(12) United States Patent
Brown et al.

(10) Patent No.: US 11,781,903 B2
(45) Date of Patent: *Oct. 10, 2023

(54) METHODS AND SYSTEMS FOR CONTROLLING TINTABLE WINDOWS WITH CLOUD DETECTION

(71) Applicant: View, Inc., Milpitas, CA (US)

(72) Inventors: Stephen Clark Brown, San Mateo, CA (US); Jason David Zedlitz, Rancho Cordova, CA (US); Jack Kendrick Rasmus-Vorrath, Mountain House, CA (US); Nitin Khanna, Sunnyvale, CA (US); Ruican Zhong, Milpitas, CA (US); Vashisth Parekh, Milpitas, CA (US); Nidhi Satyacharan Tiwari, San Jose, CA (US); Kriti Chandra Sharma, Seoul (KR)

(73) Assignee: View, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/066,799

(22) Filed: Dec. 15, 2022

(65) Prior Publication Data

US 2023/0127664 A1 Apr. 27, 2023

Related U.S. Application Data

(63) Continuation of application No. 17/027,601, filed on Sep. 21, 2020, now Pat. No. 11,566,938, which is a (Continued)

(51) Int. Cl.
G01J 1/02 (2006.01)
G01J 1/42 (2006.01)
(Continued)

(52) U.S. Cl.
CPC .............. *G01J 1/0219* (2013.01); *E06B 9/24* (2013.01); *G01J 1/0242* (2013.01);
(Continued)

(58) Field of Classification Search
CPC ...... G01J 1/0219; G01J 1/0242; G01J 1/4228; G01J 2001/4266; E06B 9/24;
(Continued)

(56) References Cited

U.S. PATENT DOCUMENTS 3,675,023 A 7/1972 Kunke et al.
3,963,347 A 6/1976 Segre et al.
(Continued)

FOREIGN PATENT DOCUMENTS

CH 707305 A1 6/2014
CN 200966026 Y 10/2007
(Continued)

OTHER PUBLICATIONS

AU Examination Report dated Jul. 9, 2021 in AU Application No. 2020250299.
(Continued)

*Primary Examiner* — Jamil Ahmed
(74) *Attorney, Agent, or Firm* — Weaver, Austin, Villeneuve & Sampson, LLP; Brian D. Griedel

(57) ABSTRACT

Methods and systems for controlling tintable windows based on cloud detection.

30 Claims, 38 Drawing Sheets

Related U.S. Application Data continuation-in-part of application No. PCT/US2019/023186, filed on Mar. 20, 2019, and a continuation-in-part of application No. 16/695,057, filed on Nov. 25, 2019, now Pat. No. 10,732,028, which is a continuation of application No. 15/514,480, filed as application No. PCT/US2015/052822 on Sep. 29, 2015, now Pat. No. 10,539,456, said application No. PCT/US2019/023186 is a continuation-in-part of application No. PCT/US2017/055631, filed on Oct. 6, 2017, which is a continuation-in-part of application No. PCT/US2016/055709, filed on Oct. 6, 2016, which is a continuation-in-part of application No. 14/998,019, filed on Oct. 6, 2015, now Pat. No. 10,690,540, said application No. PCT/US2017/055631 is a continuation-in-part of application No. 15/287,646, filed on Oct. 6, 2016, now Pat. No. 10,533,892, which is a continuation-in-part of application No. 14/998,019, filed on Oct. 6, 2015, now Pat. No. 10,690,540.

(60) Provisional application No. 62/925,716, filed on Oct. 24, 2019, provisional application No. 62/646,260, filed on Mar. 21, 2018, provisional application No. 62/057,104, filed on Sep. 29, 2014, provisional application No. 62/451,407, filed on Feb. 1, 2017.

(51) Int. Cl.
  *E06B 9/24* (2006.01)
  *G01W 1/12* (2006.01)
  *E06B 9/68* (2006.01)

(52) U.S. Cl.
  CPC ............ *G01J 1/4228* (2013.01); *G01W 1/12* (2013.01); *E06B 2009/2464* (2013.01); *E06B 2009/6818* (2013.01); *E06B 2009/6827* (2013.01); *G01J 2001/4266* (2013.01)

(58) Field of Classification Search
  CPC ..... E06B 2009/2464; E06B 2009/6818; E06B 2009/6827; G01W 1/12
  See application file for complete search history.

(56) References Cited

U.S. PATENT DOCUMENTS

| | | | |
|---|---|---|---|
| 4,171,911 A | 10/1979 | Aberle et al. |
| D256,787 S | 9/1980 | Petersen |
| D258,871 S | 4/1981 | Rajotte, Jr. et al. |
| 4,355,896 A | 10/1982 | Frosch et al. |
| 4,491,727 A | 1/1985 | Appelbaum et al. |
| D278,132 S | 3/1985 | Powell |
| 4,628,206 A | 12/1986 | Astheimer |
| 4,690,553 A | 9/1987 | Fukamizu et al. |
| 4,742,236 A | 5/1988 | Kawakami et al. |
| 5,217,296 A | 6/1993 | Tanner et al. |
| 5,379,215 A | 1/1995 | Kruhoeffer et al. |
| 5,489,777 A | 2/1996 | Stedman et al. |
| 5,583,972 A | 12/1996 | Miller |
| 5,606,393 A | 2/1997 | Schoenherr et al. |
| 5,621,526 A | 4/1997 | Kuze |
| 5,656,807 A | 8/1997 | Packard |
| 5,670,774 A | 9/1997 | Hill |
| 5,838,432 A | 11/1998 | Tokuhashi et al. |
| 6,104,513 A | 8/2000 | Bloom |
| 6,125,327 A | 9/2000 | Kalenian |
| 6,163,756 A | 12/2000 | Baron et al. |
| D439,532 S | 3/2001 | Off et al. |
| 6,266,063 B1 | 7/2001 | Baron et al. |
| 6,269,763 B1 | 8/2001 | Woodland |
| 6,417,500 B1 | 7/2002 | Wood |
| 6,466,312 B1 | 10/2002 | Li |
| 7,049,602 B2 | 5/2006 | Tokhtuev et al. |
| 7,079,944 B2 | 7/2006 | Litchfield et al. |
| 7,105,800 B1 | 9/2006 | Staerzl |
| 7,472,590 B2 | 1/2009 | Solheim et al. |
| 7,562,928 B1 | 7/2009 | Morazan |
| 7,587,289 B1 | 9/2009 | Sivertsen |
| 7,714,290 B2 | 5/2010 | Kudoh |
| 7,873,490 B2 | 1/2011 | MacDonald |
| 8,102,586 B2 | 1/2012 | Albahri |
| 8,254,013 B2 | 8/2012 | Mehtani et al. |
| 8,270,059 B2 | 9/2012 | Friedman et al. |
| 8,300,298 B2 | 10/2012 | Wang et al. |
| 8,432,603 B2 | 4/2013 | Wang et al. |
| 8,456,729 B2 | 6/2013 | Brown et al. |
| 8,582,193 B2 | 11/2013 | Wang et al. |
| 8,681,073 B1 | 3/2014 | Robbins et al. |
| 8,705,162 B2 | 4/2014 | Brown et al. |
| 8,754,983 B2 | 6/2014 | Sutton |
| 8,764,950 B2 | 7/2014 | Wang et al. |
| 8,764,951 B2 | 7/2014 | Wang et al. |
| D712,759 S | 9/2014 | Forsberg et al. |
| 8,836,263 B2 | 9/2014 | Berman et al. |
| D723,600 S | 3/2015 | Nauli et al. |
| D725,284 S | 3/2015 | Karlsson et al. |
| D727,467 S | 4/2015 | Batiste |
| 9,164,002 B2 | 10/2015 | Anderson |
| D747,988 S | 1/2016 | Matsumiya et al. |
| D748,508 S | 2/2016 | Park et al. |
| 9,261,751 B2 | 2/2016 | Pradhan et al. |
| D761,135 S | 7/2016 | Allen, Sr. et al. |
| 9,406,028 B2 | 8/2016 | Humann |
| 9,506,802 B2 | 11/2016 | Chu et al. |
| D780,612 S | 3/2017 | Alexander et al. |
| 9,638,978 B2 | 5/2017 | Brown et al. |
| 9,664,974 B2 | 5/2017 | Kozlowski et al. |
| 9,746,181 B2 | 8/2017 | Mori |
| D816,518 S | 5/2018 | Brown et al. |
| 10,063,815 B1 | 8/2018 | Spivey et al. |
| 10,234,596 B2 | 3/2019 | Frank et al. |
| 10,241,095 B2 | 3/2019 | Coates |
| 10,533,892 B2 | 1/2020 | Brown et al. |
| 10,539,456 B2 | 1/2020 | Klawuhn et al. |
| 10,690,540 B2 | 6/2020 | Brown et al. |
| 10,732,028 B2 | 8/2020 | Klawuhn et al. |
| 10,802,372 B2 | 10/2020 | Brown |
| 10,895,498 B2 | 1/2021 | Klawuhn et al. |
| 11,221,434 B2 | 1/2022 | Frank et al. |
| 11,255,722 B2 | 2/2022 | Zedlitz et al. |
| 11,280,671 B2 | 3/2022 | Brown et al. |
| 11,346,710 B2 | 5/2022 | Klawuhn et al. |
| 11,566,938 B2 | 1/2023 | Brown et al. |
| 11,674,843 B2 | 6/2023 | Zedlitz et al. |
| 2002/0075472 A1 | 6/2002 | Holton |
| 2003/0076480 A1 | 4/2003 | Burbulla |
| 2004/0043760 A1 | 3/2004 | Rosenfeld et al. |
| 2004/0047518 A1 | 3/2004 | Tiana |
| 2004/0108191 A1 | 6/2004 | Su et al. |
| 2004/0135989 A1 | 7/2004 | Klebe |
| 2006/0038983 A1 | 2/2006 | Bickel et al. |
| 2006/0207730 A1 | 9/2006 | Berman et al. |
| 2006/0238860 A1 | 10/2006 | Baun et al. |
| 2007/0012349 A1 | 1/2007 | Gaudiana et al. |
| 2007/0145252 A1 | 6/2007 | Litchfield et al. |
| 2007/0221338 A1 | 9/2007 | Meewis et al. |
| 2008/0012755 A1 | 1/2008 | Venkatachalam et al. |
| 2008/0128586 A1 | 6/2008 | Johnson et al. |
| 2008/0173818 A1 | 7/2008 | Staerzl |
| 2008/0174455 A1 | 7/2008 | Staerzl |
| 2009/0027759 A1 | 1/2009 | Albahri |
| 2009/0079349 A1 | 3/2009 | Sibalich et al. |
| 2009/0254222 A1 | 10/2009 | Berman et al. |
| 2009/0281820 A1 | 11/2009 | Sarkar et al. |
| 2009/0316671 A1 | 12/2009 | Rolf et al. |
| 2009/0326709 A1 | 12/2009 | Hooper et al. |
| 2010/0100324 A1 | 4/2010 | Caminiti et al. |
| 2010/0235206 A1 | 9/2010 | Miller et al. |
| 2011/0295575 A1 | 12/2011 | Levine et al. |
| 2011/0308318 A1 | 12/2011 | Magnussen |

(56) References Cited

U.S. PATENT DOCUMENTS

| | | |
|---|---|---|
| 2012/0006110 A1 | 1/2012 | Niemann et al. |
| 2012/0007507 A1 | 1/2012 | Niemann et al. |
| 2012/0070071 A1 | 3/2012 | Rankin et al. |
| 2012/0089257 A1 | 4/2012 | Holger |
| 2012/0133315 A1 | 5/2012 | Berman et al. |
| 2012/0239209 A1 | 9/2012 | Brown et al. |
| 2012/0323382 A1 | 12/2012 | Kamel et al. |
| 2013/0021659 A1 | 1/2013 | Friedman et al. |
| 2013/0057937 A1 | 3/2013 | Berman et al. |
| 2013/0063065 A1 | 3/2013 | Berman et al. |
| 2013/0139804 A1 | 6/2013 | Goldberg |
| 2013/0271812 A1* | 10/2013 | Brown .............. G01J 1/4228 359/275 |
| 2013/0271813 A1 | 10/2013 | Brown |
| 2013/0271814 A1 | 10/2013 | Brown |
| 2013/0271815 A1 | 10/2013 | Pradhan et al. |
| 2014/0055014 A1 | 2/2014 | Pan |
| 2014/0067733 A1 | 3/2014 | Humann |
| 2014/0083413 A1 | 3/2014 | Bibi et al. |
| 2014/0117852 A1 | 5/2014 | Zhai et al. |
| 2014/0145002 A1 | 5/2014 | Caldeira et al. |
| 2014/0156079 A1 | 6/2014 | Courtney et al. |
| 2014/0236323 A1 | 8/2014 | Brown et al. |
| 2014/0262057 A1 | 9/2014 | Chambers et al. |
| 2014/0268287 A1 | 9/2014 | Brown et al. |
| 2014/0300945 A1 | 10/2014 | Parker |
| 2015/0070190 A1 | 3/2015 | Wai Fong et al. |
| 2015/0161515 A1 | 6/2015 | Matsuoka |
| 2015/0177415 A1 | 6/2015 | Bing |
| 2015/0316473 A1 | 11/2015 | Kester et al. |
| 2016/0040478 A1 | 2/2016 | Lundy et al. |
| 2016/0054633 A1 | 2/2016 | Brown et al. |
| 2016/0090098 A1 | 3/2016 | Kim et al. |
| 2016/0127642 A1 | 5/2016 | Schechner et al. |
| 2016/0203403 A1 | 7/2016 | Nagel et al. |
| 2016/0277688 A1 | 9/2016 | Gaskamp et al. |
| 2016/0283774 A1 | 9/2016 | Buchanan et al. |
| 2017/0031056 A1 | 2/2017 | Vega-Avila et al. |
| 2017/0097259 A1 | 4/2017 | Brown et al. |
| 2017/0122802 A1 | 5/2017 | Brown et al. |
| 2017/0125875 A1 | 5/2017 | Courtney et al. |
| 2017/0276542 A1 | 9/2017 | Klawuhn et al. |
| 2017/0293049 A1 | 10/2017 | Frank et al. |
| 2019/0171081 A1 | 6/2019 | Zedlitz et al. |
| 2019/0235129 A1 | 8/2019 | Frank et al. |
| 2019/0250029 A1 | 8/2019 | Zedlitz et al. |
| 2020/0063490 A1 | 2/2020 | Hebeisen et al. |
| 2020/0200595 A1 | 6/2020 | Klawuhn et al. |
| 2020/0209057 A1 | 7/2020 | Brown et al. |
| 2020/0278245 A1 | 9/2020 | Brown et al. |
| 2020/0363261 A1 | 11/2020 | Klawuhn et al. |
| 2021/0080319 A1 | 3/2021 | Brown et al. |
| 2021/0108960 A1 | 4/2021 | Klawuhn et al. |
| 2021/0190991 A1 | 6/2021 | Frank et al. |
| 2022/0026267 A1 | 1/2022 | Brown et al. |
| 2022/0113184 A1 | 4/2022 | Zedlitz et al. |
| 2022/0163385 A1 | 5/2022 | Brown et al. |
| 2022/0244098 A1 | 8/2022 | Klawuhn et al. |

FOREIGN PATENT DOCUMENTS

| | | |
|---|---|---|
| CN | 201104273 Y | 8/2008 |
| CN | 101702036 A | 5/2010 |
| CN | 101969207 A | 2/2011 |
| CN | 102183237 A | 9/2011 |
| CN | 102183237 B | 8/2012 |
| CN | 104181612 A | 12/2014 |
| CN | 104321497 A | 1/2015 |
| CN | 204155059 U | 2/2015 |
| CN | 204422071 U | 6/2015 |
| CN | 106575064 A | 4/2017 |
| EP | 0067706 B1 | 2/1991 |
| EP | 1012633 B1 | 3/2002 |
| EP | 2357544 A2 | 8/2011 |
| EP | 2518254 A1 | 10/2012 |
| EP | 2787162 A1 | 10/2014 |
| ES | 2308936 A1 | 12/2008 |
| JP | 2004170350 A | 6/2004 |
| JP | 2014062801 A | 4/2014 |
| JP | 2015045129 A | 3/2015 |
| TW | 201217999 A | 5/2012 |
| TW | 201220111 A | 5/2012 |
| TW | 201403034 A | 1/2014 |
| WO | WO-9913359 A1 | 3/1999 |
| WO | WO-2005052524 A1 | 6/2005 |
| WO | WO-2011124720 A2 | 10/2011 |
| WO | WO-2013105244 A1 | 7/2013 |
| WO | WO-2013181408 A2 | 12/2013 |
| WO | WO-2014121863 A1 | 8/2014 |
| WO | WO-2015095615 A1 | 6/2015 |
| WO | WO-2015171886 A1 | 11/2015 |
| WO | WO-2016004109 A1 | 1/2016 |
| WO | WO-2017007942 A1 | 1/2017 |
| WO | WO-2017062592 A1 | 4/2017 |
| WO | WO-2017189437 A1 | 11/2017 |
| WO | WO-2017210346 A1 | 12/2017 |
| WO | WO-2018067996 A1 | 4/2018 |
| WO | WO-2019183232 A1 | 9/2019 |
| WO | WO-2021080879 A1 | 4/2021 |

OTHER PUBLICATIONS

AU Office Action dated Nov. 19, 2021, in Application No. AU2020250299.

AU Office action dated Sep. 29, 2022, in AU Application No. AU2021205049.

Australian Examination Report dated Aug. 20, 2020 in AU Application No. 2016334038.

Australian Examination Report dated May 31, 2019 in AU Application No. 2016334038.

Boltwood Cloud Sensor II by Diffraction Limited, 2016, [online], [retrieved Dec. 15, 2016]. Retrieved from the internet URL http://diffractionlimited.com/product/boltwood-cloud-sensor-ii/.

CA Office Action dated Dec. 5, 2022 in Application No. CA3000852.

CA Office Action dated Dec. 7, 2021, in Application No. CA2963096.

CA Office Action dated Sep. 29, 2022, in Application No. CA2963096.

Campbell-Burns, Peter, "Building a Cloud Sensor", Farnham Astronomical Society, (Apr. 15, 2013), Retrieved from the internet: URL: https://www.farnham-as.co.uk/2813/84/building-a-cloud-sensor/ [retrieved on 2828-84-24].

Canadian Office Action dated Apr. 11, 2017 in CA Design Application No. 170770.

Canadian Office Action dated Nov. 15, 2017 in CA Design Application No. 170770.

C-Bus Multi-Sensors, posted on clipsal.com. [online] <url: https:= "" www.clipsal.com/Trade/Products/Integrated-Systems/C-Bus-Control-and-Management-System/C-Bus-1 nput-Units/Sensors-and- Detectors#. WOf1 Lvkrlm E.</url:>.

Chinese Office Action dated Apr. 27, 2017 in CN Design Application No. 201630492174.4.

Chinese Office Action dated Apr. 3, 2018 in CN Application No. 201580059148.5.

Chinese Office Action dated Aug. 1, 2019 in CN Application No. 201580059148.5.

Chinese Office Action dated Aug. 17, 2020 in CN Application No. 201680062708.7 with Translation.

Chinese Office Action dated Dec. 1, 2020 in CN Application No. 201580059148.5, with English Translation.

Chinese Office Action dated Dec. 10, 2020 in CN Application No. 201580052861.7 with Translation.

Chinese Office Action dated Feb. 2, 2019 in CN Application No. 201580059148.5.

Chinese Office Action dated Jan. 12, 2021 in CN Application No. 201780065447.9 with Translation.

Chinese Office Action dated Mar. 25, 2019 in CN Application No. 201580052861.7.

Chinese Office Action dated May 6, 2020 in CN Application No. 201580059148.5.

(56) References Cited

OTHER PUBLICATIONS

Chinese Office Action dated Nov. 20, 2019 in CN Application No. 201680062708.7 with Translation.
Clay, R.W., et al., "A cloud monitoring system for remote sites," Publications of the Astronomical Society of Australia, vol. 15, No. 3, Jan. 1998, pp. 332-335.
CN Office Action dated Sep. 28, 2022 in Application No. CN201980029927.9 with English translation.
CN Office Action dated Feb. 25, 2022 in Application No. CN201980029927.9 with English translation.
CN Office Action dated Apr. 13, 2020 in Chinese Application No. 201580052861.7, with Translation.
CN Office Action dated Apr. 27, 2022, in Application No. CN201780039437.8 with English translation.
CN Office Action dated Aug. 4, 2021, in CN Application No. 201780039437.8 with English translation.
CN Office Action dated Feb. 23, 2021 in Chinese Application No. 201680062708.7,with Translation.
CN Office Action dated Nov. 3, 2021, in Application No. 201780065447.9 with English translation.
CN Office Action dated Sep. 5, 2022, in Application No. CN201780039437.8 with English translation.
CN Rejection Decision dated Mar. 19, 2021 in Chinese Application No. 201580059148.5, without English Translation.
Duchon, Claude E. et al., "Estimating Cloud Type from Pyranometer Observations," Journal of Applied Meteorology, vol. 38, Jan. 1999, pp. 132-141.
English translation of CN201104273 description form worldwide. espacenet.com.
English translation of JP2004170350 description form worldwide. espacenet.com.
EP Office Action dated Mar. 4, 2022, in Application No. EP17859286.1.
EP Office Action dated Feb. 3, 2021 in European Application No. 15848030.1.
EP Office Action dated Oct. 1, 2021, in application No. EP17807428.2.
European Examination Report dated Jul. 11, 2019 in EP Application No. 16854302.3.
European Office Action dated Aug. 27, 2019 in EP Application No. 15848030.1.
European Office Action dated Feb. 21, 2019 in EP Application No. 15845648.3.
European Office Action dated Sep. 29, 2022 in Application No. EP16854302.3.
European (Partial) Search Report dated Dec. 17, 2019 in EP Application No. 17807428.2.
Ex Parte Quayle Action, dated Feb. 2, 2021, in U.S. Appl. No. 16/335,222.
Examination Report No. 1, dated May 7, 2020, for Australian Patent Application No. 2015324000 3 pages.
Extended European Search Report dated Apr. 26, 2018 in EP Application No. 15845648.3.
Extended European Search Report dated Jul. 16, 2021 in EP Application No. 21150305.7.
Extended European Search Report dated May 3, 2018 in EP Application No. 15848030.1.
Gen5 Z-Wave Plus 6-in-1 Multisensor, posted on thesmartesthouse.com, Earliest review on Aug. 27, 2015. [online] <url: https://www.thesmartesthouse.com/products/aeotec-by-aeon-labs-z-wave-5-in-1-multisensor#shopify-product-reviews</url.
Graham, Steve, "Clouds & Radiation," Mar. 1, 1999. [http://earthobservatory.nasa.gov/Features/Clouds/].
Haby, Jeff, "Cloud Detection (IR v. VIS)," (known as of Sep. 3, 2014) [http://theweatherprediction.com/habyhints2/512/].
"Halio Rooftop Sensor Kit (Model SR500)," Product Data Sheet, Kinestral Technologies, 2020, 4 pp.
Hoosier Energy, "How do they do that? Measuring Real-Time Cloud Activity" Hoosier Energy Current Connections, (known as of Sep. 3, 2014). (http://members.questline.com/Article.aspx?articleID=18550&accountID=196000&nl=11774).
Humann, C., "HDR sky imaging for real time control of facades," presented Nov. 18, 2021 at Velux Build for Life conference. 21 pages of screenshots. Retrieved from internet: https://vimeo.com/647274396.
Idso, Sherwood B., "Humidity measurement by infrared thermometry," Remote Sensing of Environment, vol. 12, 1982, pp. 87-91.
IN Office Action dated Aug. 5, 2022 In Application No. 202037045202.
IN First Examination Report dated Jul. 7, 2021 in Indian Patent Application No. 201917013204.
IN First Examination Report dated Mar. 15, 2021 in Indian Patent Application No. 201837010260.
IN office action dated Dec. 23, 2021, in application No. 202138004652.
IN Office Action dated Mar. 30, 2022 in Application No. IN202138040983.
Indian First Examination Report dated Sep. 17, 2020 in Indian Patent Application No. 201737011527.
International Preliminary Report on Patentability dated Apr. 13, 2017 in PCT/US2015/052822.
International Preliminary Report on Patentability dated Apr. 13, 2017 in PCT/US2015/053041.
International Preliminary Report on Patentability dated Apr. 18, 2019 in PCT/US17/55631.
International Preliminary Report on Patentability dated Apr. 19, 2018 in PCT/US2016/055709 International Preliminary Report on Patentability dated Apr. 19, 2018 in PCT/US2016/055709.
International Preliminary Report on Patentability dated Dec. 13, 2018 in PCT/US17/35290.
International Preliminary Report on Patentability dated Sep. 22, 2020 in PCT/US19/23186.
International Search Report and Written Opinion dated Dec. 15, 2016 in PCT/US2016/055709.
International Search Report and Written Opinion dated Dec. 18, 2015 in PCT/US2015/053041.
International Search Report and Written Opinion dated Jan. 14, 2016 in PCT/US2015/052822.
International Search Report and Written Opinion dated Jan. 25, 2018 in PCT/US17/55631.
International Search Report and Written Opinion dated Sep. 8, 2017, issued in PCT/US17/35290.
International Search Report and Written Opinion (ISA:EPO) dated Feb. 22, 2021 in PCT/US2020/056164.
International Search Report and Written Opinion (ISA:EPO) dated Jul. 5, 2019 in PCT/US19/23186.
Kipp & Zonen, "Solar Radiation" (known as of Sep. 3, 2014) [http://www.kippzonen.com/Knowledge-Center/Theoretical-info/Solar-Radiation].
Kleissl, Jan et al., "Recent Advances in Solar Variability Modeling and Solar Forecasting at UC San Diego," Proceedings, American Solar Energy Society, 2013 Solar Conference, Apr. 16-20, 2013, Baltimore, MD.
KR Office Action dated Dec. 23, 2021, in application No. 1020197011968 with English Translation.
KR Office Action dated Feb. 18, 2022, in Application No. KR1020177011520 with English Translation.
"Sky temperature" in Designing Buildings Wiki, Apr. 26, 2015, https://www.designingbuildings.co.uk/wiki/Sky_temperature [retrieved Jul. 19, 2019].
Maghrabi, A., et al., "Design and development of a simple infrared monitor for cloud detection," Energy Conversion and Management, vol. 50, 2009, pp. 2732-2737.
Maghrabi, A., et al., "Precipitable water vapour estimation on the basis of sky temperatures measured by a single-pixel IR detector and screen temperatures under clear skies," Meteorological Applications, vol. 17, 2010, pp. 279-286.
Melexis "MLX90614 family Datasheet" (3901090614, Rev. 004), Jul. 30, 2008, 42 pp.
Merriam-Webster, Inc., "Pyrometer," Merriam-Webster's Collegiate Dictionary 10th Edition, Springfield, MA, 2001, p. 950 (4 pp.).
Mims III, Forrest M., et al., "Measuring total column water vapor by pointing an infrared thermometer at the sky," Bulletin of the American Meteorological Society, Oct. 2011, pp. 1311-1320.

(56) References Cited

OTHER PUBLICATIONS

Morris, V.R. et al., "Deployment of an infrared thermometer network at the atmospheric radiation measurement program southern great plains climate research facility," Sixteenth ARM Science Team Meeting Proceedings, Albuquerque, NM, Mar. 27-31, 2006, 11 pp.
National Aeronautics & Space Administration, "Cloud Radar System (CRS)," (known as of Sep. 3, 2014), published date of Jun. 16, 2014, [ http://har.gsfc.nasa.gov/index.php?section=12].
National Aeronautics & Space Administration, "Cloud Remote Sensing and Modeling," (known as of Sep. 3, 2014), published date of Sep. 15, 2014, [http://atmospheres.gsfc.nasa.gov/climate/index.php?section=134 ].
Notice of Allowance dated Nov. 29, 2021 in U.S. Appl. No. 16/696,887.
Notice of Allowance dated Oct. 14, 2021 in U.S. Appl. No. 16/871,976.
Notice of Allowance dated Oct. 27, 2021 in U.S. Appl. No. 16/335,222.
Notice of Allowance dated Sep. 17, 2021 in U.S. Appl. No. 16/262,775.
PCT International Preliminary Report on Patentability dated May 5, 2022 issued in PCT/US2020/056164.
"SPN1 Sunshine Pyranometer," Product Overview, Specification, Accessories and Product Resources, Delta-T Devices, May 5, 2016, 9 pp. https://www.delta-t.co.uk/product/spn1/ (downloaded Apr. 28, 2020).
Preliminary Amendment dated Feb. 20, 2018 in U.S. Appl. No. 15/287,646.
Preliminary Amendment dated Mar. 12, 2020, in U.S. Appl. No. 16/695,057.
"Remote Sensing: Clouds," Department of Atmospheric and Ocean Science, University of Maryland, (known as of Sep. 3, 2014) [http://www.atmos.umd.edu/~pinker/remote_sensing_clouds.htm].
Russian Office Action & Search Report dated Apr. 1, 2019 in RU Application No. 2017114996.
Science and Technology Facilities Council. "Cloud Radar: Predicting The Weather More Accurately." ScienceDaily, Oct. 1, 2008. [www.sciencedaily.com/releases/2008/09/080924085200.htm].
Sloan, Raymond, et al., "Infrared Emission Spectrum of the Atmosphere," Journal of the Optical Society of America, vol. 45, No. 6, Jun. 1955, pp. 455-460.
Smith, et al. "Measuring Cloud Cover and Brightness Temperature with a Ground Based Thermal Infrared Camera", (Feb. 2008), American Meteorological Society, vol. 47, pp. 683-693.
Subramaniam, S., "Daylighting Simulations with Radiance using Matrix-based Methods", Lawrence Berkeley National Laboratory, Oct. 3, 2017, 145 pages.
SurroundVideo Series, "Pioneering Multi-Sensor IP Megapixel Cameras," [webpage] 10 pp. [retrieved Jul. 24, 2015] <url: http://web.archive.org/web/20150724235343/http://www.arecontvision.com/landing-pages/surround-video/overview.php</url.
Taiwan Office Action dated Jul. 2, 2020 in Taiwan Patent Application No. 105132457 with Translation.
Taiwan Office Action dated May 13, 2021 in Taiwan Patent Application No. 106134521 with English Translation.
Taiwanese Decision of Rejection dated Nov. 1, 2019 in TW Application No. 104131932.
Taiwanese Office Action dated Jun. 28, 2019 in TW Application No. 104131932.
Thompson, Marcus, "Boltwood cloud sensor," Cloudynights.com, Nov. 25, 2005, 6 pp. [online], [retrieved Dec. 15, 2016]. Retrieved from the internet URL http://www.cloudynights.com/page/articles/cat/user-reviews/photography/photography-accessories/boltwood-cloud-sensor-r1222.
TW Notice of Allowance dated Jun. 29, 2021 in Taiwan Patent Application No. 110115755, with English translation.
TW Office Action dated Apr. 11, 2022, in Application No. TW106134521 with English Translation.
TW Office Action dated Aug. 30, 2022, in Application No. TW108109593 with English translation.
TW Office Action dated Aug. 30, 2022 In Application No. TW110115143 with English translation.
TW Office Action dated Sep. 13, 2022, in Application No. TW106134521 with English Translation.
U.S. Corrected Notice of Allowance dated Jan. 5, 2023 in U.S. Appl. No. 17/027,601.
U.S. Corrected Notice of Allowability dated Dec. 9, 2021 in U.S. Appl. No. 16/262,775
U.S. Corrected Notice of Allowability dated Jan. 12, 2022, in U.S. Appl. No. 16/335,222.
U.S. Corrected Notice of Allowability dated Nov. 24, 2021, in U.S. Appl. No. 16/335,222.
U.S. Corrected Notice of Allowance dated Aug. 19, 2021 in U.S. Appl. No. 16/871,976.
U.S. Corrected Notice of Allowance dated Feb. 10, 2022 in U.S. Appl. No. 16/949,493.
U.S. Corrected Notice of Allowance dated Feb. 22, 2022 in U.S. Appl. No. 16/696,887.
U.S. Corrected Notice of Allowance dated May 4, 2022, in U.S. Appl. No. 16/949,493.
U.S. Corrected Notice of Allowance dated May 18, 2022, in U.S. Appl. No. 16/303,384.
U.S. Corrected Notice of Allowance dated Sep. 26, 2022 in U.S. Appl. No. 17/027,601.
U.S. Final office Action dated Jan. 4, 2023 in U.S. Appl. No. 17/249,595.
U.S. Final Office Action dated Apr. 8, 2022, in U.S. Appl. No. 17/027,601.
U.S. Final Office Action dated Feb. 21, 2019 in U.S. Appl. No. 15/287,646.
U.S. Final Office Action dated Jan. 17, 2019 in U.S. Appl. No. 14/998,019.
U.S. Final Office Action dated Sep. 26, 2018 in U.S. Appl. No. 15/514,480.
U.S. Non Final Office Action dated Jan. 21, 2022, in U.S. Appl. No. 16/303,384.
U.S. Non-Final office Action dated Jul. 21, 2022 in U.S. Appl. No. 17/249,595.
U.S. Non-Final Office Action dated Dec. 6, 2022 in U.S. Appl. No. 16/303,384.
U.S. Non-Final Office Action dated Oct. 13, 2022, in U.S. Appl. No. 17/304,832.
U.S. Non-Final Office Action dated Oct. 18, 2021 in U.S. Appl. No. 16/949,493.
U.S. Non-Final Office Action dated Sep. 13, 2021, in U.S. Appl. No. 17/027,601.
U.S. Notice of Allowance dated Aug. 24, 2022 in U.S. Appl. No. 16/303,384.
U.S. Notice of Allowance dated Sep. 12, 2022 in U.S. Appl. No. 17/027,601.
U.S. Notice of Allowance dated Apr. 14, 2021 in U.S. Appl. No. 16/335,222.
U.S. Notice of Allowance dated Apr. 29, 2020 in U.S. Appl. No. 14/998,019.
U.S. Notice of Allowance dated Aug. 3, 2021 in U.S. Appl. No. 16/335,222.
U.S. Notice of Allowance dated Aug. 12, 2021 in U.S. Appl. No. 16/335,222.
U.S. Notice of Allowance dated Dec. 12, 2017 in Design U.S. Appl. No. 29/560,076.
U.S. Notice of Allowance dated Feb. 1, 2023 in U.S. Appl. No. 17/304,832.
U.S. Notice of Allowance dated Jan. 23, 2020 in U.S. Appl. No. 14/998,019.
U.S. Notice of Allowance dated Jan. 24, 2019 in U.S. Appl. No. 15/514,480.
U.S. Notice of Allowance dated Jan. 28, 2022 in U.S. Appl. No. 16/949,493.
U.S. Notice of Allowance dated Jul. 15, 2021 in U.S. Appl. No. 16/871,976.

(56) References Cited

OTHER PUBLICATIONS

U.S. Notice of Allowance dated Jun. 1, 2020 in U.S. Appl. No. 16/695,057.
U.S. Notice of Allowance dated May 4, 2022 in U.S. Appl. No. 16/303,384.
U.S. Notice of Allowance dated May 23, 2019 in U.S. Appl. No. 15/514,480.
U.S. Notice of Allowance dated Nov. 1, 2018 in U.S. Appl. No. 15/513,535.
U.S. Notice of Allowance dated Oct. 15, 2020 in U.S. Appl. No. 16/946,168.
U.S. Notice of Allowance dated Sep. 27, 2021 in U.S. Appl. No. 16/262,775.
U.S. Notice of Allowance dated Sep. 6, 2019 in U.S. Appl. No. 15/514,480.
U.S. Notice of Allowance dated Sep. 9, 2019 in U.S. Appl. No. 15/287,646.
U.S. Office Action dated Apr. 14, 2021 in U.S. Appl. No. 16/262,775.
U.S. Office Action dated Aug. 2, 2017 in U.S. Appl. No. 14/998,019.
U.S. Office Action dated Aug. 9, 2018 in U.S. Appl. No. 15/287,646.
U.S. Office Action dated Dec. 10, 2020 in U.S. Appl. No. 16/871,976.
U.S. Office Action dated Dec. 9, 2020 in U.S. Appl. No. 16/696,887.
U.S. Office Action dated Feb. 20, 2020 in U.S. Appl. No. 16/262,775.
U.S. Office Action dated Jan. 22, 2018 in U.S. Appl. No. 15/514,480.
U.S. Office Action dated Jul. 13, 2021 in U.S. Appl. No. 16/696,887.
U.S. Office Action dated Jun. 11, 2020 in U.S. Appl. No. 16/303,384.
U.S. Office Action dated Jun. 14, 2019 in U.S. Appl. No. 14/998,019.
U.S. Office Action dated Jun. 29, 2018 in U.S. Appl. No. 15/513,535.
U.S. Office Action dated Jun. 8, 2018 in U.S. Appl. No. 14/998,019.
U.S. Office Action dated Mar. 3, 2021 in U.S. Appl. No. 16/303,384.
U.S. Office Action dated May 5, 2017 in Design U.S. Appl. No. 29/560,076.
U.S. Office Action dated Sep. 29, 2020 in U.S. Appl. No. 16/262,775.
Werner, Christian, "Automatic cloud cover indicator system," Journal of Applied Meteorology, vol. 12, Dec. 1973, pp. 1394-1400.
U.S. Corrected Notice of Allowance dated Feb. 16, 2023 in U.S. Appl. No. 17/304,832.
U.S. Non-Final Office Action dated Apr. 12, 2023 in U.S. Appl. No. 17/450,091.
U.S. Notice of Allowance dated May 4, 2023 in U.S. Appl. No. 17/304,832.
U.S. Appl. No. 18/308,658, inventors Zedlitz; Jason David., filed Apr. 27, 2023.
U.S. Restriction requirement dated Mar. 14, 2023 in U.S. Appl. No. 17/651,013.

* cited by examiner

A - Direct Sunlight Penetration
B - Clear Sky Prediction
C - Real-time Irradiance accounting for obstructed and reflected A1- Direct Sunlight Penetration (Glare control)
B - Clear Sky Prediction
C1 – Irradiance Photosensor Value
D – Infrared Sensor Value

Occupancy Lookup Table

Tint level (SGHC value)

| Penetration Depth \ Space Type | Desk 1 | Desk 2 | Lobby |
|---|---|---|---|
| 2 feet | 10 (0.60) | 0 (0.80) | 0 (0.80) |
| 4 feet | 20 (0.40) | 5 (0.70) | 0 (0.80) |
| 6 feet | 30 (0.20) | 10 (0.60) | 5 (0.70) |
| 8 feet | 35 (0.10) | 20 (0.40) | 10 (0.60) |
| 10 feet | 35 (0.10) | 35 (0.10) | 10 (0.60) |
| 12 feet | 35 (0.10) | 35 (0.10) | 15 (0.50) |

*FIG. 25*

METHODS AND SYSTEMS FOR CONTROLLING TINTABLE WINDOWS WITH CLOUD DETECTION

CROSS-REFERENCES TO RELATED APPLICATIONS

This application is a continuation of U.S. patent application Ser. No. 17/027,601, filed on Sep. 21, 2020 and titled "METHODS AND SYSTEMS FOR CONTROLLING TINTABLE WINDOWS WITH CLOUD DETECTION," which claims priority to and benefit of U.S. Provisional Application 62/925,716, filed on Oct. 24, 2019 and titled "METHODS AND SYSTEMS FOR CONTROLLING TINTABLE WINDOWS WITH CLOUD DETECTION;" U.S. patent application Ser. No. 17/027,601 is a continuation-in-part of International PCT application PCT/US2019/023186 (designating the United States), filed on Mar. 20, 2019 and titled "METHODS AND SYSTEMS FOR CONTROLLING TINTABLE WINDOWS WITH CLOUD DETECTION," which claims priority to and benefit of U.S. Provisional Application 62/646,260, filed on Mar. 21, 2018, and titled "METHODS AND SYSTEMS FOR CONTROLLING TINTABLE WINDOWS WITH CLOUD DETECTION;" International PCT application PCT/US2019/023186 is a continuation-in-part of international PCT application PCT/US2017/055631 (designating the United States), filed on Oct. 6, 2017 and titled "INFRARED CLOUD DETECTOR SYSTEMS AND METHODS, which claims benefit of and priority to U.S. Provisional Application 62/453,407, filed on Feb. 2, 2017 and titled "INFRARED CLOUD DETECTOR SYSTEMS AND METHODS;" International PCT application PCT/US2017/055631 is a continuation-in-part of international PCT application PCT/US2016/055709 (designating the United States), titled "MULTI-SENSOR" and filed on Oct. 6, 2016, which is a continuation-in-part of U.S. patent application Ser. No. 14/998,019, titled "MULTI-SENSOR HAVING A RING OF PHOTOSENSORS" and filed on Oct. 6, 2015; International PCT application PCT/US2017/055631 is also a continuation-in-part of U.S. patent application Ser. No. 15/287,646, titled "MULTI-SENSOR DEVICE AND SYSTEM WITH A LIGHT DIFFUSING ELEMENT AROUND A PERIPHERY OF A RING OF PHOTOSENSORS AND AN INFRARED SENSOR" and filed on Oct. 6, 2016, which is a continuation-in-part of U.S. patent application Ser. No. 14/998,019, titled "MULTI-SENSOR HAVING A RING OF PHOTOSENSORS" and filed on Oct. 6, 2015; U.S. patent application Ser. No. 17/027,601 is also a continuation-in-part of U.S. patent application Ser. No. 16/695,057, titled "COMBI-SENSOR SYSTEMS," filed on Nov. 25, 2019, which is a continuation of U.S. patent application Ser. No. 15/514,480, filed on Mar. 24, 2017 and titled "COMBI-SENSOR SYSTEMS," which is a national stage application under 35 U.S.C. § 371 to international PCT Application PCT/US2015/052822 (designating the United States), titled "COMBI-SENSOR SYSTEMS" and filed on Sep. 29, 2015, which claims priority to and benefit of U.S. Provisional Application 62/057,104, filed on Sep. 29, 2014 and titled "COMBI-SENSOR SYSTEMS; each of these applications is hereby incorporated by reference in its entirety and for all purposes.

FIELD

The present disclosure generally relates to arrangements of sensing elements for detecting cloud cover conditions, and in particular to, infrared cloud detector systems and methods of detecting cloud cover conditions thereof.

BACKGROUND

Detecting cloud cover can be an important part of making decisions about placing equipment into operation at, for example, a robotic observatory since astronomers may want to detect clouds that may interfere with their observations. Conventional methods of mapping the sky to detect cloud cover rely on expensive imaging devices that typically rely on visible light measurements.

SUMMARY

Certain aspects pertain to a controller for controlling tint of one or more tintable windows in a zone of a building. The controller comprises a computer readable medium having control logic configured to determine a tint level at a future time for the zone of one or more tintable windows based on a cloud condition based on one or both of photosensor readings and infrared sensor readings. The controller further comprises a processor in communication with the computer readable medium and in communication with a local window controller of the tintable windows. The processor is configured to determine the cloud condition based on one or both of photosensor readings and infrared sensor readings, calculate the tint level at the future time for the zone of one or more tintable windows based on the determined cloud condition, and send tint instructions over a network to a local window controller to transition tint of the zone of tintable windows to the calculated tint level.

Certain aspects pertain to a method of controlling tint of a zone of one or more tintable windows of a building. The method comprises determining a cloud condition based on one or both of photosensor readings and infrared sensor readings, calculating a tint level at the future time for the zone of one or more tintable windows based on the determined cloud condition, and communicating tint instructions over a network to a local window controller to transition tint of the zone of tintable windows to the calculated tint level. Certain aspects pertain to methods and systems for controlling the tint level of tintable windows with cloud detection.

Certain aspects pertain to infrared cloud detector systems. In some aspects, an infrared cloud detector system comprises an infrared sensor configured to measure sky temperature based on infrared radiation received within its field-of-view, an ambient temperature sensor configured to measure an ambient temperature, and logic configured to determine a cloud condition based on a difference between the measured sky temperature and the measured ambient temperature.

In some aspects, an infrared cloud detector system comprises an infrared sensor configured to measure sky temperature based on infrared radiation received within its field-of-view, an ambient temperature sensor configured to measure an ambient temperature, a photosensor configured to measure intensity of visible light, and logic configured to determine a cloud condition. If a time of day is between a first time before sunrise and a second time after sunrise or between a third time before sunset and sunset, the logic is configured to determine the cloud condition based on a difference between the measured sky temperature and the measured ambient temperature. If the time of day is between the second time after sunrise and before the third time before sunset, the logic is configured to determine the cloud condition based on the measured intensity of visible light from the photosensor.

Certain aspects pertain to infrared cloud detector methods. In some aspects, an infrared cloud detector method comprises receiving a sky temperature reading from an infrared sensor and an ambient temperature reading from an ambient temperature sensor, calculating a difference between the sky temperature reading and the ambient temperature reading, and determining a cloud condition based on the calculated difference between the sky temperature reading and the ambient temperature reading.

In some aspects, an infrared cloud detector method comprises receiving a sky temperature reading from an infrared sensor, an ambient temperature reading from an ambient temperature sensor, and an intensity reading from a photosensor and determining whether a time of day is: (i) between a first time before sunrise and a second time after sunrise or between a third time before sunset and sunset; (ii) between the second time after sunrise and before a third time before sunset; (iii) after (i) and before (iii); or (iv) after (iii) and before (i). If the time of day is (i), (iii), or (iv), the cloud condition is determined based on a difference between the measured sky temperature and the measured ambient temperature. If the time of day is (iii), the cloud condition is determined based on the intensity reading received from the photosensor.

In another aspect, a method of controlling tintable windows installed in or on a structure comprises: (a) determining one or more maximum photosensor readings from a group of photosensors; (b) determining a cloud condition based at least in part on the one or more maximum photosensor readings from the group of photosensors; (c) calculating one or more tint levels for the tintable windows based at least in part on the cloud condition determined to generate tint instructions; and (d) communicating the tint instructions to at least one window controller to transition a tint of the tintable windows to the calculated one or more tint levels.

In some embodiments, the tint instructions are communicated over a network. In some embodiments, the at least one window controller comprises a local window controller. In some embodiments, the one or more tint levels calculated for the tintable windows are different for windows that are installed on or in different sides of the structure. In some embodiments, the group of photosensors comprises subgroups of at least two immediately adjacent photosensors. In some embodiments, the method further comprises determining an orientation of at least one member of the group of photosensors relative to an orientation of a side of the structure. In some embodiments, determining the orientation comprises using a direction determining device. In some embodiments, the direction determining device comprises a compass or a Global Positioning System (GPS) device. In some embodiments, determining the orientation comprises using a longitude and/or latitude of the structure. In some embodiments, the group of photosensors are arranged to point radially outward. In some embodiments, the group of photosensors point radially outward from a common center. In some embodiments, calculating one or more tint level is based at least in part on readings from at least one infrared sensor. In some embodiments, calculation of the one or more tint level is based at least in part on the readings from at least one infrared sensor and readings from another type of temperature sensor. In some embodiments, calculating one or more tint level is based at least in part on readings from an ambient temperature sensor at the structure. In some embodiments, calculating one or more tint level is based at least in part on an ambient temperature reading obtained from external weather feed data. In some embodiments, calculating one or more tint level is based at least in part on applying a correction factor to the ambient temperature sensor reading. In some embodiments, the correction factor is based at least in part on ambient temperature data obtained from an external weather feed.

In another aspect, an apparatus for controlling tintable windows comprises: at least one processor operatively coupled with the tintable windows, wherein the at least one processor is configured to: (i) direct determination or determine a cloud condition based at least in part on readings from at least one photosensor to generate a determined cloud condition; (ii) direct calculation or calculate one or more tint level based at least in part on the determined cloud condition; and (iii) direct sending or send tint one or more instructions to the tintable windows to transition the tintable windows to the one or more tint levels.

In some embodiments, the apparatus further comprises control logic embodied in a non-transitory computer readable medium, wherein the at least one processor in communication with the non-transitory computer readable medium. In some embodiments, the at least one processor is configured to direct determination or determine the cloud condition based at least in part on readings from at least one infrared sensor. In some embodiments, calculation of the one or more tint level is based at least in part on the readings from the at least one infrared sensor and readings from another type of temperature sensor. In some embodiments, the at least one processor is configured to direct calculation or calculate the one or more tint level based at least in part on an ambient temperature sensor reading obtained at a location of a structure, wherein the tintable windows are installed on or in the structure. In some embodiments, the at least one processor is configured to direct application or to apply a correction factor to the ambient temperature sensor reading that is based at least in part on ambient temperature weather feed data. In some embodiments, the at least one processor is configured to direct calculation or calculate the one or more tint level based at least in part on weather feed data. In some embodiments, the at least one photosensor comprises a plurality of photosensors, wherein the processor is configured to direct determination or determine an orientation of at least one of the photosensors relative to an orientation of a side of a structure, and wherein the tintable windows are installed on or in the structure. In some embodiments, the plurality of photosensors comprises groups of at least two immediately adjacent photosensors. In some embodiments, the plurality of photosensors are configured to point radially outward. In some embodiments, the plurality of photosensor are configured to point radially outward from a common center. In some embodiments, the one or more tint level is different for windows on different sides of the structure. In some embodiments, the at least one processor is configured to use a longitude and/or latitude of the structure to determine an orientation of the at least one photosensor. In some embodiments, an orientation of at least one sensor of the photosensors is based on a reading from a compass or a Global Positioning System (GPS) device.

In another aspect, a non-transitory computer-readable medium comprises program instructions for tinting one or more tintable windows, wherein the program instructions, when executed by one or more processors, are configured cause the one or more processors to: (i) generate a determination of a cloud condition based at least in part on readings from at least one photosensor; (ii) calculate of one or more tint levels based at least in part on the determined cloud condition; and (iii) generate one or more commands for tinting of the one or more tintable windows to transition the one or more tintable windows to the one or more tint levels.

In some embodiments, determination of the determined cloud condition is based at least in part on readings from at least one infrared sensor. In some embodiments, calculation of the one or more tint levels is based at least in part on an ambient temperature sensor reading obtained at a location of a structure, wherein the one or more tintable windows are installed in or on the structure. In some embodiments, the program instructions are configured to apply a correction factor to the ambient temperature sensor reading that is based at least in part on ambient temperature weather feed data. In some embodiments, the calculation of the one or more tint levels is based at least in part on weather feed data. In some embodiments, the at least one photosensor comprises a plurality of photosensors, wherein the program instructions are configured to determine an orientation of the plurality of photosensors relative to an orientation of a side of a structure, and wherein the one or more tintable windows are installed on or in the structure. In some embodiments, the one or more tint levels are different for windows on different sides of the structure. In some embodiments, the program instructions are configured to use a longitude and/or latitude of the structure to determine an orientation of the at least one photosensor. In some embodiments, the calculation is based at least in part on a determination of an orientation of the at least one photosensor, which determination is based at least in part on one or more reading from a compass and/or a Global Positioning System (GPS) device. In some embodiments, the program instructions are configured to be used by one or more controller. In some embodiments, the controller comprises a master controller, network controller and/or a local window controller. In some embodiments, calculation of the one or more tint level is based at least in part on (i) the readings from the at least one infrared sensor and/or (ii) readings from an ambient temperature sensor. In some embodiments, the program instructions are configured to be communicated over a building management system (BMS) network. In some embodiments, the program instructions are configured to be utilized by a building management system (BMS) of a structure that includes the one or more tintable windows.

In another aspect, a computer system for tinting one or more tintable windows comprises processing circuitry coupled to a memory, the memory having recorded thereon instructions that, when executed by the processing circuitry, cause the processing circuitry to be configured to generate instructions to: (i) determine, or cause a determination of, a cloud condition based at least in part on readings from at least one photosensor; (ii) calculate, or cause calculation of, one or more tint levels based at least in part on the cloud condition determined; and (iii) generate, or cause generation of, one or more commands for tinting the one or more tintable windows to transition the one or more tintable windows to the one or more tint levels.

In some embodiments, determination of the cloud condition is based at least in part on readings from at least one infrared sensor. In some embodiments, the calculation of the one or more tint level is based at least in part on an ambient temperature sensor reading obtained at a location of a structure that the one or more tintable windows are installed in or on. In some embodiments, the calculation of the one or more tint level includes calculation of a correction factor to the ambient temperature sensor reading that is based at least in part on ambient temperature weather data. In some embodiments, the calculation of the one or more tint level is based at least in part on weather data. In some embodiments, the at least one photosensor comprises a plurality of photosensors, and wherein the instructions are configured to determine an orientation of the plurality of photosensors relative to an orientation of a side of a structure, and wherein the tintable windows are installed on or in the structure. In some embodiments, the one or more tint level is different for windows on different sides of the structure. In some embodiments, the instructions are configured to use a longitude and/or latitude of the structure to determine an orientation of the at least one photosensor. In some embodiments, the at least a portion of the circuitry is disposed in a mullion of the one or more tintable windows. In some embodiments, the calculation is based at least in part on an orientation of the at least one photosensor, wherein the orientation of the at least one photosensor is based at least in part on one or more reading from a compass or a Global Positioning System (GPS) device. In some embodiments, the computer system comprises one or more controller, wherein the one or more commands are generated by the one or more controller. In some embodiments, the one or more controller comprises a master controller, network controller and/or a local window controller. In some embodiments, the one or more tint level is based at least in part on the readings from the at least one infrared sensor and readings from an ambient temperature sensor. In some embodiments, the computer system comprises, or is operatively coupled to, a building management system (BMS), wherein the one or more commands are configured to be communicated over network of the building management system (BMS). In some embodiments, the instructions are configured to be utilized by a building management system (BMS) of a structure that includes the one or more tintable windows. In some embodiments, the computer system is operatively coupled to one or more controller. In some embodiments, the one or more controller comprises a master controller, network controller and/or a local window controller.

In another aspect, the present disclosure provides systems, apparatuses (e.g., controllers), and/or non-transitory computer-readable medium (e.g., software) that implement any of the methods disclosed herein.

In another aspect, an apparatus comprises at least one controller that is programmed to direct a mechanism used to implement (e.g., effectuate) any of the method disclosed herein, wherein the at least one controller is operatively coupled to the mechanism.

In another aspect, an apparatus comprises at least one controller that is configured (e.g., programmed) to implement (e.g., effectuate) the method disclosed herein. The at least one controller may implement any of the methods disclosed herein.

In another aspect, a system comprises at least one controller that is programmed to direct operation of at least one another apparatus (or component thereof), and the apparatus (or component thereof), wherein the at least one controller is operatively coupled to the apparatus (or to the component thereof). The apparatus (or component thereof) may include any apparatus (or component thereof) disclosed herein. The at least one controller may direct any apparatus (or component thereof) disclosed herein.

In another aspect, a computer software product, comprising a non-transitory computer-readable medium in which program instructions are stored, which instructions, when read by a computer, cause the computer to direct a mechanism disclosed herein to implement (e.g., effectuate) any of the method disclosed herein, wherein the non-transitory computer-readable medium is operatively coupled to the mechanism. The mechanism can comprise any apparatus (or any component thereof) disclosed herein.

In another aspect, the present disclosure provides a non-transitory computer-readable medium comprising machine-executable code that, upon execution by one or more computer processors, implements any of the methods disclosed herein.

In another aspect, the present disclosure provides a non-transitory computer-readable medium comprising machine-executable code that, upon execution by one or more computer processors, effectuates directions of the controller(s) (e.g., as disclosed herein).

In another aspect, the present disclosure provides a computer system comprising one or more computer processors and a non-transitory computer-readable medium coupled thereto. The non-transitory computer-readable medium comprises machine-executable code that, upon execution by the one or more computer processors, implements any of the methods disclosed herein and/or effectuates directions of the controller(s) disclosed herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

These and other features and embodiments will be described in more detail with reference to the drawings.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGS." herein), of which:

FIG. 25 is an example of an occupancy lookup table according to certain aspects.

Figure 1:
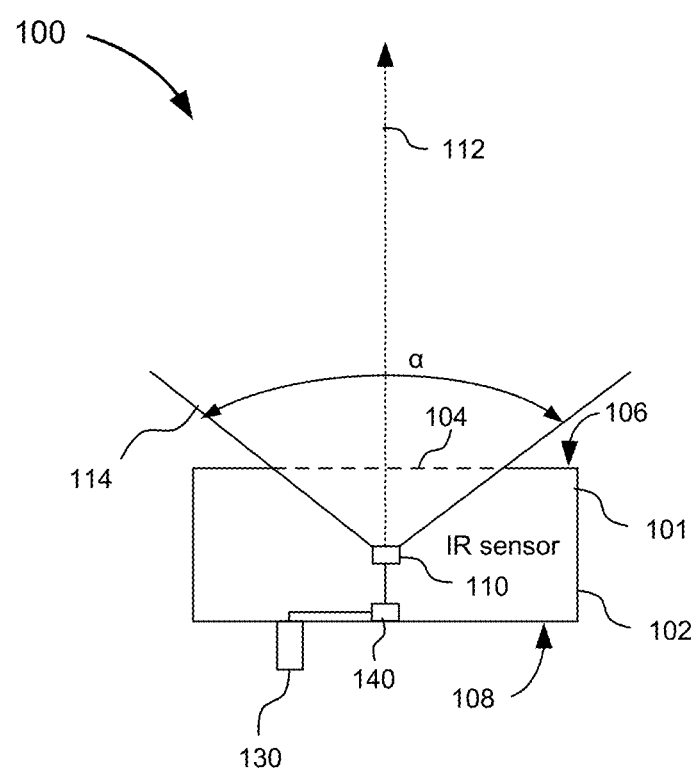
FIG. 1 shows a schematic representation of a side view of an infrared cloud detector system, according to some implementations.

The figures and components therein may not be drawn to scale. Various components of the figures described herein may not be drawn to scale.

DETAILED DESCRIPTION

While various embodiments of the invention have been shown, and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

Terms such as "a", "an" and "the" are not intended to refer to only a singular entity but include the general class of which a specific example may be used for illustration. The terminology herein is used to describe specific embodiments of the invention(s), but their usage does not delimit the invention(s).

When ranges are mentioned, the ranges are meant to be inclusive, unless otherwise specified. For example, a range between value 1 and value 2 is meant to be inclusive and include value 1 and value 2. The inclusive range will span any value from about value 1 to about value 2. The term "adjacent" or "adjacent to," as used herein, includes 'next to', 'adjoining', 'in contact with', and 'in proximity to.'

The term "operatively coupled" or "operatively connected" refers to a first mechanism that is coupled (or connected) to a second mechanism to allow the intended operation of the second and/or first mechanism. The coupling may comprise physical or non-physical coupling. The non-physical coupling may comprise signal induced coupling (e.g., wireless coupling).

I. Introduction

At certain times of the day, the intensity of visible light is at a low level such as in the morning around sunrise and in the evening just before sunset. A photosensor calibrated to measure the intensity of visible light (referred to herein as a "visible light photosensor" or as a "photosensor") does not detect direct sunlight and its intensity measurements at these times of day may not be effective in determining a cloud condition. In certain aspects, a cloud condition is determined to be one of: 1) a "clear" condition when the sky is clear without or nearly without clouds; 2) a "partially cloudy" condition; and 3) a "cloudy" or "overcast" condition when the sky is cloudy. That is, a visible light photosensor directed toward the sky at these times would measure low intensity values during a "clear" condition, a "partially cloudy" condition, and a "cloudy" condition. Consequently, the intensity measurements taken by a visible light photosensor alone may not accurately distinguish between different cloud conditions at these times. If intensity measurements from a visible light photosensor alone were used to determine a "cloudy" condition (e.g., when measured intensity levels drop below a particular minimal value) in the evening at dusk just before sunset, a false "cloudy" condition could be detected. Similarly, visible light photosensor measurements are not effective in distinguishing between "cloudy" and "clear" conditions just before sunrise when there is no direct sunlight. At any of these time periods, the photosensor measurements might be used to detect a false "cloudy"

condition. A controller that relies on a false "cloudy" determination from such photosensor readings could consequently implement an inappropriate control decision based at least in part on this false "cloudy" determination. For example, if photosensor readings determine a false "cloudy" condition at a time just before sunrise, a window controller that controls tint levels in an optically switchable window (e.g., electrochromic window) facing East might inappropriately clear the window allowing direct glare from the rising sun to shine into the room.

Moreover, a controller that makes decisions based primarily on current readings from a visible light photosensor does not account for historical intensity levels in the geographic region that could bear on probable current/future cloud cover conditions, for example, to make control commands in anticipation of a condition that is likely to occur. For example, there may be a historically low light level in the morning when small clouds pass the geographic region. In this circumstance, a small cloud temporarily blocking sunlight to the photosensor would result in the same determination of a "cloudy" condition as when a large storm were rolling into the region. In this case, the passing of a small cloud could cause the controller to transition a tintable window and possibly lock an optically switchable window into an inappropriately low tint level until the window can transition to a higher (darker) tint level.

II. Infrared (IR) Cloud Detector Systems

Both clouds and water vapor absorb and re-emit radiation in discrete bands across the infrared (IR) spectrum. Since clouds absorb and re-emit IR radiation and a clear sky transmits IR radiation, clouds are generally warmer (have higher temperature) than clear sky. In other words, the presence of clouds generally produces an enhanced IR signal (which corresponds to an approximate black body spectrum at about ground temperature) above a signal from the clear sky. There is also the lesser effect of atmospheric humidity, which can also produce an enhanced IR signal, particularly at low elevations. Based at least in part on these distinctions, devices that measure IR radiation can be effective in detecting a cloud condition.

Various implementations relate to infrared cloud detectors and methods thereof that detect cloud cover and/or other cloud condition based at least in part on infrared readings. The infrared cloud detectors generally include at least one infrared (IR) sensor and at least one ambient temperature sensor used in conjunction to take temperature readings of the sky that can be used to detect cloud cover conditions. Generally speaking, the amount of infrared radiation emitted by a medium/object and that is then measured by an IR sensor varies depending on the temperature of the medium/object, the surface and other physical characteristics of the medium/object, the field-of-view of the IR sensor, and the distance between the medium/objects and the IR sensor. The IR sensor converts IR radiation received within its field-of-view to a voltage/current and the voltage/current to corresponding temperature readings (e.g., digital temperature reading) of the medium/object within its field-of-view. For example, an IR sensor directed (oriented) to face the sky outputs temperature readings of a region of the sky within its field-of-view. The IR sensor can be oriented in a particular direction (e.g., azimuthal angle and altitude angle) to preferentially capture IR radiation in the geographical region of the sky within its field-of-view centered about that direction. The ambient temperature sensor measures the temperature of ambient air surrounding the sensor. Generally the ambient temperature sensor is located to measure the temperature of ambient air surrounding the infrared cloud detector. The infrared cloud detector also has a processor that determines the difference between the temperature readings taken by the IR sensor and the ambient temperature sensor and uses this difference to detect the amount of cloud cover in a region of the sky within the field-of-view of the IR sensor.

Generally, temperature readings taken by an ambient temperature sensor tend to fluctuate to a lesser extent with changing weather conditions than sky temperature readings taken by an infrared radiation sensor. For example, sky temperature readings taken by an infrared radiation sensor tend to fluctuate with high frequency during an "intermittent cloudy" condition in a fast moving weather pattern. Certain implementations of infrared cloud detectors have logic that determines the difference between infrared sensor sky temperature readings ($T_{sky}$) and ambient temperature readings ($T_{amb}$), the delta ($\Delta$), according to Eqn. 1 to help normalize any fluctuations in the infrared sensor temperature readings ($T_{sky}$). In one example, logic determines a "cloudy" condition if the delta ($\Delta$) is determined to be above the upper threshold value (e.g., about 0 millidegrees Celsius), a "clear" condition if the delta ($\Delta$) is determined to be below the lower threshold value (e.g., about −5 millidegrees Celsius), and an "intermittent cloudy" condition if the delta ($\Delta$) is determined to be between upper and lower threshold values. In another example, the logic determines a "cloudy" condition if the delta ($\Delta$) is above a single threshold value and a "clear" condition if the delta ($\Delta$) is below the threshold value. In one aspect, the logic can apply one or more correction factors to the delta ($\Delta$) before determining whether it is above or below threshold value(s). Some examples of correction factors that may be used in implementations include humidity, sun angle/elevation, and site elevation. For example, a correction factor may be applied based at least in part on the altitude and density of the clouds being detected. Lower altitude and/or higher density clouds more closely relate to ambient temperature readings than infrared sensor readings. Higher altitude and/or less dense clouds closely relate to infrared sensor readings then to ambient temperature readings. In this example, a correction factor can be applied to give the ambient temperature readings a higher weight for lower altitude and/or higher density clouds. In another example, the infrared sensor readings can be given a higher weight for higher altitude and/or less dense clouds. In another example, a correction factor may be applied based at least in part on humidity and/or sun position to more accurately describe cloud cover and/or remove any outliers. To illustrate the technical advantages of using the delta ($\Delta$) to determine a cloud condition is described with reference to FIGS. 2A-2C below.

Since temperature readings are generally independent of direct sunlight being present, temperature readings can be used to more accurately detect a cloud cover condition in certain instances than a visible light photosensor could detect at times when intensity of sunlight is low (e.g., just before sunrise and in the early morning just after sunrise, in the early evening before sunset). At these times, a visible light photosensor could potentially detect a false "cloudy" condition. According to these implementations, infrared cloud detectors can be used to detect cloud cover and the accuracy of their detection has no bearing on whether the sun is out or whether there are otherwise low light intensity levels such as, for example, just before sunrise or sunset. In these implementations, a relatively low temperature generally indicates the likelihood of a "clear" condition and a relatively high temperature reading generally indicates the likelihood of a "cloudy" condition (i.e. cloud cover).

In various implementations, the IR sensor of the infrared cloud detector is calibrated to measure radiant flux of long wavelength infrared radiation within a specific range. A processor of the IR sensor and/or a separate processor can be used to infer temperature readings from these measurements. In one aspect, the IR sensor is calibrated to detect infrared radiation in a wavelength range of between about 8 µm and about 14 µm. In another aspect, an IR sensor is calibrated to detect infrared radiation having wavelengths above about 5 µm. In another aspect, an IR sensor is calibrated to detect infrared radiation in a wavelength range of between about 9.5 µm and about 11.5 µm. In another aspect, an IR sensor is calibrated to detect infrared radiation in a wavelength range of between about 10.5 µm to 12.5 µm. In another aspect, an IR sensor is calibrated to detect infrared radiation in a wavelength range of between about 6.6 µm to 20 µm. Some examples of types of IR sensors that can be used include an infrared thermometer (e.g., a thermopile), infrared radiometer, infrared pyrgeometer, infrared pyrometer, and the like. A commercially-available example of an IR sensor is the Melexis MLX90614 made by Melexis of Detroit, Mich. Another commercially-available example of an IR sensor is the TS305-11C55 Temperature Sensor made by TE connectivity Ltd. of Switzerland. Another commercially-available example of an IR sensor is the SI-111 Infrared radiometer made by Apogee Temperature Sensor made by TE connectivity Ltd. of Switzerland.

In various implementations, the infrared cloud detector has an IR sensor that is located and oriented so that its field-of-view can receive infrared radiation from a particular region of sky of interest. In one implementation, the IR sensor may be located on a roof-top of a building and oriented with its sensing surface facing vertically upward or at a small angle from vertical so that its field-of-view is of a region of the sky above or at a distance from the building.

In certain implementations, the infrared cloud detector has a protective housing and the infrared sensor is located within the housing. The housing may have a cover with one or more apertures and/or thinned areas that allow/restrict transmission of infrared radiation to the infrared sensor. In some cases, the cover may be formed from a plastic such as polycarbonate, polyethylene, polypropylene and/or a thermoplastic such as nylon or other polyamide, polyester or other thermoplastic, among other suitable materials. In one example, the material is a weather-resistant plastic. In other cases, the cover may be formed from a metallic material such as aluminum, cobalt or titanium, or a semi-metallic material such as alumide. In some implementations, the cover may be sloped and/or convex-shaped to prevent the accumulation of water. Depending on the type of material or materials used to form the cover, the cover may be 3D-printed, injection molded and/or formed via another suitable process or processes.

In some implementations, the cover includes one or more apertures or thinned areas to increase transmission (lessen blocking) of incident radiation or other signals to detectors within the housing. For example, the cover may include one or more apertures and/or thinned areas proximate infrared sensors in the housing to allow for improved transmission of incident infrared radiation to the infrared sensors. Apertures and/or thinned areas may also improve transmission of other signals (e.g., GPS signals) to other detecting devices within the housing. Additionally or alternatively, some or all of the cover can be formed of a light-diffusing material. In some implementations, the cover can be connected with the housing via an adhesive and/or with some mechanical coupling mechanism such as through the use of threads and threading, and/or via a pressure gasket or other press-on fitting.

The field-of-view of the sensing surface of the infrared sensor is defined by its material composition and its structure. In some cases, the field-of-view of infrared sensor may be narrowed by obstructions. Some examples of obstructions include a building structure such as an overhanging or a roof-top structure, an obstruction near the building such as a tree or another building, etc. As another example, if the infrared sensor is located within a housing, structures within the housing may narrow the field-of-view.

In one aspect, a single IR sensor has a vertical unconstrained field-of-view of about 50 degrees to about 130 degree+−40 degrees off of vertical. In one aspect, an IR sensor has a field of view in a range of 50 degrees and 100 degrees. In another aspect, an IR sensor has a field of view in a range of 50 degrees and 80 degrees. In another aspect, an IR sensor has a field-of-view of about 88 degrees. In another aspect, an IR sensor has a field-of-view of about 70 degrees. In another aspect, an IR sensor has a field-of-view of about 44 degrees. The field-of-view of an IR sensor is typically defined as a conical volume. IR sensors typically have wider fields-of-view than visible light photosensors and are consequently capable of receiving radiation from larger regions of the sky. Since an IR sensor can take readings of larger regions of the sky, the IR sensor can be more useful in determining an approaching condition (e.g., incoming storm clouds) than a visible light photosensor which would be more limited to detecting a current condition affecting the immediate vicinity of the photosensor within its smaller field-of-view. In one aspect, a five-sensor obstructed IR sensor arrangement (e.g., in a multi-sensor configuration) of mounted sensors has four angularly mounted IR sensors, each constrained to a field-of-view of 20-70 degrees or 110-160 degrees, and one upward facing IR sensor constrained to a field-of-view of 70-110 degrees.

Certain IR sensors tend to be more effective in measuring sky temperature when direct sunlight is not impinging the sensing surface. In certain implementations, the infrared cloud detector has a structure that shades direct sunlight from the sensing surface of the IR sensor and/or has a structure that diffuses direct sunlight (e.g., enclosure of opaque plastic) before it impinges the sensing surface of IR sensor. In one implementation, an IR sensor may be shaded by an overhanging structure of the building and/or of the infrared cloud detector. In another implementation, an IR sensor may be located within a protective housing with a diffusing material between the sensing surface of the IR sensor and the sky to diffuse any direct sunlight from reaching the sensing surface of the IR sensor and also to provide protection from potentially harmful elements such as dirt, animals, etc. Additionally or alternatively, some implementations only use IR sensor readings taken before sunrise or after sunset to avoid the possibility of direct sunlight impinging the IR sensor. In these implementations, photosensor readings and/or other sensor readings may be used to detect cloud cover conditions between sunrise and sunset.

In various implementations of the infrared cloud detector has an ambient temperature sensor for measuring the temperature of the air surrounding the ambient temperature sensor. Typically, the ambient temperature sensor is located in contact with the outdoor environment (e.g. located outside of a building) to take temperature readings of the sky. The ambient temperature sensor may be, for example, a thermistor, a thermocouple, a resistance thermometer, a thermocouple, a silicon bandgap temperature sensor, etc. A commercially-available example of an ambient temperature sensor that can be used is the Pt100 thermometer probe made by Omega. Certain implementations include an ambient temperature sensor that is located to avoid direct sunlight from impinging its sensing surface. For example, the ambient temperature sensor may be located under an overhanging or mounted underneath a structure that shades the ambient temperature sensor from direct sunlight.

Although many implementations of the infrared cloud detector described herein include one IR sensor and one ambient temperature sensor, it would be understood that other implementations can include more than one IR sensor and/or more than one ambient temperature sensor. For example, in one implementation, the infrared cloud detector includes two or more IR sensors for redundancy and/or to direct IR sensors to different regions of the sky. Additionally or alternatively, the infrared cloud detector may have two or more ambient temperature sensors for redundancy in another implementation. An example of a system that uses two IR sensors directed different regions of the sky for detecting clouds can be found in international application PCT/US15/53041, filed on Sep. 29, 2015 and titled "SUNLIGHT INTENSITY OR CLOUD DETECTION WITH VARIABLE DISTANCE SENSING," which is hereby incorporated by reference in its entirety.

Various implementations of the infrared cloud detector have the basic functionality of detecting cloud cover conditions. In some cases, the infrared cloud detector can detect a "cloudy" condition and a "clear" condition. Additionally, some implementations can further differentiate a "cloudy" condition into gradations. For example, one implementation can differentiate a "cloudy" condition as either "overcast" or "intermittent clouds." In another example, an implementation can assign different levels (e.g., 1-10) of cloudiness to the "cloudy" condition. In yet another example, an implementation can determine a future cloud condition. Additionally or alternatively, some implementations can also detect other weather conditions.

In various implementations, the infrared cloud detector includes an IR sensor configured to take sky temperature readings, $T_{sky}$, and an ambient temperature sensor configured to take ambient temperature readings, $T_{amb}$. The infrared cloud detector also includes one or more processors containing program instructions that can be executing to perform various functions of the infrared cloud detector. The processor(s) executes program instructions to determine the temperature difference, delta ($\Delta$) between the temperature readings as provided in Eqn. 1. The processor(s) also executes program instructions to determine the cloud cover condition based at least in part on the delta ($\Delta$). As mentioned above, using the ambient temperature readings can help normalize any rapid fluctuations in the IR sensor temperature readings in some circumstances.

$$\text{Delta}(\Delta) = \text{Infrared Sensor Sky Temperature Reading } (T_{sky}) - \text{Ambient Temperature Reading}(T_{amb}) \quad \text{(Eqn. 1)}$$

In one implementation, the processor(s) executes program instructions to compare the delta ($\Delta$) to an upper threshold value and a lower threshold value and determine a cloud cover condition. If the delta ($\Delta$) is above the upper threshold value, a "clear" condition is determined. If the delta ($\Delta$) is below the lower threshold value, a "cloudy" condition is determined. If the delta ($\Delta$) is below the upper threshold value and above the lower threshold value (i.e. between threshold values), an "intermittent" cloud cover condition is determined. Additionally or alternatively, additional factors may be used to determine a cloud cover condition when the delta ($\Delta$) is between threshold values. This implementation works well in the morning around dawn and in the evening around dusk to accurately determine a "cloudy" condition or a "clear" condition. Between sunrise and sunset, additional factors may be used to determine cloud cover condition such as, for example, by using visible photosensor values. Some examples of additional factors include: elevation, wind speed/direction, and sun elevation/angle.

A. Infrared (IR) Sensor Cloud Detection Systems

FIG. 1 shows a schematic representation of a side view of system with an infrared cloud detector 100, according to some implementations. The infrared cloud detector 100 has a housing 101 with a cover 102 having an aperture or thinned portion 104 at a first surface 106 of the housing 101. The housing 101 also has a second surface 108 opposing the first surface 106. The infrared cloud detector 100 also includes an IR sensor 110 configured to take temperature readings, $T_{sky}$, based at least in part on infrared radiation received within its conical field-of-view 114, an ambient temperature sensor 130 for taking ambient temperature readings, $T_{amb}$, and a processor 140 in communication (wired or wirelessly) with the IR sensor 110 and the ambient temperature sensor 130. In one aspect, the IR sensor is one of an infrared thermometer (e.g., a thermopile), infrared radiometer, infrared pyrgeometer, and infrared pyrometer. In one aspect, the ambient temperature sensor is one of a thermistor, a thermometer, and a thermocouple.

In FIG. 1, the IR sensor 110 is located behind the aperture or thinned portion 104 and within the enclosure of the housing 101. The aperture or thinned portion 104 enables the IR sensor 110 to measure infrared radiation transmitted through the aperture or thinned portion 104 and received at its sensing surface. The IR sensor 110 includes an imaginary axis 112 that is orthogonal to the sensing surface of the IR sensor 110 and passes through the center of the IR sensor 110. In the illustrated example, the IR sensor 110 is oriented so that its axis 112 is in a vertical orientation and the sensing surface is facing upward. In other examples, the IR sensor 110 can be directed so that the sensing surface is facing in another orientation to direct the IR sensor, for example, to a particular region of the sky. The IR sensor 110 has a conical field-of-view 114 through the aperture or thinned portion 104 to outside of the housing 102. In this example, the portions of the cover 102 around the aperture or thinned portion 104 are made of a material that blocks infrared radiation and the perimeter of the aperture or thinned portion 104 defines the field-of-view 114. The field-of-view 114 has an angle, a, and is centered about the axis 112. In FIG. 1, the ambient temperature sensor 130 is located and affixed to the second surface 108 of the housing 102 away from the edge to avoid direct sunlight from impinging the ambient temperature sensor 130 when the infrared cloud detector 100 is in this orientation. Although not shown, the infrared cloud detector 100 also includes one or more structures that hold the infrared sensor 110 and other components in place within the housing 101.

The infrared cloud detector 100 also has logic that calculates a delta ($\Delta$) between infrared sensor sky temperature readings ($T_{sky}$) and the ambient temperature readings ($T_{amb}$) at each reading time and determine a cloud cover condition based at least in part on the calculated delta ($\Delta$). During operation, the IR sensor 110 takes sky temperature readings, $T_{sky}$, based at least in part on infrared radiation received form the region of sky within its field-of-view 114 and the ambient temperature sensor 130 takes ambient temperature readings, $T_{amb}$, of the ambient air surrounding the infrared cloud detector 100. The processor 140 receives signals with temperature readings, $T_{sky}$, from the IR sensor 110 and signals with ambient temperature readings, $T_{amb}$, from the ambient temperature sensor 130. The processor 140 executes instructions stored in memory (not shown) that uses the logic to calculate a delta ($\Delta$) between infrared sensor temperature readings ($T_{sky}$) and the ambient temperature readings ($T_{amb}$) at particular time to determine the cloud cover condition. For example, the processor 140 may execute instructions that determines a "cloudy" condition if the delta ($\Delta$) at that time is above the upper threshold value, determines a condition "clear" if the delta ($\Delta$) is below the lower threshold value, and determines an "intermittent cloudy" condition if is determined that the delta ($\Delta$) is between the upper threshold value and the lower threshold value. The processor 140 may also execute instructions stored in memory to perform other operations of methods described herein.

Although a single infrared sensor 110 is illustrated in FIG. 1, two or more infrared sensors can be used, in another implementation, for redundancy in case one malfunctions and/or is obscured by, for example, bird droppings and/or another environmental agent. In one implementation, two or more infrared sensors are used to face different orientations to capture IR radiation from different fields-of-view and/or at different distances from the building/structure. If two or more IR sensors are located within a housing of an infrared cloud detector 100, the IR sensors are typically offset from one another by a distance sufficient to reduce the likelihood that an obscuring agent would affect all the IR sensors. For example, IR sensors may be separated by at least about one inch or at least about two inches.

B. Comparison of Infrared Sensor Temperature Readings, Ambient Temperature Readings, and Delta Values During a Clear Day and a Day with Afternoon Clouds As discussed above, sky temperature readings taken by an ambient temperature sensor tend to fluctuate to a lesser extent than sky temperature readings taken by an infrared radiation sensor. Certain implementations of infrared cloud detectors have logic that determines the difference between infrared sensor temperature readings ($T_{sky}$) and ambient temperature readings ($T_{amb}$), the delta ($\Delta$), according to Eqn. 1 to help normalize any fluctuations in the infrared sensor temperature readings ($T_{sky}$). By way of comparison, FIGS. 2A-2C include graphs of examples of temperature readings, $T_{IR}$, taken by an infrared sensor of an infrared cloud detector according to an implementation, sky temperature readings, $T_{sky}$, taken by an ambient temperature sensor of the infrared cloud detector, and the delta ($\Delta$) between these readings. Each graph includes two plots: a plot of readings taken during a clear day and a plot of readings taken during a day with afternoon clouds. The infrared cloud detector used in this example includes components that are similar to those described with respect to the infrared cloud detector 100 shown in FIG. 1. In this case, the infrared cloud detector is located on the rooftop of a building and the infrared sensor is oriented to face vertically upward. The infrared sensor is calibrated to measure infrared radiation in the wavelength range from about 8 μm to about 14 μm. To avoid direct sunlight from impinging the infrared sensor, the infrared sensor is located behind a cover formed of a light diffusing material such as a plastic e.g., polycarbonate, polyethylene, polypropylene and/or a thermoplastic such as nylon or other polyamide, polyester or other thermoplastic, among other suitable materials. In this example, the infrared cloud detector also has logic that can be used to calculate the difference, delta ($\Delta$), between the sky temperature readings, $T_{sky}$, taken by the IR sensor and the ambient temperature readings, $T_{amb}$, taken by the ambient temperature sensor of the infrared cloud detector. The logic can also be used to determine a "cloudy" condition if the delta ($\Delta$) is at or above the upper threshold value, a "clear" condition if the delta ($\Delta$) is at or below the lower threshold value, and an "intermittent cloudy" condition if is determined that the delta ($\Delta$) is between the upper and lower threshold values.

Figure 2A:
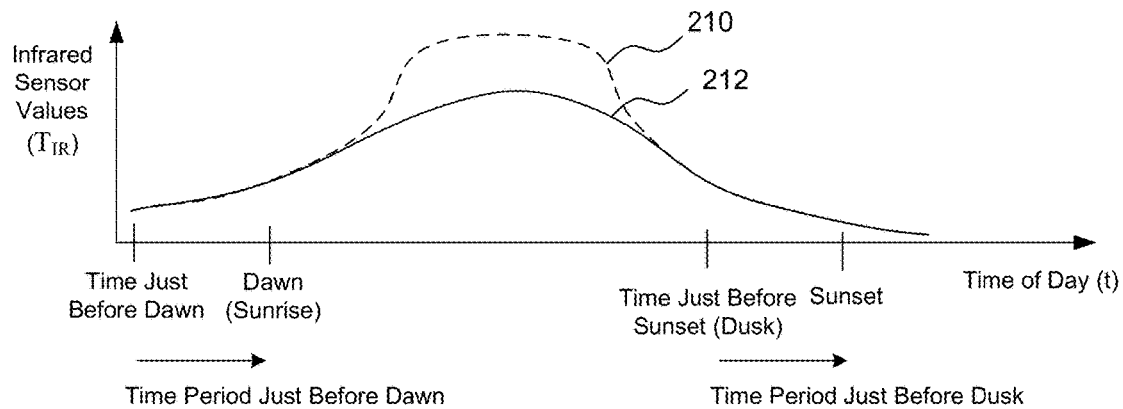
FIG. 2A shows a graph with two plots of temperature readings taken over time by an infrared sensor of the infrared cloud detector, according to this implementation.

FIG. 2A shows a graph with two plots of temperature readings, $T_{sky}$, taken over time by an infrared sensor of the infrared cloud detector, according to this implementation. Each of the two plots is of temperature readings, $T_{sky}$, taken by the infrared sensor over a time period of a day. The first plot 110 is of temperature readings, $T_{sky}$, taken by the infrared sensor during a first day with clouds in the afternoon. The second plot 112 is of temperature readings, $T_{sky}$, taken by the infrared sensor during a second day that is clear all day. As shown, the temperature readings, $T_{sky}$, of the first plot 110 taken during the afternoon of the first day with afternoon cloudiness are generally higher than the temperature readings, $T_{sky}$, of the second plot 112 taken during the second that is clear all day.

Figure 2B:
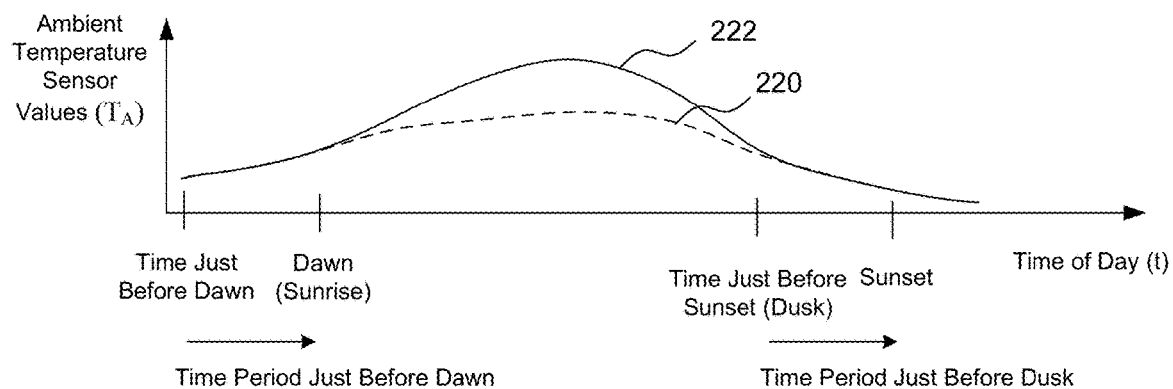
FIG. 2B shows a graph having two plots of ambient temperature readings taken over time by the ambient temperature sensor of the infrared cloud detector discussed with respect to FIG. 2A.

FIG. 2B shows a graph having two plots of ambient temperature readings, $T_{amb}$, taken over time by the ambient temperature sensor of the infrared cloud detector discussed with respect to FIG. 2A. Each of the two plots is of temperature readings, $T_{amb}$, taken by the ambient temperature sensor over a time period of a day. To avoid direct sunlight from impinging the ambient temperature sensor, it is shaded from direct sunlight. The first plot 220 is of temperature readings taken by the ambient temperature sensor during the first day with clouds in the afternoon. The second plot 222 is of temperature readings taken by the infrared sensor during a second day that is clear all day. As shown, the ambient temperature readings, $T_{amb}$, of the first plot 220 taken during the first day with clouds in the afternoon are at lower levels than the temperature readings, $T_{amb}$, of the second plot 222 taken during the second day that is clear all day.

Figure 2C:
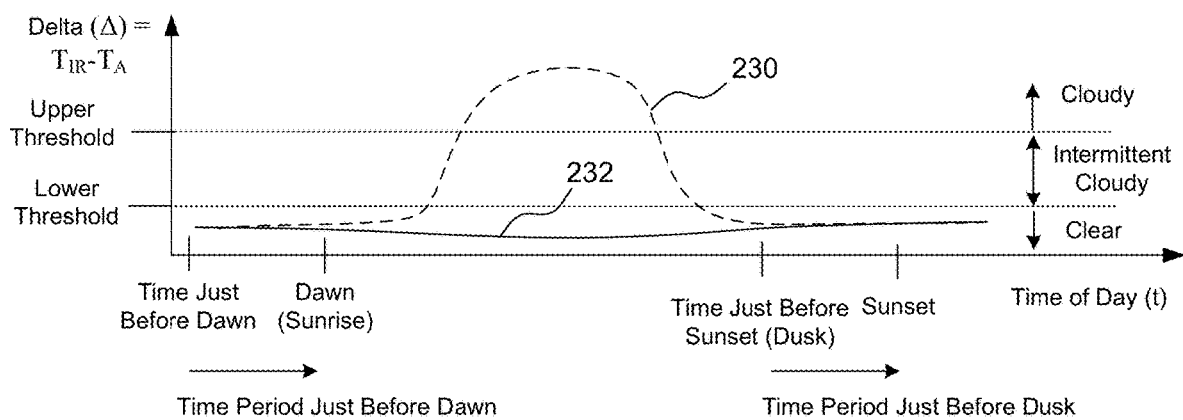
FIG. 2C shows a graph having two plots of the calculated delta between the temperature readings taken by the infrared sensor and the ambient temperature readings taken by the ambient temperature sensor of the infrared cloud detector discussed with respect to FIGS. 2A and 2B.

FIG. 2C shows a graph having two plots of the calculated delta ($\Delta$) between the sky temperature readings, $T_{sky}$, taken by the IR sensor and the ambient temperature readings, $T_{amb}$, taken by the ambient temperature sensor of the infrared cloud detector discussed with respect to FIGS. 2A and 2B. Each of the two plots is of the calculated delta ($\Delta$) over a time period of a day. The first plot 230 is the calculated delta ($\Delta$) of the readings taken during the first day with clouds in the afternoon. The second plot 232 is the calculated delta ($\Delta$) taken during the second day that is clear all day. The graph also includes an upper threshold value and a lower threshold value.

In FIG. 2C, the values of delta ($\Delta$) of the second plot 232 during a time interval from just before sunrise until just after sunrise and during a time interval from just before sunset until sunset are below the lower threshold value. Using the calculated delta ($\Delta$) values shown in the plots in FIG. 2C, the logic of the infrared cloud detector would determine a "clear" condition during this time interval. Also, since the values of delta ($\Delta$) of the second plot 232 are below the lower threshold value at most other times of the day, the logic of the infrared cloud detector would determine a "clear" condition for the other times as well.

In FIG. 2C, the values of delta ($\Delta$) of the first plot 230 are above the upper threshold value for most of the afternoon and the infrared cloud detector would determine a "cloudy" condition during the afternoon. The values of delta ($\Delta$) of the first plot 230 are below the lower threshold value during a time interval just before sunrise until just after sunrise and during a time interval from just before sunset until sunset. Based at least in part on these calculated delta (Δ) values, the logic of the infrared cloud detector would determine a "clear" condition during this time interval. The values of delta (Δ) of the first plot 230 are between the lower and upper threshold values during a brief period of time in transition in early and late afternoon. Based at least in part on these calculated delta (Δ) values, the logic of the infrared cloud detector would determine an "intermittent cloudy" condition.

C. Infrared Cloud Detector Systems with Photosensor(s)

In certain implementations, infrared cloud detector systems also include a visible light photosensor (e.g., a photodiode) for measuring intensity of visible light radiation during operation. These systems generally includes at least one infrared sensor, at least one ambient temperature sensor, at least one a visible light photosensor, and logic for determining a cloud cover condition based at least in part on readings taken by one or more of the infrared sensor(s), the ambient temperature sensor(s), and visible light photosensor(s). In some cases, the infrared sensor is calibrated to measure wavelengths in the 8-14 μm spectrum. In some cases, the photosensor is calibrated to detect intensity of visible light (e.g., between about 390 nm and about 700 nm) within a photopic range. The photosensor may be located in/on the same housing as the infrared sensor(s) and the ambient temperature sensor(s) or may be located separately. In some cases, the logic determines the cloud cover condition based at least in part on a calculated delta (Δ) value between the infrared sensor temperature readings, $T_{sky}$, and the ambient temperature readings, $T_{amb}$, for example, when the confidence level of the infrared sensor is high and/or the confidence level of the photosensor is low. The logic determines the cloud cover condition based at least in part on photosensor readings when the confidence level of the infrared sensor is low and/or the confidence level of the photosensor is high.

In various implementations, an infrared cloud detector system includes logic for determining a cloud cover condition using, as input one or more of, the time of day, the day of year, temperature readings, $T_{sky}$ from the infrared sensor(s), ambient temperature readings, $T_{amb}$, from the ambient temperature sensor(s), and light intensity readings from the photosensor(s), the oscillation frequency of the visible light intensity readings from the photosensor(s), and the oscillation frequency of the temperature readings, $T_{sky}$ from the infrared sensor(s). In some cases, the logic determines the oscillation frequency from the visible light intensity readings and/or the oscillation frequency from the temperature readings, $T_{sky}$. The logic determines whether the time of day is during one of the following four time periods: (i) a time period shortly before sunrise and up to slightly after sunrise; (ii) daytime defined as after (i) and before (iii); (iii) a time period shortly before sunset (dusk) and up until sunset; or (iv) nighttime defined as after (iii) and before (i). In one case, the time of sunrise can be determined from measurements taken by the visible wavelength photosensor. For example, the time period (i) may end at the point where a visible light wavelength photosensor begins to measure direct sunlight i.e. an intensity reading of the visible light photosensor is at or above a minimum intensity value. In addition or alternatively, the time period (iii) may be determined to end at the point where the intensity reading from a visible light wavelength photosensor is at or below a minimum intensity value. In another example, the time of sunrise and/or the time of sunset may be calculated using a solar calculator based at least in part on the day of the year and the time periods (i) and (iii) can be calculated by a defined period of time (e.g., 45 minutes) before and after the calculated times of sunrise/sunset. If the time of day is within (i) or (iii) time periods, the confidence level of the photosensor readings tends to be low and the infrared sensor readings high. In this situation, the logic determines the cloud cover condition based at least in part on a calculated delta (Δ) with or without correction factors. For example, the logic may determine a "cloudy" condition if the delta (Δ) is above the upper threshold value, a "clear" condition if the delta (Δ) is below the lower threshold value, and an "intermittent cloudy" condition if the delta (Δ) is between upper and lower threshold values. As another example, the logic may determine a "cloudy" condition if the delta (Δ) is above a single threshold value and a "clear" condition if the delta (Δ) is below the threshold value. If the time of day is during (ii) daytime, the confidence level of the photosensor readings is at a high level and the confidence level of the infrared sensor readings tends to be low. In this case, the logic may use the photosensor readings to determine the cloud cover condition as long as a calculated difference between the infrared readings and the photosensor readings stays at or below an acceptable value. For example, the logic may determine a "clear" condition if the photosensor reading is above a certain intensity level and determine a "cloudy" condition if the photosensor reading is at or below the intensity level. If the calculated difference between the infrared readings and the photosensor readings increases above the acceptable value, the confidence of the infrared readings is increased and the logic determines the cloud cover condition based at least in part on the delta (Δ) as described above. Alternatively or additionally, if the photosensor readings are determined to be oscillating at a frequency greater than a first defined level, the confidence level of the infrared readings is increased and the logic determines the cloud cover condition based at least in part on the delta (Δ). If the infrared readings are determined to be oscillating at a frequency greater than a second defined level, the confidence level of the photosensor readings is increased and the logic determines the cloud cover condition based at least in part on the photosensor readings. If the time of day is during (iv) nighttime, the logic may determine the cloud cover condition based at least in part on the delta (Δ) as described above. Other implementations of logic that can be used by an infrared cloud detector system are described herein including various logic described with reference to FIGS. 21, 22, 23, 24, 26, 27, 28, and 30, and 31.

Figure 3:
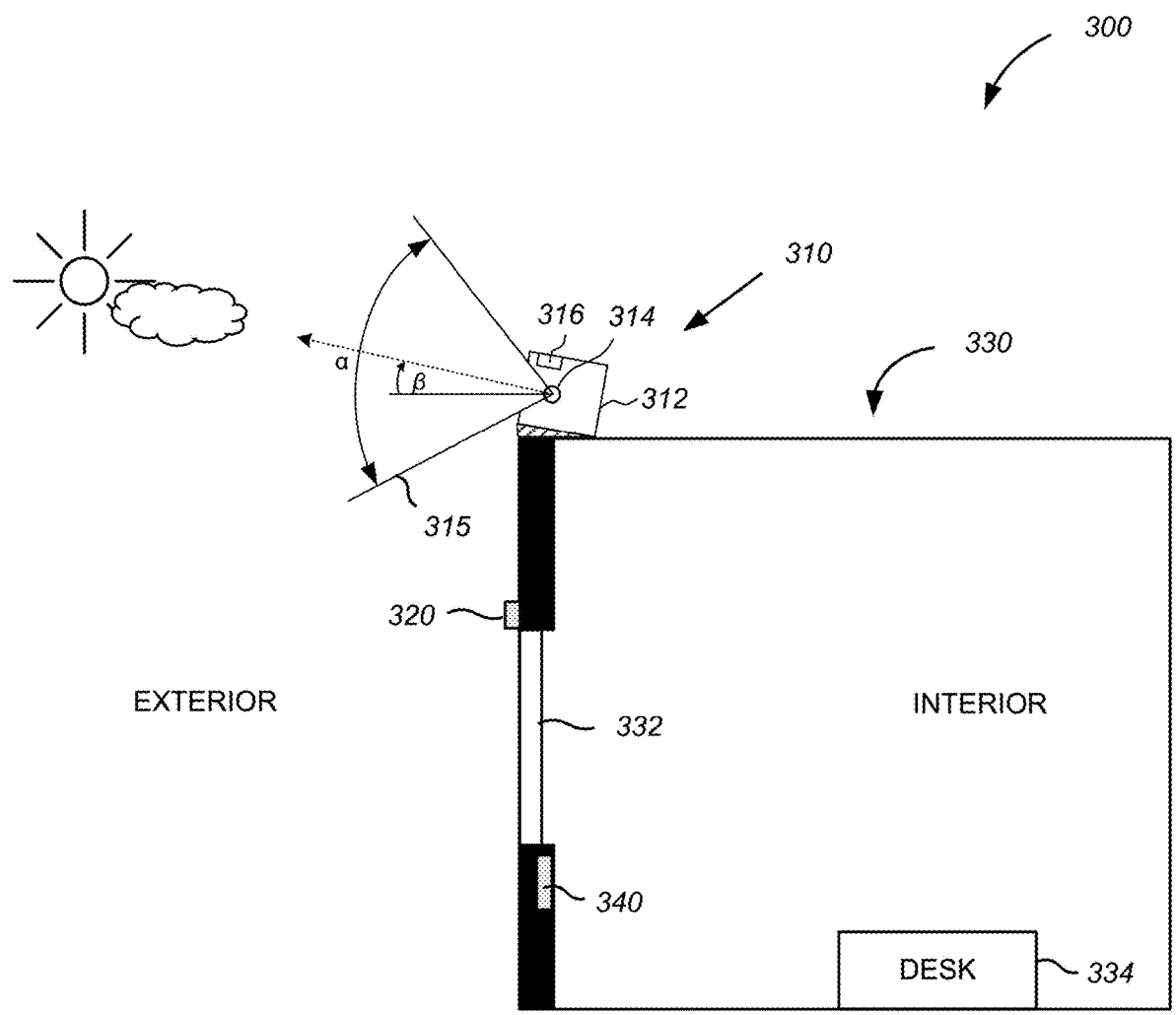
FIG. 3 depicts a schematic (side view) diagram of an infrared cloud detector system comprising an infrared cloud detector and a photosensor, according to an implementation.

FIG. 3 depicts a schematic (side view) diagram of an infrared cloud detector system 300 comprising an infrared cloud detector 310 and an external visible light photosensor 320, according to an implementation. The infrared cloud detector 310 includes a housing 312, an infrared sensor 314 within the enclosure of the housing 312, and an ambient temperature sensor 316 also within the enclosure of the housing 312. The infrared sensor 314 is configured to take temperature readings, $T_{sky}$, based at least in part on infrared radiation received form the region of sky within its conical field-of-view 315. The ambient temperature sensor 316 is configured to take ambient temperature readings, $T_{amb}$, of the ambient air surrounding the infrared cloud detector 310. In one aspect, the infrared sensor 314 is one of an infrared thermometer (e.g., a thermopile), infrared radiometer, infrared pyrgeometer, and infrared pyrometer. In one aspect, the ambient temperature sensor is one of a thermistor, a thermometer, and a thermocouple.

The infrared cloud detector 310 shown as located on the roof of a building having a room 330 with a tintable window 332 (e.g., electrochromic window with at least one electrochromic device) and the external visible light photosensor 320 is located on an exterior surface of the building. The tintable window 332 is located between the exterior and the interior of the building, which includes the room 330. FIG. 5 also shows a desk 334 in the room 330. Although the photosensor 320 is located separately from the infrared cloud detector 310 in this example, in other implementations, the photosensor 320 is located in the enclosure of the housing and/or on the outside of the housing 312.

The infrared sensor 314 includes an imaginary axis that is perpendicular to the sensing surface of the infrared sensor 314 and passes through its center. The infrared cloud detector 310 is supported by a wedge-shaped structure that orients the infrared cloud detector 310 such that its axis is directed at an angle of inclination, P, from a horizontal plane. Other components can be used to support the infrared cloud detector 310 in other implementations. The infrared sensor 314 is directed so that the sensing surface faces the sky and can receive infrared radiation from a region of the sky within its field-of-view 315. The ambient temperature sensor 130 is located within the enclosure of the housing 312 away from the edge and shaded by an overhanging portion of the housing 312 avoid direct sunlight from impinging the sensing surface of the ambient temperature sensor 130. Although not shown, the infrared cloud detector 310 also includes one or more structures that hold its components within the housing 312.

In FIG. 3, the infrared cloud detector system 300 also includes a controller 340 with a processor that can execute instructions stored in memory (not shown) for using the logic of the infrared cloud detector system 300. The controller 340 is in communication with (wirelessly or wired) the infrared sensor 314 and the ambient temperature sensor 316 to receive signals with temperature readings. The controller 340 is also in communication with (wirelessly and/or wired) the photosensor 320 to receive signals with visible light intensity readings.

In some implementations, power/communication lines can extend from the building and/or another structure to the infrared cloud detector 310. In one implementation, the infrared cloud detector 310 includes a network interface that can couple the infrared cloud detector 310 to a suitable cable. The infrared cloud detector 310 can communicated data through the network interface to the controller 340 or at least one another controller (e.g., network controller and/or master controller) of the building. In some other implementations, the infrared cloud detector 310 can additionally or alternatively include a wireless network interface enabling wireless communication with one or more external controllers.

In some implementations, the infrared cloud detector 310 or other examples of infrared cloud detectors can also include a battery within or coupled with its housing to power the sensors and electrical components within. The battery can provide such power in lieu of or in addition to the power from a power supply (for example, from a building power supply). In one implementation, an infrared cloud detector further includes at least one photovoltaic cell, for example, on an outer surface of the housing. This at least one photovoltaic cell can provide power in lieu of or in addition to the power provided by any other power supply.

The infrared cloud detector system 300 also includes logic for determining the cloud cover condition that uses, as input, the time of day, day of year, temperature readings, $T_{sky}$, from the infrared sensor 314, ambient temperature readings, $T_{amb}$, from the ambient temperature sensor 316, and light intensity readings from the photosensor 320, the oscillation frequency of the visible light intensity readings from the photosensor 320, and the oscillation frequency of the temperature readings, $T_{sky}$, from the infrared sensor 314. During operation, the infrared sensor 314 takes temperature readings, $T_{sky}$, based at least in part on infrared radiation received from the region of sky within its field-of-view 315, the ambient temperature sensor 316 takes ambient temperature readings, $T_{amb}$, of the ambient air surrounding the infrared cloud detector 310, and the photosensor 320 takes intensity readings of visible light received at its sensing surface. The processor of the controller 340 receives signals with temperature readings, $T_{sky}$, from the infrared sensor 314, signals with ambient temperature readings, $T_{amb}$, from the ambient temperature sensor 316, and signals with intensity readings from the photosensor 320. The processor executes instructions stored in memory for using the logic to determine the cloud cover condition based at least in part on the various inputs. An example of such logic is described above and also with reference to FIG. 9. In one implementation, the controller 340 is also in communication with and configured to control one or more building components. For example, the controller 340 may be in communication with and configured to control the tint level of the tintable window 332. In this implementation, the infrared cloud detector system 300 also includes logic for determining control decisions for the one or more building components e.g., the tintable window 332, based at least in part on the determined cloud cover condition. An example of logic for determining control decisions based at least in part on a determined cloud cover condition is described in more detail with respect to FIG. 10.

Although a single infrared sensor 314, ambient temperature sensor 316, and visible light photosensor 320 are illustrated in FIG. 3, it would be understood that the disclosure is not so limiting and that additional components can be used, in another implementation. For example, multiple components can be used for redundancy in case one malfunctions and/or is obscured or otherwise prevented from functioning. In another example, two or more components may be used at different locations or at different orientations to capture different information. In one implementation, two or more infrared sensors are used to face different orientations to capture infrared radiation from different fields-of-view and/or at different distances from the building/structure. In cases with multiple sensors, an average or mean value of the values from the multiple sensors may be used to determine the cloud cover condition. If two or more IR sensors are located within a housing of an infrared cloud detector, the IR sensors are typically offset from one another by a distance sufficient to reduce the likelihood that an obscuring agent would affect all the IR sensors. For example, IR sensors may be separated by at least about one inch or at least about two inches.

Other examples of infrared cloud detector systems in the form of multi-sensor devices are described in section D below.

D. Multi-Sensor Devices

According to various aspects, infrared cloud detector systems include thermal sensors for measuring the heat radiation from the sky and ambient temperature of the environment. Thermal sensor readings are output in terms of degrees (e.g., millidegrees Celsius, degrees Celsius, degrees Fahrenheit, degrees Kelvin, etc.). Some examples of types of thermal sensors that can be implemented include an infrared sensor for measuring sky temperature ($T_{sky}$), an ambient temperature sensor for measuring ambient temperature ($T_{amb}$) of the environment, and an infrared sensor device that includes both an onboard infrared sensor for measuring sky temperature ($T_{sky}$) and an ambient temperature sensor for measuring ($T_{amb}$) of the environment. In implementations that use an infrared sensor device with both an onboard infrared sensor and an onboard ambient temperature sensor, the device may output readings one or more of sky temperature ($T_{sky}$), ambient temperature ($T_{amb}$), and difference, Δ, between $T_{sky}$, and $T_{amb}$.

According to certain aspects, the ambient temperature can be implemented as a thermocouple, thermistor, etc. The ambient temperature sensor can be part of an infrared sensor or can be a separate sensor.

In certain implementations, the infrared cloud detector system includes an infrared cloud detector with one or more infrared sensors and one or more visible light photosensors within the format of a multi-sensor device that may have various other optional sensors (e.g., ambient temperature sensor) and electrical components within and/or on its housing. Details of different examples of multi-sensor devices are described in U.S. patent application Ser. No. 15/287,646, filed on Oct. 6, 2016 and titled "MULTI-SENSOR," and U.S. patent application Ser. No. 14/998,019, filed on Oct. 6, 2015 and titled "MULTI-SENSOR," which are hereby incorporated by reference in their entirety. Multi-sensor devices of these implementations are configured to be located in an environment exterior to a building in order to expose sensors to the outside environment, for example, on the rooftop of a building. In some of these implementations, power/communication lines extend from the building to the multi-sensor device. In one such case, the multi-sensor device includes a network interface that can couple the multi-sensor device to a suitable cable. The multi-sensor device can communicate sensor data and other information through the network interface to one or more external controllers such as a local controller, a network controller, and/or a master controller of the building. In other implementations, the multi-sensor device can additionally or alternatively include a wireless network interface enabling wireless communication with the one or more external controllers. In some implementations, the multi-sensor device may also include a battery within or coupled with its housing to power the sensors and electrical components within. The battery can provide such power in lieu of, or in addition to, the power from a power supply (for example, from a building power supply). In some implementations, the multi-sensor device further includes at least one photovoltaic cell, for example, on a surface of its housing. The photovoltaic cell can provide power to the multi-sensor device in lieu of, or in addition to, power from another source.

Example A

Figure 4A:
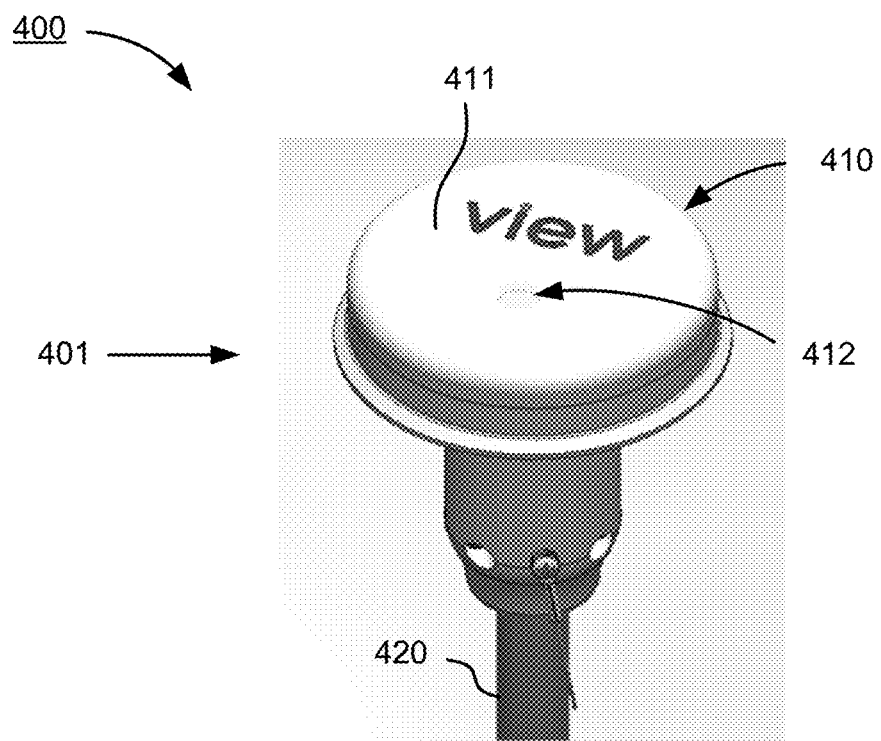
FIG. 4A shows a perspective view of a diagrammatic representation of an infrared cloud detector system comprising an infrared cloud detector in the form of a multi-sensor, according to an implementation.
Figure 4B:
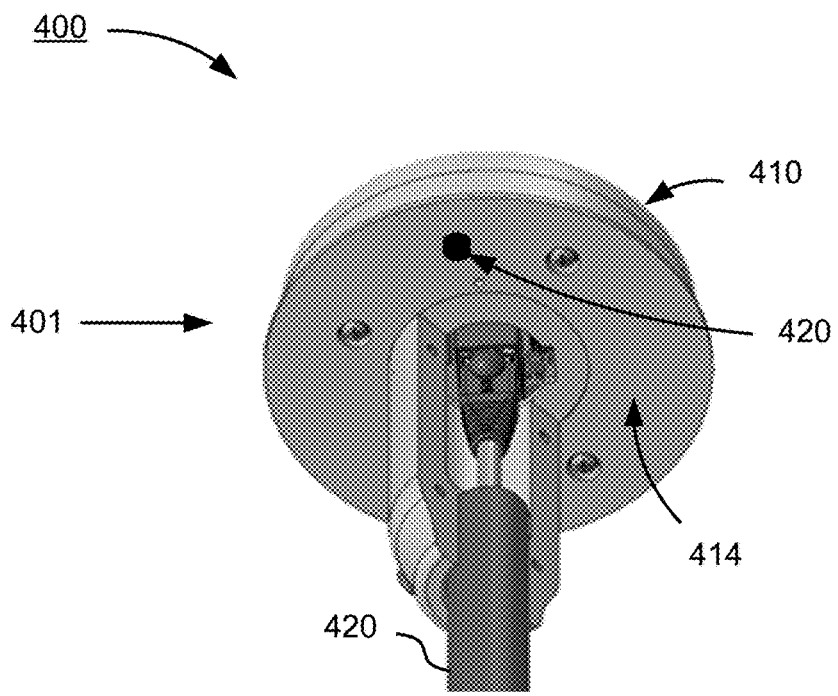
FIG. 4B shows another perspective view of the infrared cloud detector system comprising the infrared cloud detector in the form of the multi-sensor shown in FIG. 4A.
Figure 4C:
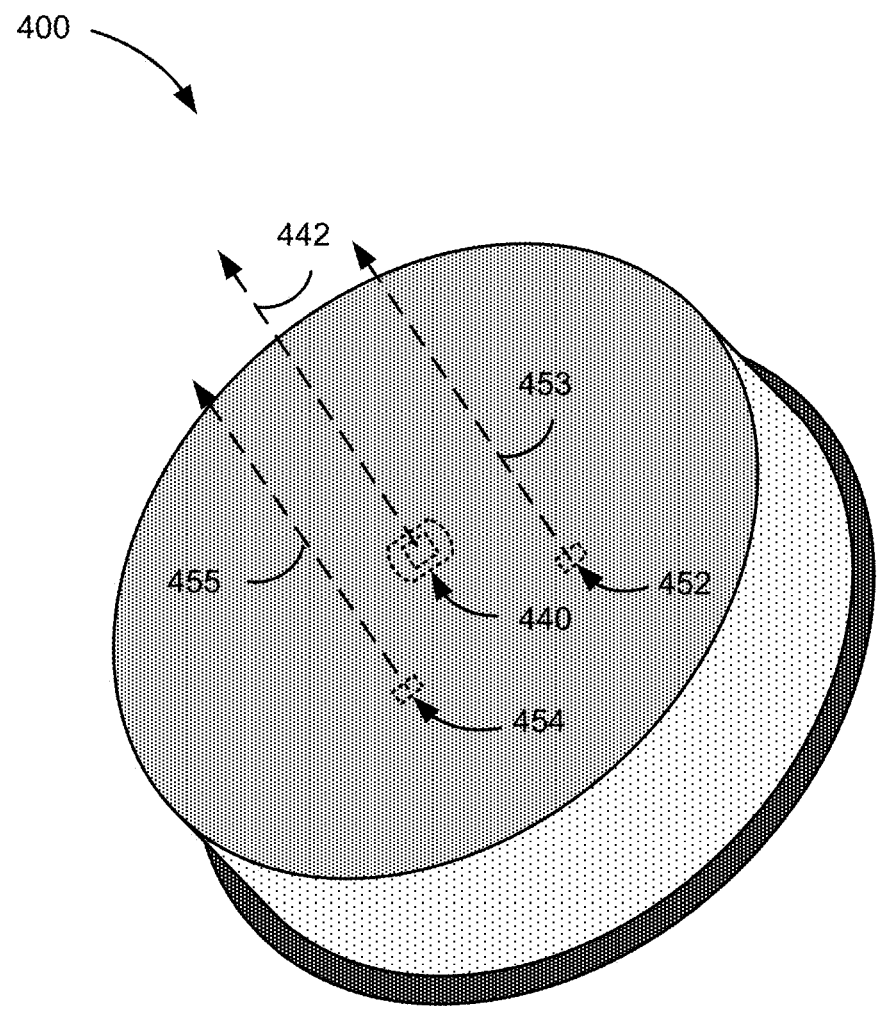
FIG. 4C shows a perspective view of some of the inner components of the multi-sensor device of the infrared cloud detector system shown in FIGS. 4A and 4B.

FIGS. 4A, 4B, and 4C show perspective views of a diagrammatic representation of an infrared cloud detector system 400 comprising an infrared cloud detector in the form of a multi-sensor device 401, according to one such implementation. FIGS. 4A and 4B show that the multi-sensor device 401 includes a housing 410 coupled to a mast 420. The mast 420 can function as a mounting assembly including a first end portion for coupling to a base portion 414 of the housing 410 and a second end portion for mounting to a building. In one example, the base portion 414 is fixedly attached, or otherwise coupled to, or with the first end portion of the mast 420 via mechanical threading or via a rubber gasket press-on. The mast 420 also can include a second end portion that can include a mounting and/or attachment mechanism for mounting and/or attaching the mast 420 to a roof top of the building (e.g., on roof of building with room 330 shown in FIG. 3) such as, for example, to a surface of the roof, a wall on the roof, or to another structure on the roof. The housing includes a cover 411 that depicted as formed of a light-diffusing material. The cover 411 also includes a thinned portion 412. In other examples, the cover 411 may comprise opaque or transparent portions (e.g., may be opaque or transparent).

FIG. 4B also shows that the multi-sensor device 401 includes an ambient temperature sensor 420 located on the bottom external surface of the base portion 414. The ambient temperature sensor 420 is configured to measure ambient temperature of the external environment during operation. The ambient temperature sensor 420 is located on the bottom surface to help shade it from direct solar radiation, for example, when the infrared cloud detector system 400 is located in an outdoor environment with the upper surface facing upward. The temperature sensor 420 may be, for example, a thermistor, a thermocouple, a resistance thermometer, a silicon bandgap temperature sensor, etc.

FIG. 4C shows a perspective view of some of the internal components of the multi-sensor device 401 of the infrared cloud detector system 400 shown in FIGS. 4A and 4B. As shown, the infrared cloud detector system 400 further includes a visible light photosensor 440, a redundant first and second infrared sensor devices 452, 454. The first infrared sensor device 452 and second infrared sensor device 454 are located on an upper portion of the multi-sensor device 401 and positioned behind the cover 411 (shown in FIGS. 4A and 4B) formed of the light-diffusing material.

As shown in FIG. 4C, the first infrared sensor device 452 has a first axis of orientation 453 that is perpendicular to its sensing surface. The second infrared sensor device 454 has a second axis of orientation 455 that is perpendicular to its sensing surface. In the illustrated example, the first and second infrared sensor devices 452, 454 are positioned so that their axis of orientation 453, 455 face outward from the top portion of the housing 410 (shown in FIGS. 4A and 4B) in order to be able to take temperature readings during operation that are based at least in part on infrared radiation captured from above the multi-sensor device 401. The first infrared sensor device 452 is separated from the second infrared sensor device 454 by at least about one inch. In one aspect, each infrared sensor device 452, 454 has an infrared sensor for measuring sky temperature ($T_{sky}$). In another aspect, each infrared sensor device 452, 454 has both an infrared sensor for detecting heat radiation for measuring sky temperature ($T_{sky}$) and an onboard ambient temperature sensor for measuring ambient temperature ($T_{amb}$).

During operation, the first and second infrared sensor devices 452, 454 detect infrared radiation that is radiated from any objects or medium within their field-of-view to measure sky temperature ($T_{sky}$). The field-of-view is based at least in part on the physical and material properties of the first and second infrared sensors 452, 454. Based at least in part on their physical and material properties alone, some examples of infrared sensors have a field-of-view that ranges from about 50 degrees to about 80 degrees. In one particular example, an infrared sensor has a field-of-view of about 70.

The photosensor 440 has an axis of orientation 442 that is perpendicular to its sensing surface. The photosensor 440 is positioned behind the thinned portion 412 of the housing 410 as shown in FIG. 4A. The thinned portion 412 allows the photosensor 440 to receive visible light radiation through the thinned portion 412. During operation, the photosensor 440 measures the intensity of visible light received through the thinned portion 412.

The infrared cloud detector system 400 also includes logic for making determinations based at least in part on the sensor data collected by the multi-sensor device 401. In this case, the multi-sensor device 401 and/or one or more external controllers (not shown) includes memory and one or more processors that can execute instructions stored in memory (not shown) for using the logic of the infrared cloud detector system 400. The one or more external controllers is in communication (e.g., through wireless or wired communication) with the multi-sensor device 401 to receive signals with sensor readings or filtered sensor values taken by the infrared sensors 452, 454, the ambient temperature sensor 420, and the photosensor 440. In some implementations, power/communication lines can extend from the building or another structure to the infrared cloud detector system 400. In one implementation, the infrared cloud detector system 400 includes a network interface that can couple to a suitable cable. The infrared cloud detector system 400 can communicate data through the network interface to the one or more external controllers of the building. In some other implementations, the infrared cloud detector system 400 can additionally or alternatively include a wireless network interface enabling wireless communication with the one or more external controllers. In some implementations, the infrared cloud detector system 400 can also include a battery within or coupled with the housing to power the sensors and electrical components within. The battery can provide such power in lieu of or in addition to the power from a power supply (for example, from a building power supply). In some implementations, the infrared cloud detector system 400 further includes at least one photovoltaic cell, for example, on a surface of the housing.

According to one aspect, the infrared cloud detector system 400 includes logic for determining a cloud cover condition using as input the time of day, day of year, temperature readings, $T_{sky}$, from one of both of the infrared sensor devices 452, 454, ambient temperature readings, $T_{amb}$, from the ambient temperature sensor 420, and light intensity readings from the photosensor 440, the oscillation frequency of the visible light intensity readings from the photosensor 440, and the oscillation frequency of the temperature readings, $T_{sky}$ from the infrared sensor devices 452, 454. Examples of such logic are described herein, for example, with respect to FIGS. 8-10.

According to another aspect, the infrared cloud detector system 400 includes various logic described with reference to FIGS. 21, 22, 23, 24, 26, 27, 28, and 30, and 31. In one implementation, for example, the multi-sensor device 401 and/or the one or more external controllers include logic for: 1) determining a filtered infrared sensor value based at least in part on the temperature readings, $T_{sky}$ from one of both of the infrared sensor devices 452, 454 and ambient temperature readings, $T_{amb}$, from the ambient temperature sensor 420; and/or 2) determining a filtered photosensor value based at least in part on light intensity readings from the photosensor 440. An example of logic for determining a filtered infrared sensor value is Module D' described with reference to flowchart 2300 shown in FIG. 23. According to certain implementations, control logic can determine a filtered infrared sensor value based at least in part on one or more sky sensors, one or more ambient sensors, or both sky sensor(s) and ambient sensor(s). An example of logic for determining a filtered photosensor value is Module C' described with reference to flowchart 3100 shown in FIG. 31.

Figure 14:
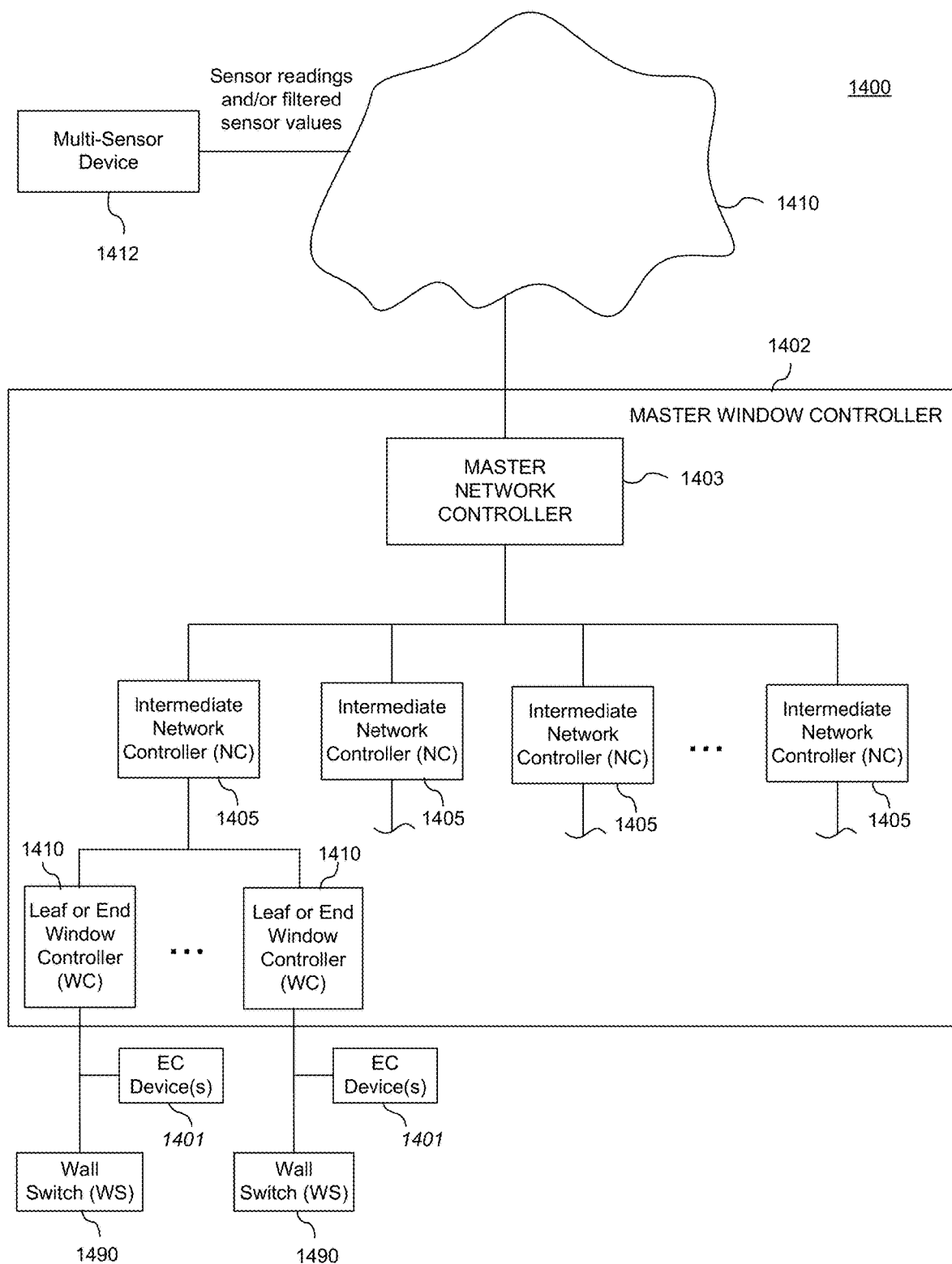
FIG. 14 is a block diagram of components of a system for controlling functions of one or more tintable windows of a building, according to embodiments.

In one case, the multi-sensor device 401 can execute instructions stored in memory for determining and/or passing filtered sensor values via a communication network to the external controller(s). An example an infrared cloud detector system 400 that includes a multi-sensor device that can pass sensor readings and/or filtered values via a communication network 1410 to external controller(s) is shown in FIG. 14. The control logic implemented by the external controller(s) can make tinting decisions to determine a tint level and/or implement tint instructions to transition tint of one or more tintable windows in the building. Such control logic is described with reference Modules A1, B, C1, and D shown in FIGS. 22, 24-28, and 30.

Example B

Figure 32A:
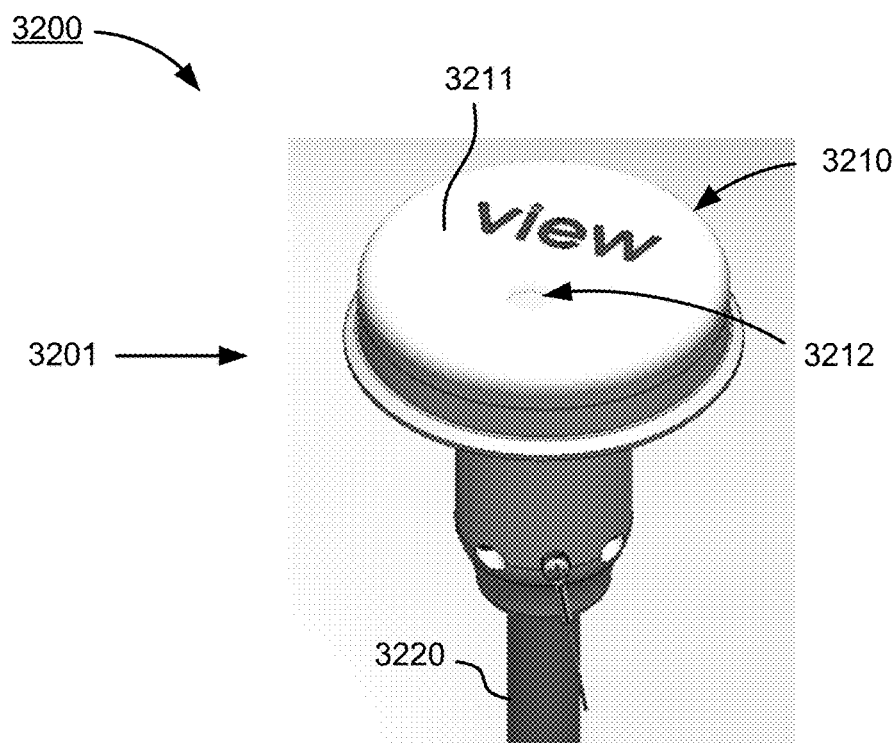
FIG. 32A shows a perspective view of a diagrammatic representation of an infrared cloud detector system with a multi-sensor device, according to an implementation.
Figure 32B:
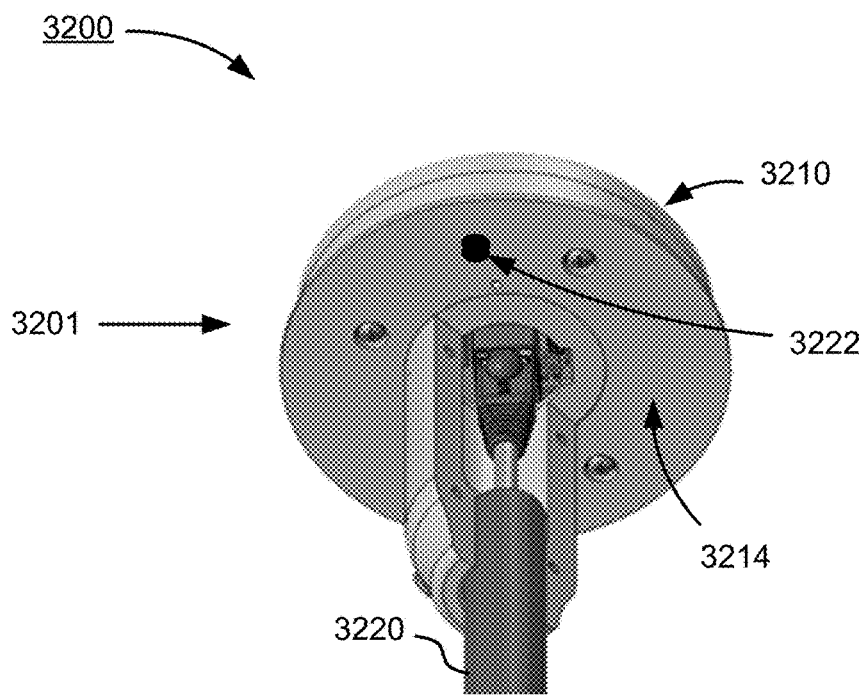
FIG. 32B shows another perspective view of the multi-sensor device shown in FIG. 32A.
Figure 33A:
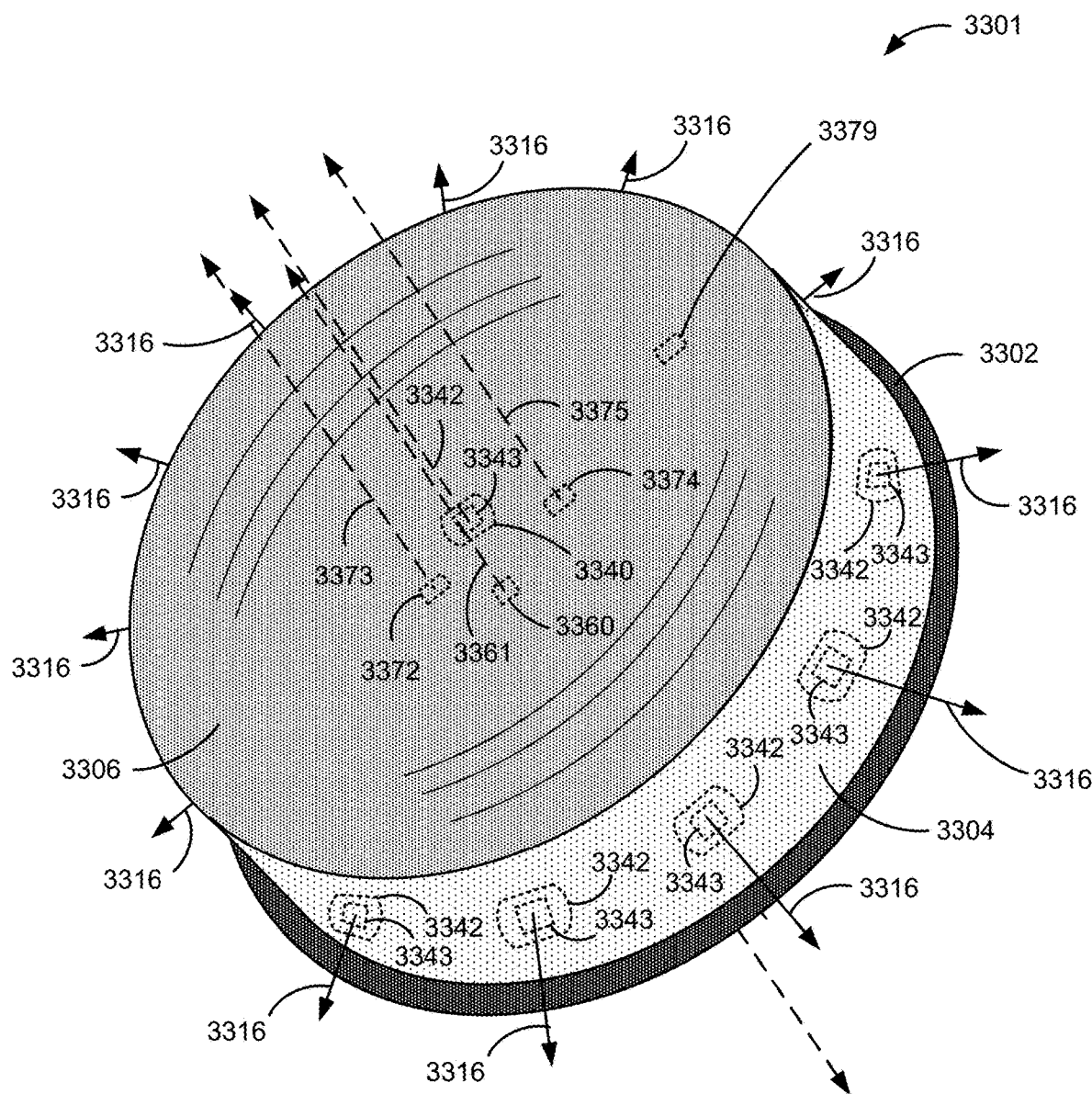
FIG. 33A shows a perspective view of a diagrammatic representation of a multi-sensor device, according to an implementation.
Figure 33B:
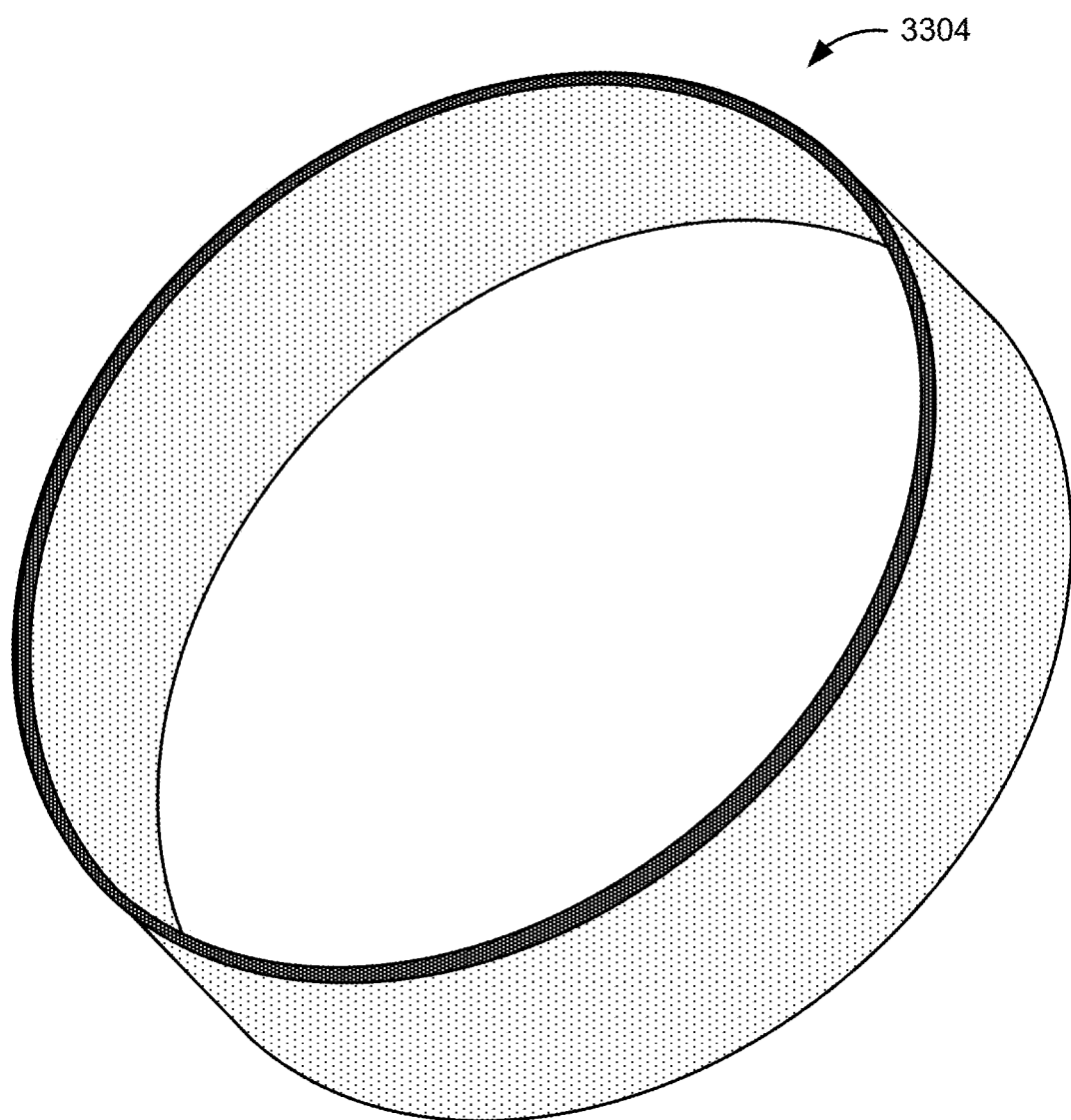
FIG. 33B shows another perspective view of the multi-sensor device shown in FIG. 32A.

FIG. 32A and FIG. 32B show example perspective views of a diagrammatic representation of an infrared cloud detector system 3200 comprising an infrared cloud detector in the form of a multi-sensor device 3201 and one or more external controllers (not shown) in communication with the multi-sensor device 3201 via a communication network (not shown), according to various implementations. FIG. 33A and FIG. 33B show perspective views of a diagrammatic representation of internal components of a multi-sensor device 3301, according to one aspect. In one implementation, the multi-sensor device 3201 of FIG. 32A and FIG. 32B may implement the components of the multi-sensor device 3301 shown in FIG. 33A and FIG. 33B.

In FIG. 32A and FIG. 32B, the multi-sensor device 3201 includes a housing 3210 coupled to a mast 3220. The mast 3220 can function as a mounting assembly including a first end portion for coupling to a base portion 3214 of the housing 3210 and a second end portion for mounting to a building. In one example, the base portion 3214 is fixedly attached or otherwise coupled to or with the first end portion of the mast 3220 via mechanical threading or via a rubber gasket press-on. The mast 3220 also can include a second end portion that can include a mounting or attachment mechanism for mounting or attaching the mast 3220 to a roof top of the building (e.g., on roof of building with room 3230 shown in FIG. 3) such as, for example, to a surface of the roof, a wall on the roof, or to another structure on the roof. The housing includes a cover 3211 that is formed of a light-diffusing material. The cover 3211 also includes a thinned portion 3212.

As shown in FIG. 32B, the multi-sensor device 3201 also includes a first ambient temperature sensor 3222 located on the bottom external surface of the base portion 3214. The first ambient temperature sensor 3222 is configured to measure ambient temperature of the external environment during operation. The first ambient temperature sensor 3222 is located on the bottom surface to help shade it from direct solar radiation, for example, when the infrared cloud detector system 3200 is located in an outdoor environment with the upper surface facing upward. The first ambient temperature sensor 3222 may be, for example, a thermistor, a thermocouple, a resistance thermometer, a silicon bandgap temperature sensor, etc.

FIG. 33A and FIG. 33B show perspective views of a diagrammatic representation of internal components of a multi-sensor device 3301, according to one aspect. The multi-sensor device 3301 generally includes a housing 3302 (portion shown) with a cover formed of a light-diffusing material that includes at least one thinned portion. The multi-sensor device 3301 also includes a diffusor 3304. As shown, in some implementations the housing 3302 and the diffuser 3304 are rotationally symmetric about an imaginary axis 3342 that passes through a center of the multi-sensor device 3301.

The multi-sensor device 3301 includes first infrared sensor device 3372 and a second infrared sensor device 3374 located on an upper portion of the multi-sensor device 3301 and positioned behind the cover formed of light-diffusing material. Each of the first and second infrared sensor devices 3372, 3374 include an onboard infrared sensor for measuring sky temperature ($T_{sky}$) and an onboard ambient temperature sensor for measuring ambient temperature ($T_{amb}$). The first infrared sensor device 3372 is positioned to face outward from upper surface of the multi-sensor device 3201 in the direction along the imaginary axis 3373. The second infrared sensor device 3374 is positioned to face outward from upper surface of the multi-sensor device 3201 in the direction along the imaginary axis 3375. The multi-sensor device 3301 may include the optional third infrared sensor device 3360 located on an upper portion of the multi-sensor device 3301 and positioned behind the cover formed of light-diffusing material. The third infrared sensor device 3360 is a standalone infrared sensor or includes both an onboard infrared sensor and onboard ambient temperature sensor. The optional third infrared sensor device 3360 is positioned to face outward from upper surface of the multi-sensor device 3201 in the direction along the imaginary axis 3361. In the illustrated example, the first and second infrared sensor devices 3372, 3374 are positioned so that their axis 3373, 3375 face outward from the top portion of the housing (e.g., housing shown in FIGS. 4A and 4B) in order to be able to take temperature readings during operation that are based at least in part on infrared radiation captured from above the multi-sensor device 3301. In one aspect, the first infrared sensor device 3372 is separated from the second infrared sensor device 3374 by at least about one inch.

Optionally, the multi-sensor device 3301 may also include a standalone ambient temperature sensor (not shown) located on a bottom external surface of the housing to shade it from direct solar radiation. The standalone ambient temperature sensor (e.g., a thermistor, a thermocouple, a resistance thermometer, a silicon bandgap temperature sensor) is configured to measure ambient temperature of the external environment during operation.

Returning to FIG. 33A and FIG. 33B, the multi-sensor device 3301 includes a plurality of visible light photosensors 3342 positioned behind the cover formed of the light-diffusing material. Although twelve (12) visible light photosensors 3342 are shown, it would be understood that a different number can be implemented. The plurality of visible light photosensors 3342 are positioned annularly along a ring (for example, the ring can have a center coincident with the axis 3342 and can define a plane orthogonal to the axis 3342). In this implementation, the visible light photosensors 3342 can more specifically be positioned equidistantly along a circumference of the ring. Each of the visible light photosensors 3342 has a light sensitive area 3343. The multi-sensor device 3301 optionally includes an additional upward facing visible light sensor 3340 located on an upper portion of the multi-sensor device 3301. This optional visible light photosensor sensor 3340 has an axis of orientation parallel with and in some instances directed along and concentric with the axis 3342. The visible light photosensor 3340 has a light sensitive area 3343.

In some implementations, the angle of view of each of visible light photosensors 3342, 3340 is in the range of approximately 30 degrees to approximately 120 degrees. For example, in one specific application, the angle of view is approximately 100 degrees. In some implementations, the distribution of incident light detectable by each of the visible light photosensors 3342, 3340 approximates a Gaussian (or "normal") distribution. Assuming the light detected by each of the visible light photosensors 3342, 3340 is associated with a Gaussian distribution, half of the power (the −3 dB point) detected by each of the light sensors is found within a viewing cone defined by the angle of view.

Diffuser 3304 is positioned around a periphery of the ring of visible light photosensors 3342 to diffuse light incident on the device prior to the light being sensed by the light photosensors 3342. For example, the diffuser 3304 can effectively function as a light integrator that spreads or distributes incident light more uniformly. Such a configuration reduces the likelihood of any one visible light photosensor 3342 receiving the full intensity of a pinpoint reflection or glare (such as off a car windshield, metal surface or mirror). The diffuser 3342 can increase the detection of light incident at oblique angles. FIG. 33A shows a diagrammatic representation of an example diffuser 3304 capable of use in the multi-sensor device 3301 of FIG. 33A according to some implementations. In some implementations, the diffuser 3304 is a single integral structure having a ring shape. For example, the diffuser 3304 can have a hollow cylindrical shape having an inner diameter, an outer diameter, and a thickness defined by the inner diameter and the outer diameter. In some implementations, the diffuser 3304 has a height that encompasses the field of view of each of the visible light photosensors 3342 (the field of view being defined by the angle of view and the distance or spacing between the outer surface of the light sensitive area of the visible light photosensor 3342 and an inner surface of the diffuser 3304.

During operation, the infrared sensors of the first and second infrared sensor devices 3372, 3374 detect infrared radiation that is radiated from any objects or medium within their field-of-view to measure sky temperature ($T_{sky}$). The field-of-view is based at least in part on the physical and material properties of the infrared sensors. Based at least in part on their physical and material properties alone, some examples of infrared sensors have a field-of-view that ranges from about 50 degrees to about 80 degrees. In one particular example, an infrared sensor has a field-of-view of about 70. During operation, the ambient temperature sensors of the first and second infrared sensor devices 3372, 3374 measure ambient temperature ($T_{amb}$). Although the multi-sensor 3301 is shown with redundant infrared sensors, it would be understood that a multi-sensor includes one or more infrared sensors. During operation, the plurality of visible light photosensors 3342 and the upward facing photosensor 3340 positioned behind the cover formed of the light-diffusing material measure the intensity of visible light received.

Returning to FIGS. 32A and 32B, the infrared cloud detector system 3200 can include logic for making determinations based at least in part on the sensor data of readings taken by the sensors of the multi-sensor device. In this case, the multi-sensor device and/or one or more external controllers (not shown) includes memory and one or more processors that can execute instructions stored in memory (not shown) for using the logic of the infrared cloud detector system 3200. The one or more external controllers is in communication with (wirelessly or wired) the multi-sensor device to receive signals with sensor readings or filtered sensor values taken by the infrared sensors (e.g., infrared sensors of the first and second infrared sensor devices 3372, 3374 and/or the infrared sensor 3360), the ambient temperature sensors (e.g., the ambient temperature sensors of the first and second infrared sensor devices 3372, 3374 or the optional standalone temperature sensor 3222 located on a bottom external surface of the housing to shade it from direct solar radiation), and the visible light photosensors (e.g., the photosensors 3342 or upward facing photosensor 3340). In some implementations, power/communication lines can extend from the building or another structure to the infrared cloud detector system 3200. In one implementation, the infrared cloud detector system 3200 includes a network interface that can couple to a suitable cable. The infrared cloud detector system 3200 can communicated data through the network interface to the one or more external controllers of the building. In some other implementations, the infrared cloud detector system 3200 can additionally or alternatively include a wireless network interface enabling wireless communication with the one or more external controllers. In some implementations, the infrared cloud detector system 3200 can include a battery within or coupled with the housing to power the sensors and electrical components within. The battery can provide such power in lieu of or in addition to the power from a power supply (for example, from a building power supply). In some implementations, the infrared cloud detector system 3200 further includes at least one photovoltaic cell, for example, on a surface of the housing.

According to one aspect, the infrared cloud detector system 3200 further includes logic for determining a cloud cover condition using as input the time of day, day of year, sky temperature readings, $T_{sky}$, from one or more of the infrared sensors (e.g., infrared sensors of the first and second infrared sensor devices 3372, 3374 and/or the infrared sensor 3360), ambient temperature readings $T_{amb}$, from one or more ambient temperature sensors (e.g., the ambient temperature sensors of the first and second infrared sensor devices 3372, 3374 or the optional standalone temperature sensor 3222 located on a bottom external surface of the housing to shade it from direct solar radiation), and visible light intensity readings from one or more photosensors (e.g., the photosensors 3342 or upward facing photosensor 3340), and an oscillation frequency of the temperature readings, $T_{sky}$, from the infrared sensors. Examples of such logic are described herein, for example, with respect to FIGS. 8-10.

According to another aspect, the infrared cloud detector system 3200 further includes various logic described with reference to FIGS. 21, 22, 23, 24, 26, 27, 28, and 30, and 31. In one implementation, for example, the multi-sensor device 3301 and/or the one or more external controllers include logic for: 1) determining a filtered infrared sensor value based at least in part on the temperature readings, $T_{sky}$, from one or more of the infrared sensors (e.g., infrared sensors of the first and second infrared sensor devices 3372, 3374 and/or the infrared sensor 3360) and ambient temperature readings, $T_{amb}$, from one or more ambient temperature sensors (e.g., the ambient temperature sensors of the first and second infrared sensor devices 3372, 3374 or the optional standalone temperature sensor 3222 located on a bottom external surface of the housing to shade it from direct solar radiation); and/or 2) determining a filtered photosensor value based at least in part on light intensity readings from one or more photosensors (e.g., the photosensors 3342 or upward facing photosensor 3340). An example of logic for determining a filtered infrared sensor value is Module D' described with reference to flowchart 2300 shown in FIG. 23. An example of logic for determining a filtered infrared sensor value is Module C1' described with reference to flowchart 3100 shown in FIG. 31. In one case, the multi-sensor device 401 can execute instructions stored in memory for determining and passing filtered sensor values via a communication network to the external controller(s). An example an infrared cloud detector system that includes a multi-sensor device that can pass sensor readings and/or filtered values via a communication network 1410 to external controller(s) is shown in FIG. 14. The control logic implemented by the external controller(s) can make tinting decisions to determine a tint level and implement tint instructions to transition tint of one or more tintable windows in the building. Such control logic is described with reference Modules A1, B, C1, and D shown in FIGS. 22, 24-28, and 30.

E. Comparison of Intensity Readings from a Photosensor with Delta Values During Different Cloud Conditions As discussed above, infrared sensors can be more accurate than a visible light photosensor in detecting a "clear" condition in the early morning and evening. Direct sun light and other conditions can cause, however, some noise that results in oscillations in the infrared sensor readings. If the frequency and/or amplitude of these oscillations is low, the infrared sensor readings can be used to make a high confidence assessment of the cloud cover condition. Certain conditions (e.g., fast moving clouds) may cause oscillations in the photosensor readings. If the frequency of oscillation is low, the photosensor readings can be used to make a high confidence assessment of the cloud cover condition during the daytime. In certain implementations, logic may determine whether the oscillations of the infrared sensor readings are of high frequency and/or the whether the oscillations of the photosensor readings are of high frequency. If it is determined that the oscillations of the infrared sensor readings are of high frequency, the logic uses the photosensor readings to determine the cloud cover condition. If it is determined that the oscillations of the photosensor readings are of high frequency, the logic uses the difference between the infrared sensor readings and the ambient temperature sensor readings to determine the cloud cover condition. To illustrate technical advantages of this logic selecting the type of sensor reading to use depending on the oscillations, FIGS. 5A, 5B, 6A, 6B, 7A, and 7B include graphs of plots of intensity readings, I, taken by a visible light photosensor for comparison with the difference, delta ($\Delta$), between temperature readings, $T_{sky}$, taken by an infrared sensor and temperature readings, $T_{amb}$, taken by an ambient temperature sensor during different cloud cover conditions. The visible light photosensor, infrared sensor, and ambient temperature sensor are similar to those described with respect to components of the infrared cloud detector 310 shown in FIG. 3. Each of the plots is of readings taken during the time period of a day.

One advantage of implementing an infrared sensor in a multi-sensor device is that often the amplitude of oscillations will be low as compared to the photosensors, due to the typically larger field of view, the light diffuser, and the consistent response of the infrared sensor to heat throughout the day—so the assessment based at least in part on the infrared sensor can be made with higher confidence.

Figure 5A:
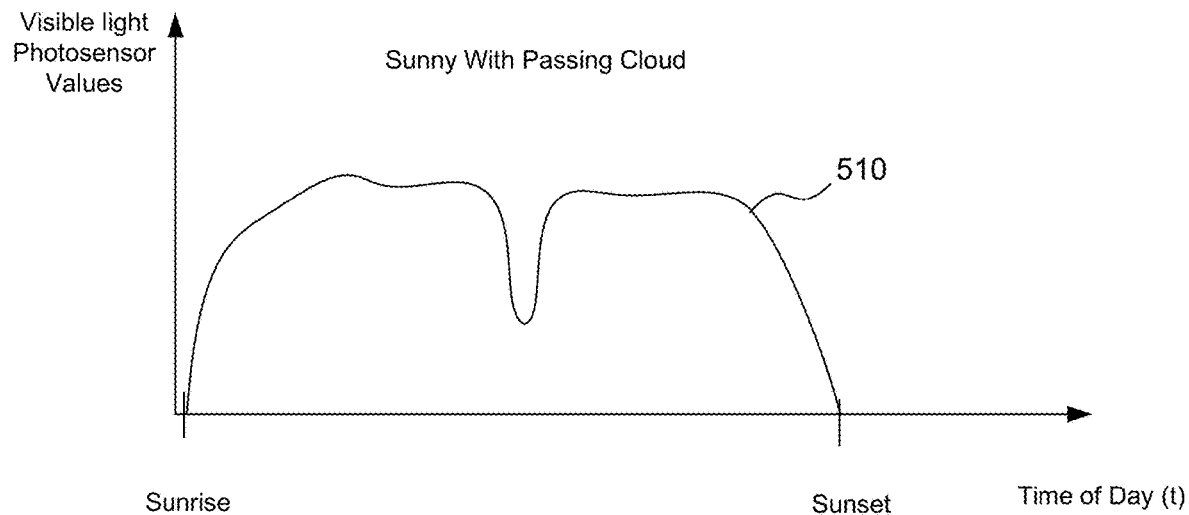
FIG. 5A is a graph with a plot of intensity readings taken by the visible light photosensor over time.
Figure 5B:
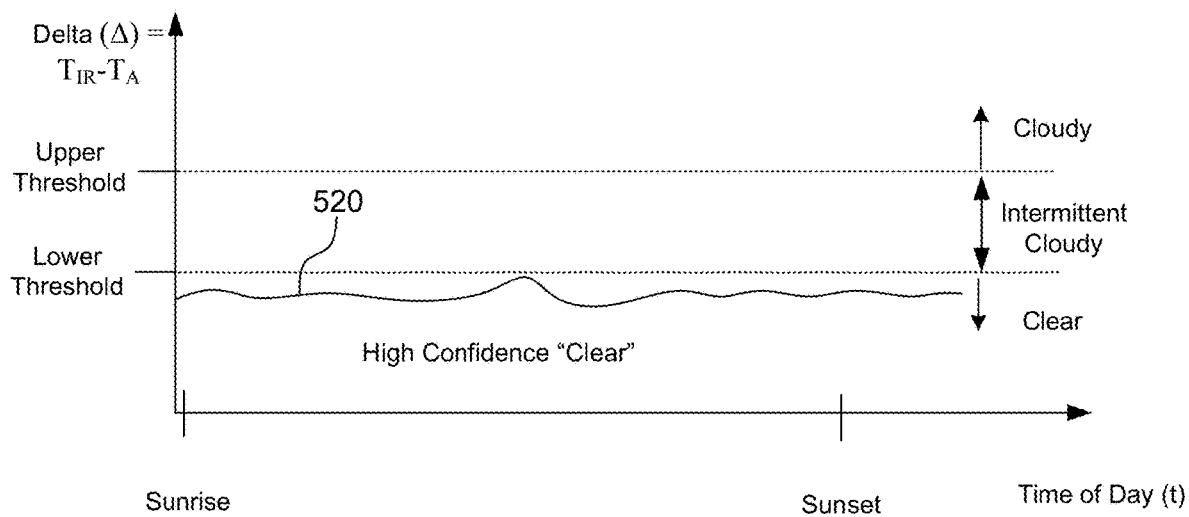
FIG. 5B is a graph with a plot of the difference between temperature readings taken by the infrared sensor and temperature readings taken by the ambient temperature sensor over time.

FIGS. 5A-5B include graphs of plots of readings taken over a day that is sunny and clear all day except for a passing cloud during the middle of the daytime. FIG. 5A is a graph with a plot 510 of intensity readings, I, taken by the visible light photosensor over time. FIG. 5B is a graph with a plot 520 of the difference, delta ($\Delta$), between temperature readings, $T_{sky}$, taken by the infrared sensor and temperature readings, $T_{amb}$, taken by the ambient temperature sensor over time. As shown in the plot 510 of FIG. 5A, the intensity readings, I, taken by the visible light photosensor are high most of the daytime and drop with a high frequency (short period) oscillation when a cloud passes during the middle of the daytime. The plot 520 of FIG. 5A shows the values of delta (Δ) do not increase above the lower threshold value during the entire day, which indicates a high confidence "clear" condition.

Figure 6A:
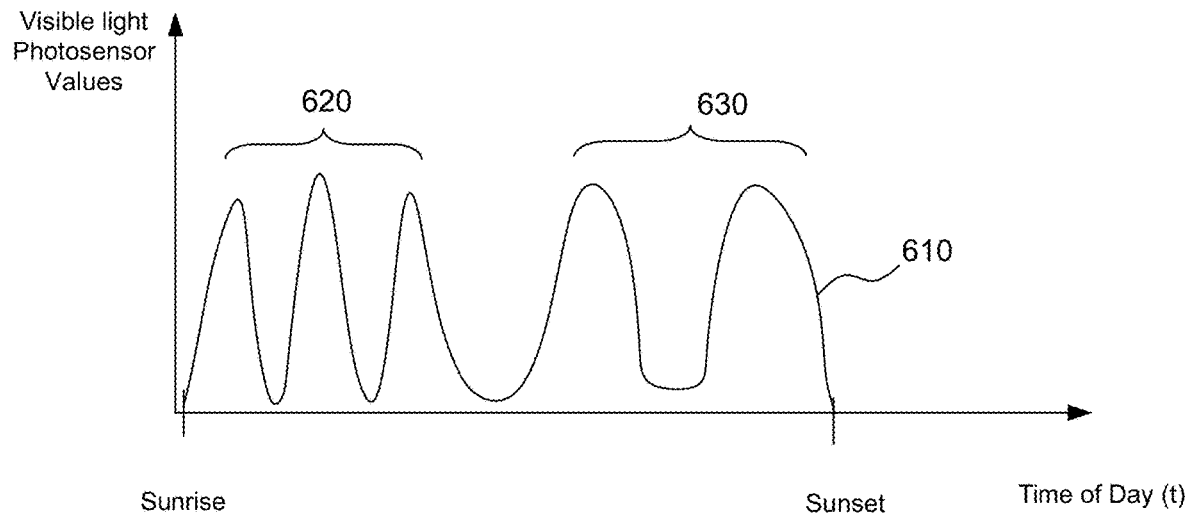
FIG. 6A is a graph with a plot of intensity readings taken by the visible light photosensor over time.
Figure 6B:
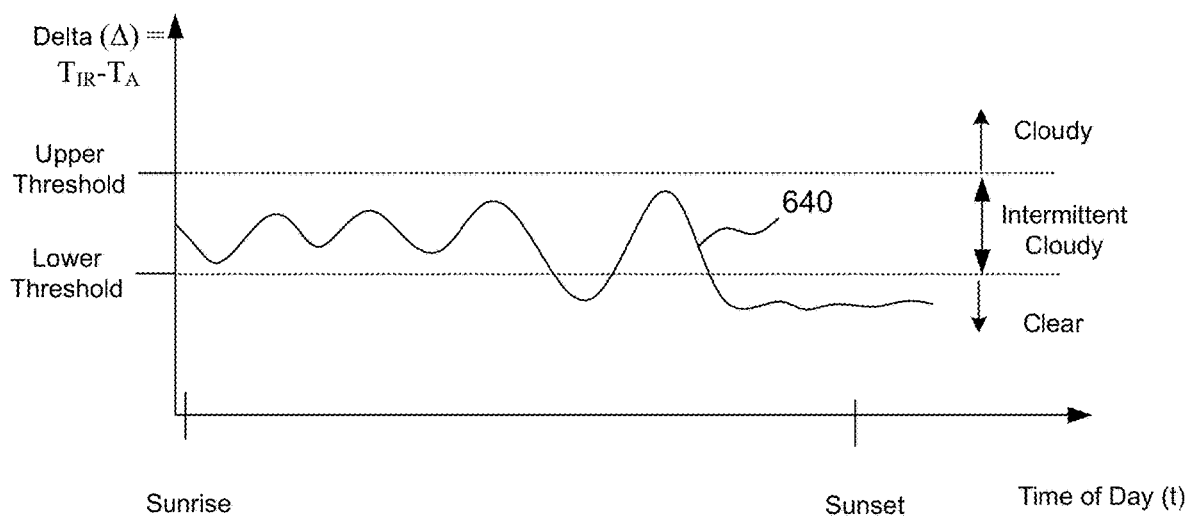
FIG. 6B is a graph with a plot of the difference between temperature readings taken by the infrared sensor over time and temperature readings taken by an ambient temperature sensor over time.

FIGS. 6A-6B include graphs of plots of readings taken over a day with frequent passing clouds in the morning until afternoon and the two slow moving clouds passing later in the afternoon. FIG. 6A is a graph with a plot 610 of intensity readings, I, taken by the visible light photosensor over time. FIG. 6B is a graph with a plot 640 of the difference, delta (Δ), between temperature readings, $T_{sky}$, taken by the infrared sensor over time and temperature readings, $T_{amb}$, taken by an ambient temperature sensor over time. As shown in the plot 610 of FIG. 6A, the intensity readings, I, taken by the visible light photosensor has a high frequency portion 620 during the time period that the frequent clouds are passing in the morning until afternoon. The plot 610 has a low frequency portion 630 later in the afternoon when two slow moving clouds pass by. The plot 640 in FIG. 6B shows that the values of delta (Δ) have high frequency during the time period that the frequent clouds are passing in the morning until afternoon and the values remain between the upper and lower threshold values indicating intermittent cloudy. The values of delta (Δ) later in the afternoon may have a low frequency oscillations that have values between the upper and lower thresholds and below the lower thresholds value shifting between "intermittent cloudy" and "clear" condition. In this case, the infrared sensor values indicate high confidence "intermittent cloudy" condition from morning until afternoon and the photosensor values indicate a high confidence "intermittent cloudy condition in the later afternoon.

Figure 7A:
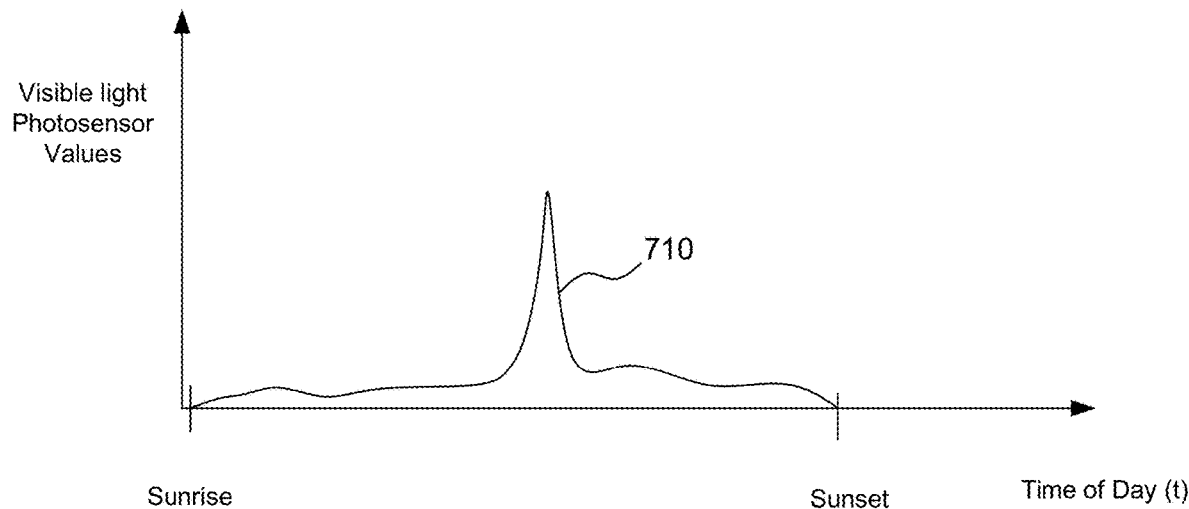
FIG. 7A is a graph with a plot of intensity readings taken by the visible light photosensor over time.
Figure 7B:
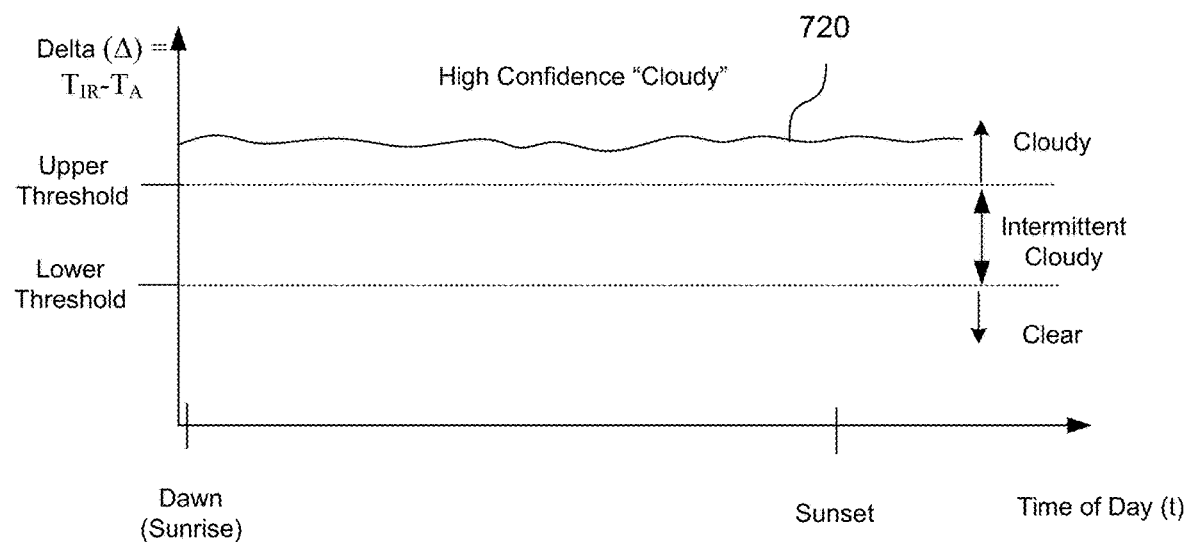
FIG. 7B is a graph with a plot of the difference between temperature readings taken by the infrared sensor and temperature readings taken by an ambient temperature sensor over time.

FIGS. 7A-7B include graphs of plots of readings taken over time during a day that is cloudy except for a short time during the middle of the day. FIG. 7A is a graph with a plot 710 of intensity readings, I, taken by the visible light photosensor over time. FIG. 7B is a graph with a plot 720 of the difference, delta (Δ), between temperature readings, $T_{sky}$, taken by the infrared sensor and temperature readings, $T_{amb}$, taken by an ambient temperature sensor over time. As shown in the plot 710 of FIG. 7A, the intensity readings, I, taken by the visible light photosensor are low most of the daytime and increase with a high frequency (short period) oscillation when the sky clears briefly in the middle of the day. The plot 720 of FIG. 7A shows the values of delta (Δ) do not go below the upper threshold value during the entire day which indicates a high confidence "cloudy" condition.

In some implementations, an infrared cloud detector system uses readings from an infrared sensor to evaluate the delta differential between the ambient temperature and the temperature reading from an infrared sensor measuring wavelengths in an infrared range, for example, wavelengths between 8-14 micrometers. In some cases, one or more correcting factors are applied to the calculated delta differential. The delta differential provides a relative sky temperature value that can be used to classify the cloud cover condition. For example, a cloud cover condition may be determined in one of three buckets "Clear," "Cloudy," and "Overcast." In using this infrared cloud detector system, the cloud cover condition determined has no bearing on if the sun is out or if it is before sunrise/sunset.

The infrared cloud detector system according to certain implementations may have one or more technical advantages. For example, during early morning and evening conditions, the infrared sensor can determine if it is cloudy or sunny independent of visible light intensity levels. This determination of a cloud cover condition during these times, when a photosensor would be ineffective while the sun is not up, may provide additional context to determining a tint state (also referred to herein as a "tint level") of a tintable window. As another example, the infrared sensor can be used to detect the general cloud cover condition within its field-of-view. This information can be used in conjunction with photosensor readings to determine if a "clear" or "cloudy" condition determined by the photosensor is likely to persist. For example, if the photo sensor detects a sharp rise in intensity levels which would tend to indicate a "clear" condition, but the infrared sensor indicates a "cloudy" condition, the "clear" condition is not expected to persist. Conversely, if the infrared sensor says a "clear" condition and the photosensor readings indicate that it's a "clear" condition, then the "clear" condition is likely to persist. As another example, on occasions where a tintable window needs to be at a steady state at sunrise, the transition needs to start at X time (e.g., transition time) before sunrise. During this time, the photosensor is ineffective as there is minimal light exposure. The IR sensor can determine the cloud conditions before sunrise to inform the control logic whether to begin the tinting process (during clear sky) or keep the tintable window clear in anticipation of a "cloudy" condition at sunrise.

Figure 8:
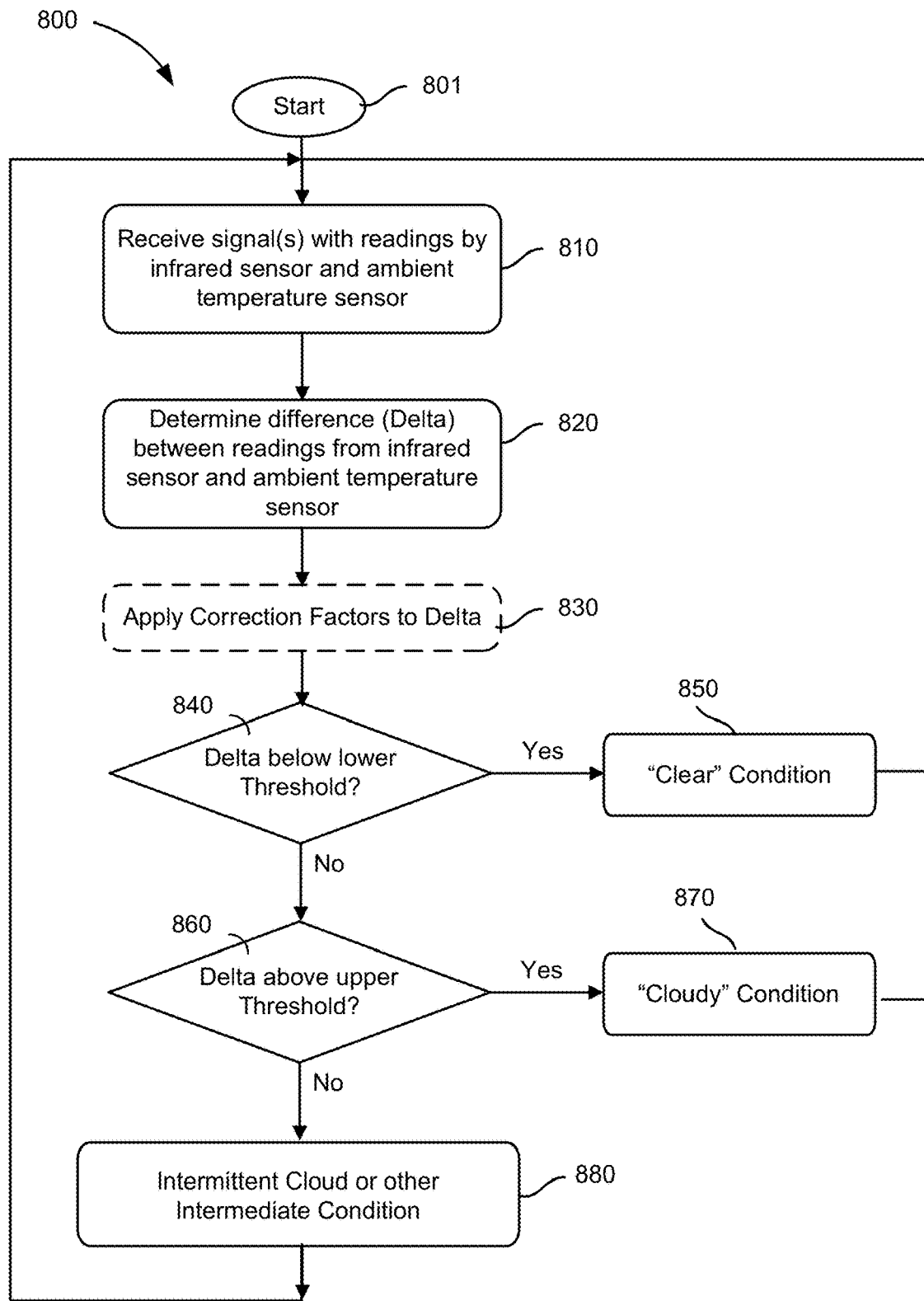
FIG. 8 shows a flowchart describing a method that uses temperature readings from an infrared sensor and an ambient temperature sensor to determine a cloud cover condition, according to implementations.
Figure 9:
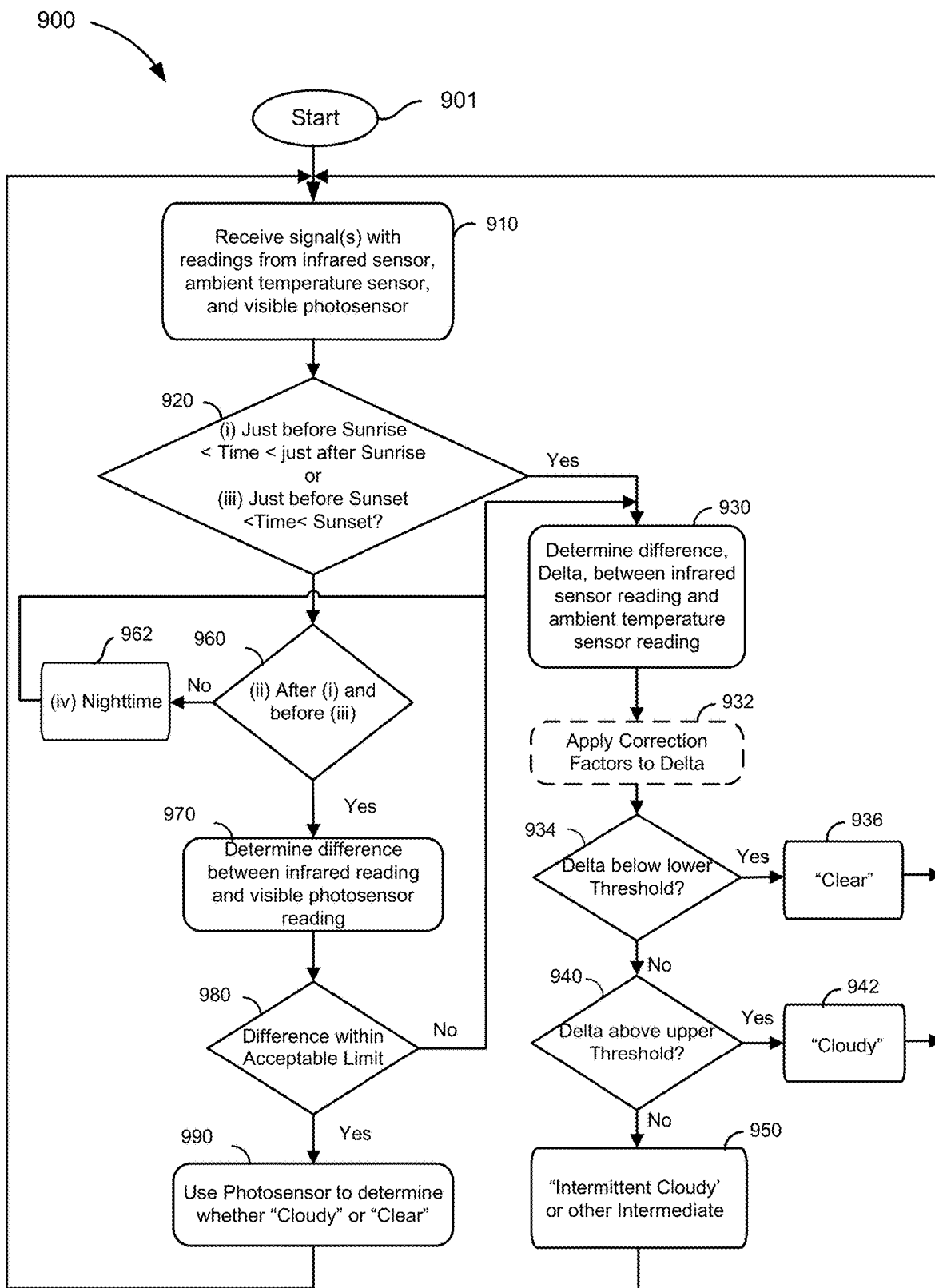
FIG. 9 shows a flowchart describing a method that determines a cloud cover condition using readings from an infrared sensor, an ambient temperature sensor, and a photosensor of an infrared cloud detector system, according to implementations.
Figure 10:
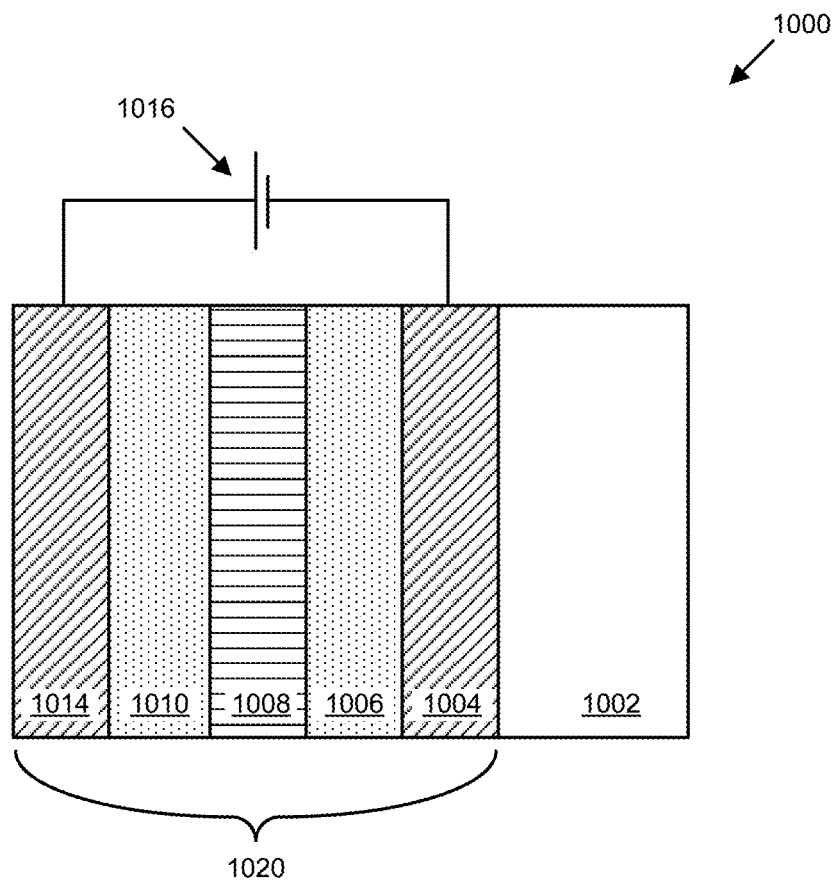
FIG. 10 depicts a schematic cross-section of an electrochromic device.

III. Examples of Methods of Using Infrared and Ambient Temperature Readings to Determine Cloud Cover Condition FIGS. 8-10 show flow charts describing methods of using readings from at least one infrared sensor and one ambient temperature sensor to determine a cloud cover condition, according to various embodiments. In FIGS. 9-10, readings from at least one photosensor can be used to determine the cloud cover condition under certain conditions. In some cases, the infrared sensor used to take temperature readings is calibrated to detect infrared radiation in about the 8 µm to 14 µm spectrum and/or has a field-of-view of about 72 degrees. In some cases, the photosensor used to take the photosensor readings is calibrated to detect intensity of visible light (e.g., between about 390 nm and about 700 nm) within a photopic range, which generally refers to light that is visible to the average human eye under well-lit conditions (e.g., a luminance level ranging from between about 10 $cd/m^2$ and about 108 $cd/m^2$). Although these methods are described with respect to readings from a single infrared sensor, a single ambient temperature sensor, and/or a single photosensor, it would be understood that values from multiple sensors of a type can be used, for example, multiple sensors oriented in different directions can be used. If multiple sensors are used, the method may use a single value based at least in part on a sensor (e.g., a functioning sensor) of a particular orientation or take an average, mean, or other statistically relevant value of readings from multiple functioning sensors. In other cases, there may be redundant sensors and the infrared cloud detector may have logic that uses the values from a functioning sensor. For example, by evaluating which of the sensors is functioning and/or which are not functioning based at least in part on comparing the readings from the various sensors.

A. Method I

FIG. 8 shows a flowchart 800 describing a method that uses temperature readings from an infrared sensor and an ambient temperature sensor to determine a cloud cover condition, according to implementations. The infrared sensor and ambient temperature sensor of the infrared cloud detector system generally take readings (at sample times) on a periodic basis. A processor executes instructions stored in memory to perform the operations of this method. In one implementation, the infrared cloud detector system has components similar to those described with respect to the system having the infrared cloud detector 100 described with respect to FIG. 1. In another implementation, the infrared cloud detector system has components similar to those described with respect to the system with infrared cloud detector 310 in FIG. 3.

In FIG. 8, the method starts at operation 801. At operation 810, a signal(s) is received, at the processor, with sky temperature reading, $T_{sky}$, taken by an infrared sensor and ambient temperature reading, $T_{amb}$, taken by the ambient temperature sensor. Signals from the infrared sensor and/or ambient temperature sensor are received wirelessly and/or via wired electrical connections. The infrared sensor takes temperature readings based at least in part on infrared radiation received within its field-of-view. The infrared sensor is usually oriented toward a region of sky of interest, for example, a region above a building. The ambient temperature sensor is configured to be exposed to the outside environment to measure the ambient temperature.

At operation 820, the processor calculates the difference, delta ($\Delta$), between the temperature reading, $T_{sky}$, taken by the infrared sensor and the temperature reading, $T_{amb}$, taken by an ambient temperature sensor at a sample time. Optionally (denoted by dotted line), correction factors are applied to the calculated delta ($\Delta$) (operation 830). Some examples of correction factors that may be applied include humidity, sun angle/elevation, and site elevation.

At operation 840, the processor determines whether the calculated delta ($\Delta$) value is below a lower threshold value (e.g., −5 millidegrees Celsius, −2 millidegrees Celsius, etc.). If it is determined that the calculated delta ($\Delta$) value is below the lower threshold value, the cloud cover condition is determined to be a "clear" condition (operation 850). During operation of the infrared cloud detector, the method then increments to the next sample time and returns to operation 810.

If it is determined that the calculated delta ($\Delta$) is above the lower threshold value, then the processor determines whether the calculated delta ($\Delta$) is above an upper threshold value (e.g., 0 millidegrees Celsius, 2 millidegrees Celsius, etc.) at operation 860. If it is determined that the calculated delta ($\Delta$) is above the upper threshold value at operation 860, then the processor determines the cloud cover condition to be a "cloudy" condition (operation 870). During operation of the infrared cloud detector, the method then increments to the next sample time and returns to operation 810.

If it is determined that the calculated delta ($\Delta$) is below the upper threshold value at operation 860, then the processor determines the cloud cover condition to be "intermittent cloudy" or another intermediate condition (operation 880). During operation of the infrared cloud detector, the method then increments to the next sample time and returns to operation 810.

B. Method II

FIG. 9 shows a flowchart 900 describing logic for a method that determines a cloud cover condition using readings from an infrared sensor, an ambient temperature sensor, and a photosensor of an infrared cloud detector system, according to implementations. The infrared sensor, ambient temperature sensor, and photosensor generally take readings (at sample times) on a periodic basis. The infrared cloud detector system may include a processor that can execute instructions stored in memory to perform the logic operations of this method. In one implementation, the infrared sensor, ambient temperature sensor, and photosensor are similar to components of the infrared cloud detector system 300 described with respect to FIG. 3. In another implementation, the infrared sensor, ambient temperature sensor, and photosensor are similar to components of the infrared cloud detector system 400 described with respect to FIG. 4A-4C.

In FIG. 9, the logic of the method starts at operation 901. At operation 910, one or more signals are received, at the processor, with a temperature reading, $T_{sky}$, taken by an infrared sensor at a particular sample time, a temperature reading, $T_{amb}$, taken by the ambient temperature sensor at the sample time, and an intensity reading taken by the photosensor at the sample time. Signals from the infrared sensor, ambient temperature sensor, and photosensor are received wirelessly and/or via wired electrical connections. The infrared sensor takes temperature readings based at least in part on infrared radiation received within its field-of-view. The infrared sensor is usually oriented toward a region of sky of interest, for example, a region above a building. The ambient temperature sensor is configured to be exposed to the outside environment to measure the ambient temperature. The sensing surface of the photosensor may be oriented toward the region of sky of interest and direct sunlight is blocked or diffused from impinging the sensing surface.

At operation 920, the logic determines whether the time of day is during one of the following time periods: (i) a time period shortly before sunrise (e.g., starting at a first time of 45 minutes before sunrise, 30 minutes before sunrise, 20 minutes before sunrise, or other suitable amount of time before sunrise) and up to slightly after sunrise (e.g., starting at a second time of 45 minutes after sunrise, 30 minutes after sunrise, 20 minutes after sunrise, or other suitable amount of time after sunrise) and (iii) a time period shortly before sunset (dusk) (e.g., starting at a third time of 45 minutes before sunset, 30 minutes before sunset, 20 minutes before sunset, or other suitable amount of time before sunset) and up until sunset. In one case, the time of sunrise can be determined from measurements taken by the visible wavelength photosensor. For example, the time period (i) may end at the point where a visible light wavelength photosensor begins to measure direct sunlight i.e. an intensity reading of the visible light photosensor is at or above a minimum intensity value. In addition or alternatively, the time period (iii) may be determined to end at the point where the intensity reading from a visible light wavelength photosensor is at or below a minimum intensity value. In another example, the time of sunrise and/or the time of sunset may be calculated using a solar calculator and the day of the year and the time periods (i) and (iii) can be calculated by a defined period of time (e.g., 45 minutes) before and after the calculated times of sunrise/sunset.

In certain implementations, the logic determines whether the current time is during one of the time periods (i), (ii), (iii), or (iv) based at least in part on a calculated solar elevation. The logic determines the solar elevation angle, at the current time using one of various publically-codes. The logic determines that the time is during the Nighttime time period (iv) if it determines that the calculated solar elevation angle is less than 0. The logic can determine that the time is in the time period (i) between just before sunrise and just after sunrise if it determines that the calculated solar elevation is greater than 0 and less than a first solar elevation threshold value associated with the time just after Sunrise (e.g. 10 minutes after sunrise, 20 minutes after sunrise, 45 minutes after sunrise, etc.). In one example, the first solar elevation threshold value is 5 degrees over the horizon. In another example, the first solar elevation threshold value is 10 degrees over the horizon. The logic can determine that the time is in a time period (iii) between just before sunset and sunset if it determines that the calculated solar elevation is less than 180 degrees an greater than a second threshold value associated with the time just before Sunset (e.g. 10 minutes after Sunset, 20 minutes after Sunset, 45 minutes after Sunset, etc.). In one example, the second solar elevation threshold value is 175 degrees or 5 degrees from the horizon. In another example, the second solar elevation threshold value is 170 degrees or 10 degrees from the horizon. The logic can determine that the time is in a time period (ii) between the time periods (i) and (iii) if the logic determines that the calculated solar elevation is greater than the first solar elevation threshold value and less than the second solar elevation threshold value.

If it is determined at operation 920 that the time of day is during either of the time periods (i) or (iii), then the logic is implemented to calculate the difference, delta ($\Delta$), between the temperature reading, $T_{sky}$, taken by the infrared sensor and the temperature reading, $T_{amb}$, taken by an ambient temperature sensor at a sample time (operation 930). Optionally (denoted by dotted line), correction factors are applied to the calculated delta ($\Delta$) (operation 930). Some examples of correction factors that may be applied include humidity, sun angle/elevation, and site elevation.

In one embodiment, the logic determines at operation 920 whether the infrared readings are oscillating at a frequency greater than a second defined level. If the processor determines at operation 920 that the time of day is either within the time period (i) or (iii) and the infrared readings are oscillating at a frequency greater than a second defined level, then the processor applies operation 990 to use the photosensor readings to determine the cloud condition. For example, the processor may determine a "clear" condition if the photosensor reading is above a certain minimum intensity level and determine a "cloudy" condition if the photosensor reading is at or below minimum intensity level. If the system is still in operation, the method increments to the next sample time and returns to operation 910.

At operation 934, the processor determines whether the calculated delta ($\Delta$) value is below a lower threshold value (e.g., −5 millidegrees Celsius, −2 millidegrees Celsius, etc.). If it is determined that the calculated delta ($\Delta$) value is below the lower threshold value, the cloud cover condition is determined to be a "clear" condition (operation 936). During operation of the infrared cloud detector, the method then increments to the next sample time and returns to operation 910.

If it is determined that the calculated delta ($\Delta$) is above the lower threshold value, then the processor determines whether the calculated delta ($\Delta$) is above an upper threshold value (e.g., 0 millidegrees Celsius, 2 millidegrees Celsius, etc.) at operation 940. If it is determined that the calculated delta ($\Delta$) is above the upper threshold value at operation 940, then the processor determines the cloud cover condition to be a "cloudy" condition (operation 942). If still in operation, the method increments to the next sample time and returns to operation 910.

If it is determined that the calculated delta ($\Delta$) is below the upper threshold value at operation 940, then the processor determines the cloud cover condition to be "intermittent cloudy" or another intermediate condition (operation 950). If the system is still in operation, the method increments to the next sample time and returns to operation 910.

If it is determined at operation 920 that the time of day is not during either of the time periods (i) or (iii), then the processor determines whether the time of day is during the time period (ii) which is in the daytime after the time period (i) and before time period (iii) (operation 960). If the processor determines at operation 960 that the time of day is during the time period (ii) daytime, then the processor calculates the difference between the temperature reading, $T_{sky}$, taken by the infrared sensor and the intensity reading taken by the photosensor (operation 970). At operation 980, the processor determines whether the calculated difference is within an acceptable limit. If the processor determines at operation 980 that the calculated difference is more than the acceptable limit, then the processor applies operation 930 to calculate the delta ($\Delta$) and uses the calculated delta ($\Delta$) to determine the cloud cover condition as discussed above.

In one embodiment, the processor determines at operation 960 whether the infrared readings are oscillating at a frequency greater than a second defined level. If the processor determines at operation 960 the time of day is within the time period (ii) and that the infrared readings are oscillating at a frequency greater than a second defined level, then the processor applies operation 990 to use the photosensor readings to determine the cloud condition. For example, the processor may determine a "clear" condition if the photosensor reading is above a certain minimum intensity level and determine a "cloudy" condition if the photosensor reading is at or below minimum intensity level. If the system is still in operation, the method increments to the next sample time and returns to operation 910.

If the processor determines at operation 980 that the calculated difference is within the acceptable limit, the photosensor reading is used to determine the cloud cover condition (operation 990). For example, the processor may determine a "clear" condition if the photosensor reading is above a certain minimum intensity level and determine a "cloudy" condition if the photosensor reading is at or below minimum intensity level. If the system is still in operation, the method increments to the next sample time and returns to operation 910.

In one embodiment, the processor determines at operation 970 whether the photosensor readings are oscillating at a frequency greater than a first defined level and whether the infrared readings are oscillating at a frequency greater than a second defined level. If the processor determines at operation 980 that the calculated difference is within the acceptable limit and the processor determines that the photosensor readings are oscillating at a frequency greater than the first defined level, then the processor applies operation 930 to calculate the delta ($\Delta$) and use the calculated delta ($\Delta$) is used determine the cloud cover condition as discussed above. If the processor determines at operation 980 that the calculated difference is not within the acceptable limit and the processor determines that the infrared readings are oscillating at a frequency greater than the second defined level, then the processor applies operation 990 to use the photosensor readings to determine the cloud condition. For example, the processor may determine a "clear" condition if the photosensor reading is above a certain minimum intensity level and determine a "cloudy" condition if the photosensor reading is at or below minimum intensity level. If the system is still in operation, the method increments to the next sample time and returns to operation 910.

In another embodiment, instead or implementing operations 970, 980, and 990, the processor executes instructions to implement logic the runs both a daytime infrared sensor algorithm and a daytime photosensor algorithm to determine a cloudy/clear/intermediate condition independently, each based at least in part on their own thresholds of signal, and the corresponding tint level. The control logic then applies the darker tint level of the two tint levels determined independently by the daytime photosensor algorithm and the daytime infrared sensor algorithm. An example of similar control logic is described with respect to operations 2820, 2830, 2832, and 2840 depicted in FIG. 28.

Returning to FIG. 9, if the processor determines at operation 960 that the time of day is in the nighttime time period (iv) after time period (iii) and before time period (i), the processor calculates the delta at operation 930 and uses the calculated delta (Δ) to determine the cloud cover condition as discussed above.

IV. Methods and Systems of Controlling Tintable Window (s) Using Infrared Sensor and/or Photosensor Readings In energy efficient buildings, control logic for setting levels of its building systems may consider cloud cover in its decisions. For example, in buildings with optically-switchable windows (also referred to herein as "tintable windows"), control logic may consider cloud cover in setting optical states of an optically-switchable window (e.g., tint states of an electrochromic window). Conventional systems that purport to provide this functionality typically employ expensive sensing equipment to map the entire sky and track movement of clouds. This mapping technology can be hampered by not being able to register clouds until there is enough visible light to see them. Thus, by the time the clouds are registered, building systems may not need to be adjusted.

In various implementations described herein, sensor data from an infrared cloud detector system (e.g., a system of FIG. 1, system 300 in FIG. 3, system 400 in FIGS. 4A-4C, or other infrared cloud detector systems described herein) can be used to set levels of building systems. As an example, this section describes control logic that uses readings, including infrared measurements, taken by sensors in an infrared cloud detector system to determine a cloud cover condition and set tint levels in one or more optically-switchable windows (e.g., electrochromic windows) of a building based at least in part on the determined cloud cover condition. Although the control logic described in this section is described with reference to controlling tint levels in electrochromic windows, it would be understood that this logic can be used to control other types of optically-switchable windows and other building systems. Electrochromic windows have one or more electrochromic devices such as the electrochromic devices described in U.S. Pat. No. 8,764, 950, issued on Jul. 1, 2014 and titled "ELECTROCHROMIC DEVICES," and in U.S. patent application Ser. No. 13/462,725 (issued as U.S. Pat. No. 9,261,751), filed on May 2, 2012 and titled "ELECTROCHROMIC DEVICES," each of which is hereby incorporated by reference in its entirety.

i) Electrochromic Devices/Windows

Figure 11A:
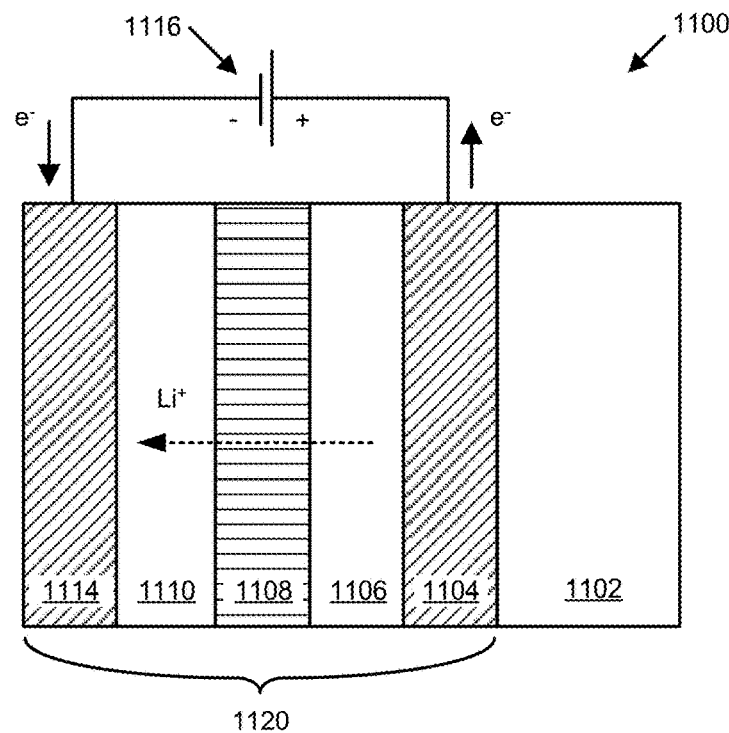
FIG. 11A depicts a schematic cross-section of an electrochromic device in a bleached state (or transitioning to a bleached state).
Figure 11B:
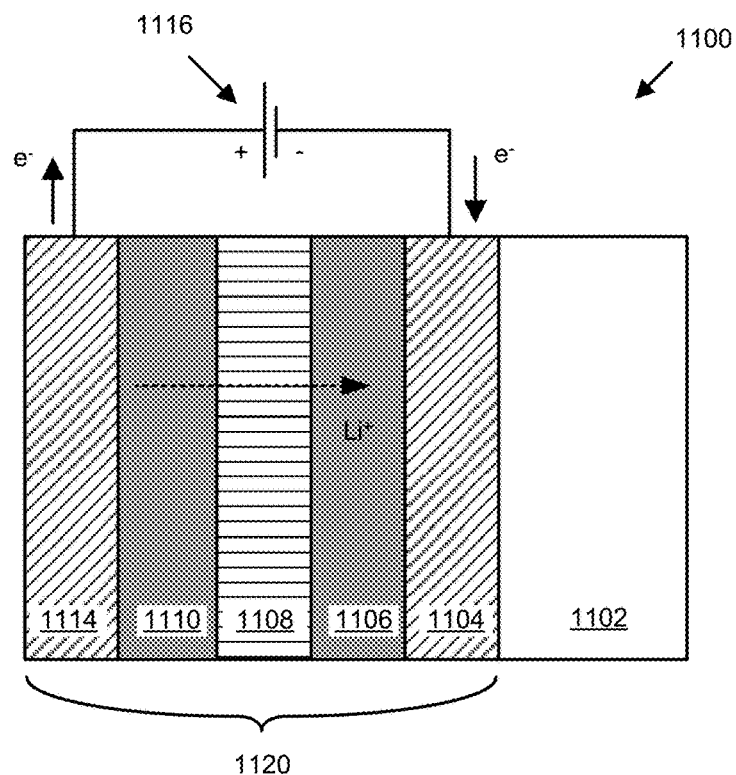
FIG. 11B depicts a schematic cross-section of the electrochromic device shown in FIG. 11A, but in a colored state (or transitioning to a colored state).

FIG. 10 schematically depicts an electrochromic device 1000, in cross-section. The electrochromic device 1000 includes a substrate 1002, a first conductive layer (CL) 1004, an electrochromic layer (EC) 1006, an ion conducting layer (IC) 1008, a counter electrode layer (CE) 1010, and a second conductive layer (CL) 1014. In one implementation, the electrochromic layer (EC) 1006 comprising tungsten oxide and the counter electrode layer (CE) 1010 includes nickel-tungsten oxide. Layers 1004, 1006, 1008, 1010, and 1014 are collectively referred to as an electrochromic stack 1020. A voltage source 1016 operable to apply an electric potential across the electrochromic stack 1020 effects transition of the electrochromic device, for example, between a bleached state (e.g., as depicted in FIG. 11A) and a colored state (e.g., as depicted in FIG. 11B). The order of layers can be reversed with respect to the substrate 1002.

In some cases, electrochromic devices having distinct layers and can be fabricated as all solid state devices and/or all inorganic devices. Examples of such devices and methods of fabricating them are described in more detail in U.S. patent application Ser. No. 12/645,111 (issued as U.S. Pat. No. 9,664,974), titled "Fabrication of Low-Defectivity Electrochromic Devices" and filed on Dec. 22, 2009, and in U.S. patent application Ser. No. 12/645,159 (issued as U.S. Pat. No. 8,432,603 on Apr. 30, 2013), titled "Electrochromic Devices" and filed on Dec. 22, 2009, both of which are hereby incorporated by reference in their entireties. It should be understood, however, that any one or more of the layers in the stack may contain some amount of organic material. The same can be said for liquids that may be present in one or more layers in small amounts. It should be understood that solid state material may be deposited or otherwise formed by processes employing liquid components such as certain processes employing sol-gels or chemical vapor deposition. Additionally, it should be understood that reference to a transition between a bleached state and colored state is non-limiting and suggests only one example, among many, of an electrochromic transition that may be implemented. Unless otherwise specified herein (including the foregoing discussion), whenever reference is made to a bleached-colored transition, the corresponding device or process encompasses other optical state transitions such as non-reflective-reflective, transparent-opaque, etc. Further, the term "bleached" refers to an optically neutral state, for example, uncolored, transparent, or translucent. Still further, unless specified otherwise herein, the "color" of an electrochromic transition is not limited to any particular wavelength or range of wavelengths. As understood by those of skill in the art, the choice of appropriate electrochromic and counter electrode materials governs the relevant optical transition.

In some implementations, an electrochromic device is configured to reversibly cycle between a bleached state and a colored state. When the electrochromic device is in a bleached state, a potential is applied to the electrochromic stack 1020 such that available ions in the stack reside primarily in the counter electrode 1010. When the potential on the electrochromic stack is reversed, the ions are transported across the ion conducting layer 1008 to the electrochromic material 1006 and cause the material to transition to the colored state. In a similar way, the electrochromic device of certain implementations described herein is configured to reversibly cycle between different tint levels (e.g., bleached state, darkest colored state, and intermediate levels between the bleached state and the darkest colored state).

Referring again to FIG. 10, a voltage source 1016 is configured to operate in conjunction with input from sensors. As described herein, the voltage source 1016 interfaces with a controller (not shown in this figure). Additionally, the voltage source 1016 may interface with an energy management system that controls the electrochromic device according to various criteria such as the time of year, time of day, and measured environmental conditions. Such an energy management system, in conjunction with large area electrochromic windows can dramatically lower the energy consumption of a building having the electrochromic windows.

Any material having suitable optical, electrical, thermal, and mechanical properties may be used as the substrate 1002 or other substrate of an electrochromic stack described herein. Examples of suitable substrates include, for example, glass, plastic, and mirror materials. Suitable glasses include either clear or tinted soda lime glass, including soda lime float glass. The glass may be tempered or untempered. In many cases, the substrate is a glass pane sized for residential window applications. The size of such glass pane can vary widely depending on the specific needs of the residence. In other cases, the substrate is architectural glass. Architectural glass is typically used in commercial buildings, but may be used in residential buildings, and typically, though not necessarily, separates an indoor environment from an outdoor environment. In certain examples, architectural glass is at least 20 inches by 20 inches, and can be much larger, for example, as large as about 80 inches by 120 inches. Architectural glass is typically at least about 2 mm thick, typically between about 3 mm and about 6 mm thick. Of course, electrochromic devices are scalable to substrates smaller or larger than architectural glass. Further, the electrochromic device may be provided on a mirror of any size and shape.

On top of the illustrated substrate 1002 is a conductive layer 1004. In certain implementations, one or both of the conductive layers 1004 and 1014 is inorganic and/or solid. The conductive layers 1004 and 1014 may be made from a number of different materials, including conductive oxides, thin metallic coatings, conductive metal nitrides, and composite conductors. Typically, the conductive layers 1004 and 1014 are transparent at least in the range of wavelengths where electrochromism is exhibited by the electrochromic layer. Transparent conductive oxides include metal oxides and metal oxides doped with one or more metals. Examples of such metal oxides and doped metal oxides include indium oxide, indium tin oxide, doped indium oxide, tin oxide, doped tin oxide, zinc oxide, aluminum zinc oxide, doped zinc oxide, ruthenium oxide, doped ruthenium oxide and the like. Since oxides are often used for these layers, they are sometimes referred to as "transparent conductive oxide" (TCO) layers. Thin metallic coatings that are substantially transparent may be used, as well as combinations of TCOs and metallic coatings.

The function of the conductive layers is to spread an electric potential provided by the voltage source 1016 over surfaces of the electrochromic stack 1020 to interior regions of the stack, with relatively little ohmic potential drop. The electric potential is transferred to the conductive layers though electrical connections to the conductive layers. In some aspects, bus bars, at least one in contact with conductive layer 1004 and at least one in contact with conductive layer 1014, provide the electric connection between the voltage source 1016 and the conductive layers 1004 and 1014. The conductive layers 1004 and 1014 may be connected to the voltage source 1016 with other conventional means.

Overlaying the illustrated conductive layer 1004 is an electrochromic layer 1006. In some aspects, the electrochromic layer 1006 is inorganic and/or solid. The electrochromic layer may contain any one or more of a number of different electrochromic materials including metal oxides. Some examples of suitable metal oxides include tungsten oxide ($WO_3$), molybdenum oxide ($MoO_3$), niobium oxide ($Nb_2O_5$), titanium oxide ($TiO_2$), copper oxide (CuO), iridium oxide ($Ir_2O_3$), chromium oxide ($Cr_2O_3$), manganese oxide ($Mn_2O_3$), vanadium oxide ($V_2O_5$), nickel oxide ($Ni_2O_3$), cobalt oxide ($Co_2O_3$) and the like. During operation, the electrochromic layer 1006 transfers ions to and receives ions from the counter electrode layer 1010 to cause reversible optical transitions. Generally, the colorization (or change in any optical property—e.g., absorbance, reflectance, and transmittance) of the electrochromic material is caused by reversible ion insertion into the material (e.g., intercalation) and a corresponding injection of a charge balancing electron. Typically some fraction of the ions responsible for the optical transition is irreversibly bound up in the electrochromic material. Some or all of the irreversibly bound ions are used to compensate "blind charge" in the material. In most electrochromic materials, suitable ions include lithium ions (Li+) and hydrogen ions (H+) (that is, protons). In some cases, however, other ions will be suitable. In various embodiments, lithium ions are used to produce the electrochromic phenomena. Intercalation of lithium ions into tungsten oxide ($WO_{3-y}$ ($0<y\leq\sim0.3$)) causes the tungsten oxide to change from transparent (bleached state) to blue (colored state).

Referring again to FIG. 10, in the electrochromic stack 1020, the ion conducting layer 1008 is sandwiched between the electrochromic layer 1006 and the counter electrode layer 1010. In some embodiments, the counter electrode layer 1010 is inorganic and/or solid. The counter electrode layer may include one or more of a number of different materials that serve as a reservoir of ions when the electrochromic device is in the bleached state. During an electrochromic transition initiated by, for example, application of an appropriate electric potential, the counter electrode layer transfers some or all of the ions it holds to the electrochromic layer, changing the electrochromic layer to the colored state. Concurrently, in the case of NiWO, the counter electrode layer colors with the loss of ions. Suitable materials for the counter electrode complementary to $WO_3$ include nickel oxide (NiO), nickel tungsten oxide (NiWO), nickel vanadium oxide, nickel chromium oxide, nickel aluminum oxide, nickel manganese oxide, nickel magnesium oxide, chromium oxide ($Cr_2O_3$), manganese oxide ($MnO_2$), and Prussian blue. When charge is removed from a counter electrode 1010 made of nickel tungsten oxide (that is, ions are transported from counter electrode 1010 to electrochromic layer 1006), the counter electrode layer 1010 will transition from a transparent state to a colored state.

In the illustrated electrochromic device 1100, between the electrochromic layer 1006 and the counter electrode layer 1010, there is the ion conducting layer 1008. The ion conducting layer 1008 serves as a medium through which ions are transported (in the manner of an electrolyte) when the electrochromic device transitions between the bleached state and the colored state. Preferably, ion conducting layer 1008 is highly conductive to the relevant ions for the electrochromic and the counter electrode layers, but has sufficiently low electron conductivity that negligible electron transfer takes place during normal operation. A thin ion conducting layer with high ionic conductivity permits fast ion conduction and hence fast switching for high performance electrochromic devices. In certain aspects, the ion conducting layer 1008 is inorganic and/or solid.

Examples of suitable materials for an ion conducting layer (i.e. for electrochromic devices having a distinct IC layer) include silicates, silicon oxides, tungsten oxides, tantalum oxides, niobium oxides, and borates. These materials may be doped with different dopants, including lithium. Lithium doped silicon oxides include lithium silicon-aluminum-oxide. In some embodiments, the ion conducting layer includes a silicate-based structure. In one aspect, a silicon-aluminum-oxide (SiAlO) is used for the ion conducting layer 1008.

In certain implementations, the electrochromic device 1000 includes one or more additional layers (not shown), such as one or more passive layers. Passive layers used to improve certain optical properties may be included in the electrochromic device 1000. Passive layers for providing moisture or scratch resistance may be included in electrochromic device 1000. For example, the conductive layers may be treated with anti-reflective or protective oxide or nitride layers. Other passive layers may serve to hermetically seal electrochromic device 300.

FIG. 11A is a schematic cross-section of an electrochromic device in a bleached state (or transitioning to a bleached state). In accordance with this illustrated example, an electrochromic device 1100 includes a tungsten oxide electrochromic layer (EC) 1106 and a nickel-tungsten oxide counter electrode layer (CE) 1110. The electrochromic device 1100 includes a substrate 1102, a conductive layer (CL) 11011, an ion conducting layer (IC) 1108, and conductive layer (CL) 1114. Layers 1104, 1106, 1108, 1010, and 1114 are collectively referred to as an electrochromic stack 1120. A power source 1116 is configured to apply a voltage potential and/or current to the electrochromic stack 1120 through suitable electrical connections (e.g., bus bars) to the conductive layers 1104 and 1114. In one aspect, the voltage source is configured to apply a potential of a few volts in order to drive a transition of the device from one optical state to another. The polarity of the potential as shown in FIG. 11A is such that the ions (lithium ions in this example) primarily reside (as indicated by the dashed arrow) in nickel-tungsten oxide counter electrode layer 1110

FIG. 11B is a schematic cross-section of the electrochromic device 1100 shown in FIG. 11A but in a colored state (or transitioning to a colored state). In FIG. 11B, the polarity of voltage source 1116 is reversed, so that the tungsten oxide electrochromic layer 1106 is made more negative to accept additional lithium ions, and thereby transition to the colored state. As indicated by the dashed arrow, lithium ions are transported across the ion conducting layer 1108 to the tungsten oxide electrochromic layer 1106. The tungsten oxide electrochromic layer 1106 is shown in the colored state or transitioning to the colored state. The nickel-tungsten oxide counter electrode 1110 is shown in the colored state or transitioning to the colored state. As explained, nickel-tungsten oxide becomes progressively more opaque as it gives up (deintercalates) lithium ions. In this example, there is a synergistic effect where the transition to colored states for both layers 1106 and 1110 are additive toward reducing the amount of light transmitted through the electrochromic stack and the substrate.

In certain implementations, an electrochromic device includes an electrochromic (EC) electrode layer and a counter electrode (CE) layer separated by an ionically conductive (IC) layer that is highly conductive to ions and highly resistive to electrons. As conventionally understood, the ionically conductive layer therefore prevents shorting between the electrochromic layer and the counter electrode layer. The ionically conductive layer allows the electrochromic and counter electrodes to hold a charge and thereby maintain their bleached or colored states. In electrochromic devices having distinct layers, the components form a stack which includes the ion conducting layer sandwiched between the electrochromic electrode layer and the counter electrode layer. The boundaries between these three stack components are defined by abrupt changes in composition and/or microstructure. Thus, the devices have three distinct layers with two abrupt interfaces.

In accordance with certain implementations, the counter electrode and electrochromic electrodes are formed immediately adjacent one another, sometimes in direct contact, without separately depositing an ionically conducting layer. In some implementations, electrochromic devices having an interfacial region rather than a distinct IC layer are employed. Such devices, and methods of fabricating them, are described in U.S. Pat. Nos. 8,300,298, 8,582,193, 8,764, 950, and 8,764,951—each of the patents is titled "Electrochromic Devices," and each is hereby incorporated by reference in its entirety.

In certain implementations, an electrochromic device may be integrated into an insulated glass unit (IGU) of an electrochromic window or may be in a single pane electrochromic window. For example, an electrochromic window may have an IGU including a first electrochromic lite and a second lite. The IGU may include a spacer separating the first electrochromic lite and the second lite. The second lite in the IGU may be a non-electrochromic lite or otherwise. For example, the second lite may have an electrochromic device thereon and/or one or more coatings such as low-E coatings and the like. Either of the lites can be laminated glass. Between the spacer and the first TCO layer of the electrochromic lite is a primary seal material. This primary seal material may be between spacer and second glass lite. Around the perimeter of spacer is a secondary seal. These seals aid in keeping moisture out of the interior space of the IGU. They may serve to prevent argon or other gas that may be introduced into the interior space of the IGU from escaping. The IGU may include bus bar wiring for connection to a window controller. In some implementations, one or both of the bus bars are inside the finished IGU, however in one implementation one bus bar is outside the seal of the IGU and one bus bar is inside the IGU. In the former embodiment, an area is used to make the seal with one face of the spacer used to form the IGU. Thus, the wires or other connection to the bus bars runs between the spacer and the glass. As many spacers are made of metal, e.g., stainless steel, which is conductive, it is desirable to take steps to avoid short circuiting due to electrical communication between the bus bar and connector thereto and the metal spacer.

ii) Window Controllers

A window controller is used to control the tint state (also referred to herein as "tint level") of one or more electrochromic devices in an electrochromic window or a zone of one or more electrochromic windows. In some embodiments, the window controller is able to transition an electrochromic window between two tint states, a bleached state and a colored state. In other embodiments, the controller can additionally transition the electrochromic window (e.g., window having a single electrochromic device) between tint states including: a bleached state, one or more intermediate tint levels, and a colored state. In some embodiments, the window controller is able to transition the electrochromic window between four or more tint states. In other embodiments, the window controller is able to transition an electrochromic window incorporating an electrochromic device between any number of tint levels between the bleached state and the colored state. Certain electrochromic windows allow intermediate tint levels by using two (or more) electrochromic lites in a single IGU, where each electrochromic lite is a two-state lite.

In some embodiments, an electrochromic window can include an electrochromic device on one lite of and another electrochromic device on another lite of an insulated glass unit (IGU). If the window controller is able to transition each electrochromic device between two states, a bleached state and a colored state, the IGU is able to attain four different states (tint levels), a colored state with both electrochromic devices being colored, a first intermediate state with one electrochromic device being colored, a second intermediate state with the other electrochromic device being colored, and a bleached state with both electrochromic devices being bleached. Embodiments of multi-pane electrochromic windows, such as IGUs, are further described in U.S. Pat. No. 8,270,059, naming Robin Friedman et al. as inventors, titled "MULTI-PANE ELECTROCHROMIC WINDOWS," which is hereby incorporated by reference in its entirety.

In some embodiments, the window controller is able to transition an electrochromic window having an electrochromic device capable of transitioning between two or more tint levels. For example, a window controller may be able to transition the electrochromic window to a bleached state, one or more intermediate levels, and a colored state. In some other embodiments, the window controller is able to transition an electrochromic window incorporating an electrochromic device between any number of tint levels between the bleached state and the colored state. Embodiments of methods and controllers for transitioning an electrochromic window to an intermediate tint level or levels are further described in U.S. Pat. No. 8,254,013, naming Disha Mehtani et al. as inventors, titled "CONTROLLING TRANSITIONS IN OPTICALLY SWITCHABLE DEVICES," and international PCT application PCT/US17/35290, titled "CONTROL METHODS FOR TINTABLE WINDOWS IMPLEMENTING INTERMEDIATE TINT STATES," filed on May 31, 2017, which are hereby incorporated by reference in their entireties.

In some embodiments, a window controller can power one or more electrochromic devices of an electrochromic window. Typically, this function of the window controller is augmented with one or more other functions described in more detail below. Window controllers described herein are not limited to those that have the function of powering an electrochromic device to which it is associated for the purposes of control. That is, the power source for the electrochromic window may be separate from the window controller, where the controller has its own power source and directs application of power from the window power source to the window. However, it is convenient to include a power source with the window controller and to configure the controller to power the window directly, because it obviates the need for separate wiring for powering the electrochromic window.

In some cases, window controllers are standalone controllers which are configured to control the functions of a single window or a plurality of electrochromic windows, without integration of the window controller into a building control network or a building management system (BMS). Window controllers, however, may be integrated into a building control network or a BMS, as described further in this section.

Figure 12:
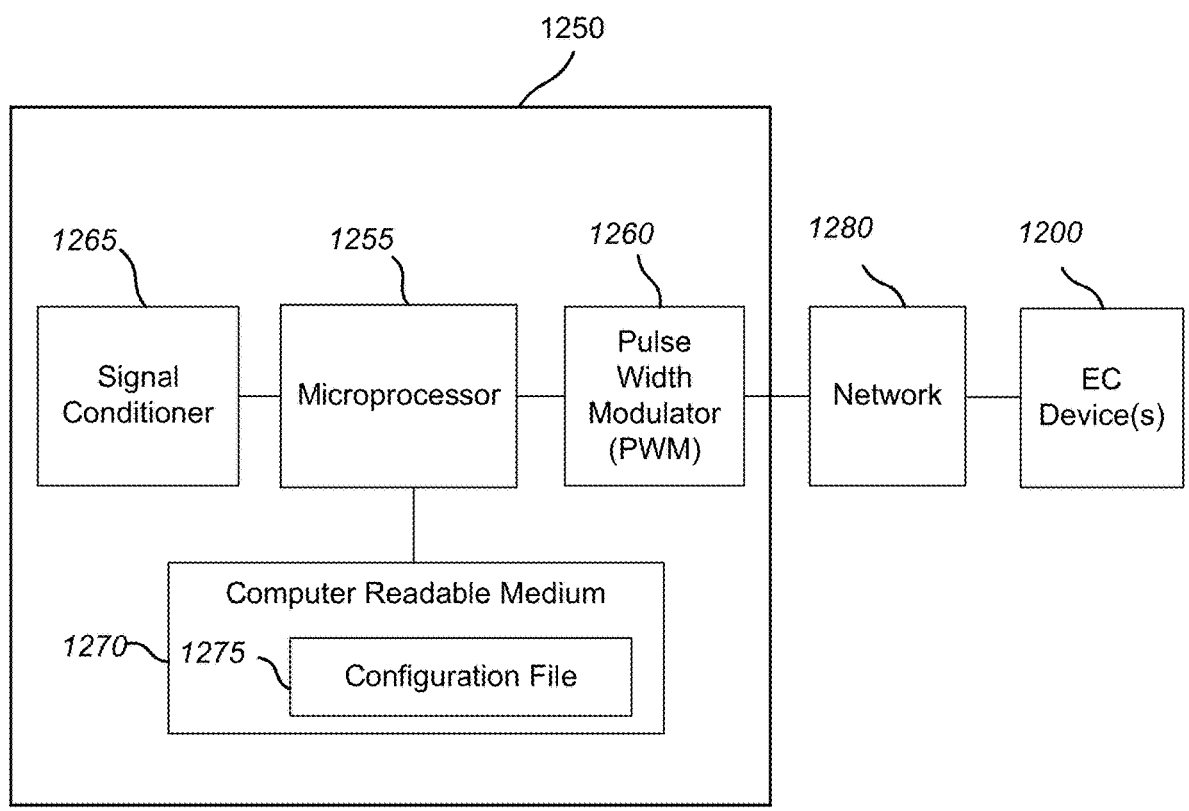
FIG. 12 depicts a simplified block diagram of components of a window controller, according to an embodiment.

FIG. 12 depicts a block diagram of some components of a window controller 1250 and other components of a window controller system of disclosed embodiments. FIG. 12 is a simplified block diagram of a window controller 1250, and more detail regarding window controllers can be found in U.S. patent application Ser. Nos. 13/449,248 and 13/449,251, both naming Stephen Brown as inventor, both titled "CONTROLLER FOR OPTICALLY-SWITCHABLE WINDOWS," and both filed on Apr. 17, 2012, and in U.S. patent application Ser. No. 13/449,235 (issued as U.S. Pat. No. 8,705,162), titled "CONTROLLING TRANSITIONS IN OPTICALLY SWITCHABLE DEVICES," naming Stephen Brown et al. as inventors and filed on Apr. 17, 2012; all of which are hereby incorporated by reference in their entireties.

In FIG. 12, the illustrated components of the window controller 1250 include a microprocessor 1255 or other processor, a pulse width modulator 1260 (PWM), a signal conditioning module 1265, and a computer readable medium (e.g., memory) 1270 having a configuration file 1275. Window controller 1250 is in electronic communication with one or more electrochromic devices 1200 in an electrochromic window through network 1280 (wired or wireless) to send control instructions to the one or more electrochromic devices 1200. In some embodiments, the window controller 1250 may be a local window controller in communication through a network (wired or wireless) to a master window controller.

In some disclosed examples, a building has one or more electrochromic windows between the exterior and interior of the building. One or more sensors (e.g., photosensors, infrared sensors, ambient temperature sensors, etc.) are located to the exterior of the building and/or inside one or more rooms having the electrochromic windows. Output from the one or more sensors can be input (e.g., via a communication network) to the signal conditioning module 1265 of the window controller 1250. In some cases, output from the one or more sensors may be input to a building management system (BMS), as described further in this section. Although the sensors of depicted embodiments are shown as located on the rooftop, sensors may additionally or alternatively, be located in other locations such as outside vertical wall of the building, inside the room, or on other surfaces to the exterior, as well. In certain examples, a multi-sensor is used with two or more sensors that measure the same or nearly the same input (e.g., two infrared sensors directed to the same general region of the sky), which can provide redundancy in case a sensor fails or has an otherwise erroneous reading.

An exterior photosensor to the building, e.g. a photosensor of a multi-sensor device on the rooftop, is able to detect radiant light incident upon the photosensor directly from a light source such as the sun or from light reflected to the sensor from a surface, particles in the atmosphere, clouds, etc. Each exterior photosensor may generate a signal in the form of electrical current that results from the photoelectric effect and the signal is a function of the light incident on the photosensor. In some cases, the photosensor may detects radiant light in terms of irradiance in units of watts/m$^2$ or other similar units. In some cases, the photosensor detects light in the visible range of wavelengths in units of foot candles or similar units. In some cases, there is a linear relationship between these values of irradiance and visible light.

Irradiance values from sunlight during a sunny condition can be predicted based at least in part on the time of day and time of year as the angle at which sunlight strikes the earth changes. An exterior photosensor can detect actual radiant light in real-time, which accounts for reflected and obstructed light due to buildings or other structures, changes in weather (e.g., clouds), etc. For example, on cloudy days, sunlight can be blocked by the clouds and the radiant light detected by an exterior sensor would be lower than on cloudless (sunny) days.

In the morning and evening, sunlight levels are low and the corresponding readings taken by an photosensor are low values that might be considered consistent with readings taken during cloudy conditions during midday. Photosensor readings taken during the morning and evening may falsely indicate a cloudy condition if considered in isolation. In addition, any obstruction from a building or a hill/mountain may result in a false positive indication for a cloudy day based at least in part on photosensor readings alone. Moreover, just before sunrise, using photosensor values alone would result in a false positive for a cloudy condition that might lead to transitioning an electrochromic window to a clear state at sunrise allowing for a glare condition in the room with the cleared window. In certain embodiments, sensor readings from at least two infrared sensors can be used to determine a cloud condition at times just before sunrise, and in the morning and in the evening. The infrared sensors can operate independent of sunlight levels allowing for tinting control logic to determine a cloud condition before sunrise and as the sun is setting to determine and maintain a proper tint state of an electrochromic window during the morning and evening. In addition, the readings from the at least two infrared sensors may be used to detect a cloud condition even when the sensor is shaded or otherwise obstructed from receiving direct sunlight.

In some aspects, a single device (sometimes referred to herein as a "multi-sensor device") includes both an infrared sensor for detecting heat radiation and an onboard ambient temperature sensor. The infrared sensor is typically positioned to be directed to the sky to measure sky temperature ($T_{sky}$). The onboard ambient temperature sensor is generally located to measure ambient temperature ($T_{amb}$) at the device. Additionally or alternatively, the infrared sensor device outputs a temperature reading of the difference between the sky temperature and the ambient temperature, delta (Δ). The infrared sensor device temperature readings ($T_{sky}$, $T_{amb}$, and/or Δ) are typically in degrees, e.g., millidegrees Celsius or millidegrees Fahrenheit.

According to certain aspects, there may be multiple sensors associated with a single electrochromic window of a building or multiple electrochromic windows of a building, for example, a zone of electrochromic windows. For example, multiple sensors may be in the form of a multi-sensor device having at least two infrared sensors, an ambient temperature sensor (e.g., part of an infrared sensor), and a plurality of photosensors. The multi-sensor device may be located, for example, on the roof of the building having the one or more electrochromic windows. In one embodiment, output from redundant sensors is compared to one another to determine, for example, if one of the sensors is shaded by an object, such as by a bird that landed on a multi-sensor device on the rooftop. In some cases, it may be desirable to use relatively few sensors in a building because having many sensors can be expensive and/or some sensors can be unreliable. In certain implementations, a single sensor or a multiple sensors (e.g., 2, 3, 4, 5) may be employed to determine the current level of radiant light from the sunlight impinging on the building or perhaps one side of the building. A cloud may pass in front of the sun or a construction vehicle may park in front of the setting sun. These occurrences will result in deviations from the amount of radiant light from the sun that would be calculated to normally impinge on the building during a clear sky condition.

In examples with photosensors, the photosensor can be, for example, a charge coupled device (CCD), a photodiode, a photoresistor, or a photovoltaic cell. One of ordinary skill in the art would appreciate that future developments in photosensor and other sensor technology would work, as they measure light intensity and provide an electrical output representative of the light level.

In some embodiments, output from sensors may be input to the signal conditioning module 1265. The input may be in the form of a voltage signal to signal conditioning module 1265. Signal conditioning module 1265 passes an output signal to the microprocessor 1255 or other processor. The microprocessor 1255 or other processor determines a tint level of the electrochromic window, based at least in part on information from the configuration file 1275, output from the signal conditioning module 1265, or override values. The microprocessor 1255 then sends instructions to the PWM 1260 to apply a voltage and/or current through a network 1280 to electrochromic device(s) 1200 of one or more electrochromic windows of a building to transition to the one or more electrochromic windows to the desired tint level.

In one aspect, the signal conditioning module 1265 is part of a multi-sensor device (e.g., a rooftop multi-sensor device) that receives output from the one or more sensors of the multi-sensor device. In this case, the signal conditioning module 1265 communicates an output signal through a wired or wireless network to the microprocessor 1255 or other processor of the window controller 1250. The microprocessor 1255 or other processor determines a tint level of the electrochromic window and sends instructions to the PWM 1260 to apply a voltage and/or current through a network 1280 to electrochromic device(s) 1200 of one or more electrochromic windows of a building to transition the one or more electrochromic windows to the desired tint level.

In some embodiments, the microprocessor 1260 can instruct the PWM 1260, to apply a voltage and/or current to an electrochromic window to transition it to any one of four or more different tint levels. In one case, the electrochromic window can be transitioned to at least eight different tint levels described as: 0 (lightest), 5, 10, 15, 20, 25, 30, and 35 (darkest). The tint levels may linearly correspond to visual transmittance values and solar heat gain coefficient (SHGC) values of light transmitted through the electrochromic window. For example, using the above eight tint levels, the lightest tint level of 0 may correspond to an SHGC value of 0.80, the tint level of 5 may correspond to an SHGC value of 0.70, the tint level of 10 may correspond to an SHGC value of 0.60, the tint level of 15 may correspond to an SHGC value of 0.50, the tint level of 20 may correspond to an SHGC value of 0.40, the tint level of 25 may correspond to an SHGC value of 0.30, the tint level of 30 may correspond to an SHGC value of 0.20, and the tint level of 35 (darkest) may correspond to an SHGC value of 0.10.

Window controller 1250 or a master controller in communication with the window controller 1250 may employ any one or more control logic components to determine a desired tint level based at least in part on signals from the sensors and/or other input. The window controller 1250 can instruct the PWM 1260 to apply a voltage and/or current to one or more electrochromic windows to transition them to the desired tint level.

Building Management Systems (BMSs)

The window controllers described herein may be suited for integration with a Building Management System (BMS). A BMS is a computer-based control system installed in a building that monitors and controls the building's mechanical and electrical equipment such as ventilation, lighting, power systems, elevators, fire systems, and security systems. A BMS consists of hardware, including interconnections by communication channels to a computer or computers, and associated software for maintaining conditions in the building according to preferences set by the occupants and/or by the building manager. For example, a BMS may be implemented using a local area network, such as Ethernet. The software can be based at least in part on, for example, internet protocols and/or open standards. One example is software from Tridium, Inc. (of Richmond, Va.). One communications protocol commonly used with a BMS is BACnet (building automation and control networks).

A BMS is most common in a large building, and typically functions at least to control the environment within the building. For example, a BMS may control temperature, carbon dioxide levels, and humidity within a building. Typically, there are many mechanical devices that are controlled by a BMS such as heaters, air conditioners, blowers, vents, and the like. To control the building environment, a BMS may turn on and off these various devices under defined conditions. A core function of a typical modern BMS is to maintain a comfortable environment for the building's occupants while minimizing heating and cooling costs/demand. Thus, a modern BMS is used not only to monitor and control, but also to optimize the synergy between various systems, for example, to conserve energy and lower building operation costs.

In some embodiments, a window controller is integrated with a BMS, where the window controller is configured to control one or more electrochromic windows or other tintable windows. In one embodiment, the one or more electrochromic windows include at least one all solid state and inorganic electrochromic device, but may include more than one electrochromic device, e.g. where each lite or pane of an IGU is tintable. In one embodiment, the one or more electrochromic windows include only all solid state and inorganic electrochromic devices. In one embodiment, the electrochromic windows are multistate electrochromic windows, as described in U.S. patent application Ser. No. 12/851,514 (now U.S. Pat. No. 8,705,162), filed on Aug. 5, 2010, and titled "Multipane Electrochromic Windows," which is hereby incorporated by reference in its entirety.

Figure 13:
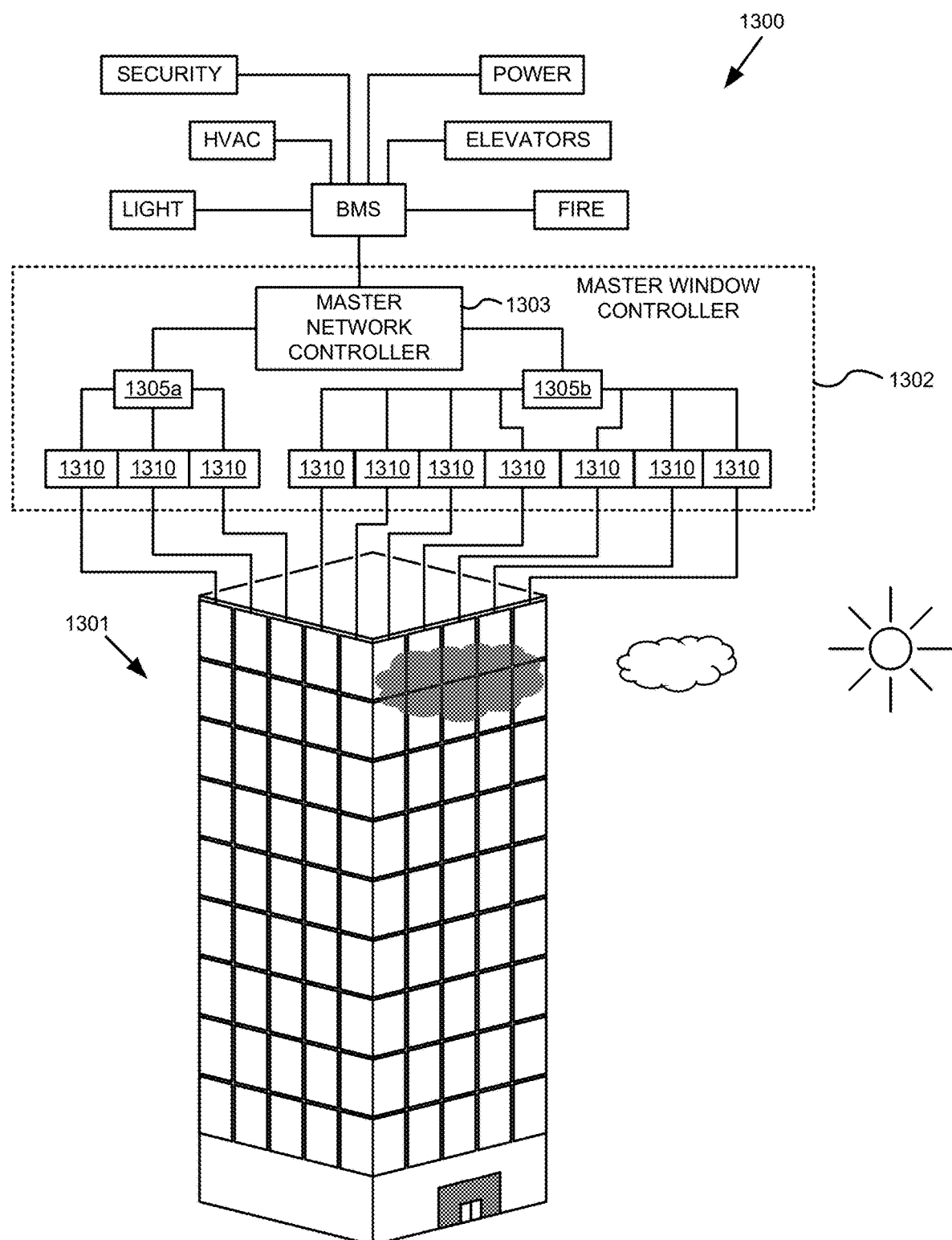
FIG. 13 depicts a schematic diagram of an embodiment of a BMS, according to an embodiment.

FIG. 13 depicts a schematic diagram of an embodiment of a BMS 1300, that manages a number of systems of a building 1301, including security systems, heating/ventilation/air conditioning (HVAC), lighting of the building, power systems, elevators, fire systems, and the like. Security systems may include magnetic card access, turnstiles, solenoid driven door locks, surveillance cameras, burglar alarms, metal detectors, and the like. Fire systems may include fire alarms and fire suppression systems including a water plumbing control. Lighting systems may include interior lighting, exterior lighting, emergency warning lights, emergency exit signs, and emergency floor egress lighting. Power systems may include the main power, backup power generators, and uninterrupted power source (UPS) grids.

Also, BMS 1300 manages a master window controller 1302. In this example, the master window controller 3102 is depicted as a distributed network of window controllers including a master network controller, 1303, intermediate network controllers, 1305a and 1305b, and end or leaf controllers 1310. End or leaf controllers 1310 may be similar to window controller 1250 described with respect to FIG. 12. In one example, the master network controller 1303 may be in close proximity to the BMS 1300, and each floor of building 1301 may have one or more intermediate network controllers 1305a and 1305b, while each window of the building has its own end controller 1310. In this example, each of end or leaf controllers 1310 controls a specific electrochromic window of the building 1301.

Each of the end or leaf controllers 1310 can be in a separate location from the electrochromic window that it controls, or can be integrated into the electrochromic window. For simplicity, only ten electrochromic windows of building 1301 are depicted as controlled by master window controller 1302. In a typical setting there may be a large number of electrochromic windows in a building controlled by master window controller 1302. Master window controller 1302 need not be a distributed network of window controllers. For example, the master window controller 1302 as a single end controller which controls the functions of a single electrochromic window also falls within the scope of the embodiments disclosed herein, as described above.

One aspect of the disclosed embodiments is a BMS that includes a multi-sensor device (e.g., multi-sensor device 401 shown in FIGS. 4A-4C) or other form of infrared cloud detector system. By incorporating feedback from the infrared cloud detector system, a BMS can provide, for example, enhanced: 1) environmental control, 2) energy savings, 3) security, 4) flexibility in control options, 5) improved reliability and usable life of other systems due to less reliance thereon and therefore less maintenance thereof, 6) information availability and diagnostics, and 7) effective use of, and higher productivity from, staff, and various combinations of these, because the electrochromic windows can be automatically controlled. In some embodiments, a BMS may not be present or a BMS may be present but may not communicate with a master network controller or communicate at a high level with a master network controller. In certain embodiments, maintenance on the BMS would not interrupt control of the electrochromic windows.

In some cases, the systems of BMS 1300 may run according to daily, monthly, quarterly, or yearly schedules. For example, the lighting control system, the window control system, the HVAC, and the security system may operate on a 24 hour schedule accounting for when people are in the building during the work day. At night, the building may enter an energy savings mode, and during the day, the systems may operate in a manner that minimizes the energy consumption of the building while providing for occupant comfort. As another example, the systems may shut down or enter an energy savings mode over a holiday period.

The scheduling information may be combined with geographical information. Geographical information may include the latitude and longitude of the building. Geographical information also may include information about the direction that each side of the building faces. Using such information, different rooms on different sides of the building may be controlled in different manners. For example, for east facing rooms of the building in the winter, the window controller may instruct the windows to have no tint in the morning so that the room warms up due to sunlight shining in the room and the lighting control panel may instruct the lights to be dim because of the lighting from the sunlight. The west facing windows may be controllable by the occupants of the room in the morning because the tint of the windows on the west side may have no impact on energy savings. However, the modes of operation of the east facing windows and the west facing windows may switch in the evening (e.g., when the sun is setting, the west facing windows are not tinted to allow sunlight in for both heat and lighting).

Further, the temperature within a building may be influenced by exterior light and/or the exterior temperature. For example, on a cold day and with the building being heated by a heating system, rooms closer to doors and/or windows will lose heat faster than the interior regions of the building and be cooler compared to the interior regions.

In one implementation with exterior sensors, the building may include exterior sensors on the roof of the building. Alternatively, the building may include an exterior sensor associated with each exterior window or an exterior sensor on each side of the building. An exterior sensor on each side of the building could track the irradiance on a side of the building as the sun changes position throughout the day.

An example of a building, for example, like building 1301 in FIG. 13, includes a building network or a BMS, tintable windows for the exterior windows of the building (i.e., windows separating the interior of the building from the exterior of the building), and a number of different sensors. Light from exterior windows of a building generally has an effect on the interior lighting in the building to about 20 feet or about 30 feet from the windows. That is, space in a building that is more than about 20 feet or about 30 feet from an exterior window receives little light from the exterior window. Such spaces away from exterior windows in a building are mainly lit by interior lighting systems of the building.

FIG. 14 is a block diagram of components of a system 1400 for controlling functions (e.g., transitioning to different tint levels) of one or more tintable windows of a building (e.g., building 1301 shown in FIG. 13), according to embodiments. System 1400 may be one of the systems managed by a BMS (e.g., BMS 1300 shown in FIG. 13) or may operate independently of a BMS.

System 1400 includes a master window controller 1402 that can send control signals to the one or more tintable windows to control their functions. System 1400 also includes a network 1410 in electronic communication with master window controller 1402. The control logic, other control logic and instructions for controlling functions of the tintable window(s), and/or sensor data may be communicated to the master window controller 1402 through the network 1410. Network 1410 can be a wired or wireless network (e.g. cloud network). In one embodiment, network 1410 may be in communication with a BMS to allow the BMS to send instructions for controlling the tintable window (s) through network 1410 to the tintable window(s) in a building.

System 1400 also includes EC devices 400 of the one or more tintable windows (not shown) and optional wall switches 1490, which are both in electronic communication with master window controller 1402. In this illustrated example, master window controller 1402 can send control signals to EC device(s) 1401 to control the tint level of the tintable windows having the EC device(s) 400. Each wall switch 1490 is also in communication with EC device(s) 1401 and master window controller 1402. An end user (e.g., occupant of a room having the tintable window) can use the wall switch 1490 to control the tint level and other functions of the tintable window having the EC device(s) 1401.

In FIG. 14, master window controller 1402 is depicted as a distributed network of window controllers including a master network controller 1403, a plurality of intermediate network controllers 1405 in communication with the master network controller 1403, and multiple pluralities of end or leaf window controllers 1410. Each plurality of end or leaf window controllers 1410 is in communication with a single intermediate network controller 1405. Although master window controller 1402 is illustrated as a distributed network of window controllers, master window controller 1402 could also be a single window controller controlling the functions of a single tintable window in other embodiments. The components of the system 1400 in FIG. 14 may be similar in some respects to components described with respect to FIG. 13. For example, master network controller 1403 may be similar to master network controller 1303 and intermediate network controllers 1405 may be similar to intermediate network controllers 1305. Each of the window controllers in the distributed network of FIG. 14 may include a processor (e.g., microprocessor) and a computer readable medium in electrical communication with the processor.

In FIG. 14, each leaf or end window controller 1410 is in communication with EC device(s) 1401 of a single tintable window to control the tint level of that tintable window in the building. In the case of an IGU, the leaf or end window controller 1410 may be in communication with EC devices 1401 on multiple lites of the IGU to control the tint level of the IGU. In other embodiments, each leaf or end window controller 1410 may be in communication with a plurality of tintable windows, for example, of a zone of windows. The leaf or end window controller 1410 may be integrated into the tintable window or may be separate from the tintable window that it controls. Leaf and end window controllers 1410 in FIG. 14 may be similar to the end or leaf controllers 1410 in FIG. 13 and/or may also be similar to window controller 1250 described with respect to FIG. 12.

Each wall switch 1490 can be operated by an end user (e.g., occupant of the room) to control the tint level and other functions of the tintable window in communication with the wall switch 1490. The end user can operate the wall switch 1490 to communicate control signals to the EC devices 400 in the associated tintable window. These signals from the wall switch 1490 may override signals from master window controller 1402 in some cases. In other cases (e.g., high demand cases), control signals from the master window controller 1402 may override the control signals from wall switch 1490. Each wall switch 1490 is also in communication with the leaf or end window controller 1410 to send information about the control signals (e.g. time, date, tint level requested, etc.) sent from wall switch 1490 back to master window controller 1402. In some cases, wall switches 1490 may be manually operated. In other cases, wall switches 1490 may be wirelessly controlled by the end user using a remote device (e.g., cell phone, tablet, etc.) sending wireless communications with the control signals, for example, using infrared (IR), and/or radio frequency (RF) signals. In some cases, wall switches 1490 may include a wireless protocol chip, such as Bluetooth, EnOcean, WiFi, Zigbee, and the like. Although wall switches 1490 depicted in FIG. 14 are located on the wall(s), other embodiments of system 1400 may have switches located elsewhere in the room.

System 1400 also includes a multi-sensor device 1412 in electronic communication with one or more controllers via a communication network 1410 in order to communicate sensor readings and/or filtered sensor values to the controller (s).

iii) Logic for Controlling Electrochromic Devices/Windows

In some implementations, a controller (e.g., local end or leaf window controller, network controller, master controller, etc.) includes intelligence control logic for calculating, determining, selecting or otherwise generating tint states for one or more optically-switchable windows (e.g., electrochromic windows) of a building. This control logic can be used to determine a cloud cover condition based at least in part on sensor data from an infrared cloud detector system at the building and use the determined cloud cover condition to determine tint states for the optically-switchable windows. This control logic can be used to implement methods for determining and controlling desired tint levels for the one more electrochromic windows or other tintable windows to account for occupant comfort, energy conservation, and/ or other considerations. In some cases, the control logic employs one or more logic modules.

Figure 15A:
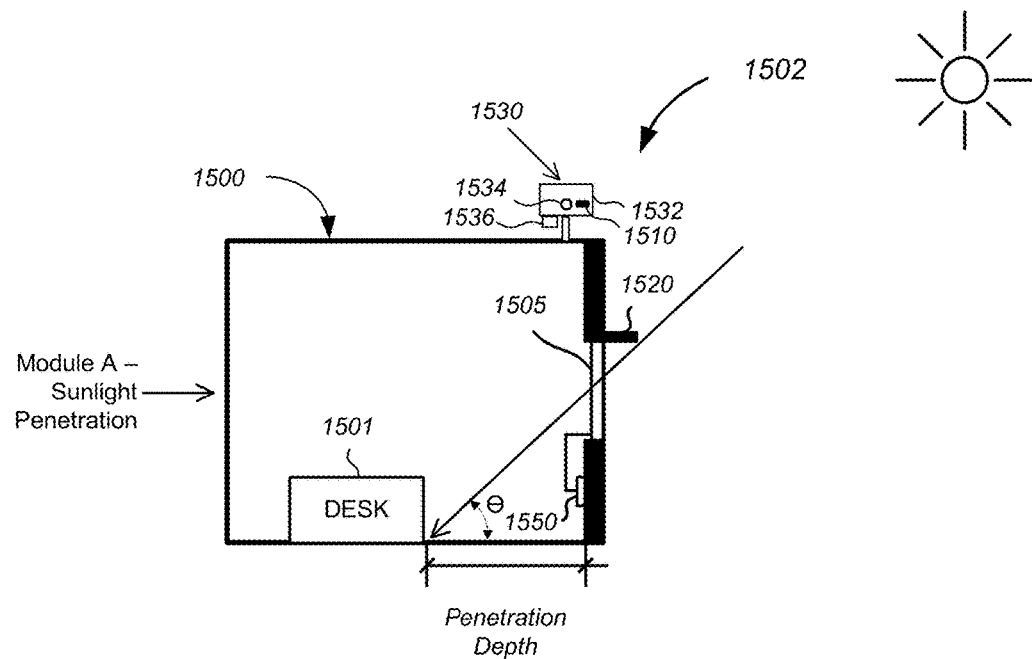
FIG. 15A shows the penetration depth of direct sunlight into a room through an electrochromic window between the exterior and the interior of a building, which includes the room, according to an implementation.
Figure 15B:
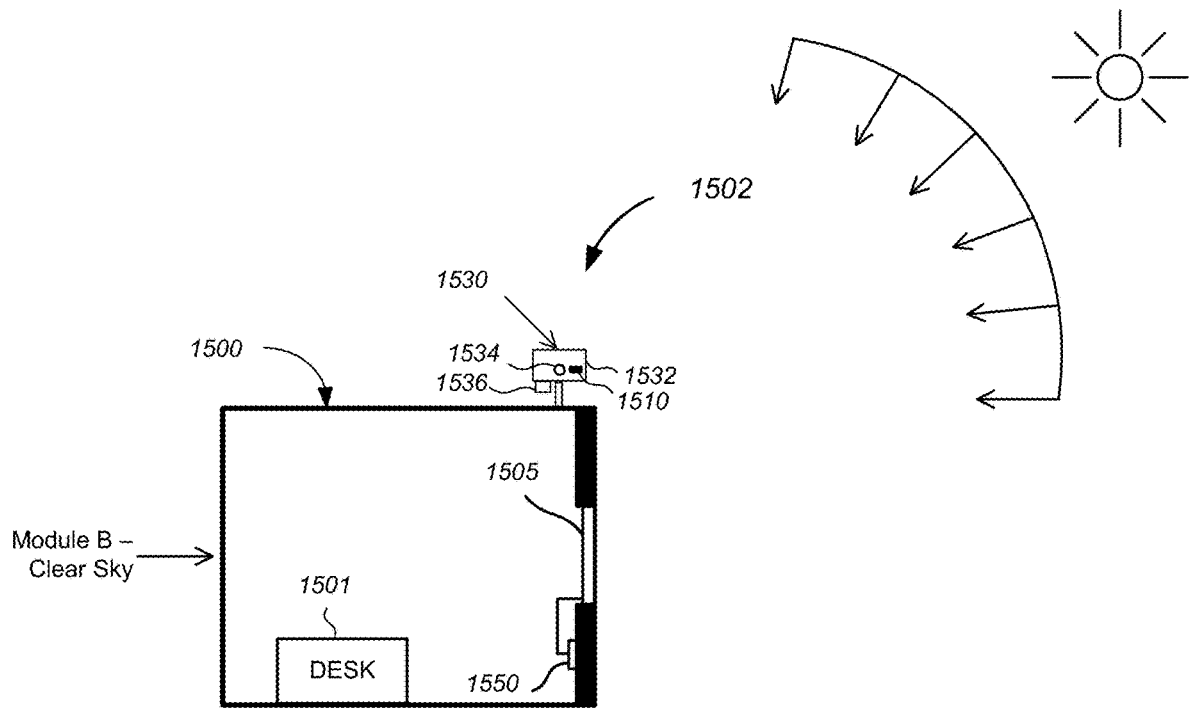
FIG. 15B shows direct sunlight and radiation under clear sky conditions entering the room through the electrochromic window, according to an implementation.
Figure 15C:
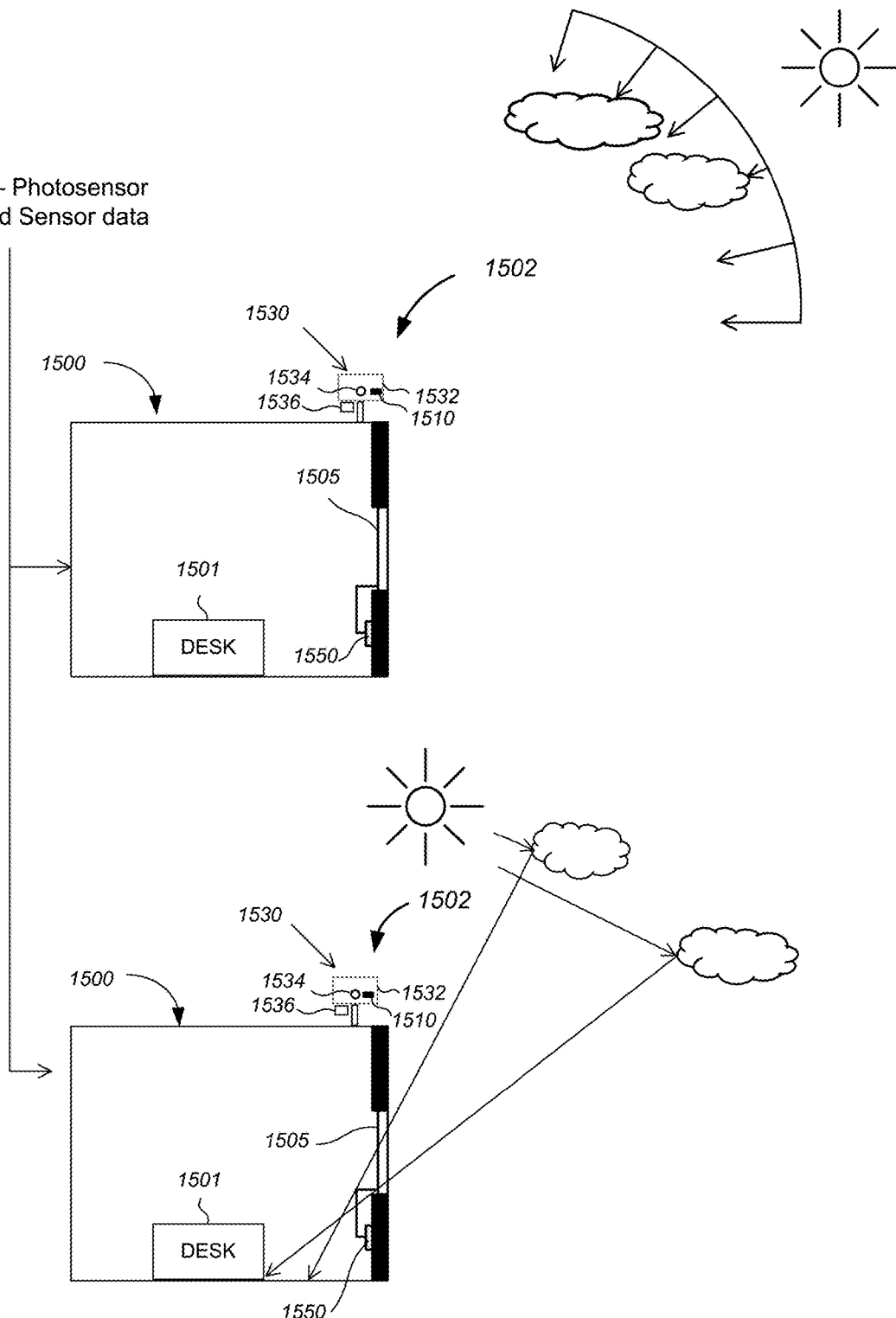
FIG. 15C shows radiant light from the sky as may be obstructed by or reflected from objects such as, for example, clouds and other buildings, according to an implementation.

For example, FIGS. 15A-15C depict general input to each of three logic Modules A, B, and C of an exemplary control logic according to certain implementations. Other examples of Modules A, B, and C are described in International Patent Application PCT/US16/41344, titled "CONTROL METHOD FOR TINTABLE WINDOWS," filed on Jul. 7, 2016, International Patent Application PCT/US15/29675, titled "CONTROL METHOD FOR TINTABLE WINDOWS" and filed on May 5, 2015; each of which is hereby incorporated by reference in its entirety. Other examples of logic modules are described in International Patent Application PCT/US17 PCT/US17/66198, titled "CONTROL METHOD FOR TINTABLE WINDOWS," filed on Dec. 13, 2017, which is hereby incorporated by reference in its entirety. Another example of exemplary control logic including four (4) logic modules is described later in this section.

Example of Modules A, B, and C

FIGS. 15A-15C include diagrams depicting some general input to each of three logic Modules A, B, and C of an exemplary control logic of disclosed implementations. Each diagram depicts a schematic side view of a room 1500 of a building having a desk 1501 and an electrochromic window 1505 located between the exterior and the interior of the building. The diagram also depicts an infrared cloud detector system 1502 in accordance with one example. In other implementations, another example of an infrared cloud detector system described herein can be used. In the illustrated example, the infrared cloud detector system 1502 includes an infrared cloud detector 1530 located on the roof of the building. The infrared cloud detector 1530 has a housing 1532 with a cover made of light-diffusing material, an infrared sensor 1534 and a photosensor 1510 within the enclosure of the housing 1532, and an ambient temperature sensor 1536 located on a shaded surface of the housing 1532. The infrared sensor 1534 is configured to take temperature readings, $T_{IR}$, based at least in part on infrared radiation received from the region of sky within its field-of-view. The ambient temperature sensor 1536 is configured to take ambient temperature readings, $T_{amb}$, of the ambient air surrounding the infrared cloud detector 1530. In one aspect, the infrared sensor and the ambient temperature sensor are integrated into the same sensor. The infrared sensor 1534 includes an imaginary axis (not shown) that is perpendicular to the sensing surface of the infrared sensor 1534 and passes through its center. The infrared sensor 1534 is directed so that its sensing surface faces upward and can receive infrared radiation from a region of the sky within its field-of-view. The ambient temperature sensor 1536 is located on a shaded surface to avoid direct sunlight from impinging its sensing surface. Although not shown, the infrared cloud detector 1530 also includes one or more structures that hold its components within the housing 1532.

The infrared cloud detector system 1502 also includes a local window controller 1550 with a processor (not shown) that can execute instructions stored in memory (not shown) for implementing the control logic to control the tint level of the electrochromic window 1505. The local window controller 1550 is in communication with the electrochromic window 1505 to send control signals. The local window controller 1550 is also in communication with (wirelessly or wired) the infrared sensor 1534 and the ambient temperature sensor 1536 to receive signals with temperature readings. The local window controller 1550 is also in communication with (wirelessly or wired) the photosensor 1510 to receive signals with visible light intensity readings.

According to certain aspects, power/communication lines extend from the building or another structure to the infrared cloud detector 1530. In one implementation, the infrared cloud detector 1530 includes a network interface that can couple the infrared cloud detector 1530 to a suitable cable. The infrared cloud detector 1530 can communicate data through the network interface to the local window controller 1550 or another controller (e.g., network controller and/or master controller) of the building. In some other implementations, the infrared cloud detector 1530 can additionally or alternatively include a wireless network interface enabling wireless communication with one or more external controllers. In some aspects, the infrared cloud detector 1530 can also include a battery within or coupled with its housing to power the sensors and electrical components within. The battery can provide such power in lieu of or in addition to the power from a power supply (for example, from a building power supply). In one aspect, the infrared cloud detector 1530 further includes at least one photovoltaic cell, for example, on an outer surface of the housing. This at least one photovoltaic cell can provide power in lieu of or in addition to the power provided by any other power supply.

FIG. 15A shows the penetration depth of direct sunlight into a room 1500 through an electrochromic window 1505 between the exterior and the interior of a building, which includes the room 1500. Penetration depth is a measure of how far direct sunlight will penetrate into the room 1500. As shown, penetration depth is measured in a horizontal direction away from the sill (bottom) of window 1505. Generally, the window defines an aperture that provides an acceptance angle for direct sunlight. The penetration depth is calculated based upon the geometry of the window (e.g., window dimensions), its position and orientation in the room, any fins or other exterior shading outside of the window, and the position of the sun (e.g. angle of direct sunlight for a particular time of day and date). Exterior shading to an electrochromic window 1505 may be due to any type of structure that can shade the window such as an overhang, a fin, etc. In FIG. 15A, there is an overhang 1520 above the electrochromic window 1505 that blocks a portion of the direct sunlight entering the room 1500 thus shortening the penetration depth.

Module A can be used to determine a tint level that considers occupant comfort from direct sunlight through the electrochromic window 1505 onto an occupant or their activity area (also referred to herein as a "glare condition"). The tint level is determined based at least in part on a calculated penetration depth of direct sunlight into the room and the space type (e.g., desk near window, lobby, etc.) in the room at a particular instant in time (time of day and day of year). In some cases, the tint level determination may also be based at least in part on providing sufficient natural lighting into the room. In some cases, the penetration depth is calculated at a time in the future to account for glass transition time (the time required for the window to tint, e.g. to 80%, 90% or 100% of the desired tint level). The issue addressed in Module A is that direct sunlight may penetrate so deeply into the room 1500 as to shine directly on an occupant working at a desk or other work surface in a room. Publicly-available programs can be used to calculate the sun's position and allow for calculation of penetration depth.

FIGS. 15A-15C also show a desk 1501 in the room 1500 as an example of a space type of a single occupancy office with a desk associated with an activity area (i.e. desk) and location of the activity area (i.e. location of desk). Each space type is associated with different tint levels for occupant comfort. For example, if the activity is a critical activity such as work in an office being done at a desk or computer, and the desk is located near the window, the desired tint level may be higher than if the desk were further away from the window. As another example, if the activity is non-critical, such as the activity in a lobby, the desired tint level may be lower than for the same space having a desk in an office.

FIG. 15B shows direct sunlight and radiation under clear sky conditions entering the room 1500 through the electrochromic window 1505, according to an implementation. The radiation may be from sunlight scattered by molecules and particles in the atmosphere. Module B determines a tint level based at least in part on calculated values of irradiance under clear sky conditions flowing through the electrochromic window 1505 under consideration. Various software, such as open source RADIANCE program, can be used to calculate clear sky irradiance at a certain latitude, longitude, time of year, and time of day, and for a given window orientation.

FIG. 15C shows radiant light from the sky as may be obstructed by or reflected from objects such as, for example, clouds and other buildings, according to an implementation. These obstructions and reflections are not accounted for in the clear sky radiation calculations. The radiant light from the sky is determined based at least in part on sensor data from sensors such as, for example, the infrared sensor 1534, the photosensor 1510, and the ambient temperature sensor 1536 of the infrared cloud detector system. The tint level determined by Module C is based at least in part on the sensor data. In many cases, the tint level is based at least in part on a cloud cover condition determined using readings from the sensors. Generally, the operations of Module B will determine a tint level that darkens (or does not change) the tint level determined by Module A and the operations of Module C will determine a tint level that lightens (or does not change) the tint level determined by Module B.

The control logic may implement one or more of the logic Modules A, B and C separately for each electrochromic window 1505 in the building or for a representative window of a zone of electrochromic windows. Each electrochromic window 1505 can have a unique set of dimensions, orientation (e.g., vertical, horizontal, tilted at an angle), position, associated space type, etc. A configuration file with this information and other information can be maintained for each electrochromic window 1505. The configuration file may be stored in a computer readable medium of the local window controller 1550 of the electrochromic window 1505 or in the building management system ("BMS") described later in this disclosure. The configuration file can include information such as a window configuration, an occupancy lookup table, information about an associated datum glass, and/or other data used by the control logic. The window configuration may include information such as the dimensions of the electrochromic window 1505, the orientation of the electrochromic window 1505, the position of the electrochromic window 1505, etc. The occupancy lookup table describes tint levels that provide occupant comfort for certain space types and penetration depths. That is, the tint levels in the occupancy lookup table are designed to provide comfort to occupant(s) that may be in the room 1500 from direct sunlight on the occupant(s) or their workspace. The space type is a measure to determine how much tinting will be required to address occupant comfort concerns for a given penetration depth and/or provide comfortable natural lighting in the room. The space type parameter may take into consideration many factors. Among these factors is the type of work or other activity being conducted in a particular room and the location of the activity. Close work associated with detailed study requiring great attention might be at one space type, while a lounge or a conference room might have a different space type. Additionally, the position of the desk or other work surface in the room with respect to the window is a consideration in defining the space type. For example, the space type may be associated with an office of a single occupant having a desk or other workspace located near the electrochromic window 1505. As another example, the space type may be a lobby.

In certain embodiments, one or more modules of the control logic can determine desired tint levels while accounting for energy conservation in addition to occupant comfort. These modules may determine energy savings associated with a particular tint level by comparing the performance of the electrochromic window 1505 at that tint level to a datum glass or other standard reference window. The purpose of using this reference window can be to ensure that the control logic conforms to requirements of the municipal building code or other requirements for reference windows used in the locale of the building. Often municipalities define reference windows using conventional low emissivity glass to control the amount of air conditioning load in the building. As an example of how the reference window 1505 fits into the control logic, the logic may be designed so that the irradiance coming through a given electrochromic window 1505 is never greater than the maximum irradiance coming through a reference window as specified by the respective municipality. In disclosed embodiments, control logic may use the solar heat gain coefficient (SHGC) value of the electrochromic window 1505 at a particular tint level and the SHGC of the reference window to determine the energy savings of using the tint level. Generally, the value of the SHGC is the fraction of incident light of all wavelengths transmitted through the window. Although a datum glass is described in many embodiments, other standard reference windows can be used. Generally the SHGC of the reference window (e.g., datum glass) is a variable that can be different for different geographical locations and window orientations, and is based at least in part on code requirements specified by the respective municipality.

Generally, buildings are designed to have a heating, ventilation, and air conditioning ("HVAC") system with the capacity to fulfill the maximum expected heating and/or air-conditioning loads required at any given instance. The calculation of required capacity may take into consideration the datum glass or reference window required in a building at the particular location where the building is being constructed. Therefore, it is important that the control logic meet or exceed the functional requirements of the datum glass in order to allow building designers to confidently determine how much HVAC capacity to put into a particular building. Since the control logic can be used to tint the window to provide additional energy savings over the datum glass, the control logic could be useful in allowing building designers to have a lower HVAC capacity than would have been required using the datum glass specified by the codes and standards.

Particular embodiments described herein assume that energy conservation is achieved by reducing air conditioning load in a building. Therefore, many of the implementations attempt to achieve the maximum tinting possible, while accounting for occupant comfort level and perhaps lighting load in a room having with the window under consideration. However, in some climates, such as those at far northern and for southern latitudes, heating may be more of a concern than air conditioning. Therefore, the control logic can be modified, specifically, road reversed in some matters, so that less tinting occurs in order to ensure that the heating load of the building is reduced.

Examples of Control Logic Including Modules A, B, and C

Figure 16:
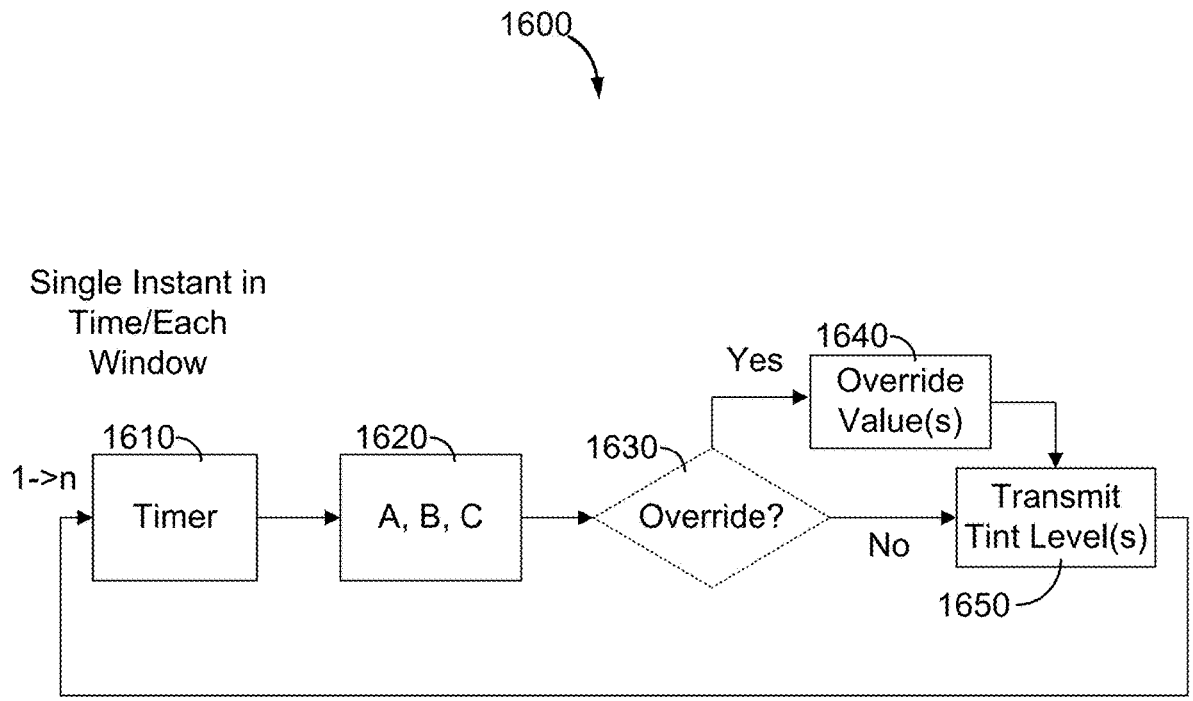
FIG. 16 depicts a flowchart showing general control logic for a method of controlling one or more electrochromic windows in a building, according to embodiments.

FIG. 16 depicts a flowchart 1600 showing general control logic for a method of controlling one or more electrochromic windows (e.g., electrochromic window 1505 in FIGS. 15A-C) in a building, according to embodiments. The control logic uses one or more of Modules A, B, and C to calculate tint levels for the window(s) and sends instructions to transition the window(s) to the tint levels. The calculations in the control logic are run 1 to n times at intervals timed by the timer at operation 1610. For example, the tint level can be recalculated 1 to n times by one or more of the Modules A, B, and C and calculated for instances in time $t_i = t_1, t_2 \ldots t_n$. n is the number of recalculations performed and n can be at least 1. The logic calculations can be done at constant time intervals in some cases. In one cases, the logic calculations may be done every 2 to 5 minutes. However, tint transition for large pieces of electrochromic glass (e.g. up to 6 feet×10 feet) can take up to 30 minutes or more. For these large windows, calculations may be done on a less frequent basis such as every 30 minutes.

At operation 1620, logic Modules A, B, and C perform calculations to determine a tint level for each electrochromic window at a single instant in time $t_i$. These calculations can be performed by a processor of a controller. In certain embodiments, the control logic is predictive logic that calculates how the window should transition in advance of the actual transition. In these cases, the calculations in Modules A, B, and C are made based at least in part on a future time (e.g., $t_i$=present time+time duration such as transition time for the electrochromic window), for example, around or after transition is complete. For example, the future time used in the calculations may be a time in the future that is sufficient to allow the transition to be completed after receiving the tint instructions. In these cases, the controller can send tint instructions in the present time in advance of the actual transition. By the completion of the transition, the window will have transitioned to a tint level that is desired for that future time.

At operation 1630, the control logic allows for certain types of overrides that disengage the algorithm at Modules A, B, and C and define override tint levels at operation 1640 based at least in part on some other consideration. One type of override is a manual override. This is an override implemented by an end user who is occupying a room and determines that a particular tint level (override value) is desirable. There may be situations where the user's manual override is itself overridden. An example of an override is a high demand (or peak load) override, which is associated with a requirement of a utility that energy consumption in the building be reduced. For example, on particularly hot days in large metropolitan areas, it may be necessary to reduce energy consumption throughout the municipality in order to not overly tax the municipality's energy generation and delivery systems. In such cases, the building may override the tint level from the control logic described herein to ensure that all windows have a particularly high level of tinting. Another example of an override may be if there is no occupant in the room example weekends in a commercial office building. In these cases, the building may disengage one or more Modules that relate to occupant comfort and all the windows may have a low level of tinting in cold weather and high level of tinting in warm weather.

At operation 1650, the control signals for implementing the tint levels are transmitted over a network to the power supply in electrical communication with the electrochromic device(s) in one or more electrochromic windows in the building. In certain embodiments, the transmission of tint levels to all windows of a building may be implemented with efficiency in mind. For example, if the recalculation of a tint level suggests that no change in tint from the current tint level is required, then there is no transmission of instructions with an updated tint level. As another example, the building may be divided into zones based at least in part on window size and/or location in the building. In one case, control logic recalculates tint levels for zones with smaller windows more frequently than for zones with larger windows.

In some embodiments, the control logic in FIG. 16 for implementing the control method(s) for multiple electrochromic windows in an entire building can be on a single device, for example, a single master window controller. This device can perform the calculations for each and every tintable window in the building and also provide an interface for transmitting tint levels to one or more electrochromic devices in individual electrochromic windows, for example, in multi-zone windows or on multiple EC lites of an insulated glass unit. Some examples of multi-zone windows can be found in international PCT application No. PCT/US14/71314, filed on Dec. 14, 2014 and titled "MULTI-ZONE EC WINDOWS," which is hereby incorporated by reference in its entirety.

Also, there may be certain adaptive components of the control logic of embodiments. For example, the control logic may determine how an end user (e.g. occupant) tries to override the algorithm at particular times of day and makes use of this information in a more predictive manner to determine desired tint levels. In one case, the end user may be using a wall switch to override the tint level provided by the control logic at a certain time each day to an override value. The control logic may receive information about these instances and change the control logic to change the tint level to the override value at that time of day.

Figure 17:
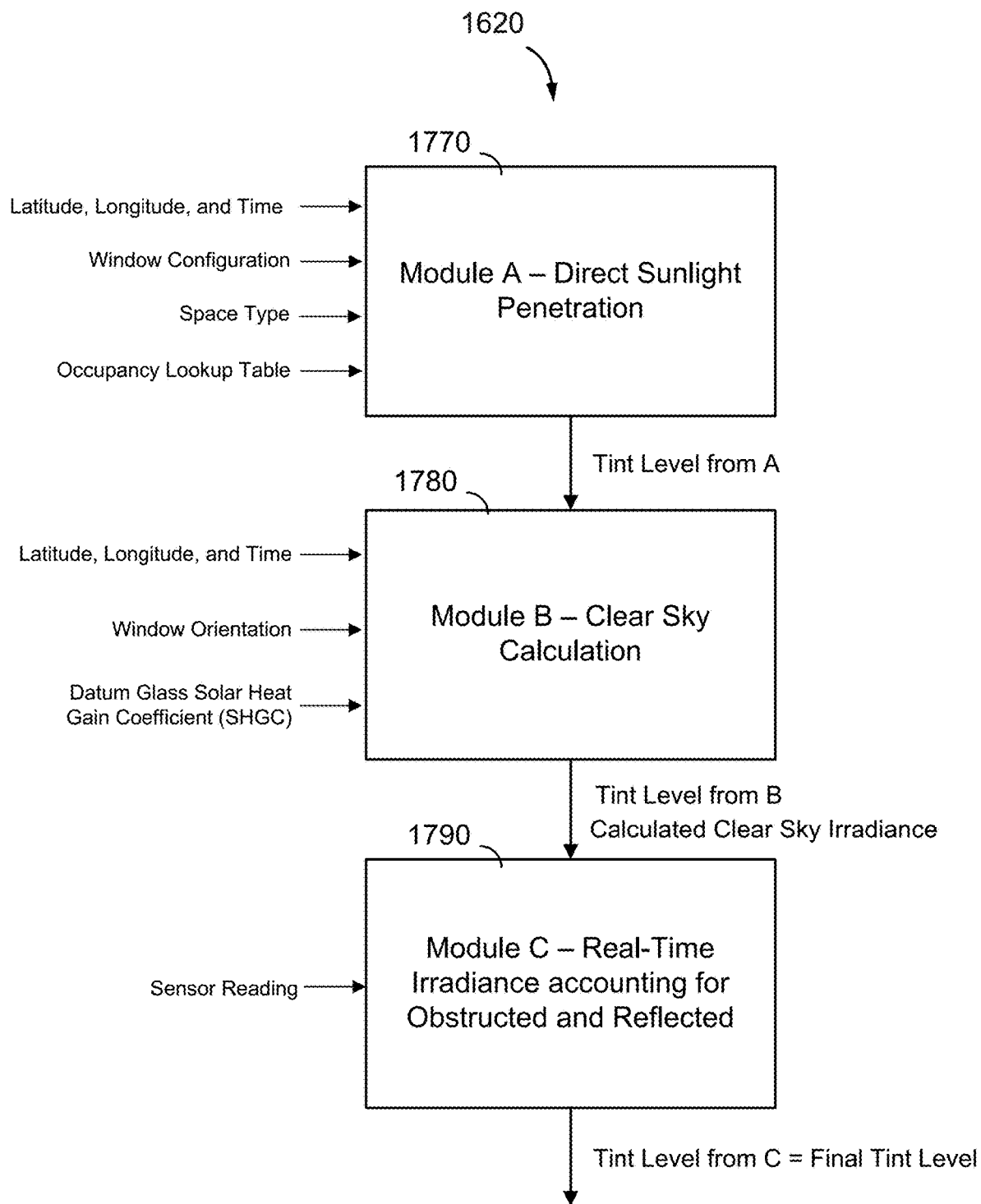
FIG. 17 is a diagram showing a particular implementation of one of the blocks from FIG. 16, according to an implementation.

FIG. 17 is a diagram showing a particular implementation of block 1620 from FIG. 16. This diagram shows a method of performing all three Modules A, B, and C in sequence to calculate a final tint level of a particular electrochromic window at a single instant in time $t_i$. In the case of predictive logic, the Modules A, B, and C are performed based at least in part on determining a final tint level for a time in the future. The final tint level may be the maximum permissible transmissivity of the window under consideration. FIG. 17 also shows some exemplary inputs and outputs of Modules A, B, and C. The calculations in Modules A, B, and C are performed by the processor of a local window controller, a network controller, or a master controller. Although certain examples describe all three Modules A, B, and C being used, other implementations may use one or more of the Modules A, B, and C or may use additional/different modules.

At operation 1770, the processor uses Module A to determine a tint level for occupant comfort to prevent direct glare from sunlight penetrating into the room. The processor uses Module A to calculate the penetration depth of direct sunlight into the room based at least in part on the sun's position in the sky and the window configuration from the configuration file. The position of the sun is calculated based at least in part on the latitude and longitude of the building and the time of day and date. The occupancy lookup table and space type are input from a configuration file for the particular window. Module A outputs the Tint level from A to Module B. The goal of Module A is generally to ensure that direct sunlight or glare does not strike the occupant or his or her workspace. The tint level from Module A is determined to accomplish this purpose. Subsequent calculations of tint level in Modules B and C can reduce energy consumption and may require even greater tint. However, if subsequent calculations of tint level based at least in part on energy consumption suggest less tinting than required to avoid interfering with the occupant, the logic prevents the calculated greater level of transmissivity from being executed to assure occupant comfort.

At operation 1780, the tint level calculated in Module A is input into Module B. Generally Module B determines a tint level that darkens (or does not change) the tint level calculated in Module B. A tint level is calculated based at least in part on calculations of irradiance under clear sky conditions (clear sky irradiance). The processor of the controller uses Module B to calculate clear sky irradiance for the electrochromic window based at least in part on window orientation from the configuration file and based at least in part on latitude and longitude of the building. These calculations are based at least in part on a time of day and date. Publicly available software such as the RADIANCE program, which is an open-source program, can provide the calculations for calculating clear sky irradiance. The SHGC of the datum glass is also input into Module B from the configuration file. The processor uses Module B to determine a tint level that is darker than the tint level in A and transmits less heat than the datum glass is calculated to transmit under maximum clear sky irradiance. Maximum clear sky irradiance is the highest level of irradiance for all times calculated for clear sky conditions.

At operation 1790, a tint level from Module B and the calculated clear sky irradiance are input to Module C. Sensor readings are input to Module C based at least in part on measurements taken by the infrared sensor(s), the ambient temperature sensor(s), and the photosensor(s). The processor uses Module C to determine the cloud cover condition based at least in part on the sensor readings and the actual irradiance. The processor also uses Module C to calculate irradiance transmitted into the room if the window were tinted to the Tint level from Module B under clear sky conditions. The processor uses Module C to find the appropriate tint level if the actual irradiance through the window with this tint level is less than or equal to the irradiance through the window with the Tint level from Module B based at least in part on the determined cloud cover condition from the sensor readings. Generally the operations of Module C will determine a tint level that lightens (or does not change) the tint level determined by the operations of Module B. The tint level determined in Module C is the final tint level in this example.

Much of the information input to the control logic is determined from fixed information about the latitude and longitude, time of day and date. This information describes where the sun is with respect to the building, and more particularly with respect to the window for which the control logic is being implemented. The position of the sun with respect to the window provides information such as the penetration depth of direct sunlight into the room assisted with the window. It also provides an indication of the maximum irradiance or solar radiant energy flux coming through the window. This calculated level of irradiance can be based at least in part on sensor input which might indicated that there is a reduction based at least in part on the determined cloud cover condition or another obstruction between the window and the sun.

A program such as the open source program Radiance, is used to determine clear sky irradiance based at least in part on window orientation and latitude and longitude coordinates of the building for both a single instant in time $t_i$ and a maximum value for all times. The datum glass SHGC and calculated maximum clear sky irradiance are input into Module B. Module B increases the tint level calculated in Module A in steps and picks a tint level where the Inside radiation is less than or equal to the Datum Inside Irradiance where: Inside Irradiance=Tint level SHGC×Clear Sky Irradiance and Datum Inside Irradiance=Datum SHGC×Maximum Clear Sky Irradiance. However, when Module A calculates the maximum tint of the glass, module B doesn't change the tint to make it lighter. The tint level calculated in Module B is then input into Module C. The calculated clear sky irradiance is also input into Module C.

Figure 18:
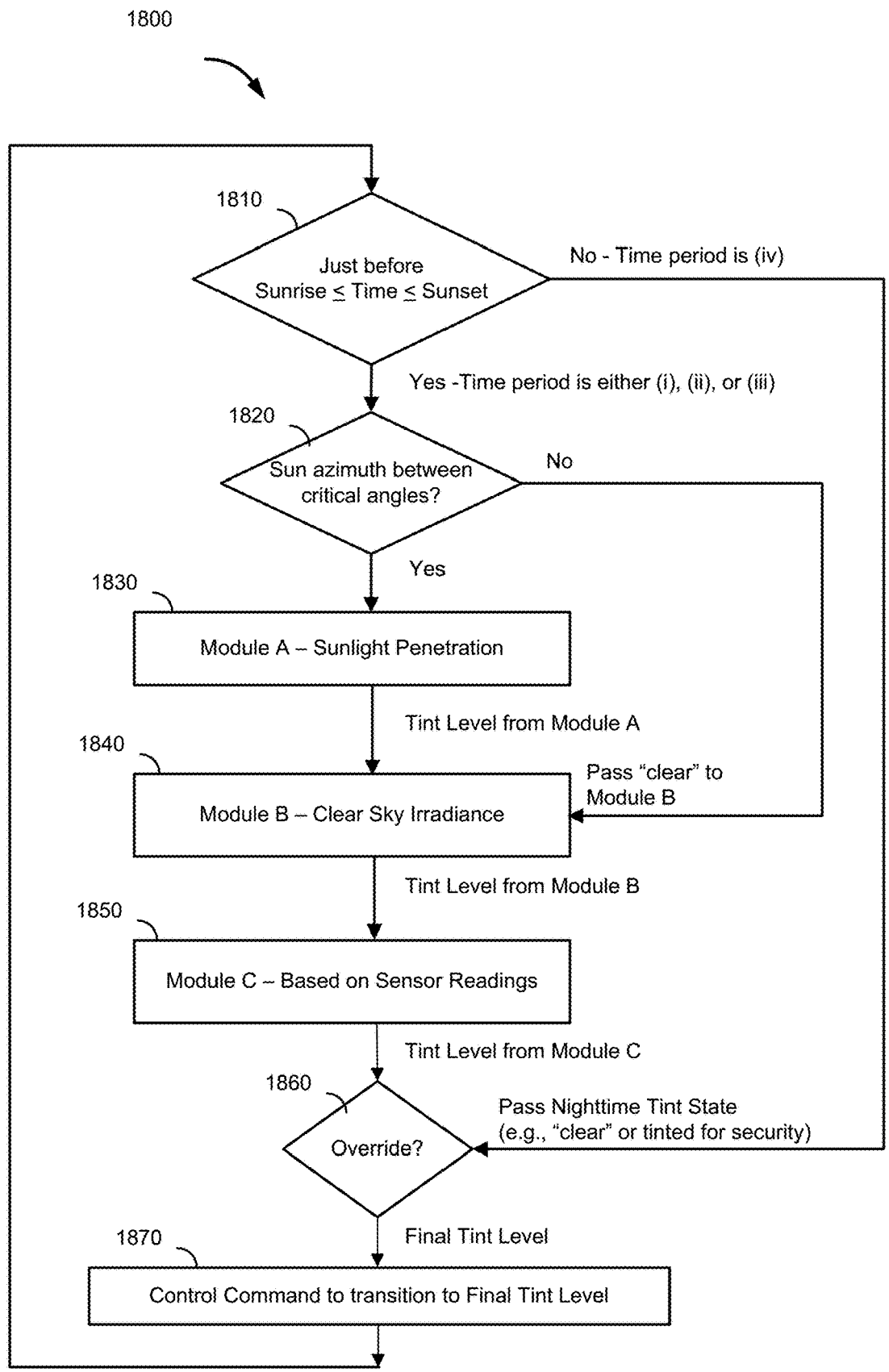
FIG. 18 depicts a flowchart showing a particular implementation of the control logic of operations shown in FIG. 16, according to embodiments.

Example of Control Logic for Making Tinting Decisions Using an Infrared Cloud Detector System with a Photosensor FIG. 18 is a flowchart 1800 depicting a particular implementation of the control logic of operations shown in FIG. 16, according to an implementation. Although this control logic is described with respect to a single window, it would be understood that control logic can be used to control multiple windows or a zone of one or more windows.

At operation 1810, the control logic determines whether the time of day is during one of the following time periods: (i) a time period starting at a first time shortly before sunrise (e.g., starting at a first time of 45 minutes before sunrise, 30 minutes before sunrise, 20 minutes before sunrise, or other suitable amount of time before sunrise) and ending at a second time shortly after sunrise (e.g., ending at a second time of 45 minutes after sunrise, 30 minutes after sunrise, 20 minutes after sunrise, or other suitable amount of time after sunrise); (ii) a time period starting at a third time before sunset and ending at sunset; (iii) a time period starting after the second time after sunrise and ending at the third time before or at sunset (dusk) (e.g., ending at a third time of 45 minutes before sunset, 30 minutes before sunset, 20 minutes before sunset, 0 minutes before sunset i.e. at sunset, or other suitable amount of time before sunset); and (iv) a time period starting at the third time and ending at the first time before sunrise. In one case, the time of sunrise can be determined from measurements taken by the visible wavelength photosensor. For example, the second time may be at the point where a visible light wavelength photosensor begins to measure direct sunlight i.e. an intensity reading of the visible light photosensor is at or above a minimum intensity value. In addition or alternatively, the third time may be determined to end at the point where the intensity reading from a visible light wavelength photosensor is at or below a minimum intensity value. In another example, the time of sunrise and/or the time of sunset may be calculated using a solar calculator and the day of the year and the time periods (i)-(iv) can be calculated by a defined period of time (e.g., 45 minutes) before and after the calculated times of sunrise/sunset.

If it is determined that the time of day is not during one of the time periods (i), (ii), or (iii) at operation 1810, then the control logic determines that the time of day is in the time period (iv) after time period (iii) and before time period (i) i.e. at nighttime. In this case, the control logic passes a nighttime tint state (e.g., "clear" tint state or a dark tint state for security) and proceeds to operation 1870 to determine whether there is an override, for example, an override command received in a signal from an operator or occupant. If it is determined that there is an override at operation 1860, the override value is the final tint level. If it is determined that there is no override in place, the nighttime tint level is the final tint level. At operation 1870, a control command is sent to over a network or directly to electrochromic device (s) of the window to transition the window to the final tint level, the time of day is updated, and the method returns to operation 1810. If, instead, it is determined at operation 1810 that the time of day is during one of the time periods (i), (ii), or (iii), then the time of day is between just before sunrise and just before or at sunset and the control logic goes on to determine whether the sun azimuth is between critical angles of the tintable window at operation 1820.

If it is determined by the control logic at operation 1820 that the sun azimuth is outside the critical angles, then Module A is bypassed, and a "clear" tint level is passed to Module B, and Module B is used to make calculations at operation 1840. If it is determined at operation 1820 that the sun azimuth is between the critical angles, the control logic in Module A is used to calculate penetration depth and an appropriate tint level based at least in part on penetration depth at operation 1830. The tint level determined from Module A is then input to Module B and Module B is used to make calculations at operation 1840.

At operation 1840, the control logic from Module B determines a tint level that darkens (or does not change) the tint level received from Module A or the "clear" tint leve from operation 1820. The tint level in Module B is calculated based at least in part on calculations of irradiance under clear sky conditions (clear sky irradiance). Module B is used to calculate clear sky irradiance for the window based at least in part on window orientation from the configuration file and based at least in part on latitude and longitude of the building. These calculations are also based at least in part on a time of day and a day of the year (date). Publicly available software such as the RADIANCE program, which is an open-source program, can provide calculations for determining clear sky irradiance. The SHGC of the datum glass is also input into Module B from the configuration file. The processor uses the control logic of Module B to determine a tint level that is darker (or the same) as than the tint level it receives from Module A and that transmits less heat than the datum glass is calculated to transmit under maximum clear sky irradiance. Maximum clear sky irradiance is the highest level of irradiance for all times calculated for clear sky conditions.

At operation 1850, a tint level from Module B, the calculated clear sky irradiance and sensor readings from an infrared sensor(s), an ambient temperature sensor(s), and a photosensor(s) are input to Module C. The control logic of Module C determines the cloud cover condition based at least in part on the sensor readings and determines the actual irradiance based at least in part on the cloud cover condition. The control logic of Module C also calculates an irradiance level that would be transmitted into the room if the window were tinted to the Tint level from Module B under clear sky conditions. The control logic in Module C decreases the tint level if the determined actual irradiance through the window based at least in part on the cloud cover condition is less than or equal to the calculated irradiance through the window when tinted to the tint level from Module B. Generally the operations of Module C will determine a tint level that lightens (or does not change) the tint level determined by the operations of Module B.

At operation 1850, the control logic determines a tint level from Module C based at least in part on sensor readings and then proceeds to operation 1860 to determine whether there is an override in place, for example, an override command received in a signal from an operator. If it is determined that there is an override at operation 1860, the override value is the final tint level. If it is determined that there is no override in place, the tint level from Module C is the final tint level. At operation 1870, a control command is sent to over a network or directed to electrochromic device(s) of the window to transition the window to the final tint level, the time of day is updated, and the method returns to operation 1810.

Figure 19:
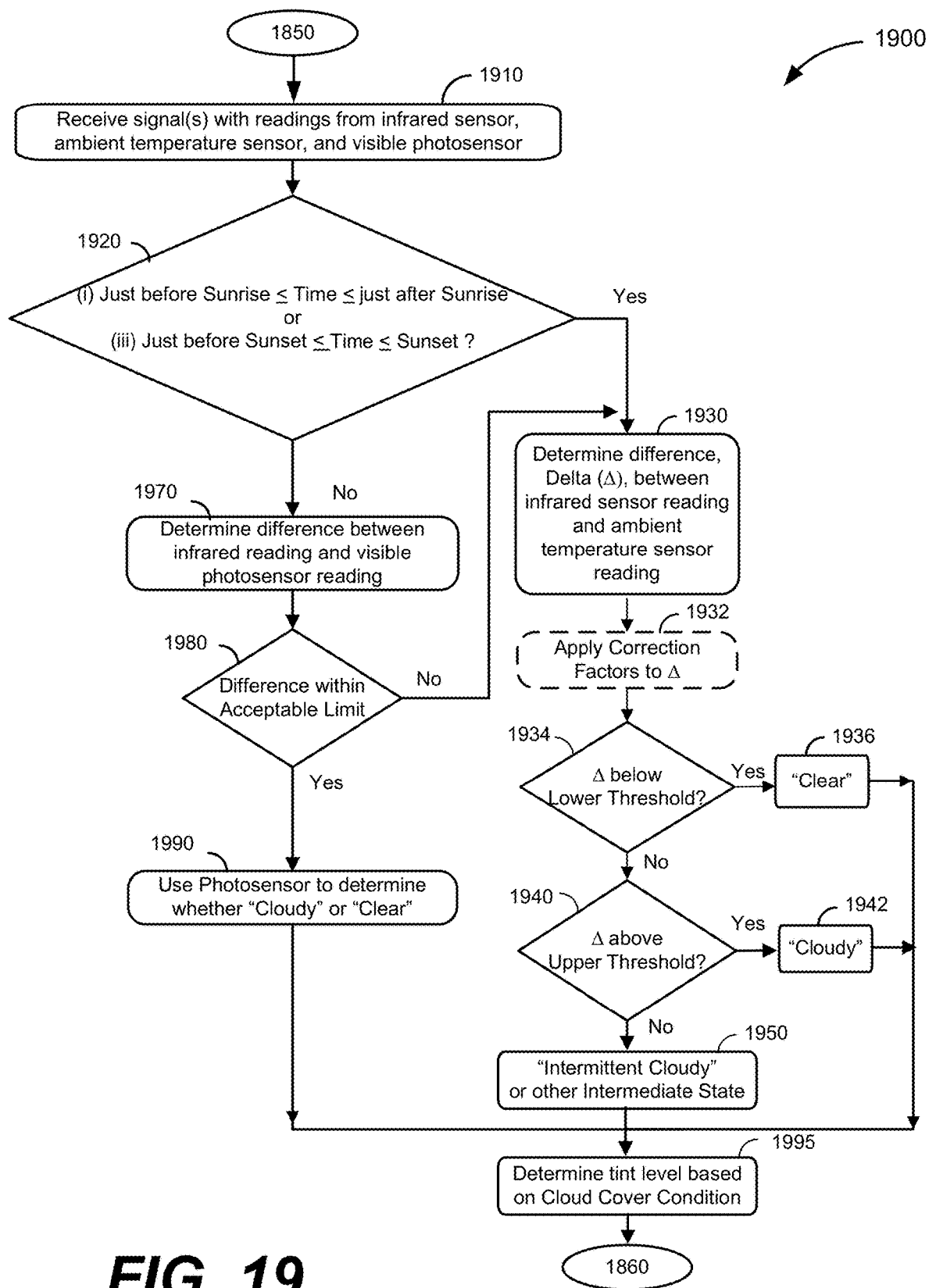
FIG. 19 is a flowchart depicting a particular implementation of the control logic of an operation shown in FIG. 18, according to an implementation.

FIG. 19 is a flowchart 1900 depicting a particular implementation of the control logic of operation 1850 implementing Module C as shown in FIG. 18. At operation 1910, one or more signals are received, at the processor, with a temperature reading, $T_{IR}$, taken by an infrared sensor at a particular sample time, a temperature reading, $T_{amb}$, taken by the ambient temperature sensor at the sample time, and an intensity reading taken by the photosensor at the sample time. Signals from the infrared sensor, ambient temperature sensor, and photosensor are received wirelessly and/or via wired electrical connections. The infrared sensor takes temperature readings based at least in part on infrared radiation received within its field-of-view. The infrared sensor is usually oriented toward a region of sky of interest, for example, a region above a building with the window. The ambient temperature sensor is configured to be exposed to the outside environment exterior to the building to measure the ambient temperature. The ambient temperature sensor is usually located and its sensing surface oriented so that direct sunlight is blocked or diffused from impinging the sensing surface. Direct sunlight is usually diffused, e.g., with a diffuser, before impinging the sensing surface of the photosensor. In some cases, the sensing surface of the photosensor is oriented in the same direction as the window faces.

If it is determined at operation 1920 that the time of day is during either of the time periods (i) or (iii), then the processor calculates the difference, delta ($\Delta$), between the temperature reading, $T_{IR}$, taken by the infrared sensor and the temperature reading, $T_{amb}$, taken by an ambient temperature sensor at a sample time (operation 1930). Optionally (denoted by dotted line), correction factors are applied to the calculated delta ($\Delta$) (operation 1930). Some examples of correction factors that may be applied include humidity, sun angle/elevation, and site elevation.

In one embodiment, the processor also determines at operation 1920 whether the infrared readings are oscillating at a frequency greater than a second defined level. If the processor determines at operation 1920 that the time of day is either within the time period (i) or (iii) and the infrared readings are oscillating at a frequency greater than a second defined level, then the processor applies operation 1990 to use the photosensor readings to determine the cloud condition. For example, the processor may determine a "clear" condition if the photosensor reading is above a certain minimum intensity level and determine a "cloudy" condition if the photosensor reading is at or below minimum intensity level. If the system is still in operation, the method increments to the next sample time and returns to operation 1910. If not, the method returns to operation 1860 in FIG. 18.

At operation 1934, the processor determines whether the calculated delta ($\Delta$) value is below a lower threshold value (e.g., $-5$ millidegrees Celsius (m° c.), $-2$ millidegrees Celsius (m° c.), etc.). If it is determined that the calculated delta ($\Delta$) value is below the lower threshold value, the cloud cover condition is determined to be a "clear" condition (operation 1936). The control logic then applies operation 1995 to determine a tint level based on the determined cloud condition. During operation of the infrared cloud detector, the method then increments to the next sample time and returns to operation 1910. If the infrared detector is not being implemented, the method returns to operation 1860 in FIG. 18.

If it is determined that the calculated delta (Δ) is above the lower threshold value, then the processor determines whether the calculated delta (Δ) is above an upper threshold value (e.g., 0 millidegrees Celsius (m° c.), 2 millidegrees Celsius (m° c.), etc.) at operation 1940. If it is determined that the calculated delta (Δ) is above the upper threshold value at operation 1940, then the processor determines the cloud cover condition to be a "cloudy" condition (operation 1942) and applies operation 1995 to determine at tint level based on the determined cloud condition. During operation/implementation of the infrared cloud detector, the method then increments to the next sample time and returns to operation 1910. If the infrared cloud detector is not being implemented, the method returns to operation 1860 in FIG. 18.

At operation 1995, the control logic determines the actual irradiance based at least in part on the cloud cover condition and calculates an irradiance level that would be transmitted into the room if the window were tinted to the Tint level from Module B under clear sky conditions. The control logic in Module C decreases the tint level from Module B if the irradiance based at least in part on the cloud cover condition is less than or equal to the calculated irradiance through the window when tinted to the tint level from Module B. During operation/implementation of the infrared cloud detector, the method then increments to the next sample time and returns to operation 1910. If the infrared cloud detector is not still being implemented, the method returns to operation 1860 in FIG. 18.

If it is determined that the calculated delta (Δ) is below the upper threshold value at operation 1940, then the processor determines the cloud cover condition to be "intermittent cloudy" or another intermediate condition (operation 1950) and proceeds to operation 1995 as described in detail above.

If it is determined at operation 1920 that the time of day is not during either of the time periods (i) or (iii), then the time of day is during the time period (ii) daytime and the processor calculates the difference between the temperature reading, $T_{IR}$, taken by the infrared sensor and the intensity reading taken by the photosensor at operation 1970. At operation 1980, the processor determines whether the calculated difference is within an acceptable limit. If the processor determines at operation 1980 that the calculated difference is more than the acceptable limit, then the processor applies operation 1930 to calculate the delta (Δ) and uses the calculated delta (Δ) to determine the cloud cover condition as discussed above.

In one embodiment, the processor also determines at operation 1960 whether the infrared readings are oscillating at a frequency greater than a second defined level. If the processor determines at operation 1960 the time of day is within the time period (ii) and that the infrared readings are oscillating at a frequency greater than a second defined level, then the processor applies operation 1990 to use the photosensor readings to determine the cloud condition. For example, the processor may determine a "clear" condition if the photosensor reading is above a certain minimum intensity level and determine a "cloudy" condition if the photosensor reading is at or below minimum intensity level. The control logic then proceeds to operation 1995 described in detail above.

If the processor determines at operation 1980 that the calculated difference is within the acceptable limit, the photosensor reading is used to determine the cloud cover condition (operation 1990). For example, the processor may determine a "clear" condition if the photosensor reading is above a certain minimum intensity level and determine a "cloudy" condition if the photosensor reading is at or below minimum intensity level. The control logic then proceeds to operation 1995 described in detail above.

In one embodiment, the processor also determines at operation 1910 whether the photosensor readings are oscillating at a frequency greater than a first defined level and whether the infrared readings are oscillating at a frequency greater than a second defined level. If the processor determines at operation 1970 that the calculated difference is within the acceptable limit and the processor determines that the photosensor readings are oscillating at a frequency greater than the first defined level, then the processor applies operation 1930 to calculate the delta (Δ) and use the calculated delta (Δ) is used determine the cloud cover condition as discussed above. If the processor determines at operation 1970 that the calculated difference is not within the acceptable limit and the processor determines that the infrared readings are oscillating at a frequency greater than the second defined level, then the processor applies operation 1990 to use the photosensor readings to determine the cloud condition. For example, the processor may determine a "clear" condition if the photosensor reading is above a certain minimum intensity level and determine a "cloudy" condition if the photosensor reading is at or below minimum intensity level. The control logic then proceeds to operation 1995 described in more detail above.

Examples of Modules C1 and D

One example of exemplary tint control logic includes four (4) logic modules A, B, C1, and D. Modules C1 and D determine tint level using sensor readings taken by various sensors such as, for example, temperature sensors and visible light photosensors. In one embodiment, Modules C1 and D also use ambient temperature readings from weather feed data. Typically these sensors are part of an infrared cloud detector system such as one in the form of a multi-sensor device (e.g., multi-sensor device 2030 shown in FIGS. 20A-20D, multi-sensor device 401 shown in FIGS. 4A-4C, or multi-sensor device 3201 shown in FIGS. 32A-C).

FIGS. 20A-20D include schematic diagrams depicting some general input to logic Modules A, B, C1 and D. To illustrate the general input, each diagram depicts a schematic side view of a room 2000 of a building having a desk 2001 and an electrochromic window 2005 located between the exterior and the interior of the building. The diagram also depicts a local window controller 2050 is in communication with the electrochromic window 2005 to send control signals to control a voltage applied to the electrochromic window 2005 to control its transitions. The diagram also depicts an infrared cloud detector system in form of a multi-sensor device 2030 located on the roof the building with one or more tintable windows.

The multi-sensor device 2030 is illustrated in simplified form in FIGS. 20A-20D. The components of the multi-sensor device 2030 are similar to components of the multi-sensor device 3201 described in more detail with respect to FIGS. 32A-C. In the illustrated example shown in FIGS. 20A-20D, the multi-sensor device 2030 includes a housing 2032 with a casing made of light-diffusing material. The multi-sensor device 2030 also includes at least two redundant infrared sensor devices 2034 e.g., multiple infrared sensor devices to provide redundancy should one should malfunction or be unavailable. Each of the infrared sensor devices 2034 has an onboard ambient temperature sensor and an infrared sensor for measuring heat radiation from the sky. In addition, the multi-sensor device 2030 includes a plurality of visible light photosensors 2010 located within the enclosure of the casing and facing outward at different directions and/or facing upward. For example, the multi-sensor device 20134 may have thirteen (13) visible light photosensors 2010. Each infrared sensor is configured to take temperature readings of the sky, $T_{sky}$, based at least in part on infrared radiation received from the region of sky within its field-of-view. Each onboard ambient temperature sensor is configured to take ambient temperature readings, $T_{amb}$, of the ambient air. Each infrared sensor device 2034 includes an imaginary axis that is perpendicular to the sensing surface of the infrared sensors and passes through approximately its center of the sensing surface. Although not shown, the multi-sensor device 2030 also includes one or more structures that hold its components within the housing 2032. Although logic Modules A, B, C1 and D are described with reference to sensor data from multi-sensor device 2030, for simplicity, it would be understood that these modules may use data derived from one or more other sources such as, for example, other infrared cloud detector systems, weather feed data, other sensors in the building such as standalone sensors available at the one or more electrochromic windows, user input, etc.

The multi-sensor device 2030 also includes a processor that can execute instructions stored in memory (not shown) for implementing logic. For example, in one implementation, the processor of the multi-sensor device 2030 filters sensor readings using logic of Module D, e.g., logic of Module D' described with reference to FIG. 23. In this example, the processor of the multi-sensor device 2030 receives sensor readings from the sensors at the multi-sensor device 2030 and/or receives weather feed data via a network to filter the sensor readings over time to determine filtered sensor values as input to the control logic. In this implementation, the window controller 2050 receives signals with filtered sensor values and uses the filtered sensor values as input to the logic of Modules C1 and/or D.

The room 2000 also includes a local window controller 2050 with a processor that can execute instructions stored in memory (not shown) for implementing control logic to control the tint level of the electrochromic window 2005. The window controller 2050 is in communication with the electrochromic window 2005 to send control signals. The window controller 2050 is also in communication with (wirelessly or wired) the multi-sensor device 2030 to receive signals with, for example, filtered sensor values or sensor readings. For example, the window controller 2050 may receive signals with infrared sensor readings ($T_{sky}$) taken by the infrared sensors and ambient temperature readings ($T_{amb}$) taken by the onboard ambient temperature sensors of the infrared sensor devices 2034, and/or visible light readings taken by the plurality of photosensors 2010. Additionally or alternatively, the window controller 2050 may receive signals with filtered infrared sensor values based at least in part on readings taken by the infrared sensors 2034 and/or a filtered photosensor values based at least in part on readings taken by the photosensors 2010.

According to certain aspects, power/communication lines extend from the building or another structure to multi-sensor device 2030. In one implementation, the multi-sensor device 2030 includes a network interface that can couple the multi-sensor device 2030 to a suitable cable. The multi-sensor device 2030 can communicate data through the network interface to the window controller 2050 or another controller (e.g., network controller and/or master controller) of the building. In some other implementations, the multi-sensor device 2030 can additionally or alternatively include a wireless network interface enabling wireless communication with one or more external controllers. In some aspects, the multi-sensor device 2030 can also include a battery within or coupled with its housing to power the sensors and electrical components within. The battery can provide such power in lieu of or in addition to the power from a power supply (for example, from a building power supply). In one aspect, the multi-sensor device 2030 further includes at least one photovoltaic cell, for example, on an outer surface of the housing. This at least one photovoltaic cell can provide power in lieu of or in addition to the power provided by any other power supply.

Figure 20A:
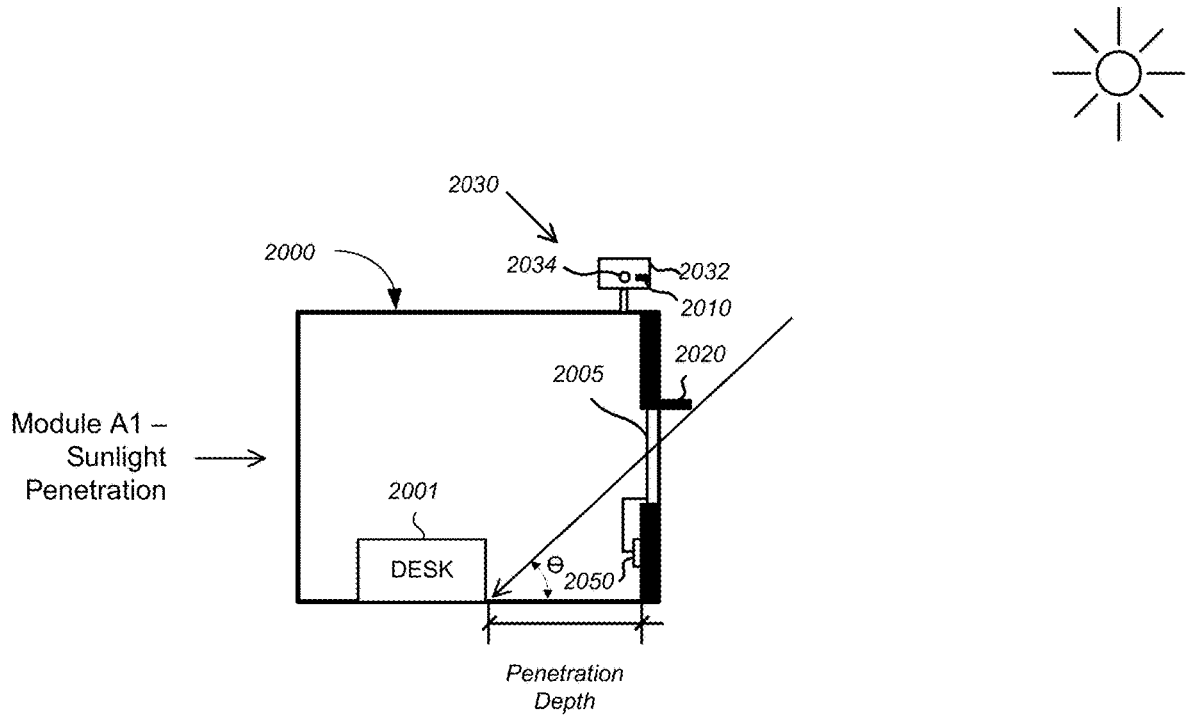
FIG. 20A shows the penetration depth of direct sunlight into a room through an electrochromic window between the exterior and the interior of a building, which includes the room, according to an implementation.

FIG. 20A shows the penetration depth of direct sunlight into a room 2000 through an electrochromic window 2005 between the exterior and the interior of a building, which includes the room 2000. Penetration depth is a measure of how far direct sunlight will penetrate into the room 2000. As shown, penetration depth is measured in a horizontal direction away from the sill (bottom) of the electrochromic window 2005. Generally, a window defines an aperture that provides an acceptance angle for direct sunlight. The penetration depth is calculated based upon the geometry of the window (e.g., window dimensions), its position and orientation in the room, any fins or other exterior shading outside of the window, and the position of the sun (e.g. angle of direct sunlight for a particular time of day and date). Exterior shading to an electrochromic window 2005 may be due to any type of structure that can shade the window such as an overhang, a fin, etc. In FIG. 20A, there is an overhang 2020 above the electrochromic window 2005 that blocks a portion of the direct sunlight entering the room 2000 thus shortening the penetration depth.

Module A1 can be used to determine a tint level that considers occupant comfort from direct sunlight through the electrochromic window 2005 onto an occupant or their activity area (also referred to herein as a "glare condition"). The tint level is determined based at least in part on a calculated penetration depth of direct sunlight into the room and the space type (e.g., desk near window, lobby, etc.) in the room at a particular instant in time (time of day and day of year). In some cases, the tint level may also be based at least in part on providing sufficient natural lighting into the room. In some cases, the penetration depth is the value calculated at a time in the future to account for glass transition time (the time required for the window to tint, e.g. to 80%, 90% or 100% of the desired tint level). The issue addressed in Module A1 is that direct sunlight may penetrate so deeply into the room 2000 as to show directly on an occupant working at a desk or other work surface in a room. Publicly available programs can provide calculation of the sun's position and allow for easy calculation of penetration depth.

FIGS. 20A-20D also show a desk 2001 in the room 2000 as an example of a space type associated with an activity area (i.e. desk) and location of the activity area (i.e. location of desk). Each space type is associated with different tint levels for occupant comfort. For example, if the activity is a critical activity such as work in an office being done at a desk or computer, and the desk is located near the window, the desired tint level may be higher than if the desk were further away from the window. As another example, if the activity is non-critical, such as the activity in a lobby, the desired tint level may be lower than for the same space having a desk.

Figure 20B:
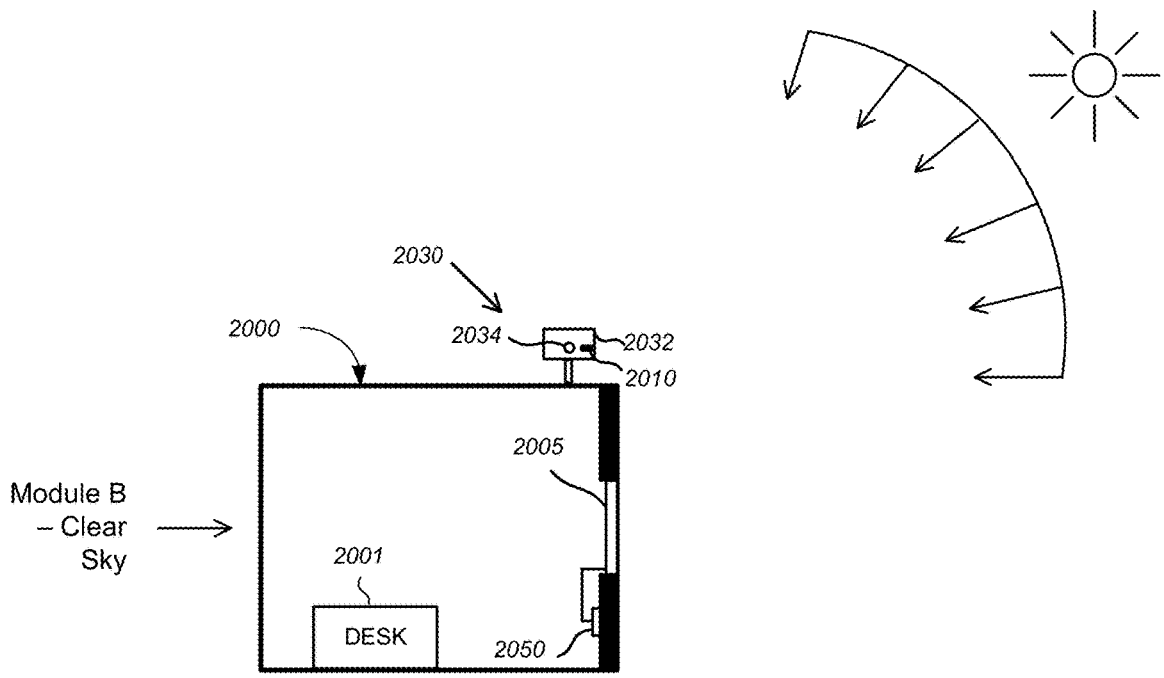
FIG. 20B shows direct sunlight and radiation under clear sky conditions entering the room through the electrochromic window, according to an implementation.

FIG. 20B shows direct sunlight and radiation under clear sky conditions entering the room 2000 through the electrochromic window 2005, according to an implementation. The radiation may be from sunlight scattered by molecules and particles in the atmosphere. Module B determines a tint level based at least in part on calculated values of irradiance under clear sky conditions flowing through the electrochromic window 2005 under consideration. Various software, such as open source RADIANCE program, can be used to calculate clear sky irradiance at a certain latitude, longitude, time of year, and time of day, and for a given window orientation.

Figure 20C:
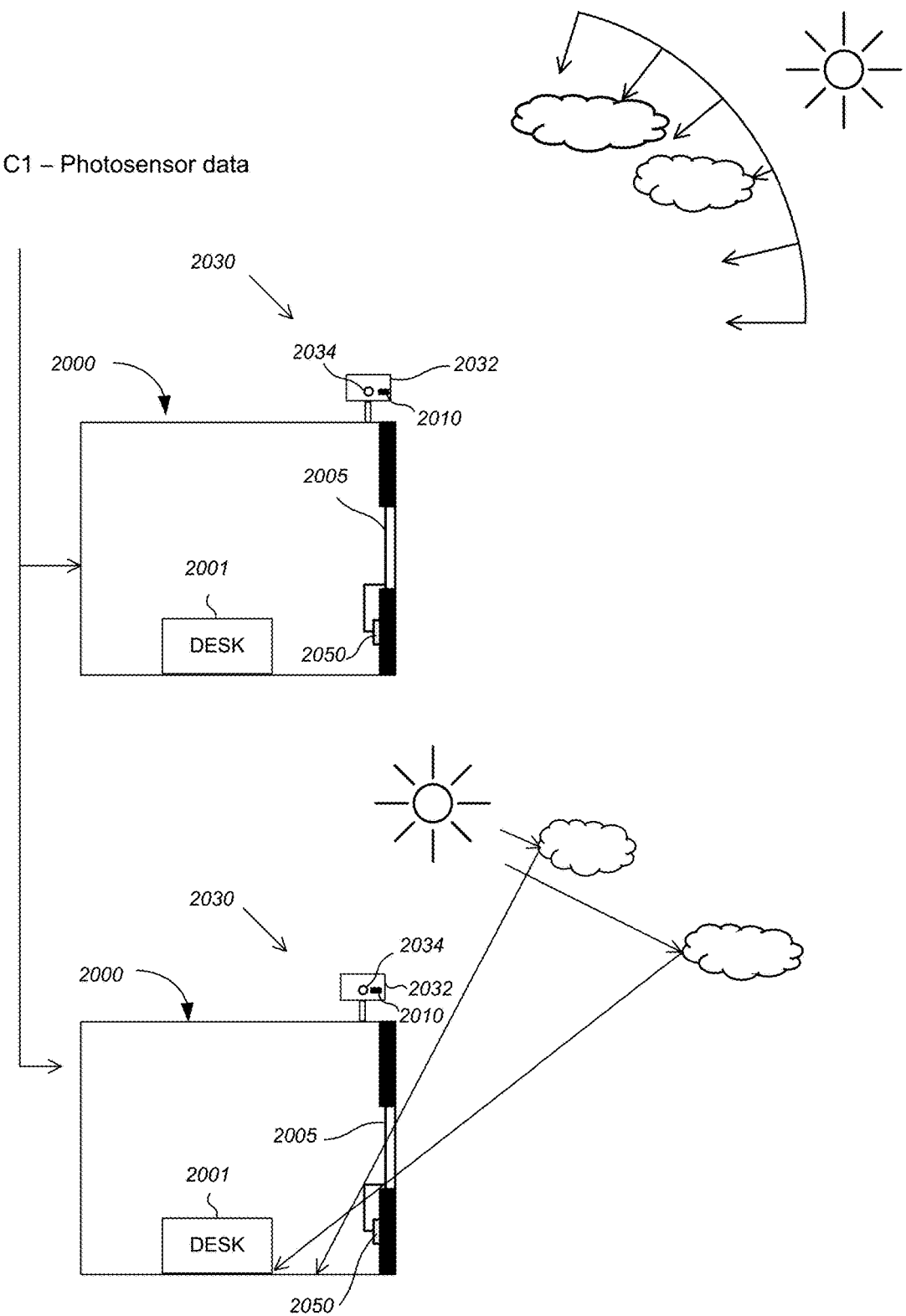
FIG. 20C shows radiant light from the sky as may be obstructed by or reflected from objects such as, for example, clouds and other buildings, according to an implementation.

FIG. 20C shows radiant light from the sky as may be obstructed by or reflected from objects such as clouds, or other buildings or structures, according to an implementation. These obstructions and reflections are not accounted for in the clear sky radiation calculations. The radiant light from the sky is determined based at least in part on photosensor data from the plurality of photosensors 2010 of the multi-sensor device 2030. The tint level determined by the logic of Module C1 is based at least in part on the photosensor data. The tint level is based at least in part on a cloud cover condition determined using the readings taken by the plurality of photosensors 2010. In some cases, the cloud cover condition is determined based at least in part on a filtered photosensor value determined from the readings from the plurality of photosensors 2010 taken over time.

Figure 20D:
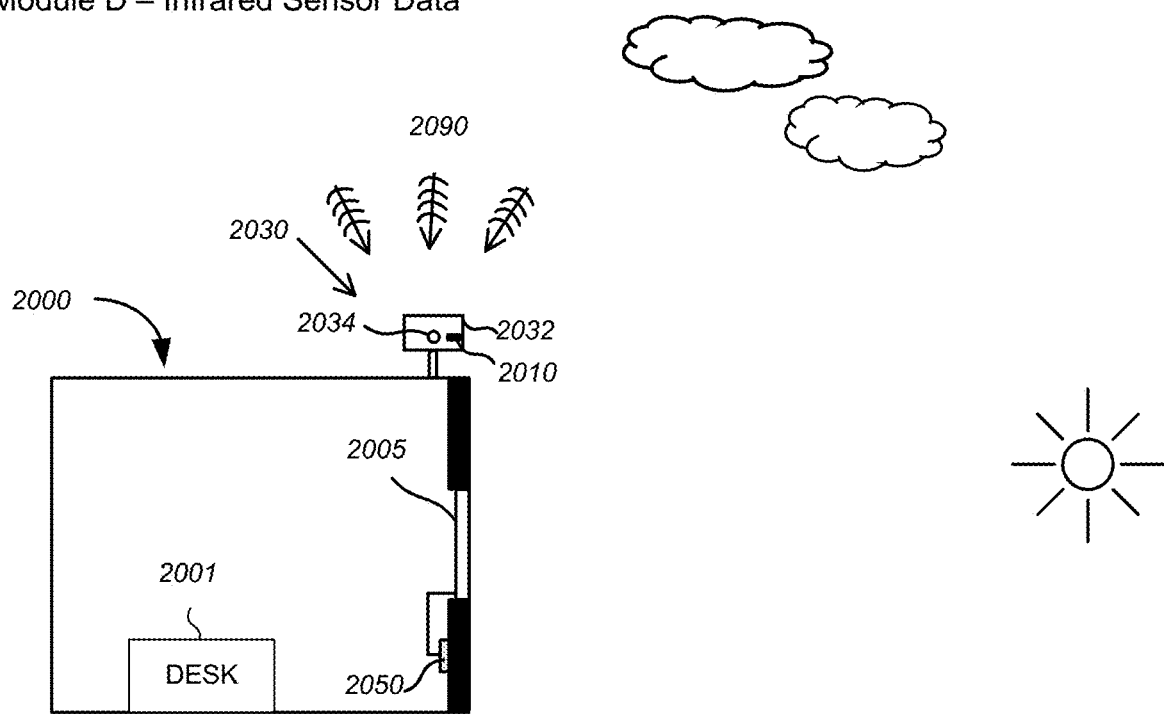
FIG. 20D shows infrared radiation from the sky, according to an implementation.

FIG. 20D shows infrared radiation 2090 from the sky as may radiate from clouds and other obstructions, according to an implementation. As mentioned above with reference to FIG. 20C, these obstructions are not accounted for in the clear sky radiation calculations. During the morning and evening when radiant visible light levels are low and photosensor readings of visible light are low and may give a false positive for a cloudy condition, the operations of Module D use sky temperature and ambient temperature data to determine the cloud cover condition.

In one implementation, the operations of Module D determine the cloud cover condition at each instant in time, $t_i$, using a filtered infrared sensor value determined based at least in part on sky temperature readings ($T_{sky}$) and ambient temperature readings ($T_{amb}$) taken over time. The ambient temperature readings are either from one or more ambient temperature sensors or from weather feed data. For example, the sky temperature readings may be determined based at least in part on readings taken by the infrared sensors of multi-sensor device 2030. The tint level is determined based at least in part on the cloud cover condition determined from the filtered infrared sensor value. Generally, the operations of Module B will determine a tint level that darkens (or does not change) the tint level determined by Module A1 and the operations of Module C1 or D will determine a tint level that lightens (or does not change) the tint level determined by Module B.

The control logic may implement one or more of the logic Modules A1, B, C1, and D for one or more windows in the building. Each electrochromic window can have a unique set of dimensions, orientation (e.g., vertical, horizontal, tilted at an angle), position, associated space type, etc. A configuration file with this information and other information can be maintained for each electrochromic window or zone of electrochromic windows in the building. In one example, the configuration file may be stored in a computer readable medium of the local window controller 2050 of the electrochromic window 2005 or in the building management system ("BMS") described later in this disclosure. The configuration file can include information such as a window configuration, an occupancy lookup table, information about an associated datum glass, and/or other data used by the control logic. The window configuration may include information such as the dimensions of the electrochromic window 2005, the orientation of the electrochromic window 2005, the position of the electrochromic window 2005, etc. The occupancy lookup table describes tint levels that provide occupant comfort for certain space types and penetration depths. That is, the tint levels in the occupancy lookup table are designed to provide comfort to occupant(s) that may be in the room 2000 from direct sunlight on the occupant(s) or their workspace. The space type is a measure to determine how much tinting will be required to address occupant comfort concerns for a given penetration depth and/or provide comfortable natural lighting in the room. The space type parameter may take into consideration many factors. Among these factors is the type of work or other activity being conducted in a particular room and the location of the activity. Close work associated with detailed study requiring great attention might be at one space type, while a lounge or a conference room might have a different space type. Additionally, the position of the desk or other work surface in the room with respect to the window is a consideration in defining the space type. For example, the space type may be associated with an office of a single occupant having a desk or other workspace located near the electrochromic window 1505. As another example, the space type may be a lobby.

In certain embodiments, one or more modules of the control logic can determine desired tint levels while accounting for energy conservation in addition to occupant comfort. These modules may determine energy savings associated with a particular tint level by comparing the performance of an electrochromic window at that tint level to a datum glass or other standard reference window. The purpose of using this reference window can be to ensure that the control logic conforms to requirements of the municipal building code or other requirements for reference windows used in the locale of the building. Often municipalities define reference windows using conventional low emissivity glass to control the amount of air conditioning load in the building. As an example of how the reference window 2005 fits into the control logic, the logic may be designed so that the irradiance coming through a given electrochromic window 2005 is never greater than the maximum irradiance coming through a reference window as specified by the respective municipality. In disclosed embodiments, control logic may use the solar heat gain coefficient (SHGC) value of the electrochromic window 2005 at a particular tint level and the SHGC of the reference window to determine the energy savings of using the tint level. Generally, the value of the SHGC is the fraction of incident light of all wavelengths transmitted through the window. Although a datum glass is described in many embodiments, other standard reference windows can be used. Generally the SHGC of the reference window (e.g., datum glass) is a variable that can be different for different geographical locations and window orientations, and is based at least in part on code requirements specified by the respective municipality.

Examples of Control Logic Including Modules a, B, C1, and D

Figure 21:
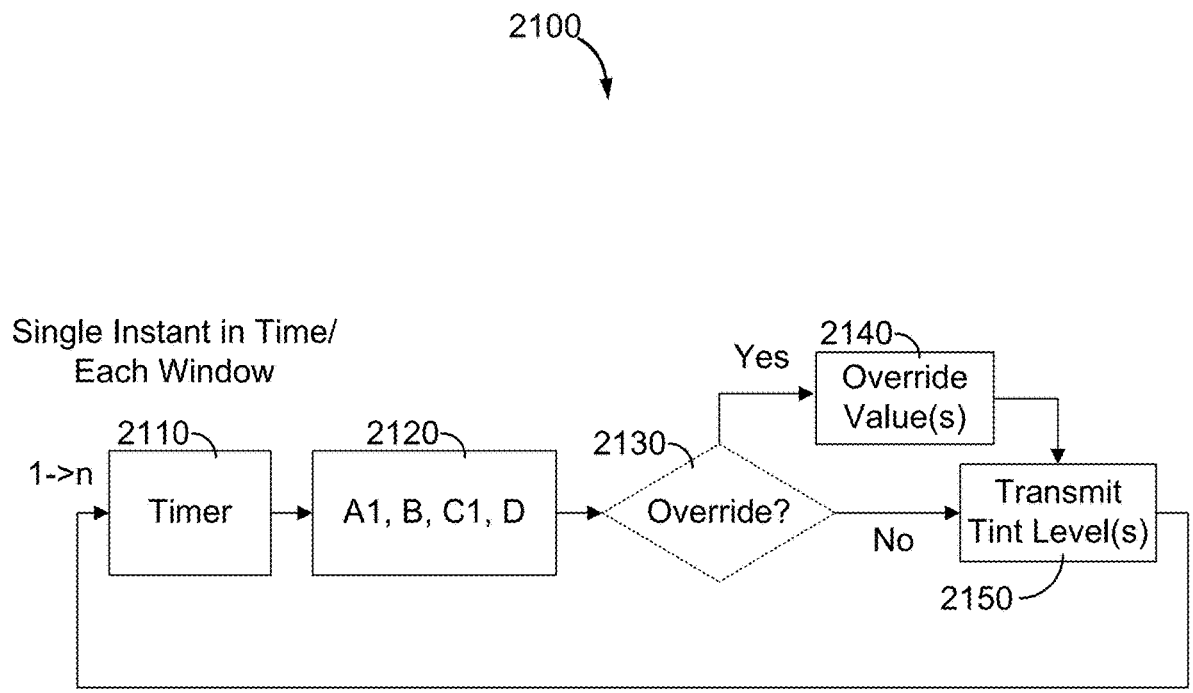
FIG. 21 includes a flowchart depicting general control logic for a method of controlling one or more electrochromic windows in a building, according to embodiments.

FIG. 21 depicts a flowchart 2100 showing general control logic for a method of controlling one or more electrochromic windows in a building, according to embodiments. This control logic may be implemented to control a zone of one or more electrochromic windows, for example. The control logic implements one or more of Modules A1, B, C1, and D to calculate a tint level for the one or more electrochromic windows and sends instructions to transition the electrochromic devices of the one or more electrochromic windows to the tint level, for example, electrochromic devices in multi-zone electrochromic windows or electrochromic devices on multiple electrochromic lites of an insulated glass unit. Some examples of multi-zone windows can be found in international PCT application No. PCT/US14/71314, filed on Dec. 14, 2014 and titled "MULTI-ZONE EC WINDOWS," which is hereby incorporated by reference in its entirety. Modules A1 and B are similar to Modules A and B described with respect to FIGS. 15A and 15B.

The calculations in the control logic are run at intervals timed by the timer at operation 2110. The logic calculations can be done at constant time intervals in some cases. In one case, the logic calculations are done every 2 to 5 minutes. In other cases, it may be desirable to make calculations on a less frequent basis such as every 30 minutes or every 20 minutes such as for tint transition for large pieces of electrochromic lites (e.g. up to 6 feet×10 feet) that can take up to 30 minutes or more to transition.

At operation 2120, logic Modules A1, B, C1, and D perform calculations to determine the tint level for the one or more electrochromic windows at a single instant in time $t_i$. These calculations can be performed by one or more processors of a window controller(s) and/or a multi-sensor device. For example, a processor of a multi-sensor device may determine filtered sensor values and communicate these filtered sensor values to a window controller that determines the tint level based at least in part on the filtered sensor values. In another example, one or more processors of a window controller may determine the filtered sensor values and corresponding tint level based at least in part on sensor readings received from the multi-sensor device.

In certain embodiments, the control logic is predictive logic that calculates how the window should transition in advance of the actual transition. In these cases, the calculations in Modules A1, B, C1, and D are made based at least in part on a future time (e.g., $t_i$=present time+time duration such as the transition time for the one or more electrochromic windows), e.g., around or after transition is complete. For example, the future time used in the calculations may be a time in the future that is sufficient to allow the transition to be completed after receiving the tint instructions. In these cases, the window controller can send tint instructions in the present time in advance of the actual transition. By the completion of the transition, the window will have transitioned to a tint level that is desired for that future time.

At operation 2130, the control logic allows for various types of overrides to disengage the algorithm at Modules A1, B, C1, and D and define override tint levels at operation 2140 based at least in part on some other consideration. One type of override is a manual override. This is an override implemented by an end user who is occupying a room and determines that a particular tint level (override value) is desirable. There may be situations where the user's manual override is itself overridden. An example of an override is a high demand (or peak load) override, which is associated with a requirement of a utility that energy consumption in the building be reduced. For example, on particularly hot days in large metropolitan areas, it may be necessary to reduce energy consumption throughout the municipality in order to not overly tax the municipality's energy generation and delivery systems. In such cases, the building may override the tint level from the control logic to ensure that all windows have a particularly high level of tinting. This override may override a user's manual override. Another example of an override is when there is no occupant in the room, for example, on weekends in a commercial office building. In this case, the building may disengage one or more Modules that relate to occupant comfort and all the windows may have a low level of tinting in cold weather and high level of tinting in warm weather.

At operation 2150, the control signals for implementing the tint level are transmitted over a network to the power supply in electrical communication with the electrochromic device(s) of the one or more electrochromic windows to transition the windows to the tint level. In certain embodiments, the transmission of tint level to the windows of a building may be implemented with efficiency in mind. For example, if the recalculation of the tint level suggests that no change in tint from the current tint level is required, then there is no transmission of instructions with an updated tint level. As another example, the building may be divided into zones of windows based at least in part on window size and/or location in the building. In one case, the control logic recalculates tint levels for zones with smaller windows more frequently than for zones with larger windows.

In one case, the control logic in FIG. 21 implements a control method for controlling the tint level of all the electrochromic windows of an entire building on a single device, for example, on a single master window controller. This device can perform the calculations for each and every electrochromic window in the building and also provide an interface for transmitting tint levels to the electrochromic devices in individual electrochromic windows.

Also, there may be certain adaptive components of the control logic of embodiments. For example, the control logic may determine how an end user (e.g. occupant) tries to override the algorithm at particular times of day and then makes use of this information in a more predictive manner to determine a desired tint level. For example, the end user may be using a wall switch to override the tint level provided by the control logic at a certain time on each day over a consecutive sequence of days to an override value. The control logic may receive information about these instances and change the control logic to introduce an override value that changes the tint level to the override value from the end user at that time of day.

Figure 22:
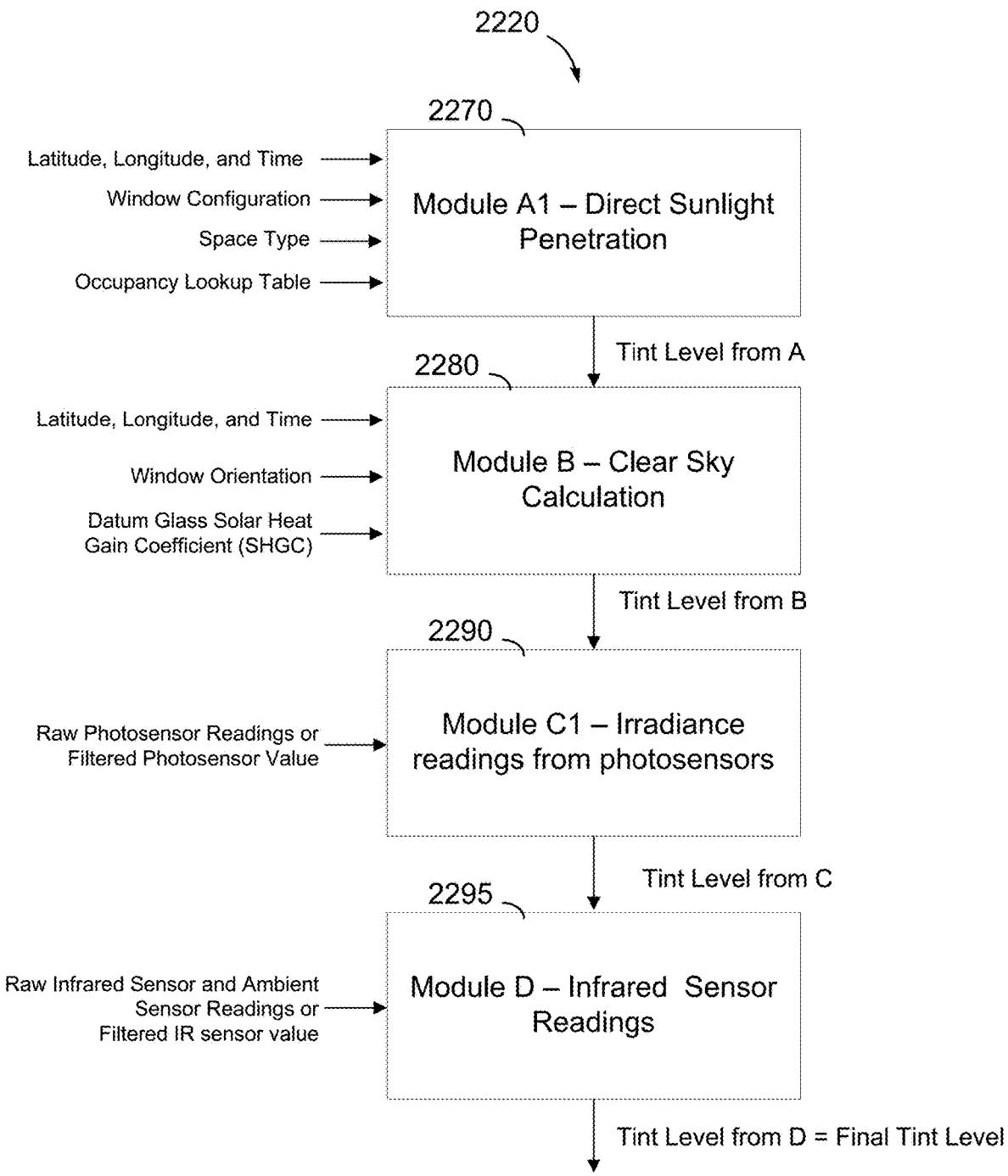
FIG. 22 includes a flowchart of logic according to one implementation of a block of the flowchart illustrated in FIG. 21.

FIG. 22 is a diagram showing a particular implementation of block 2020 from FIG. 21. This diagram shows a method of performing all four Modules A1, B, C1, and D in sequence to calculate a final tint level of a particular electrochromic window at a single instant in time $t_i$. In the case of predictive logic, the Modules A1, B, C1, and D are performed based at least in part on determining a final tint level for a time, $t_i$, in the future. The final tint level may be the maximum permissible transmissivity of the window under consideration. In one embodiment, the calculations of Modules A1, B, C1, and D are performed by the processor of a local window controller, a network controller, or a master controller.

At operation 2270, the processor uses Module A1 to determine a tint level for occupant comfort to prevent direct glare from sunlight penetrating into the room. The processor uses Module A1 to calculate the penetration depth of direct sunlight into the room based at least in part on the sun's position in the sky and the window configuration from the configuration file. The position of the sun is calculated based at least in part on the latitude and longitude of the building and the time of day and date. The occupancy lookup table and space type are input from a configuration file for the particular window. Module A1 outputs the Tint level from A to Module B. The goal of Module A1 is generally to ensure that direct sunlight or glare does not strike the occupant or his or her workspace. The tint level from Module A1 is determined to accomplish this purpose. Subsequent calculations of tint level in Modules B, C, and D can reduce energy consumption and may require even greater tint. However, if subsequent calculations of tint level based at least in part on energy consumption suggest less tinting than required to avoid interfering with the occupant, the logic prevents the calculated greater level of transmissivity from being executed to assure occupant comfort.

At operation 2280, the tint level calculated in Module A1 is input into Module B. Generally Module B determines a tint level that darkens (or does not change) the tint level calculated in Module B. A tint level is calculated based at least in part on calculations of irradiance under clear sky conditions (clear sky irradiance). The processor of the controller uses Module B to calculate clear sky irradiance for the one or more electrochromic windows based at least in part on window orientation from the configuration file and based at least in part on latitude and longitude coordinates of the building. These calculations are also based at least in part on a time of day at time $t_i$ and/or a maximum value for all times. Publicly available software such as the RADIANCE program, which is an open-source program, can provide the calculations for calculating clear sky irradiance. The SHGC of the datum glass is also input into Module B from the configuration file. The processor uses Module B to determine a tint level that is darker than the tint level in A and transmits less heat than the datum glass is calculated to transmit under maximum clear sky irradiance. Maximum clear sky irradiance is the highest level of irradiance for all times calculated for clear sky conditions. In one example, Module B increases the tint level calculated in Module A1 in steps and picks a tint level where the Inside radiation is less than or equal to the Datum Inside Irradiance where: Inside Irradiance=Tint level SHGC x Clear Sky Irradiance and Datum Inside Irradiance=Datum SHGC×Maximum Clear Sky Irradiance.

At operation 2290, a tint level from Module B and the photosensor readings and/or a filtered photosensor values are input to Module C1. The calculated clear sky irradiance is also input into Module C1. The photosensor readings are based at least in part on measurements taken by the plurality of photosensor(s), for example, of a multi-sensor device. The processor uses the logic of Module C1 to determine a cloud cover condition by comparing filtered photosensor values with threshold values. In one case, Module C1 determines the filtered photosensor values based at least in part on the raw photosensor readings. In another case, Module C1 receives the filtered photosensor values as input. The processor implements the logic of Module C1 to determine a tint level based at least in part on the determined cloud cover condition. Generally the operations of Module C1 will determine a tint level that lightens or does not change the tint level determined by the operations of Module B.

At operation 2295, a tint level from Module C1 in input to Module D. In addition, infrared sensor readings and ambient temperature sensor readings and/or their associated filtered infrared sensor values are input to Module D. The infrared sensor readings and ambient temperature sensor readings include sky temperature readings ($T_{sky}$), ambient temperature readings from local sensors at the building ($T_{amb}$) and/or from weather feed ($T_{weather}$) and/or the difference between $T_{sky}$-$T_{amb}$. The filtered infrared sensor values are determined based at least in part on the sky temperature readings ($T_{sky}$) and the ambient temperature readings from local sensors ($T_{amb}$) or from weather feed ($T_{weather}$) The sky temperature readings are taken by infrared sensor(s). The ambient temperature readings are taken by one or more ambient temperature sensors. The ambient temperature readings may be received from various sources. For example, the ambient temperature readings may be communicated from one or more ambient temperature sensors located onboard an infrared sensor and/or a standalone temperature sensor of, for example, a multi-sensor device at the building. As another example, the ambient temperature readings may be received from weather feed. The logic of Module D to determines a cloud cover condition by comparing the filtered infrared sensor values with threshold values. Generally the operations of Module D will determine a tint level that darkens (or does not change) the tint level determined by the operations of Module C1. The tint level determined in Module D is the final tint level in this example. In one embodiment, (i) a history of local ambient temperature readings from one or more local temperature sensor is compared against (ii) a history of ambient temperatures readings obtained from an external weather data source, to form a comparison. A statistical analysis using a multivariate regression model may be performed to identify differences between the two types of historical readings. In some embodiments, statistical analysis has been found useful in identifying sensor reading biases and/or inaccuracies. Such biases and/or inaccuracies may be caused by local heating effects that might otherwise not be present. Examples of heating effects include those that may be caused by the radiated heat of a building and/or by inadequate ventilation of a sensor housing. If such biases and/or inaccuracies exist, tint decisions made by Module D could potentially be negatively affected. In one embodiment, Module D uses one or more differences between the two sets of historical readings as an input, e.g., before determining the final tint level.

Much of the information input to the control logic described with respect to FIG. 22 is determined from fixed information about the latitude and longitude of the building, and also from time of day and a day of the year (date). This information describes where the sun is with respect to the building, and more particularly with respect to each of the one or more windows for which the control logic is being implemented. The position of the sun with respect to the window(s) can be used to calculate information such as the penetration depth of direct sunlight into the room through each window. It also provides an indication of the maximum irradiance or solar radiant energy flux coming through the window(s) during clear sky conditions.

In the morning and evening, sunlight levels are low and readings taken by exterior visible light photosensors in, for example, a multi-sensor are low values that might be considered consistent with readings taken during a cloudy condition during the daytime. For this reason, exterior visible light photosensor readings taken during the morning and evening might falsely indicate a cloudy condition if considered in isolation. In addition, any obstruction from a building or a hill/mountain may also result in a false positive indication for a cloudy condition based at least in part on visible light photosensor readings taken alone. Moreover, exterior visible light photosensor readings taken before sunrise may result in a false positive cloudy condition if taken alone. Where control logic is predictive in determining a tint level at sunrise in advance based at least in part on visible light photosensor readings alone taken just before sunrise, a false positive cloudy condition might lead to transitioning an electrochromic window to a clear state at sunrise allowing glare in the room.

In certain implementations, control logic described herein uses filtered sensor values based at least in part on temperature readings from one or more infrared sensors and from ambient temperature sensors to determine a cloud condition in the morning and evening and/or at a time just before sunrise. The one or more infrared sensors operate generally independent of sunlight levels allowing for the tinting control logic to determine a cloud condition before sunrise and as the sun is setting to determine and maintain a proper tint level during the morning and evening. In addition, the filtered sensor values based at least in part on the temperatures readings from the one or more infrared sensors can be used to determine a cloud condition even when the visible light photosensors are shaded or otherwise obstructed.

In one implementation, the control logic described with respect to FIG. 22 implements Module C1 and/or Module D based at least in part on whether the time, $t_i$, is in the morning, daytime or evening regions as determined by solar altitude. An example of this implementation is described in detail with respect to FIG. 24.

Examples of Module D

In certain implementations, Module D uses filtered infrared (IR) sensor values (e.g., rolling average or median values of sensor readings) as input to determine a tint level for one or more electrochromic windows in a building. The filtered IR sensor values may be calculated by logic and passed to Module D or Module D may query a database to retrieve stored filtered IR sensor values. In one aspect, Module D includes logic to calculate the filtered IR sensor values using a Cloudy Offset value and sky temperature readings ($T_{sky}$) and ambient temperature readings from local sensors ($T_{amb}$) or from weather feed ($T_{weather}$), and/or a difference, delta ($\Delta$), between sky temperature readings and ambient temperature readings. The Cloudy Offset value is a temperature offset that corresponds to the threshold values that will be used to determine the cloudy condition by the logic in Module D. The logic of Module D may be performed by the one or more processors performing the logic of Module D such as a local window controller, a network controller, or a master controller.

For example, an alternative implementation of the control logic shown in FIG. 22 further includes a Module D' that receives infrared sensor readings and ambient temperature readings from sensors, calculates the filtered infrared sensor values, and passes filtered infrared sensor values to Module D. Alternatively, the logic of Module D' may be performed by one or more processors of a multi-sensor device. In one case, the calculated filtered IR sensor values from Module D' are saved into an IR sensor measurement database which is stored in memory. In this case, the one or more processors performing the calculations of Module D retrieves the filtered IR sensor values as input from IR sensor measurement database.

Figure 23:
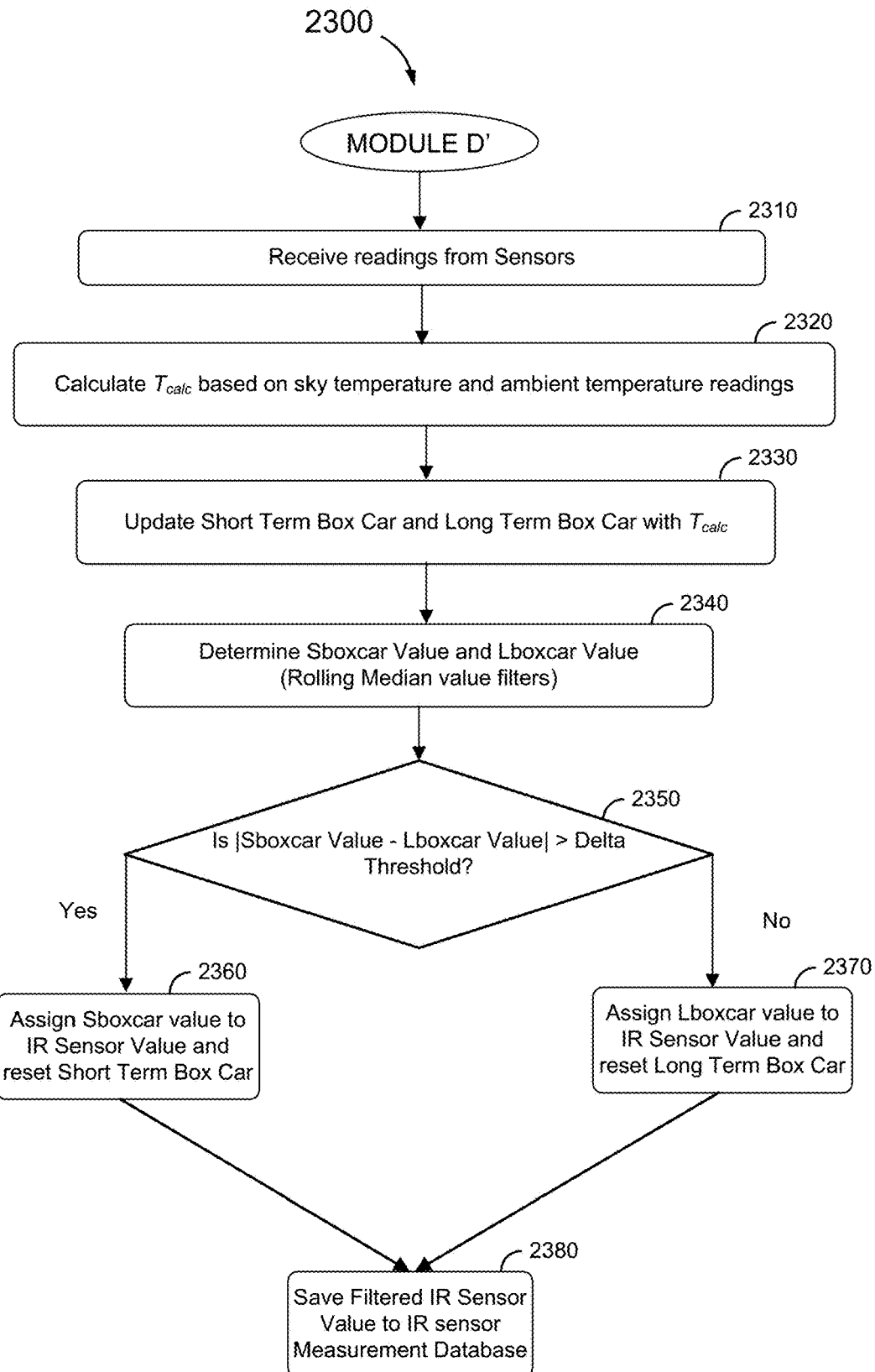
FIG. 23 includes a flowchart depicting control logic of a Module D' for determining a filtered infrared sensor value, according to implementations.

FIG. 23 illustrates a flowchart 2300 depicting logic of Module D', according to certain implementations. The logic of Module D' may be performed by one or more processors of a local window controller, a network controller, a master controller, or a multi-sensor device. At operation 2310, the processor(s) performing the operations of Module D' receives as input sensor readings at a current time. The sensor readings may be received via a communication network at the building, for example, from a rooftop multi-sensor device. The received sensor readings include sky temperature readings ($T_{sky}$) and ambient temperature readings from local sensors at the building ($T_{amb}$) or from weather feed ($T_{weather}$) and/or readings of the difference between $T_{sky}$ and $T_{amb}$ ($\Delta$). The ambient temperature readings from local sensors at the building ($T_{amb}$) are measurements taken by ambient temperature sensors located either onboard an IR sensor device or separate from the IR sensor device. The ambient temperature sensor readings can alternatively be from weather feed data.

In one implementation, the logic of Module D' receives and uses raw sensor readings of measurements taken by two or more IR sensor devices at the building (e.g., of a rooftop multi-sensor device), each IR sensor device having an onboard ambient temperature sensor for measuring ambient temperature ($T_{amb}$) and an onboard infrared sensor directed to the sky for measuring sky temperature ($T_{sky}$) based at least in part on infrared radiation received within its field-of-view. Two or more IR sensor devices are typically used to provide redundancy. In one case, each infrared sensor device outputs readings of ambient temperature ($T_{amb}$) and sky temperature ($T_{sky}$). In another case, each infrared sensor device outputs readings of ambient temperature ($T_{amb}$), sky temperature ($T_{sky}$), and the difference between $T_{sky}$ and $T_{amb}$, delta A. In one case, each infrared sensor device outputs readings the difference between $T_{sky}$ and $T_{amb}$, delta $\Delta$. According to one aspect, the logic of Module D' uses raw sensor readings of measurements taken by two IR sensor devices at the building. In another aspect, the logic of Module D' uses raw sensor readings of measurements taken by 1-10 IR sensor devices at the building.

In another implementation, the logic of Module D' receives and uses raw sky temperature ($T_{sky}$) readings taken by infrared sensors at the building and directed to the sky to received infrared radiation within its field-of-view and ambient temperature readings from weather feed data ($T_{weather}$). The weather feed data is received from one or more weather services and/or other data sources over a communication network. Weather feed data generally includes data associated with weather conditions such as, for example, cloud coverage percentage, visibility data, wind speed data, temperature data, percentage probability of precipitation, and/or humidity. Typically weather feed data is received in a signal through a communication network by a window controller. According to certain aspects, the window controller can send a signal with a request for the weather feed data through a communication interface over the communication network to one or more weather services. The request usually includes at least the longitude and latitude of the location of the window(s) being controlled. In response, the one or more weather services send a signal with weather feed data through the communication network through a communication interface to the window controller. The communication interface and network may be in wired or wireless form. In some cases, a weather service may be accessible through a weather website. An example of a weather website can be found at www.forecast.io. Another example is the National Weather Service (www.weather.gov). The weather feed data may be based at least in part on a current time or may be forecasted at a future time. More details regarding logic that uses weather feed data can be found in international application PCT/US16/41344, filed on Jul. 7, 2016 and titled "CONTROL METHOD FOR TINTABLE WINDOWS," which is hereby incorporated by reference in its entirety.

Returning to FIG. 23, at operation 2320, a temperature value ($T_{calc}$) is calculated based at least in part on sky temperature readings from one or more infrared sensors, ambient temperature readings from either one or more local ambient temperature sensors or from weather feed, and a Cloudy Offset value. The Cloudy Offset value is a temperature offset which determines the first and second threshold values used to determine the cloud condition in Module D. In one implementation, the Cloudy Offset value is −17 millidegrees Celsius. In one example, a Cloudy Offset value of −17 millidegrees Celsius corresponds to a first threshold value of 0 millidegrees Celsius. In one implementation, the Cloudy Offset value is in the range of −30 millidegrees Celsius to 0 millidegrees Celsius.

In one implementation, the temperature value ($T_{calc}$) is calculated based at least in part on sky temperature readings from two or more pairs of thermal sensors. Each pair of thermal sensors having an infrared sensor and an ambient temperature sensor. In one case, the thermal sensors of each pair are integral components of an IR sensor device. Each IR sensor device has an onboard infrared sensor and an onboard ambient temperature sensor. Two IR sensor devices are typically used to provide redundancy. In another case, the infrared sensor and ambient temperature sensor are separate. In this implementation, the temperature value is calculated as:

$$T_{calc} = \text{minimum}(T_{sky1}, T_{sky2}, \ldots) - \text{minimum}(T_{amb1}, T_{amb2}, \ldots) - \text{Cloudy Offset} \quad (\text{Eqn. 2})$$

$T_{sky1}$, $T_{sky2}$, ... are temperature readings taken by the multiple infrared sensors and $T_{amb1}$, $T_{amb2}$, ... are temperature readings taken the multiple ambient temperature sensors. If two infrared sensors and two ambient temperature sensors are used, $T_{calc} = \text{minimum}(T_{sky1}, T_{sky2}) - \text{minimum}(T_{amb1}, T_{amb2}) - \text{Cloudy Offset}$. Minimums of the readings from multiple sensors of the same type are used to bias the result toward lower temperature values that would indicate lower cloud cover and result in higher tint level in order to bias the result toward avoiding glare.

In another implementation, the logic of Module D' may switch from using a local ambient temperature sensor to using weather feed data when ambient temperature sensor readings become unavailable or inaccurate, for example, where an ambient temperature sensor is reading heat radiating from a local source such as from a rooftop. In this implementation, the temperature value ($T_{calc}$) is calculated based at least in part on sky temperature readings and ambient temperature readings from weather feed data ($T_{weather}$). In this implementation, the temperature value is calculated as:

$$T_{calc} = \text{minimum}(T_{sky1}, T_{sky2}, \ldots) - T_{weather} - \text{Cloudy Offset} \quad (\text{Eqn. 3})$$

In another implementation, the temperature value ($T_{calc}$) is calculated based at least in part on readings of the difference, A, between sky temperature and ambient temperature as measured by two or more IR sensor devices, each having an onboard infrared sensor measuring and ambient temperature sensor. In this implementation, the temperature value is calculated as:

$$T_{calc} = \text{minimum}(\Delta_1, \Delta_2, \ldots) - \text{Cloudy Offset} \quad (\text{Eqn. 4})$$

$\Delta_1$, $\Delta_2$, ... are readings of the difference, A, between sky temperature and ambient temperature measured by multiple IR sensor devices. In the implementations that use Eqn. 1, Eqn. 2, and Eqn. 2, the control logic uses the difference between the sky temperature and the ambient temperature to determine the IR sensor value input to Module D to determine a cloud condition. Ambient temperature readings tend to fluctuate less than sky temperature readings. By using the difference between sky temperature and ambient temperature as input to determine tint state, the tint states determined over time may fluctuate to a lesser degree and provide a more stable tinting of the window.

In another implementation, the control logic calculates $T_{calc}$ based only on sky temperature readings from two or more infrared sensors. In this implementation, the IR sensor value determined by Module D' and input into Module D is based at least in part on sky temperature readings and not on ambient temperature readings. In this case, Module D determines a cloud condition based at least in part on sky temperature readings. Although the above described implementations for determining $T_{calc}$ are based at least in part on two or more redundant sensors of each type, it would be understood that the control logic may be implemented with readings from a single sensor of the different types.

At operation 2330, the processor updates the short term box car and long term box car with the $T_{calc}$ determined in operation 2320. To update the box cars, the most recent sensor reading is added to the box cars and the oldest sensor reading is dropped out of the box cars. For Module D and other control logic described herein, filtered sensor values are used as input to making tinting decisions. Module D' and other logic described herein determine filtered sensor values using short term and long term box cars (filters). A short box car (e.g., box car that employs sample values taken over 10 minutes, 20 minutes, 5 minutes, etc.) is based at least in part on a smaller number of sensor samples (e.g., n=1, 2, 3, ... 10, etc.) relative to the larger number of sensor samples (e.g., n=10, 20, 30, 40, etc.) in a long box car (e.g., box car that employs sample values taken over 1 hour, 2 hours, etc.). A box car (illumination) value may be based at least in part on a mean, average, median or other representative value of the sample values in the box car. In one example, the short box car value is a median value of sensor samples and the long box car value is a median value of sensor samples. Module D' typically uses a rolling median value of sensor samples for each of the short box car value and long box car value. In another example, the short box car value is a mean value of sensor samples and the long box car value is a mean value of sensor samples. Module C1 typically uses filtered photosensor values that are determined from short and/or long box car values based at least in part on mean value of sensor samples.

Since a short box car value is based at least in part on a smaller number of sensor samples, short box car values more closely follow the current sensor readings than long box car values. Thus, short box car values respond to rapidly changing conditions more quickly and to a greater degree than the long box car values. Although both the calculated short and long box car values lag behind the sensor readings, short box car values will lag behind to a lesser extent than the long box car values. Short box car values tend to react more quickly than long box car values to current conditions. A long box car filter can be used to smooth the response of the window controller to frequent short duration weather fluctuations like a passing cloud, while a short box car does not smooth as well but responds more quickly to rapid and significant weather changes like overcast conditions. In the case of a passing cloud condition, control logic using only a long box car value will not react quickly to the current passing cloud condition. In this case, the long box car value can be used in tinting decisions to determine an appropriate high tint level. In the case of a fog burning off condition, it may be more appropriate to use a short term box car value in tinting decisions. In this case, the short term box car reacts more quickly to a new sunny condition after the fog burns off. By using the short term box car value to make tinting decisions, the tintable window can quickly adjust to the sunny condition and keeps the occupant comfortable as the fog rapidly burns off.

At operation 2340, the processor determines the short box car value (Sboxcar value) and the long box car value (Lboxcar value) based at least in part on the current sensor readings in the box cars updated at operation 2330. In this example, each box car value is calculated by taking the median value of the sensor readings in the box car after the last update made at operation 2330. In another implementation, each box car value is calculated by taking the mean value of the current sensor readings in each box car. In other implementations, other calculations of the sensor readings in each box car may be used.

In certain implementation, control logic described herein evaluates the difference between the short term box car value and the long term box car value to determine which box car value to implement in making tinting decisions. For example, when the absolute value of the difference between the short term box car value and the long term box car value exceeds a threshold value, the short term box car value may be used in the tinting decisions. In this case, the short box car value of the sensor readings in the short term is larger by the threshold the value of the long term sensor readings which may indicate a short term fluctuation of a large enough significance, e.g., a large cloud that may suggest transitioning to a lower tint state. If the absolute value of the difference between the short and long box car values does not exceed the threshold value, the long term box car is used. Returning to FIG. 23, at operation 2350, the logic evaluates whether the value of the absolute value of the difference between the Sboxcar value and the Lboxcar value is greater than a delta threshold value (|Sboxcar Value−Lboxcar Value|>Delta Threshold). In some cases, the value of the Delta Threshold is in the range of 0 millidegrees Celsius to 10 millidegrees Celsius. In one case, the value of the Delta Threshold is 0 millidegrees Celsius.

If the absolute value of the difference is above the delta threshold value, the Sboxcar value is assigned to the IR sensor value and the short term box car is reset to empty its values (operation 2360). If the absolute value of the difference is not above the delta threshold value, the Lboxcar value is assigned to the IR sensor value and the long term box car is reset to empty its values (operation 2370). At operation 2380, the filtered IR sensor value is saved to the IR sensor Measurement database to be retrieved by Module D. Alternatively, the filtered IR sensor value may be passed directly to Module D.

Example of Control Logic for Making Tinting Decisions Based on Infrared Sensor and/or Photosensor Readings Depending Morning, Daytime, Evening, Nighttime Regions In certain implementations, tinting control logic uses a filtered value of temperature readings from infrared sensor(s) and ambient temperature readings to determine a cloud condition in the morning and evening and/or at a time just before sunrise. Since infrared sensors generally operate independent of sunlight intensity levels, this allows the tinting control logic to determine the cloud condition just before sunrise and as the sun is setting to maintain a proper tint level during the morning and evening. In addition, the readings from the infrared sensor(s) can be used to determine a cloud condition even when the visible light photosensors are shaded or otherwise obstructed. During the daytime when infrared sensors are enabled, the tinting control logic determines a first tint level based at least in part on infrared sensor readings and ambient temperature readings and a second tint level based at least in part on photosensor readings and then uses the maximum of the first and second tint levels. If the IR sensor is not enabled, the control logic uses the second tint level based at least in part on photosensor readings.

In one implementation, the control logic described with respect to FIG. 22 implements Module C1 and/or Module D depending on whether the time, $t_i$, of the calculations is during the morning, daytime or evening regions as determined by solar altitude. An example of this control logic is described in detail with respect to FIG. 24.

Figure 24:
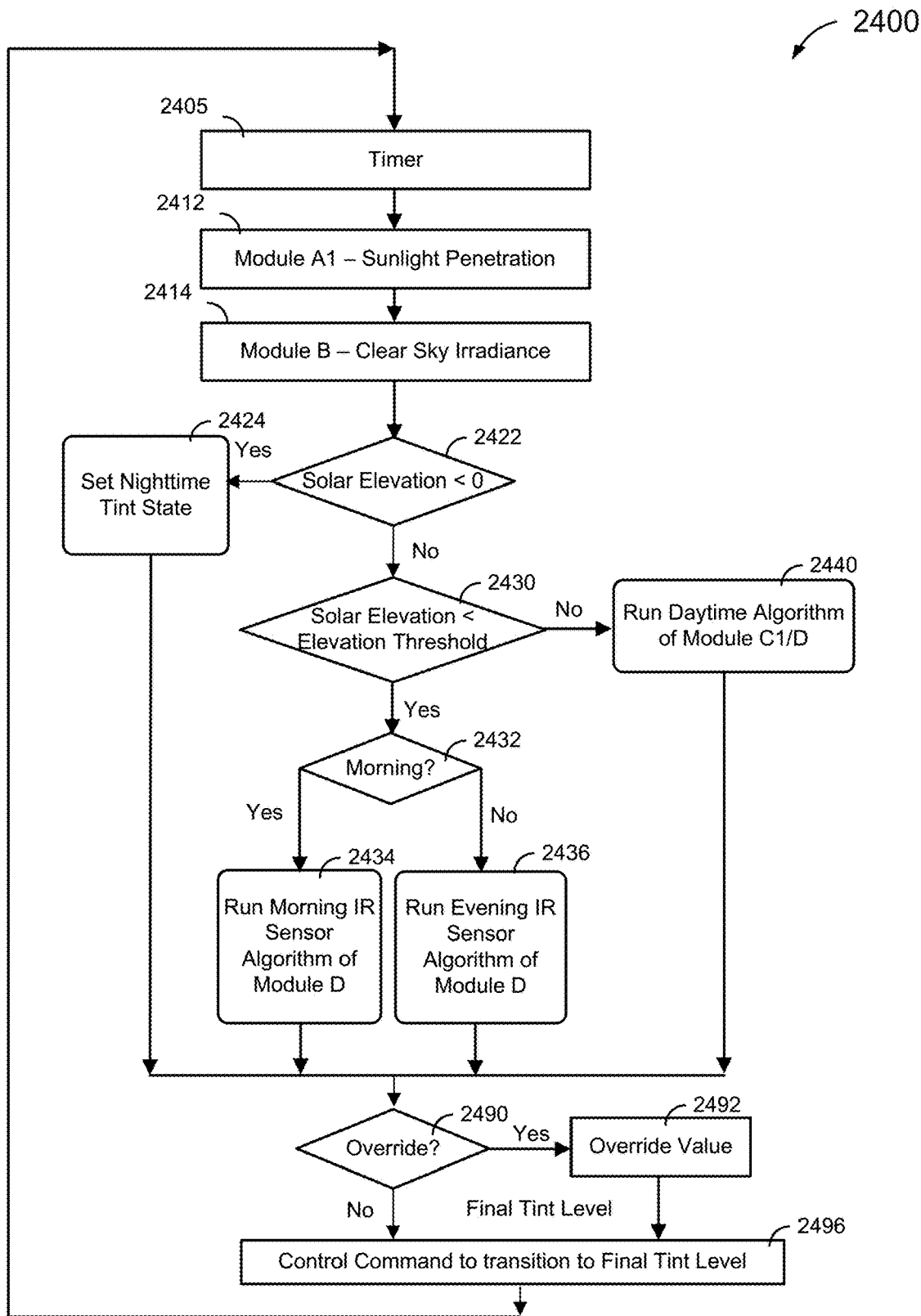
FIG. 24 includes a flowchart depicting control logic for making tinting decisions based on infrared sensor and/or photosensor data depending on whether it is during a morning region, during a daytime time region, during an evening region, or during the nighttime, according to implementations

FIG. 24 illustrates a flowchart 2400 depicting control logic for making tinting decisions using infrared sensor and/or photosensor data depending on whether the time, $t_i$, of the calculations is during the morning, daytime, or evening regions, according to implementations. Examples of certain operations of the control logic described with respect to the flowchart illustrated in FIG. 24 are described with reference to the flowcharts illustrated in FIGS. 26-28. In one aspect, this control logic is predictive logic that calculates a tint level to which the window should transition in advance. In this aspect, the calculations in Modules A1, B, C1, and D are made to determine an appropriate tint level at a future time (i.e. $t_i$=present time plus a time duration such as the transition time of the one or more windows). For example, the time used in the calculations may be a time in the future that is sufficient to allow the transition to be completed after receiving the tint instructions. In these cases, the window controller can send tint instructions in in advance of the transition. By the completion of the transition, the one or more windows will have transitioned to the tint level that is desired for that future time.

In the flowchart 2400 illustrated in FIG. 24, the calculations of the control logic are run at intervals timed by a timer at operation 2405. In one implementation, the logic calculations are performed at constant time intervals. In one example, the logic calculations are done every 2 to 5 minutes. In another example, it may be desirable to make the calculations on a less frequent basis such as every 30 minutes or every 20 minutes such as for tint transition of large area electrochromic windows that can take up to 30 minutes or more to transition.

At operation 2412, the control logic of Module A1 is implemented to determine a tint level that considers occupant comfort from direct sunlight through the one or more electrochromic windows onto an occupant or their activity area. First, the control logic is used to determine whether the sun azimuth is outside the critical angles of the one or more electrochromic windows. The logic of Module A1 is used to calculate the sun's position in the sky based at least in part on the latitude and longitude of the building with the window(s) and the time of day, $t_i$, and the day of the year (date). The sun's position includes the sun azimuthal angle (also referred to as sun azimuth). Publicly available programs can provide the calculations for determining the sun's position. The critical angles are input from a configuration file of the one or more windows. If it is determined that the sun azimuth is outside the critical angles, then it is determined that sunlight is shining at such an angle that direct sunlight is not entering the room or rooms with the one or more windows and the control logic proceeds to Module B at operation 2414. In this case, Module A1 passes a "clear" tint level (i.e. lowest tint state) as input to Module B.

If, on the other hand, it is determined that the sun azimuth is between the critical angles of the one or more windows, then sunlight is shining at an angle that direct sunlight may be entering the room(s) through the one or more windows. In this case, the logic of Module A1 is implemented to calculate the penetration depth at the time, $t_i$, based at least in part on the calculated position of the sun and window configuration information including one or more of the position of the window, dimensions of the window, orientation of the window (i.e. direction facing), and details of any exterior shading. The logic of Module A1 is then implemented to determine a tint level that will provide occupant comfort for the calculated penetration depth based at least in part on the space type of the room by finding the desired tint level for the space type (e.g., office with desk near window, lobby, conference room, etc.) associated with the window(s) for the calculated penetration depth in an occupancy lookup table or other data corresponding different tint levels with space type and penetration depth. The space type and occupancy lookup table or similar data are provided as input to Module A1 from the configuration file associated with the one or more windows. In some cases, the tint level may also be based at least in part on providing sufficient natural lighting into the room(s) with the one or more windows. In this case, the tint level determined for the space type and calculated penetration depth is provided as input to Module B.

An example of an occupancy lookup table is provided in FIG. 25. The values in the table are in terms of a tint level and associated SHGC values in parenthesis. FIG. 25 shows the different tint levels (SHGC values) for different combinations of calculated penetration values and space types. The table is based at least in part on eight tint levels including 0 (lightest), 5, 10, 15, 20, 25, 30, and 35 (lightest). The lightest tint level of 0 corresponds to an SHGC value of 0.80, the tint level of 5 corresponds to an SHGC value of 0.70, the tint level of 10 corresponds to an SHGC value of 0.60, the tint level of 15 corresponds to an SHGC value of 0.50, the tint level of 20 corresponds to an SHGC value of 0.40, the tint level of 25 corresponds to an SHGC value of 0.30, the tint level of 30 corresponds to an SHGC value of 0.20, and the tint level of 35 (darkest) corresponds to an SHGC value of 0.10. The illustrated example includes three space types: Desk 1, Desk 2, and Lobby and six penetration depths.

At operation 2415, the control logic of Module B is implemented to determine a tint level based at least in part on a predicted irradiance under clear sky conditions (clear sky irradiance). Module B is used to predict the irradiance at the one or more windows under clear sky conditions at $t_i$ and the maximum clear sky irradiance at all times. Maximum clear sky irradiance is the highest level of irradiance for all times predicted for clear sky conditions. The clear sky irradiance is calculated based at least in part on the latitude and longitude coordinates of the building, the window orientation (i.e. direction the window is facing), and the time of day, $t_i$, and day of year. The predicted values of clear sky irradiance can be calculated using open source software, such as, for example, Radiance. Module B typically determines a tint level that is darker than the tint level input from Module A1. The tint level determined by Module B transmits less heat than the datum glass is predicted to transmit under maximum clear sky irradiance. The logic of Module B determines the tint level by increases the tint level input from Module A1 in steps and picks a tint level where the predicted Inside Radiation in the room(s) based at least in part on clear sky irradiance at the $t_i$ is less than or equal to the Datum Inside Irradiance where: Inside Irradiance=Tint level SHGC×Clear Sky Irradiance and Datum Inside Irradiance=Datum SHGC×Maximum Clear Sky Irradiance. The SHGC of the datum glass is input into Module B from the configuration file. The tint level from Module B is provided as input to Modules C1 and D.

The control logic makes tinting decisions using infrared sensor and/or photosensor data depending on whether the time $t_i$ is during the morning, daytime, or evening regions. The control logic determines whether the time $t_i$ is in the morning, daytime, evening, nighttime regions based at least in part on the solar elevation. The logic of Module A1 determines the solar position, including the solar elevation angle, at time $t_i$. The solar elevation angle is passed from Module A1 to Modules C1 and D. At operation 2422, the control logic determines whether the calculated solar elevation at time $t_i$ is less than 0. If the solar elevation at time $t_i$ is determined to be less than 0, it is nighttime and the control logic sets a nighttime tint state at operation 2424. An example of a nighttime tint state is a cleared tint level which is the lowest tint state. A cleared tint level may be used as a nighttime tint state, for example, to provide security by allowing security personnel outside the building to see inside lighted room(s) of the building through the cleared windows. Another example of a nighttime tint state is a highest tint level, which can also provide privacy and/or security by not allowing others to see inside the building at nighttime when the windows are in the darkest tint state. If the solar elevation at time $t_i$ is determined to be less than 0, the control logic determines whether there is an override in place at operation 2490. If an override is not in place, the final tint level is set to the nighttime tint level. If an override is in place, the control logic sets the final tint level to the override value at operation 2492. At operation 2496, the control logic is implemented to communicate the final tint level to transition the one or more windows to the final tint level. The control logic then proceeds to the timer at operation 2405 to make calculations at the next time interval.

If the calculated solar elevation at time $t_i$ is determined to be greater than or equal to 0 at operation 2422, the control logic determines whether the solar elevation is less than a solar elevation threshold value at operation 2430. If the solar elevation is less than the solar elevation threshold, then the time $t_i$ is either in the morning or evening. In one example, the solar elevation threshold value is less than 10 degrees. In another example, the solar elevation threshold value is less than 15 degrees. In another example, the solar elevation threshold value is less than 20 degrees. If the solar elevation is less than the solar elevation threshold, the control logic determines whether the solar elevation is increasing.

At operation 2432, the control logic is used to determine whether it is morning based at least in part on whether the solar elevation is increasing or decreasing. The control logic determines whether the solar elevation is increasing or decreasing by comparing calculated solar elevation values taken at $t_i$ and another time. If the control logic determines that the solar elevation is increasing, it is determined to be morning and the control logic runs a morning IR sensor algorithm implementation of Module D at operation 2434. An example of a morning IR sensor algorithm that can be used is described with respect to the flowchart 2600 in FIG. 26. Module D typically queries the infrared sensor measurements database for a filtered IR sensor value for the current time and determines a cloud condition and associated tint level based at least in part on the filtered IR sensor value. If the filtered IR sensor value is below a lower threshold value, it is a "sunny" condition and the tint level from Module D set to the highest tint level. If the filtered IR sensor value is above an upper threshold value, it is a "Cloudy" condition and the tint level from Module D is set to the lowest tint level. If the filtered IR sensor value is less than or equal to the upper threshold value and greater than or equal to the lower threshold value, the tint level from Module D is set to an intermediate tint level. If the control logic determines that the solar elevation is not increasing (decreasing) at operation 2432, it is determined to be evening and the control logic runs an evening IR sensor algorithm implementation of Module D at operation 2436. An example of an evening IR sensor algorithm that can be used is described with respect to the flowchart 2700 illustrated in FIG. 27.

After running either the morning or evening IR sensor algorithms of Module D to determine a tint level based at least in part on Module D, the control logic determines whether in override is in place at operation 2490. If an override is not in place, the final tint level is set to the tint level determined by Module D. If an override is in place, the control logic sets the final tint level to the override value at operation 2492. At operation 2496, the control logic is implemented to communicate the final tint level to transition the one or more electrochromic devices on the one or more windows to the final tint level. The control logic then proceeds to the timer at operation 2405 to make calculations at the next time interval.

If it is determined at operation 2430 that the solar elevation is not less than (greater than or equal to) the solar elevation threshold, then the time $t_i$ is during the daytime region and the control logic runs a daytime algorithm which implements Module C1 and/or Module D to determine a tint level based at least in part on photosensor and/or infrared sensor readings (operation 2440). The control logic then determines whether in override is in place at operation 2490. If an override is not in place, the final tint level is set to the tint level determined by the daytime algorithm of Module C1 and/or Module D. An example of a daytime algorithm that can be used is described with respect to the flowchart 2800 illustrated in FIG. 28. If an override is in place, the control logic sets the final tint level to the override value at operation 2492. At operation 2496, the control logic is implemented to communicate the final tint level to transition the one or more windows to the final tint level. The control logic then proceeds to the timer at operation 2405 to make calculations at the next time interval.

In one embodiment, instead of running a morning IR sensor algorithm of Module D at operation 2434, an evening IR sensor algorithm of Module D at operation 2436, and a daytime algorithm of Module C1 and/or Module D at operation 2440, a morning photosensor algorithm of Module C is used at operation 2434, an evening photosensor algorithm of Module C1 is used at operation 2436, and a daytime algorithm of Module C1 is used at operation 2440.

Examples of Morning IR Sensor Algorithm and Evening IR Sensor Algorithm of Module D Module D queries an infrared sensor measurements database for a filtered IR sensor value (or receives the value directly from another logic module) and then determines a cloud condition and associated tint level based at least in part on the filtered IR sensor value. If the filtered IR sensor value is below a lower threshold value, it is a "sunny" condition and the tint level from Module D set to the highest tint level. If the filtered IR sensor value is above an upper threshold value, it is a "Cloudy" condition and the tint level from Module D is set to the lowest tint level. If the filtered IR sensor value is less than or equal to the upper threshold value and greater than or equal to the lower threshold value, the tint level from Module D is set to an intermediate tint level. The upper and lower threshold values used in these calculations are based at least in part on whether the morning IR sensor algorithm, evening IR sensor algorithm, or daytime algorithm is being implemented.

Figure 29:
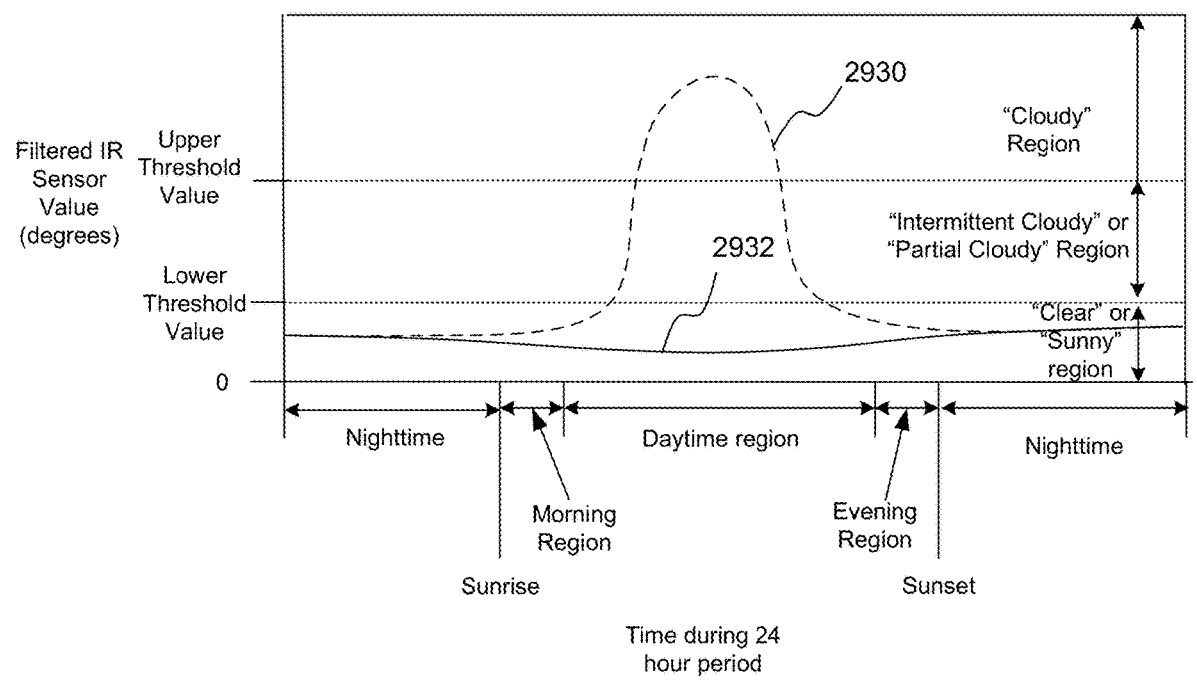
FIG. 29 shows a graph of filtered infrared sensor values in millidegrees vs time during a 24 hour period, according to an implementation.

FIG. 29 shows a graph of filtered IR sensor values in millidegrees Celsius vs time during a 24 hour period. The graph shows three regions of ranges of filtered IR sensor values. The upper region above the upper threshold value is the "Cloudy" region. A filtered IR sensor value above the upper threshold value is in the "Cloudy" region. The mid region between the upper threshold value and the lower threshold value is the "Intermittent Cloudy" or "Partial Cloudy" region. The lower region below the lower threshold value is the "Clear" region also referred to as "Sunny" region. A filtered IR sensor value below the upper threshold value is in the "Clear" or "Sunny" region. The graph has two curves of the calculated filtered IR sensor values based at least in part on readings taken over two 24 hour periods. The first curve 2930 shows the calculated filtered IR sensor values taken during a first day with clouds in the afternoon. The second curve 2932 shows the calculated filtered IR sensor values taken during a second day that is sunny/clear all day. The lower threshold value describes the lower boundary between the mid region and the lower region. The upper threshold value describes the upper boundary between the mid region and the upper region. The lower and upper threshold values used during the evening (evening lower threshold value and evening upper threshold value) are typically higher than the lower and upper threshold values used during the morning (morning lower threshold value and morning upper threshold value).

Figure 26:
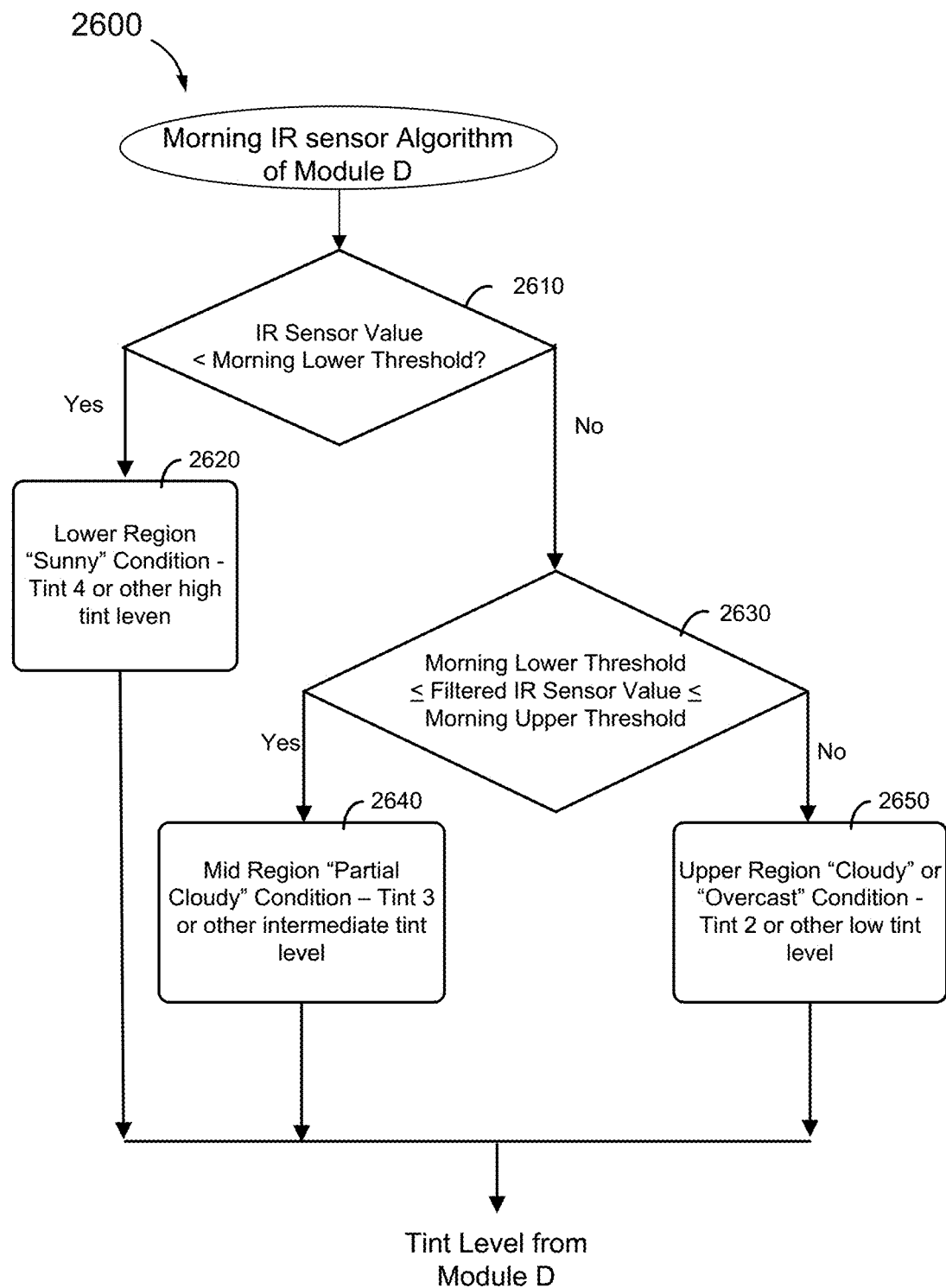
FIG. 26 includes a flowchart depicting control logic for determining a tint level from Module D when the current time is during a daytime region, according to certain aspects.

FIG. 26 illustrates a flowchart 2600 depicting control logic of a morning IR sensor algorithm implementation of Module D. The morning IR sensor algorithm can be implemented when tinting control logic determines that the current time is during a morning region. The morning IR sensor algorithm is an example of control logic that can be implemented at operation 2434 of the flowchart shown in FIG. 24 when the control logic determines that the solar elevation angle is less than an elevation threshold value and the solar elevation angle is increasing.

The control logic of the flowchart 2600 starts at operation 2610 and the filtered IR sensor value is compared with a Morning Lower threshold value to determine whether the filtered IR sensor value is less than the Morning Lower threshold value. The control logic of Module D queries an infrared sensor measurements database or other database to retrieve the filtered IR sensor value. Alternatively, the control logic calculates the filtered IR sensor value. An example of control logic that can be used to calculate the filtered IR sensor value and store the value to the infrared sensor measurements database is the control logic of Module D' described with reference to the flowchart in FIG. 23. The Morning Lower threshold value is the temperature value at the lower boundary of the filtered IR sensor values between the lower region ("Sunny" or "Clear" region) and the mid region ("Partly Cloudy" region) that applies during the morning region. In certain implementations, the Morning Lower threshold value is in the range of −20 and 20 millidegrees Celsius. In one example, the Morning Lower threshold value is 1 degree Celsius.

If it is determined at operation 2610 that the filtered IR sensor value is less than the Morning Lower threshold value, the filtered IR sensor value is in a lower region which is the "Clear" or "Sunny" region. In this case, the control logic sets the tint level from Module D to a high tint state (e.g. tint level 4) and passes the tint level from Module D (operation 2620).

If it is determined at operation 2610 that the filtered IR sensor value is not less than the Morning Lower threshold value, the control logic proceeds to determine whether the filtered IR sensor value is less than or equal to a Morning Upper threshold value and greater than or equal to a Morning Lower threshold value at operation 2630. The Morning Upper threshold is the temperature at the upper boundary of the filtered IR sensor values between the mid region ("Partly Cloudy" region) and the upper region ("Cloudy" region) that applies during the morning region of the day. In certain implementations, the Morning Upper threshold value is in the range of −20 and 20 millidegrees Celsius. In one example, the Morning Upper threshold value is 3 millidegrees Celsius.

If it is determined at operation 2630 that the filtered IR sensor value is less than or equal to the Morning Upper threshold value and greater than or equal to the Morning Lower Threshold Value, the filtered IR sensor value is determined to be in a mid-region that is the "Partial Cloudy" region (operation 2640). In this case, the control logic sets the tint level of Module D to an intermediate tint state (e.g. tint level 2 or 3) and the tint level from Module D is passed.

If it is determined at operation 2630 that the filtered IR sensor value is not less than or equal to the Morning Upper threshold value and greater than or equal to the Morning Lower Threshold Value (i.e., the filtered sensor value is greater than the Morning Upper threshold value), the filtered IR sensor value is determined to be in an upper region that is the "Cloudy" (operation 2650). In this case, the control logic sets the tint level of Module D to a low tint state (e.g. tint level 2 or lower tint level) and the tint level from Module D is passed.

Figure 27:
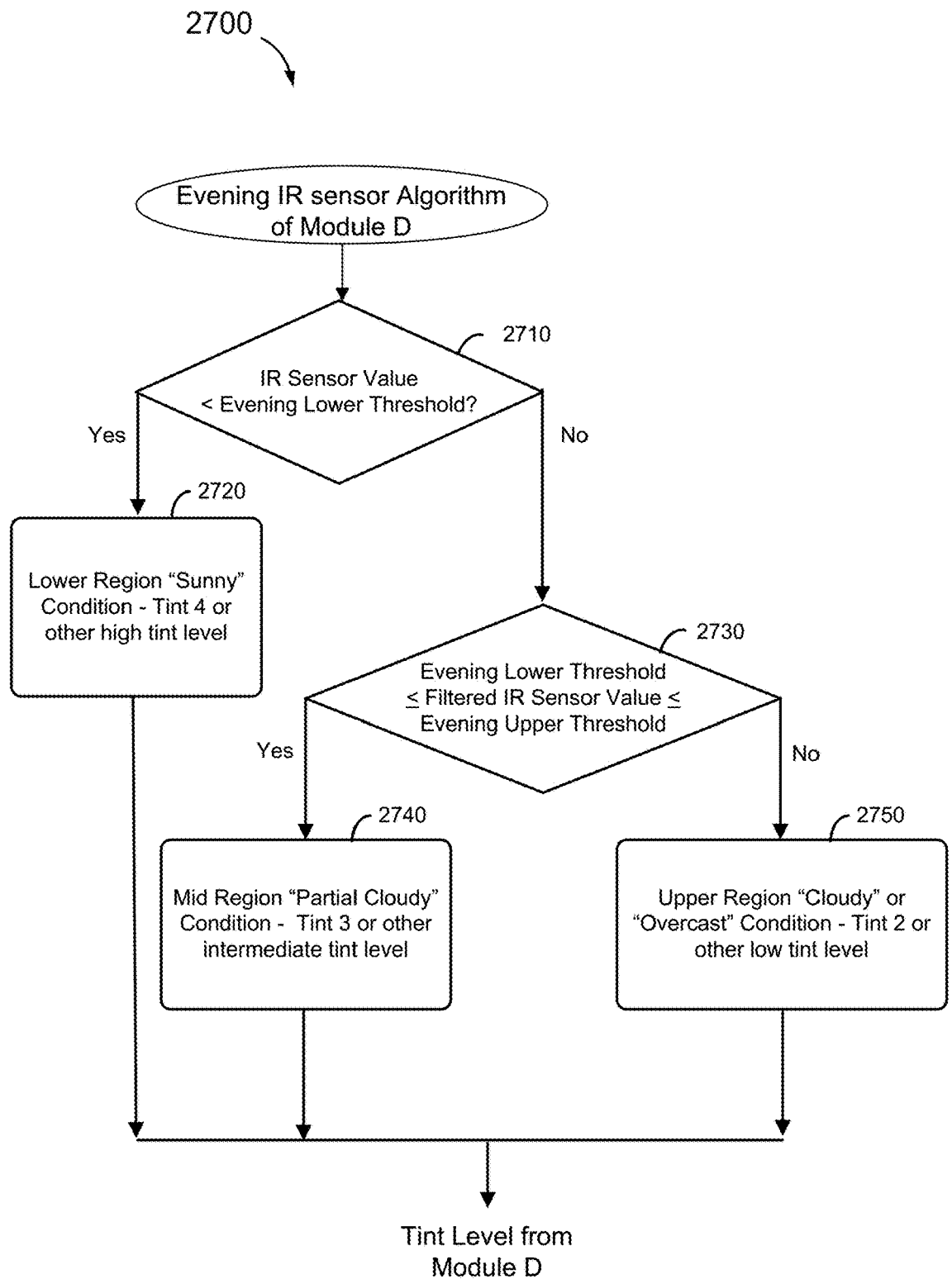
FIG. 27 includes a flowchart depicting control logic for determining a tint level from Module D when the current time is during an evening region, according to certain aspects.

FIG. 27 illustrates a flowchart 2700 depicting control logic of an evening IR sensor algorithm implementation of Module D. The evening IR sensor algorithm can be implemented when tinting control logic determines that the current time is during an evening region. The evening IR sensor algorithm is an example of control logic that can be implemented at operation 2436 of the flowchart shown in FIG. 24 when the control logic determines that the solar elevation angle is less than an elevation threshold value and the solar elevation angle is decreasing.

The control logic of the flowchart 2700 starts at operation 2710 and the filtered IR sensor value is compared with an Evening lower threshold value to determine whether the filtered IR sensor value is less than the Evening Lower threshold value. The control logic of Module D queries an infrared sensor measurements database or other database to retrieve the filtered IR sensor value. Alternatively, the control logic calculates the filtered IR sensor value. An example of control logic that can be used to calculate the filtered IR sensor value and store the value to the infrared sensor measurements database is the control logic of Module D' described with reference to the flowchart in FIG. 23. The Evening Lower threshold value is the temperature value at the lower boundary of the filtered IR sensor values between the lower region ("Sunny" or "Clear" region) and the mid region ("Partly Cloudy" region) that applies during the evening region. In certain implementations, the Evening Lower threshold value is in the range of −20 and 20 millidegrees Celsius. In one example, the Evening Lower threshold value is 2 millidegrees Celsius.

If it is determined at operation 2710 that the filtered IR sensor value is less than the Evening Lower threshold value, the filtered IR sensor value is in a lower region which is the "Clear" or "Sunny" region. In this case, the control logic sets the tint level from Module D to a high tint state (e.g. tint level 4) at operation 2720 and passes the tint level from Module D.

If it is determined at operation 2710 that the filtered IR sensor value is not less than the Evening Lower threshold value, the control logic proceeds to determine whether the filtered IR sensor value is less than or equal to an Evening Upper threshold value and greater than or equal to an Evening Lower threshold value at operation 2730. The Evening Upper threshold is the temperature at the upper boundary of the filtered IR sensor values between the mid region ("Partly Cloudy" region) and the upper region ("Cloudy" region) that applies during the evening region of the day. In certain implementations, the Evening Upper threshold value is in the range of −20 and 20 millidegrees Celsius. In one example, the Evening Upper threshold value is 5 millidegrees Celsius.

If it is determined at operation 2730 that the filtered IR sensor value is less than or equal to the Evening Upper threshold value and greater than or equal to the Evening Lower Threshold Value, the filtered IR sensor value is determined to be in a mid-region that is the "Partial Cloudy" region (operation 2750). In this case, the control logic sets the tint level of Module D to an intermediate tint state (e.g. tint level 2 or 3) and the tint level from Module D is passed.

If it is determined at operation 2730 that the filtered IR sensor value is not less than or equal to the Evening Upper threshold value and greater than or equal to the Evening Lower Threshold Value (i.e., the filtered sensor value is greater than the Evening Upper threshold value), the filtered IR sensor value is determined to be in an upper region that is the "Cloudy" (operation 2740). In this case, the control logic sets the tint level of Module D to a low tint state (e.g. tint level 2 or lower tint level) and this tint level from Module D is passed.

Example of Daytime Algorithm of Module C1 and or Module D

During the daytime, temperature readings taken by an infrared sensor can tend to fluctuate if the local area around the infrared sensor is heated up. For example, an infrared sensor located on a rooftop may be heated by the rooftop as it absorbs heat from the midday sun. In certain implementations, a daytime algorithm disables the use of IR sensor readings in its tinting decisions under certain circumstances and uses Module C1 to determine tint level from photosensor readings alone. In other circumstances, the daytime algorithm determines a first tint level based at least in part on IR sensor readings using Module D, determines a second tint level based at least in part on photosensor readings using Module C1, and then sets the tint level to the maximum of the first and second tint levels.

Figure 28:
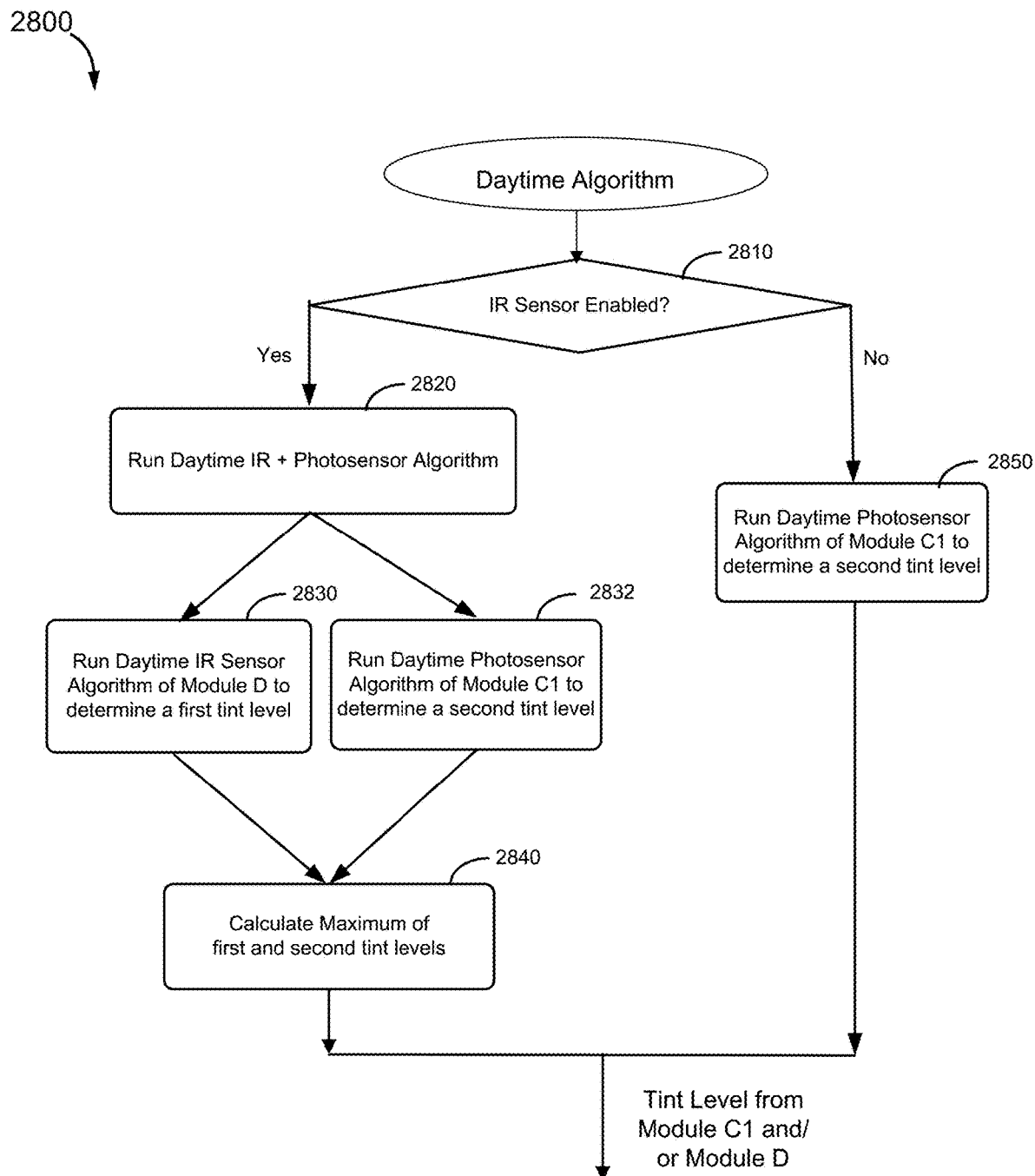
FIG. 28 includes a flowchart depicting control logic for determining a tint level from Module C1 and/Module D when the current time is during a daytime region, according to certain aspects.

FIG. 28 illustrates a flowchart 2800 depicting control logic of a daytime algorithm that can implement a daytime IR sensor algorithm of Module C1 and/or a daytime photosensor algorithm of Module D. The daytime algorithm is used when tinting control logic determines that the current time is during a daytime region. The daytime algorithm is an example of control logic that can be implemented at operation 2440 of the flowchart shown in FIG. 24 when the solar elevation angle is greater than or equal to 0 and less than or equal to the elevation threshold.

At operation 2810, it is determined whether using IR sensor readings is enabled. In one case, the default setting for tinting control logic is to disable using the IR sensor readings unless photosensor readings are unavailable, for example, due to malfunctioning photosensors. In another case, the control logic disables using the IR sensor readings if the IR sensor data is not available, for example, due to malfunctioning IR sensors. If it is determined at operation 2810 that the using IR sensor readings is enabled, the control logic runs both the daytime IR sensor algorithm of Module D and the daytime photosensor algorithm of Module C1 (operation 2820). If it is determined at operation 2810 that the using IR sensor readings is not enabled, the control logic runs the daytime photosensor algorithm of Module C1 (operation 2850).

At operation 2830, the logic of a daytime IR sensor algorithm of Module D is run to determine a first tint state. A filtered IR sensor value is retrieved from an infrared sensor measurements database or other database. Alternatively, the logic of the daytime IR sensor algorithm calculates the filtered IR sensor value. An example of logic that can be used to calculate the filtered IR sensor value and store the value to the infrared sensor measurements database is the control logic of Module D' described with reference to the flowchart in FIG. 23. The logic of the daytime IR sensor algorithm compares the filtered IR sensor value with a daytime lower threshold to determine whether the filtered IR sensor value is less than the Daytime Lower threshold, greater than the Daytime Upper threshold, or between the Daytime Lower and Upper thresholds. The Daytime Lower threshold is the temperature at the lower boundary of the filtered IR sensor values between the lower region ("Sunny" or "Clear" region) and the mid region ("Partly Cloudy" region) that applies during the daytime region. In certain implementations, the Daytime Lower threshold value is in the range of −20 and 20 millidegrees Celsius. In one example, the Daytime Lower threshold value is −1 millidegrees Celsius. The Daytime Upper threshold value is the temperature value at the upper boundary of the filtered IR sensor values between the mid region ("Partly Cloudy" region) and the upper region ("Cloudy" region) that applies during the evening region of the day. In certain implementations, the Daytime Upper threshold is in the range of −20 and 20 millidegrees Celsius. In one example, the Daytime Upper threshold is 5 millidegrees Celsius. If it is determined that the filtered IR sensor value is less than the Daytime Lower threshold value, the filtered IR sensor value is in a lower region which is the "Clear" or "Sunny" region. In this case, the control logic sets the first tint level from Module D to a high tint state (e.g. tint level 4). If it is determined that the filtered IR sensor value is less than or equal to a Daytime Upper threshold value and greater than or equal to an Upper Daytime threshold value, the filtered IR sensor value is determined to be in a mid-region that is the "Partial Cloudy" region. In this case, the control logic sets the first tint level to an intermediate tint state (e.g. tint level 2 or 3). If it is determined that the filtered IR sensor value is not less than or equal to the Daytime Upper threshold value and greater than or equal to the Daytime Lower Threshold Value (i.e., the filtered sensor value is greater than the Daytime Upper threshold value), the filtered IR sensor value is determined to be in an upper region that is the "Cloudy" region. In this case, the control logic sets the first tint level of Module D to a low tint state (e.g. tint level 2 or lower tint level).

At operation 2832, the logic of a daytime photosensor sensor algorithm of Module C1 is run to determine a second tint level. Module C1 determines the second tint level based at least in part on real-time irradiance using photosensor readings. An example of control logic of Module C1 that can be used to determine the second tint level is described with respect to a flowchart 3000 shown in FIG. 30 in the section below.

At operation 2840, the logic of the daytime algorithm calculates the maximum of the first tint state using Module D based at least in part on IR sensor readings and the second tint state using Module C1 based at least in part on photosensor readings. The tint level from the daytime algorithm is set to the maximum of the calculated first tint state based at least in part on IR sensor readings and the calculated second tint state based at least in part on photosensor readings. The tint level from Module C1 is returned.

If it is determined at operation 2810 that the using IR sensor readings is not enabled, the control logic runs the daytime photosensor algorithm of Module C1 (operation 2850). At operation 2850, the logic of the daytime photosensor sensor algorithm of Module C1 is run to determine the second tint level. In this case, the tint state from the daytime algorithm is set to second tint level based at least in part on photosensor readings and this tint level from Module C1 is returned. An example of control logic of Module C1 that can be used to determine the second tint level is described with respect to the flowchart shown in FIG. 30.

Example of Module C1

Figure 30:
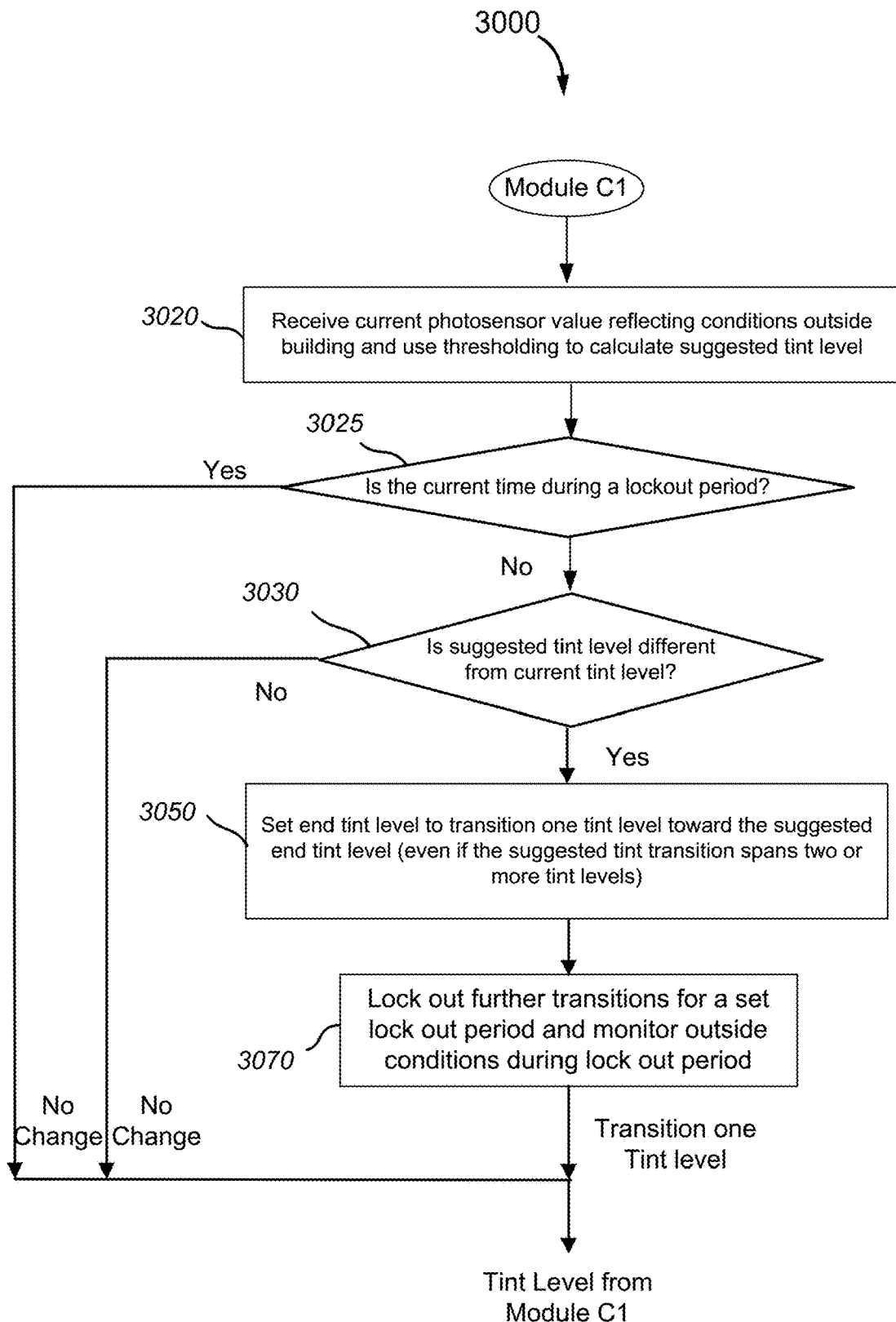
FIG. 30 includes a flowchart depicting control logic of a Module C1 for determining a tint level for the one or more electrochromic windows in a building, according to an implementation.

As shown, FIG. 30 includes a flowchart 3000 depicting control logic of an example of Module C1 for determining a tint level for the one or more electrochromic windows, according to one aspect. Module C1 receives as input a tint level from Module B.

At operation 3020, a current photosensor value is received reflecting conditions outside the building and thresholding is implemented to calculate a suggested tint level to apply. In one example, the current photosensor value is a maximum value of of measurements taken by a plurality of photosensors (e.g, 13 photosensors of a multi-sensor device) at one sample time. In another example, the photosensor value is a filtered rolling mean of multiple readings taken at different sample times, where each reading is the maximum value of measurements taken by a plurality of photsensors. An example of control logic that can be used to calculate a current photosensor value is described in a flowchart 3100 in FIG. 31 which depicts control logic of a Module C'.

Returning to FIG. 30, at operation 3020, thresholding is used to calculate the suggested tint level by determining whether the current filtered photosensor value has crossed one or more thresholds over a period of time. The period of time may be, for example, the time period between the current time and the last sample time taken by the photosensors or between the current time and the first of multiple sample readings previously taken. Photosensor readings may be taken on a periodic basis such as once a minute, once every 10 seconds, once every 10 minutes, etc. In one implementation, thresholding uses two threshold values: a lower photosensor threshold value and an upper photosensor threshold value. If it is determined that the photosensor value is higher than the upper photosensor threshold value, the photosensor value is in a higher region which is the "Clear" or "Sunny" region. In this case, the control logic determines the suggested tint level from Module C1 is a high tint state (e.g. tint level 4). If it is determined that the photosensor value is less than or equal to the Upper photosensor threshold value and greater than or equal to the Lower photosensor Threshold Value, the photosensor value is determined to be in a mid-region that is the "Partial Cloudy" region. In this case, the control logic determines the suggested tint level from Module C1 is an intermediate tint state (e.g. tint level 2 or 3). If it is determined that the photosensor sensor value is greater than the Evening Upper threshold value, the photo sensor value is determined to be in an upper region that is the "Cloudy" region. In this case, the control logic determines the suggested tint level from Module C1 to a low tint state (e.g. tint level 2 or lower tint level).

If the current time is the instant in time after the lockout period has ended, the control logic calculates the suggested tint level at operation 3020 based at least in part on the conditions monitored during the lockout period. The suggested tint level calculated based at least in part on the conditions monitored during the lockout period is based at least in part on a statistical evaluation of the monitored input. Various techniques can be used for the statistical evaluation of the input monitored during the wait time. One example is tint level averaging during the wait time. During the wait time, the control logic implements an operation that monitors the input and calculates tint levels determined, for example, using one or more of modules A1, B and C1. The operation then averages the determined tint levels over the wait time to determine which direction is suggested for a one tint region transition.

At operation 3025, it is determined whether the current time is during a lockout period. If the current time is during a lockout period, Module C1 does not change the tint level received from Module B. During the lockout period, photosensor values of outside conditions are monitored. In addition, the control logic monitors the suggested tint levels determined by operation 3020 during the lockout period. If the current time is determined to not be during a lockout period, the control logic proceeds to operation 3030.

At operation 3030, the logic of Module C1 goes on to determine whether the current information suggests a tint transition. This operation 3030 compares the suggested tint level determined in operation 3020 with the current tint level applied to the one or more windows to determine whether the tint levels are different. If the suggested tint level is not different from the current tint level, the tint level is not changed.

At operation 3050, if the suggested tint level is different from the current tint level, Module C1 sets a new tint level that is one tint level toward the suggested tint level determined in operation 3020 (even if the suggested tint level is two or more tint levels from the current tint level). For example, if the suggested tint region determined in operation 3020 is from a first tint level to a third tint level, the tint level returned by Module C1 is to transition one tint level to a second tint level.

At operation 3070, a lock out period is set to lock out from transitions to other tint levels during the lockout period. During the lockout period, photosensor values of outside conditions are monitored. In addition, the control logic calculates a suggested tint region during intervals based at least in part on the conditions monitored during the lockout period. The new tint level passed from Module C1 is determined at operation 3050 as one tint level toward the suggested tint level determined in operation 3020.

Example of Module C1'

Figure 31:
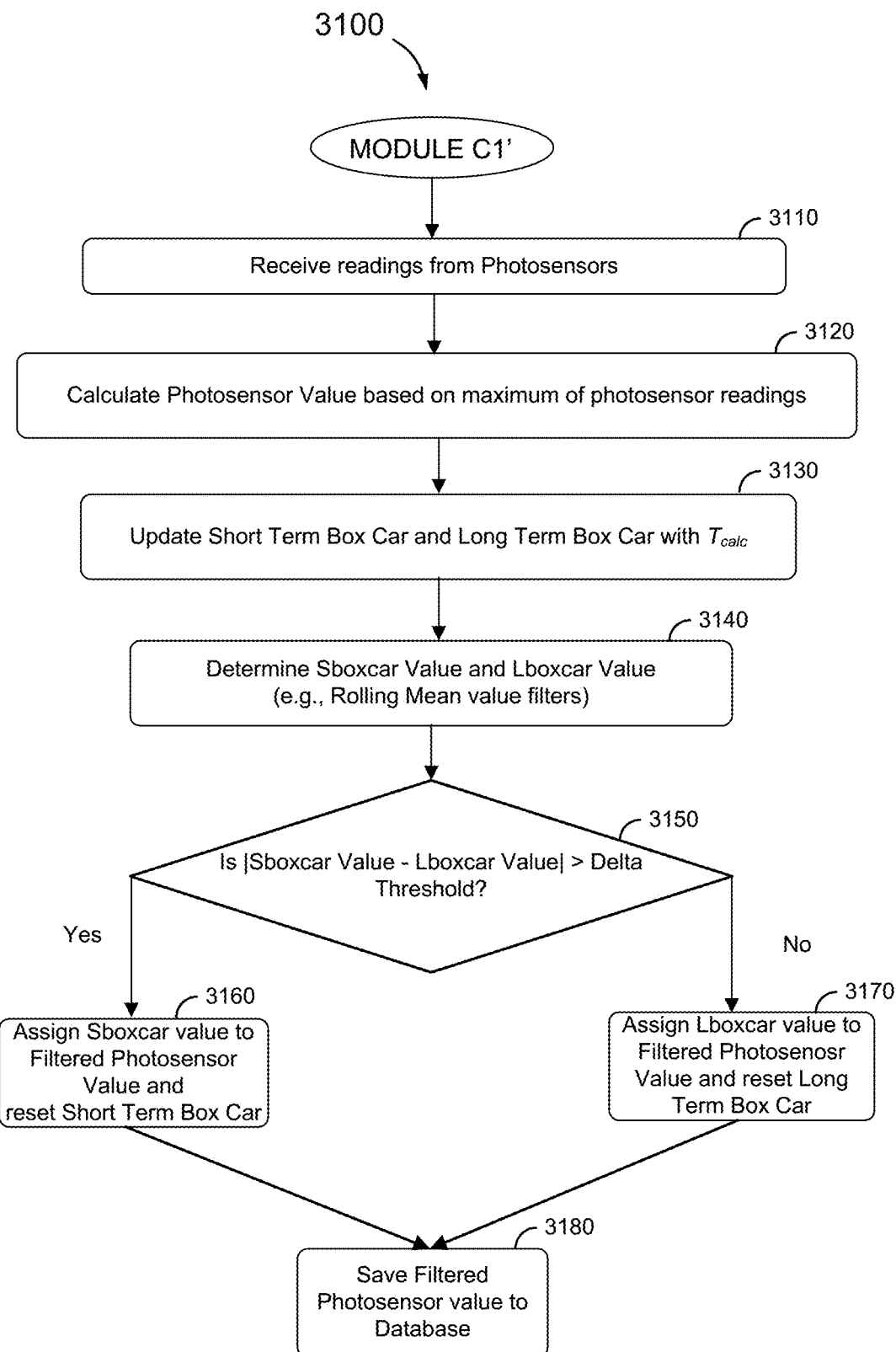
FIG. 31 includes a flowchart depicting control logic of a Module C' for determining a filtered photosensor value, according to implementations.

FIG. 31 illustrates a flowchart 3100 depicting logic of Module C1', according to certain implementations. The logic of Module C1' may be performed by one or more processors of a local window controller, a network controller, a master controller, or a multi-sensor device. At operation 3110, the processor(s) performing the operations of Module C1' receives as input photosensor readings at a current time. The photosensor readings may be received via a communication network at the building, for example, from a rooftop multi-sensor device. The received photosensor readings are real-time irradiance readings.

In one implementation, the logic of Module C1' receives and uses raw photosensor readings of measurements taken by two or more photosensors at the building (e.g., of a rooftop multi-sensor device). Two or more photosensors are typically used to provide redundancy. According to one aspect, the logic of Module C1' uses raw photosensor readings of measurements taken by two photosensor devices at the building. In another aspect, the logic of Module C1' uses raw photosensor readings of measurements taken by 1-10 photosensors at the building. In another aspect, the logic of Module C1' uses raw photosensor readings of measurements taken by thirteen (13) photosensors at the building.

At operation 3120, a photosensor value is calculated based at least in part on raw measurements taken by two or more photosensors. For example, the photosensor value may be calculated as the maximum value of measurements taken by the two or more photosensors at a single sample time.

At operation 3130, the processor(s) updates the short term box car and long term box car with the photosensor value determined in operation 3120. In Module C1' and other control logic described herein, filtered photosensor values are used as input to making tinting decisions. Module C1' and other logic described herein determines filtered sensor values using short term and long term box cars (filters). A short box car (e.g., box car that employs sample values taken over 10 minutes, 20 minutes, 5 minutes, etc.) is based at least in part on a smaller number of sensor samples (e.g., n=1, 2, 3, ... 10, etc.) relative to the larger number of sensor samples (e.g., n=10, 20, 30, 40, etc.) in a long box car (e.g., box car that employs sample values taken over 1 hour, 2 hours, etc.). A box car (illumination) value may be based at least in part on a mean, average, median or other representative value of the sample values in the box car. In one example, the short box car value is a mean value of sensor samples and the long box car value is a mean value of photosensor samples. Module D' typically uses a rolling mean value of sensor samples for each of the short box car value and long box car value. In another example, the short box car value is a mean value of sensor samples and the long box car value is a mean value of sensor samples.

At operation 3140, the processor determines the short box car value (Sboxcar value) and the long box car value (Lboxcar value) based at least in part on the current photosensor readings in the box cars updated at operation 3130. In this example, each box car value is calculated by taking the mean value of the photosensor readings in the box car after the last update made at operation 3130. In another example, each box car value is calculated by taking the median value of the photosensor readings in the box car after the last update made at operation 3130.

At operation 3150, the logic evaluates whether the value of the absolute value of the difference between the Sboxcar value and the Lboxcar value is greater than a delta threshold value (|Sboxcar Value−Lboxcar Value|>Delta Threshold). In some cases, the value of the Delta Threshold is in the range of 0 millidegrees Celsius to 10 millidegrees Celsius. In one case, the value of the Delta Threshold is 0 millidegrees Celsius.

If the difference is above the delta threshold value, the Sboxcar value is assigned to the photosensor value and the short term box car is reset to empty its values (operation 3160). If the difference is not above the delta threshold value, the Lboxcar value is assigned to the photosensor value and the long term box car is reset to empty its values (operation 3170). At operation 3180, the photosensor value is saved to a database.

Although a single infrared sensor is described as included in the infrared cloud detector of certain implementations, two or more infrared sensors can be used, according to another implementation, for redundancy in case one malfunctions and/or is obscured by, for example, bird droppings or another environmental agent. In one aspect, two or more infrared sensors can be included that face different orientations to capture infrared radiation from different fields-of-view and/or at different distances from the building/structure. If two or more infrared sensors are located within a housing of the infrared cloud detector, the infrared sensors are typically offset from one another by a distance sufficient to reduce the likelihood that an obscuring agent would affect all the infrared sensors. For example, the infrared sensors may be separated by at least about one inch or at least about two inches.

In certain embodiments described herein, control logic determines tint levels based on a condition that is likely to occur at a future time (also referred to herein as a "future condition"). For example, a tint level may be determined based on the likelihood of the occurrence of a cloud condition at a future time (e.g., $t_i$=present time+time duration such as the transition time for the one or more electrochromic windows). The future time used in these logic operations may be set to a time in the future that is sufficient to allow the transition of the window to the tint level to be completed after receiving the control instructions. In these cases, a controller can send instructions in the present time in advance of the actual transition. By the completion of the transition, the window will have transitioned to the tint level that is desired for that future time. In other embodiments, the disclosed control logic may be used to determine tint levels based on a condition occurring or likely to occur at present time, e.g., by setting the time duration to 0. For example, in certain electrochromic windows the transition time to a new tint level, e.g., to an intermediate tint level, may be very short so that sending instructions to transition to a tint level based on the present time would be appropriate.

It should be understood that the present invention as described above can be implemented in the form of control logic using computer software in a modular or integrated manner. Based at least in part on the disclosure and teachings provided herein, a person of ordinary skill in the art will know and appreciate other ways and/or methods to implement the present invention using hardware and a combination of hardware and software.

FIG. 33A shows an example of a plurality of photosensors 3342 that are arranged to point radially outward about an axis of a multi-sensor device 3301. In one embodiment, the photosensors provide a radiance based 360-degree view of the environment, where at any given time, only one maximum radiance value from a plurality (e.g., all) of the photosensors is used by Module C1 to provide a tint level signal to Module D. Module D can then provide one tint level command. This command can be used to control the tint of (e.g., all) the windows of a building. Use of one tint level command does not take into account that windows located on different facades and/or sides of a building may be exposed to different amounts of solar radiation.

In one embodiment, the multi-sensor device described herein may include a compass, an on-board GPS sensor, and/or or other direction determining device 3379. In one embodiment, the direction determining device may be used to determine how much to physically orient the multi-sensor device and/or its photosensors, relative to a known direction. Physical orientation of the device may be performed during an initial installation, and/or as may be required subsequently due to changes in the initial orientation. In one embodiment, the photosensors of a multi-sensor device are assigned to groups and each group is assigned to at least one façade or side of a building. In some embodiments, the number of different facades or sides is 2, 3, 4 or mores sides of a building. In some embodiments, the groups comprise 2, 3, 4 or more adjacent photosensors. In some embodiments, the number of facades and/or sides of a building comprises 2, 3, 4 or more facades and/or sides. In some embodiments, Module C1 receives a maximum radiance reading from the 2, 3, 4 or more groups of photosensors. In some embodiments, Module C1 provides 2, 3, 4 or more individual tint level commands to Module D. The individual tint level commands may be used to enable the tint level of windows that are located on different facades or sides of a building to be controlled independent of each other.

In one embodiment, orientation of the multi-sensor device described herein can be determined requiring minimal (e.g., or without requiring) physical alignment of the multi-sensor device. In one embodiment, orientation of the multi-sensor device is determined at least in part via a calculated (e.g., and algorithm based) approach. In one embodiment, the calculated approach uses as inputs: solar azimuth information provided to Module A1 and/or time stamped radiance readings obtained from at least two (e.g., all) radially oriented photosensors of a multi-sensor device. In one embodiment, time stamped radiance readings are analyzed to obtain one maximum photosensor radiance reading. In one embodiment, data of maximum photosensor radiance readings (e.g., accumulated during one week or less) is stored for analysis by the algorithm. In some embodiments, it may be difficult to determine distinct maximum radiance readings, for example, because of an extended period of fog, rain, and/or snow. In some embodiments, the one week or less period of time can be increased, for example, to at most 2 weeks, 3 weeks, or 4 weeks. Although the solar azimuth information input to Module A1 can be used to determine an east-west orientation of a multi-sensor device, the orientation (on its own) may not necessarily provide the individual orientations of each photosensor of the multi-sensor device. In one embodiment, the East-West orientation may be used as a reference point to subset rows of maximum photosensor radiance data whose solar azimuth is closest to 90 and 270 degrees, respectively. The maximum photosensor radiance data of each photo sensor at a particular timestamp may subsequently be compared against clear sky model radiance data. The radiance data, as well as solar azimuth data provided to Module A1, may be obtained from a publicly available RADIANCE program, or another (e.g., similar) program or database. To account for impact of cloudy weather on photosensor readings, in one embodiment, the algorithm can iteratively subset the rows of data for measures of brightness that are highest. The threshold may be lowered incrementally if no data in a particular range is available. Preliminary photosensor orientation assignments can be determined accordingly. At sites with high northern latitudes, there may be no data corresponding to solar azimuth values of about 900 and 2700 (the symbol "°" designates degrees), for example, in the winter months. Where there is no data corresponding to solar azimuth, southwest and southeast directions can be used as reference points to subset the rows of photosensor data whose solar azimuth is closest to 1500 and 210°, respectively. The photosensor maximum threshold can be incrementally lowered, e.g., until rows are obtained that allow comparison of (i) timestamps of clear sky data with (ii) photosensor maxima data. These comparisons may result in two possible preliminary assignments for each reference photosensor. For example, a reference photo sensor #1 may oriented slightly south of 900 East (i.e., East-Southeast), or, it may be oriented slightly north of 900 East (i.e., East-Northeast). The same holds for preliminary assignment of an opposite radially facing photosensor #7 (i.e., West-Southwest, or West-Northwest). From at least one of the four possible mappings (e.g., two for each reference photosensor), assignments for the remaining sensors can be extrapolated. The extrapolated assignments can be compared to select the mapping for which there is an agreement. If there is no majority mapping (e.g., an equal count of possible mappings derived from the two reference photo sensors), the algorithm may return assignments with a 600 granularity, accounting for the two possible assignments attributed to each of the 12 photosensors. If no mapping agreement is identified, a warning may be issued in a log file output. If no mapping agreement is identified, a 600 granular mapping may be extrapolated from the preliminary photo sensor assignment whose solar azimuth is closest to that of the historical radiation reference point (e.g., 89.890 is closer to true East than 268.12° is to true West). In one embodiment, the calculated approach to determining an orientation of photosensors of a multi-sensor device may be used to replace and/or supplement physical alignment of the multi-sensor device and its sensors.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

While preferred embodiments of the present invention have been shown, and described herein, it will be obvious to those skilled in the art that such embodiments are provided by way of example only. It is not intended that the invention be limited by the specific examples provided within the specification. While the invention has been described with reference to the afore-mentioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein might be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A method of using a rooftop multi-sensor device to control one or more tintable windows in or on a structure, the method comprising:
   determining at least one photosensor reading from a plurality of photosensor readings taken by a group of photosensors of the rooftop multi-sensor device;
   selecting one or more tint levels for the one or more tintable windows based at least in part on the at least one photosensor reading determined; and
   communicating tint instructions to transition tint of the one or more tintable windows to the one or more tint levels selected.

2. The method of claim 1, wherein each tint level of the one or more tint levels is selected for each tintable window of the one or more tintable windows based at least in part on a facade or a side of the structure on which each tintable window is disposed.

3. The method of claim 1, further comprising selecting one or more photosensors from the group of photosensors to use in determining a tint level for at least one tintable window disposed on a facade or a side of the structure.

4. The method of claim 3, wherein a tint level for the at least one tintable window on the facade or the side of the structure is calculated based at least in part on photosensor readings from the one or more photosensors selected.

5. The method of claim 3, wherein the selection is based on an orientation of the one or more photosensors and an orientation of the facade or the side of the structure.

6. The method of claim 5, wherein the orientation of the one or more photosensors is determined using a direction-determining device.

7. The method of claim 6, wherein the direction-determining device comprises a compass or a global positioning system device.

8. The method of claim 5, wherein the orientation of the facade or the side of the structure is determined using a longitude and a latitude of the structure.

9. The method of claim 1, wherein each photosensor in the group of photosensors is oriented radially outward from an axis.

10. The method of claim 1, wherein the selection of the one or more tint levels is based at least in part on the at least one photosensor reading determined and one or more readings taken by at least one infrared sensor of the rooftop multi-sensor device.

11. The method of claim 1, wherein the selection of the one or more tint levels is based at least in part on the at least one photosensor reading determined and ambient temperature data.

12. The method of claim 11, wherein the ambient temperature data is based on readings taken by an ambient temperature sensor of the rooftop multi-sensor device or from an external weather feed.

13. The method of claim 11, wherein the selection of the one or more tint levels is based in part on applying a correction factor to the ambient temperature data.

14. The method of claim 1, wherein each photosensor in the group of photosensors is directed to take readings of radiation received from a different direction than the other photosensors in the group of photosensors.

15. The method of claim 3, wherein a tint level for the at least one tintable window on the facade or the side of the structure is calculated based at least in part on photosensor readings from the one or more photosensors selected.

16. The method of claim 1, wherein collectively the group of photosensors have a 360 degree view.

17. A rooftop multi-sensor device for controlling one or more tintable windows in or on a structure, the rooftop multi-sensor device comprising:
   a group of photosensors;
   control logic embodied in a computer readable medium; and
   circuitry in communication with the one or more tintable windows and the group of photosensors, the circuitry configured to utilize the control logic to:
      determine at least one photosensor reading from a plurality of photosensor readings taken by the group of photosensors;
      select one or more tint levels for the one or more tintable windows based at least in part on the at least one photosensor reading determined; and
      communicate tint instructions to transition tint of the one or more tintable windows to the one or more tint levels selected.

18. The rooftop multi-sensor device of claim 17, wherein each tint level of the one or more tint levels is selected for each tintable window of the one or more tintable windows based at least in part on a facade or a side of the structure on which each tintable window is disposed.

19. The rooftop multi-sensor device of claim 17, wherein the circuitry is further configured to select one or more photosensors from the group of photosensors to use to determine a tint level for at least one tintable window disposed on a facade or a side of the structure.

20. The rooftop multi-sensor device of claim 19, wherein the circuitry is configured to select the one or more photosensors based on an orientation of the one or more photosensors and an orientation of the facade or the side of the structure.

21. The rooftop multi-sensor device of claim 20, wherein the circuitry is configured to use a longitude and a latitude of the structure to determine the orientation of the one or more photosensors.

22. The rooftop multi-sensor device of claim 21, wherein the orientation of the one or more photosensors is determined based at least in part on a reading from a compass or a global positioning system device.

23. The rooftop multi-sensor device of claim 19, wherein each photosensor in the group of photosensors is oriented radially outward from an axis.

24. The rooftop multi-sensor device of claim 17,
   further comprising at least one infrared sensor;
   wherein the circuitry is configured to select the one or more tint levels based on the at least one photosensor reading determined and one or more readings from the at least one infrared sensor.

25. The rooftop multi-sensor device of claim 17, wherein the circuitry is configured to select the one or more tint levels based on the at least one photosensor reading determined and based on ambient temperature data.

26. The rooftop multi-sensor device of claim 25, wherein the ambient temperature data is based on readings taken by an ambient temperature sensor on or in the rooftop multi-sensor device or from external weather feed.

27. The rooftop multi-sensor device of claim 25, wherein the ambient temperature data is based on readings from an external weather feed and the one or more tint levels is selected in part by applying a correction factor to the ambient temperature data from the external weather feed.

28. The rooftop multi-sensor device of claim 17, wherein each photosensor in the group of photosensors is directed to take readings of radiation received from a different direction than the other photosensors in the group of photosensors.

29. The rooftop multi-sensor device of claim 21, wherein a tint level for the at least one tintable window on the facade or the side of the structure is selected based at least in part on photosensor readings from the one or more photosensors selected.

30. The rooftop multi-sensor device of claim 17, wherein collectively the group of photosensors has a 360 degree view.

* * * * *